US012539217B2

(12) United States Patent
Frankle et al.

(10) Patent No.: US 12,539,217 B2
(45) Date of Patent: Feb. 3, 2026

(54) GLENOID IMPLANT

(71) Applicant: ENCORE MEDICAL, L.P., Austin, TX (US)

(72) Inventors: Mark A. Frankle, Tampa, FL (US); Sergio Gutierrez, Tampa, FL (US); Gerald Williams, Villanova, PA (US)

(73) Assignee: ENCORE MEDICAL, L.P., Austin, TX (US)

( * ) Notice: Subject to any disclaimer, the term of this patent is extended or adjusted under 35 U.S.C. 154(b) by 1198 days.

(21) Appl. No.: 17/310,280

(22) PCT Filed: Jan. 27, 2020

(86) PCT No.: PCT/US2020/015199
§ 371 (c)(1),
(2) Date: Jul. 27, 2021

(87) PCT Pub. No.: WO2020/159864
PCT Pub. Date: Aug. 6, 2020

(65) Prior Publication Data
US 2022/0125594 A1    Apr. 28, 2022

Related U.S. Application Data

(60) Provisional application No. 62/797,866, filed on Jan. 28, 2019.

(51) Int. Cl.
*A61F 2/40*    (2006.01)
*A61F 2/30*    (2006.01)

(52) U.S. Cl.
CPC ........ *A61F 2/4081* (2013.01); *A61F 2/30734* (2013.01); *A61F 2/30749* (2013.01);
(Continued)

(58) Field of Classification Search
CPC ...... A61F 2/32; A61F 2/40; A61F 2002/4085; A61F 2/4081; A61F 2/30734;
(Continued)

(56) References Cited

U.S. PATENT DOCUMENTS 6,077,262 A * 6/2000 Schlapfer ........... A61B 17/7032
606/264
9,421,102 B2 * 8/2016 Hjelle .................... D04B 21/12
(Continued)

FOREIGN PATENT DOCUMENTS

EP       2 662 056 A2    11/2013
JP       2016513498 A     5/2016
(Continued)

OTHER PUBLICATIONS

International Search Report and Written Opinion in International Application No. PCT/US2020/015199, mailed Apr. 14, 2020 (14 pages).

(Continued)

*Primary Examiner* — Melanie R Tyson
*Assistant Examiner* — Paris Marie Blass
(74) *Attorney, Agent, or Firm* — Nixon Peabody LLP

(57) ABSTRACT

A glenoid implant includes a base element, a coupling element, and an augment. The base element has a central aperture, a second aperture, and a wedge element. The coupling element has a first portion and a second portion. The first portion has a first plurality of apertures and the second portion has a central aperture aligned with the central aperture of the base element. The augment is received within a receiving space of the coupling element. The augment has a second plurality of apertures, each of which is aligned with each of the first plurality of apertures to receive respective second fastening elements. The coupling element and the augment are configured to rotate about an axis of the base
(Continued)

element such that the coupling element and the augment are movable relative to the base element.

30 Claims, 76 Drawing Sheets

(52) U.S. Cl.
CPC ............... *A61F 2002/30433* (2013.01); *A61F 2002/30736* (2013.01); *A61F 2002/4085* (2013.01)

(58) Field of Classification Search
CPC ........ A61F 2/30749; A61F 2002/30433; A61F 2002/30736; A61F 2/42
USPC ...................... 623/19.11, 18.11, 19.14, 23.43
See application file for complete search history.

(56) References Cited

U.S. PATENT DOCUMENTS

| | | | |
|---|---|---|---|
| 9,717,599 B1* | 8/2017 | Gorelick | ............... A61F 2/4261 |
| 9,861,493 B2* | 1/2018 | Maale | ................... A61F 2/4081 |
| 2004/0153086 A1 | 8/2004 | Sanford | |
| 2006/0217734 A1 | 9/2006 | Sanford et al. | |
| 2008/0058949 A1 | 3/2008 | Dees et al. | |
| 2013/0150972 A1 | 6/2013 | Iannotti | |
| 2013/0150974 A1* | 6/2013 | Iannotti | ................. A61F 2/4003 623/18.11 |
| 2014/0257499 A1 | 9/2014 | Winslow | |
| 2014/0277518 A1* | 9/2014 | Iannotti | ..................... A61F 2/30 623/19.11 |
| 2016/0045323 A1 | 2/2016 | Kovacs | |
| 2016/0074168 A1* | 3/2016 | Masson | ................. A61F 2/4014 623/19.13 |
| 2018/0103966 A1 | 4/2018 | Jones et al. | |
| 2018/0280152 A1* | 10/2018 | Mutchler | .............. A61F 2/4014 |

FOREIGN PATENT DOCUMENTS

| | | |
|---|---|---|
| JP | 2017523872 A | 8/2017 |
| WO | 2014138424 A1 | 9/2014 |
| WO | 2016025378 A1 | 2/2016 |
| WO | 2017007820 A1 | 1/2017 |
| WO | WO-2018039493 A1 * | 3/2018 ........... A61B 17/025 |
| WO | 2018189322 A1 | 10/2018 |
| WO | WO-2019006205 A1 * | 1/2019 ......... A61F 2/30734 |

OTHER PUBLICATIONS

Office Action for European Patent Application No. 21707580.3, mailed Feb. 10, 2025, (5 pages).

* cited by examiner

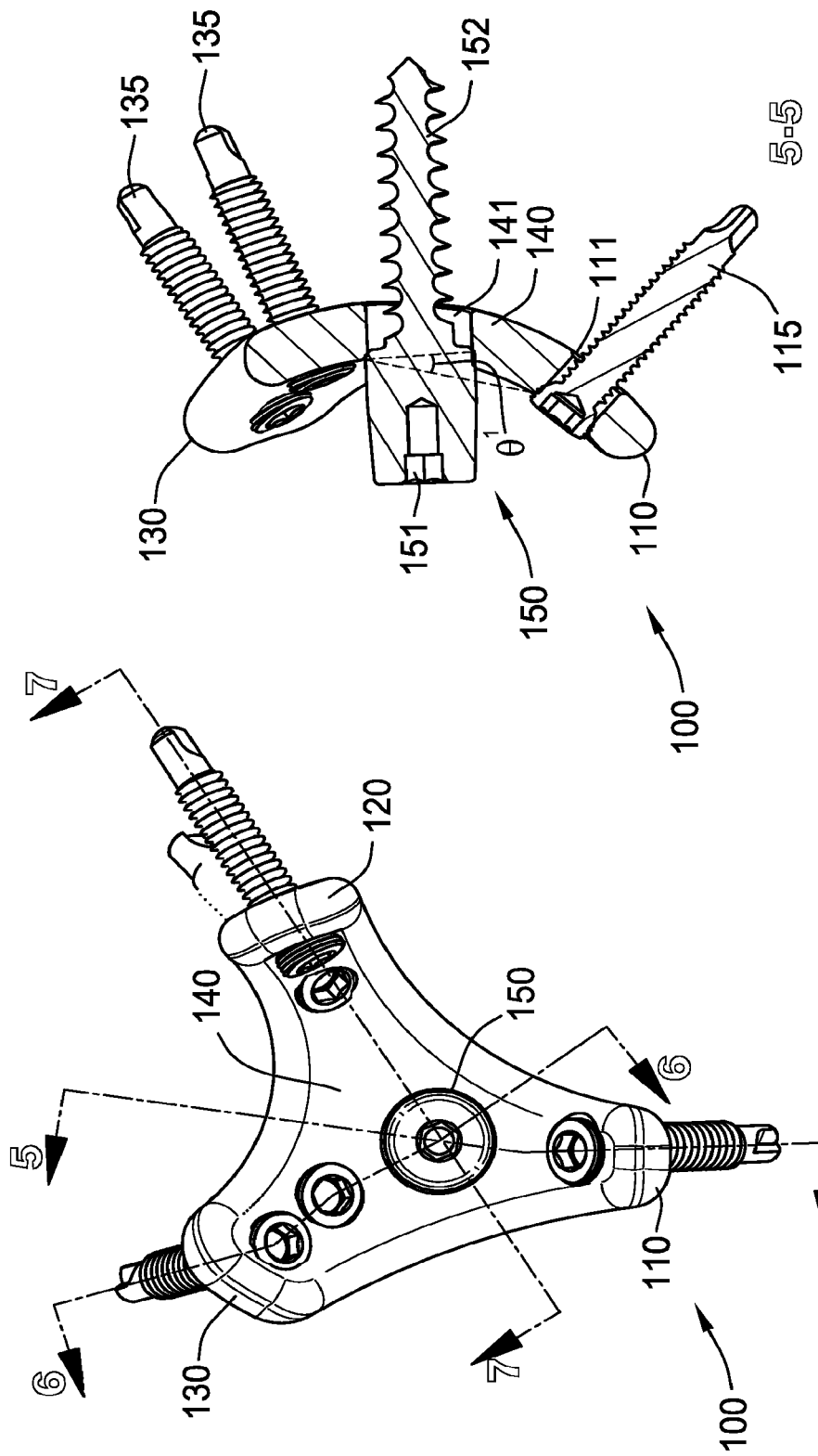

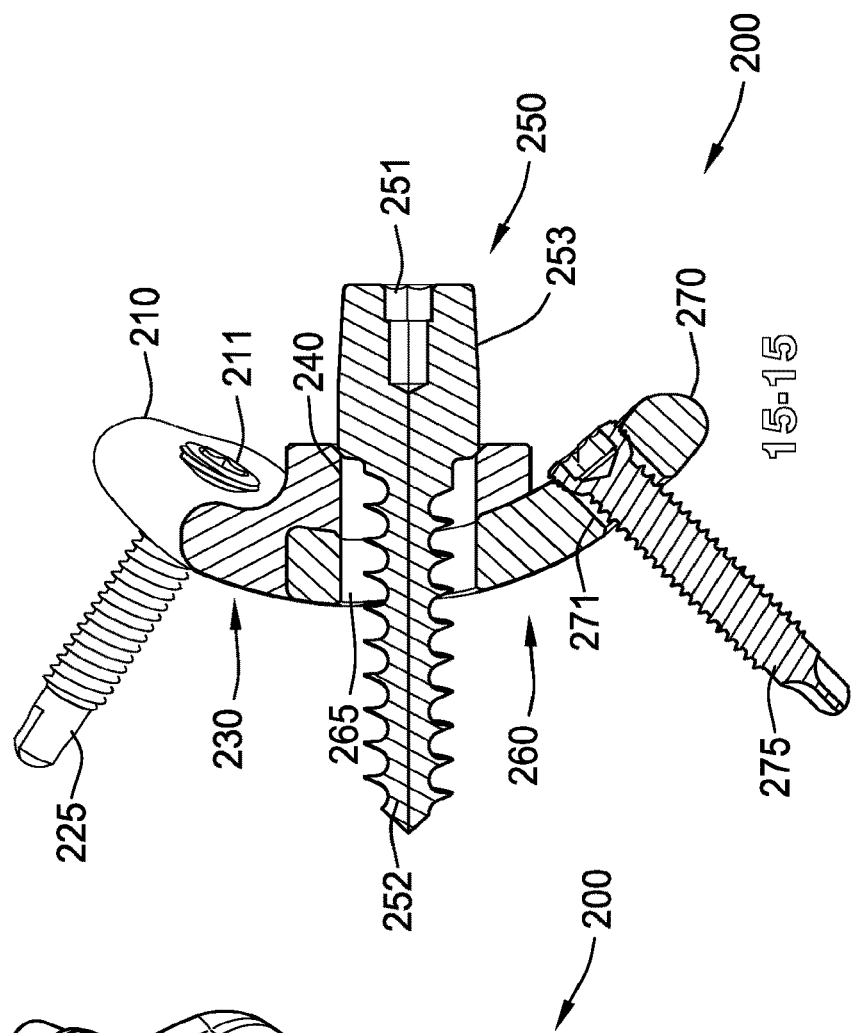
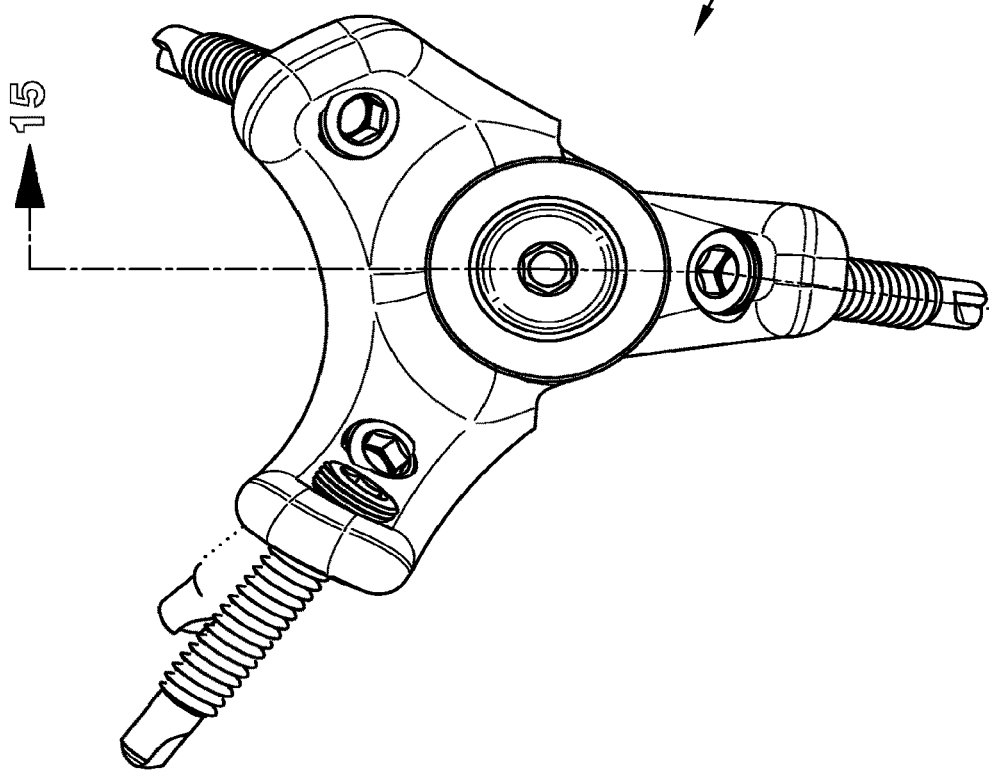
FIG. 15
FIG. 14

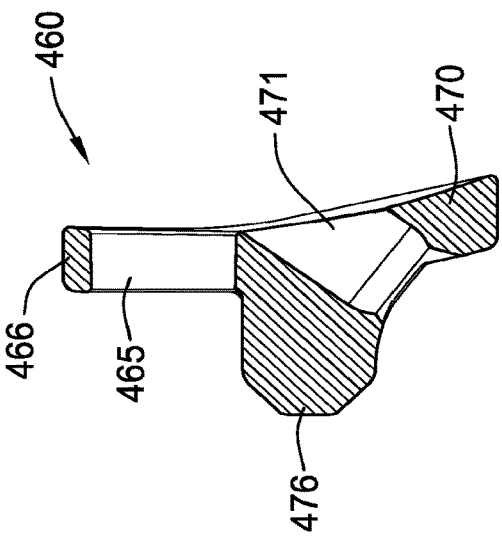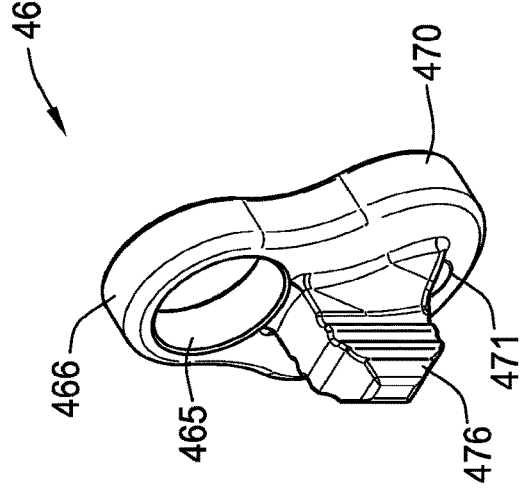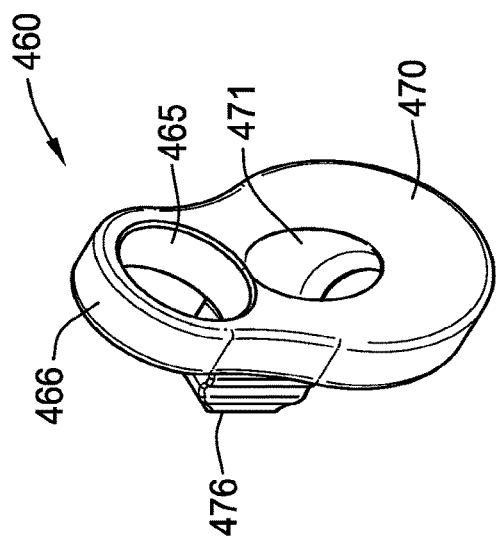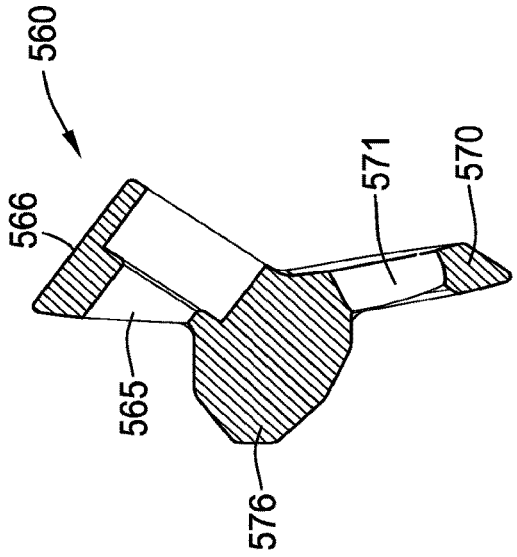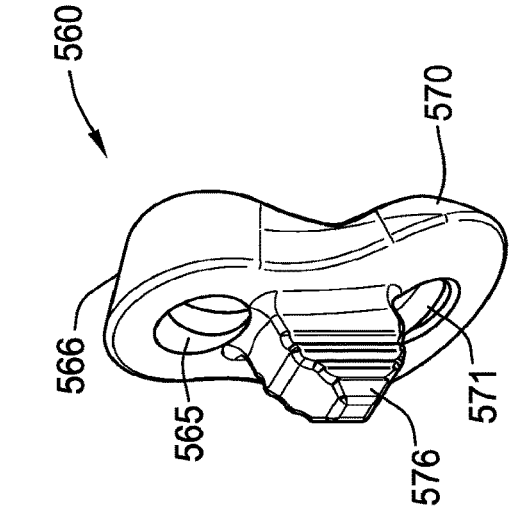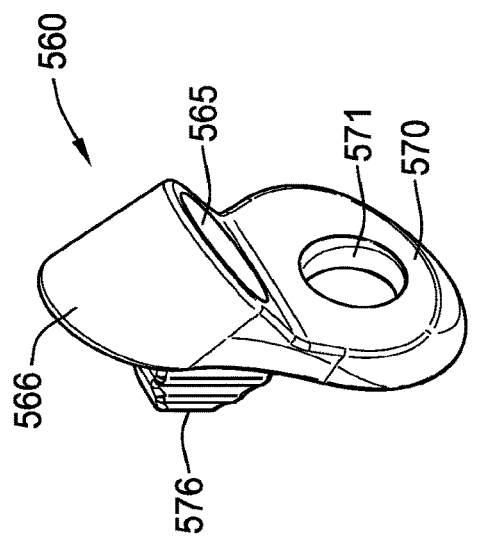

GLENOID IMPLANT

CROSS-REFERENCE TO RELATED APPLICATION

This application is a U.S. National Stage of International Application No. PCT/US2020/015199, filed Jan. 27, 2020, which claims priority to and the benefit of U.S. Provisional Patent Application No. 62/797,866, filed Jan. 28, 2019, each of which is hereby incorporated by reference herein in its entirety.

FIELD OF THE PRESENT DISCLOSURE

The present disclosure relates to glenoid implants for cases of severe bone loss.

BACKGROUND

Shoulder replacement surgery is currently used to treat patients suffering from disabling pain due to worn or damaged shoulder joints, which can be caused by, e.g., arthritis and/or injury. The humeral implants currently in use are typically made from metal, and the implants are affixed to the bone using bone cement (e.g., polymethylmethacrylate) or by press fitting the implant into the bone using a roughened outer surface coating on the metal for bony integration. Most glenoid (shoulder socket) implants are made completely from polyethylene and affixed to the cortical bone using bone cement. Some glenoid implants have a metal baseplate with a polyethylene insert. Current glenoid implants are made to sit on the surface of a reamed glenoid, which is prepared by removing any remaining cartilage and flattening the bony surface. These implants use either a keel or multiple elongated pegs on the back of the prosthetic glenoid implant to secure the glenoid implant inside the glenoid vault.

Keeled and pegged glenoid implants suffer from several disadvantages, which limit their lifespan once implanted and reduce the number of indications for which they can be used when the age of the patient is a factor. For example, the glenoid implants can loosen due to poor fixation within the bone, and they are prone to wear and fatigue failure of the polyethylene due to adhesion, abrasion, and shear stress. Because of these deficiencies, surgeons hesitate to perform glenoid replacement surgery on young or middle aged patients with glenoid articular cartilage injuries or damage due to early arthritis for fear that the implant may not last more than 10-15 years in the body, thus subjecting the patient to the possibility of two or more surgeries during the lifetime of the patient to preserve the function and pain-free state of the joint. Finally, current glenoid implants with a long keel or pegs are sometimes contraindicated in patients with significant glenoid bone loss. As arthritis progresses, the humeral head can wear medially and destroy the foundation of glenoid bone. In these cases, the glenoid vault can be significantly reduced in volume and depth. Thus, a typical keel or peg design can broach the glenoid vault and injure the suprascapular nerve along the suprascapular notch or spinoglenoid notch with resultant denervation injury to the rotator cuff muscles. Broaching through the glenoid vault can also fracture the body of the scapula and cause early implant loosening.

Because there are more than 20,000 shoulder arthoplasty surgeries performed per year, many U.S. patients incur a risk of continued pain and disability, neuromuscular injuries, or failed shoulder prostheses requiring revision surgery. Thus, there remains a need for an improved glenoid implants. The present disclosure is directed to solving these problems and addressing other needs.

SUMMARY OF THE PRESENT DISCLOSURE

According to some implementations of the present disclosure, a glenoid implant includes a base element, a coupling element, and an augment. The base element has a central aperture, a second aperture, and a wedge element. The coupling element has a first portion and a second portion. The first portion has a first plurality of apertures and the second portion has a central aperture aligned with the central aperture of the base element. The augment is received within a receiving space of the coupling element. The augment has a second plurality of apertures, each of which is aligned with each of the first plurality of apertures to receive respective second fastening elements. The coupling element and the augment are configured to rotate about an axis of the base element such that the coupling element and the augment are movable relative to the base element.

According to some implementations of the present disclosure, a glenoid implant includes a base element, a coupling element and an augment. The base element has a central aperture therethrough, a second aperture therethrough, and a wedge element extending from a rear of the base element. The second aperture is configured to receive a portion of a first fastening element therethrough to aid in securing the base element to a first portion of a scapula of a patient. The coupling element has a first portion and a second portion. The first portion has a first plurality of apertures therethrough and the second portion has a central aperture aligned with the central aperture of the base element. The augment is configured to be received within a receiving space of the first portion of the coupling element. The augment has a second plurality of apertures therethrough. Each of the first plurality of apertures is aligned with each of the second plurality of apertures to receive a respective second fastening element therethrough to aid in securing the coupling element and the augment to a second portion of the scapula of the patient. The coupling element and the augment are configured to rotate about an axis of the base element such that the coupling element and the augment are movable relative to the base element.

According to some implementations of the present disclosure, a glenoid implant includes a base element, a coupling element, and an augment. The base element has a trunnion forming a central aperture therethrough and an attachment portion adjacent to the trunnion. The base element further forms a second aperture that is configured to receive a portion of a first fastening element therethrough to aid in coupling the base element to a first portion of a scapula of a patient. The coupling element has a first portion and a second portion. The first portion has a plurality of apertures therethrough and the second portion having a central aperture aligned with the central aperture of the base element. The augment is configured to be received within a receiving space of the first portion of the coupling element. The augment has a second plurality of apertures therethrough. Each of the first plurality of apertures is aligned with each of the second plurality of apertures to receive a respective second fastening element therethrough to aid in securing the coupling element and the augment to a second portion of the scapula of the patient. The coupling element and the augment are configured to rotate about an axis of the base element such that the coupling element and the augment are movable relative to the base element.

According to some implementations of the present disclosure, a glenoid implant includes a baseplate, a first leg and a second leg. The baseplate includes a central aperture therethrough. The first leg extends from the baseplate generally along a first arc. The first leg includes a first aperture therein configured to receive a portion of a first fastening element therethrough to aid in securing the first leg to a first portion of a scapula of a patient. The second leg extends from the baseplate generally along a second arc. The second leg includes a second aperture therein configured to receive a portion of a second fastening element therethrough to aid in securing the second leg to a second portion of the scapula of the patient.

In some implementations, a radius of curvature for the first arc is larger than a radius of curvature for the second arc. In an alternative implementation, a radius of curvature for the first arc is the same as a radius of curvature for the second arc. In an alternative implementation, a radius of curvature for the second arc is larger than a radius of curvature for the first arc. The first portion of the scapula of the patient can be an Acromion. The second portion of the scapula of the patient can be a Coracoid.

The glenoid implant can also include a third leg extending from the baseplate generally along a third arc. The third leg can have a third aperture therein configured to receive a portion of a third fastening element therethrough to aid in securing the third leg to a third portion of the scapula of the patient. In some implementations, a radius of curvature for the third arc is smaller than a radius of curvature for the second arc and a radius of curvature for the first arc. In some alternative implementations, the radius of curvature for the third arc is the same as a radius of curvature for the second arc and a radius of curvature for the first arc. The third portion of the scapula of the patient can be an Infraglenoid tubercle (also referred to as the lateral boarder of the scapula) and/or the For Subscapularis.

In some implementations, the baseplate includes a first portion coupled to a second portion such that the central aperture is defined by both the first portion and the second portion. The first portion of the baseplate, the first leg, and the second leg can form a first monolithic part. Furthermore, the second portion of the baseplate and the third leg can form a second monolithic part that is separate and distinct from the first monolithic part.

In some implementations, the first leg, the second leg, and the third leg are curved to account for curvature of the first portion, second portion, and third portion of the scapula of the patient. The first leg, the second leg, and the third leg can extend generally along the first arc, the second arc, and the third arc, respectively, such that each of the first leg, the second leg, and the third leg has a radius of curvature.

The radius of curvature of the first leg, the second leg, and the third leg can aid in a substantial portion of the glenoid implant directly abutting the first portion, second portion, and third portion, respectively, of the scapula of the patient. In some implementations, at least seventy-five percent of a rear surface of the glenoid implant directly abuts the scapula of the patient prior to bone grafting material being applied. In some implementations, the first leg is longer than the second leg and the third leg.

The glenoid implant can also include a central fastening element configured to be at least partially positioned through the central aperture of the baseplate to aid in securing the baseplate to a fourth portion of the scapula of the patient. The fourth portion of the scapula of the patient can be a glenoid cavity. In some implementations of the disclosure, a head of the central fastening element is configured to be coupled with one or more additional components using a Morse taper press fit. The head of the central fastening element can be configured to be coupled with a humeral head. In alternative implementations, the central fastening element includes a compression screw. In further alternative implementations of the disclosure, the central fastening element includes a lock screw.

In some implementations, the first fastening element and the second fastening element are configured to provide the glenoid implant with bi-cortical support. In alternative implementations of the present disclosure, the first fastening element and the second fastening element are configured to provide the glenoid implant with uni-cortical support.

According to some implementations of the present disclosure, a glenoid implant includes a baseplate, a first leg and a second leg. The baseplate includes a central aperture therethrough. The first leg extends from the baseplate in a first direction. The first leg includes a first aperture therein configured to receive a portion of a first fastening element therethrough to aid in securing the first leg to a first portion of a scapula of a patient. The second leg extends from the baseplate in a second direction. The second leg includes a second aperture therein configured to receive a portion of a second fastening element therethrough to aid in securing the second leg to a second portion of the scapula of the patient.

According to some implementations of the present disclosure, a glenoid implant includes a base, a first leg a second leg, and an adjustable third leg. The base includes a first portion and a second portion. The first portion includes a first aperture therethrough and the second portion having a second aperture therethrough. The first aperture is configured to align with the second aperture to define a central aperture of the base, responsive to the first portion being coupled to the second portion.

The first leg extends from the first portion of the base generally along a first arc. The first leg includes a first aperture therein configured to receive a portion of a first fastening element therethrough to aid in securing the first leg to a first portion of a scapula of a patient. The second leg extends from the first portion of the base generally along a second arc. The second leg includes a second aperture therein configured to receive a portion of a second fastening element therethrough to aid in securing the second leg to a second portion of the scapula of the patient. The adjustable extends from the second portion of the base generally along a third arc responsive to the first portion being coupled to the second portion. The third leg having a third aperture therein configured to receive a portion of a third fastening element therethrough to aid in securing the third leg to a third portion of the scapula of the patient.

According to some implementations of the present disclosure, a glenoid implant includes a base element, a coupling element and an augment. The base element includes a central aperture therethrough, a second aperture therethrough, and a keel element extending from a rear of the base element. The keel element is configured to secure the base element to a first portion of a scapula of a patient. The second aperture is configured to receive a portion of a first fastening element therethrough to aid in securing the base element to the first portion of the scapula of the patient. The coupling element includes a first elongated portion and a second portion. The first elongated portion includes a plurality of apertures therethrough and the second portion includes a central aperture aligned with the central aperture of the base element.

The augment is configured to be received within a receiving space of the first elongated portion of the coupling element. The augment includes a second plurality of apertures therethrough. Each aperture of the first plurality of apertures is aligned with each aperture of the second plurality of apertures to receive a portion of a second fastening element therethrough to aid in securing the coupling element and the augment to a second portion of the scapula of the patient. Once coupled, the coupling element and the augment is configured to rotate relative to the base element and/or relative to an axis of the base element.

According to some implementations of the disclosure, a glenoid implant includes a base element and a coupling element. The base element includes a central aperture therethrough and a second aperture therethrough. The second aperture is configured to receive a portion of a first fastening element therethrough to aid in coupling the base element to a first portion of a scapula of a patient. The coupling element includes a plurality of apertures therethrough and a central aperture aligned with the central aperture of the base element. Each aperture of the plurality of apertures is configured to receive a portion of a second fastening element therethrough to aid in securing the coupling element to a second portion of the scapula of the patient. The coupling element is configured to rotate relative to the base element and/or relative to an axis of the base element.

According to some implementations of the disclosure, a glenoid implant includes a base element, a coupling element, and an augment. The base element includes a central aperture therethrough, a second aperture therethrough, and a keel element extending from a rear of the base element. The keel element is configured to secure the base element to a first portion of a scapula of a patient. The second aperture is configured to receive a portion of a first fastening element therethrough to aid in securing the base element to the first portion of the scapula of the patient. The coupling element includes a first elongated portion and a second portion. The first elongated portion includes a plurality of apertures therethrough. The second portion includes a central aperture aligned with the central aperture of the base element.

The augment is configured to be received within a receiving space of the first elongated portion of the coupling element. The augment includes a second plurality of apertures therethrough. Each aperture of the first plurality of apertures is aligned with each aperture of the second plurality of apertures to receive a portion of a second fastening element therethrough to aid in securing the coupling element and the augment to a second portion of the scapula of the patient. Once coupled, the coupling element and the augment are configured to rotate relative to the base element and/or relative to an axis of the base element.

According to some implementations of the disclosure, a glenoid implant includes a base element, a coupling element, and an augment. The base element includes a central aperture therethrough, a second aperture therethrough, and a male receiving element on a rear end of the base element. The second aperture is configured to receive a portion of a first fastening element therethrough to aid in coupling the base element to a first portion of a scapula of a patient. The coupling element includes a first elongated portion and a second portion. The first elongated portion includes a plurality of apertures therethrough. The second portion includes a central aperture aligned with the central aperture of the base element. The augment is configured to be received within a receiving space of the first elongated portion of the coupling element. The augment includes a second plurality of apertures therethrough. Each aperture of the first plurality of apertures is aligned with each aperture of the second plurality of apertures to receive a portion of a second fastening element therethrough to aid in securing the coupling element and the augment to a second portion of the scapula of the patient. Once coupled, the coupling element and the augment are configured to rotate relative to the base element and/or relative to an axis of the base element.

According to some implementations of the disclosure, a glenoid implant includes a base element, a removable wedge element, a central fastening element, and a glenosphere. The base element includes a central aperture therethrough, a second aperture therethrough, and a male receiving element on a rear end of the base element. The second aperture is configured to receive a portion of a first fastening element therethrough to aid in securing the base element to a first portion of a scapula of a patient. The removable wedge element includes an aperture. The aperture is configured to receive the male receiving element of the base element and a third fastening element therethrough to aid in securing the removable wedge element to the base element. The central fastening element is configured to be at least partially positioned through the central aperture of the base element to aid in securing the base element to the first portion of the scapula of the patient. The glenosphere is configured to be coupled to the base element via the central fastening element.

According to some implementations of the disclosure, a glenoid implant includes a base element and a coupling element. The base element includes a central aperture therethrough, a second aperture therethrough, and a keel element extending from a rear of the base element. The keel element is configured to secure the base element to a first portion of a scapula of a patient. The second aperture is configured to receive a portion of a first fastening element therethrough to aid in securing the base element to the first portion of the scapula of the patient. The coupling element includes a first elongated portion and a second portion. The first elongated body includes a plurality of apertures therethrough and the second portion includes a central aperture aligned with the central aperture of the base element. Each aperture of the plurality of apertures is configured to receive a portion of a second fastening element therethrough to aid in securing the coupling element to a second portion of the scapula of the patient. The first elongated portion of the coupling element is positioned to a first side of the base element.

According to some implementations of the disclosure, a glenoid implant includes a base element, a coupling element, and an augment. The base element includes a central aperture therethrough, a second aperture therethrough, and a keel element extending from a rear of the base element. The keel element is configured to secure the base element to a first portion of a scapula of a patient. The second aperture is configured to receive a portion of a first fastening element therethrough to aid in securing the base element to the first portion of the scapula of the patient. The coupling element includes a first elongated portion and a second portion. The first elongated portion includes a plurality of apertures therethrough and the second portion includes a central aperture aligned with the central aperture of the base element. The augment is configured to be received within a receiving space of the first elongated portion of the coupling element. The augment includes a second plurality of apertures therethrough. Each aperture of the first plurality of apertures is aligned with each aperture of the second plurality of apertures to receive a portion of a second fastening element therethrough to aid in securing the coupling element and the augment to a second portion of the scapula of the patient. The coupling element and the augments are positioned to a first side of the base element.

According to some implementations of the disclosure, a glenoid implant includes a base element, a coupling element, and an augment. The base element includes a central aperture therethrough, a second aperture therethrough, and a wedge element extending from a rear of the base element. The wedge element is configured to secure the base element to a first portion of a scapula of a patient. The second aperture is configured to receive a portion of a first fastening element therethrough to aid in securing the base element to the first portion of the scapula of the patient. The coupling element includes a first elongated portion and a second portion. The first elongated portion includes a plurality of apertures therethrough and the second portion includes a central aperture aligned with the central aperture of the base element. The augment is configured to be received within a receiving space of the first elongated portion of the coupling element. The augment includes a second plurality of apertures therethrough. Each aperture of the first plurality of apertures is aligned with each aperture of the second plurality of apertures to receive a portion of a second fastening element therethrough to aid in securing the coupling element and the augment to a second portion of the scapula of the patient.

According to some implementations of the disclosure, a glenoid implant includes a baseplate and a keel element extending from a rear of the baseplate. The baseplate includes a central aperture therethrough and a plurality of apertures therethrough. Each of the plurality of apertures are positioned around the central aperture. The keel element includes a central aperture aligned with the central aperture of the base element and a plurality of grooves. Each aperture of the plurality of apertures is aligned with each groove of the plurality of grooves to receive a portion of a second fastening element therethrough to aid in securing the wedge element to a first portion of a scapula of a patient. The keel element is shaped to account for a cavity defect of a first portion of a scapula of a patient.

According to some implementations of the disclosure, a glenoid implant includes a baseplate and a keel element extending from a rear of the baseplate. The baseplate includes a central aperture therethrough and a first plurality of apertures therethrough. Each of the plurality of apertures are positioned around the central aperture. The keel element includes a central aperture aligned with the central aperture of the base element and a second plurality of apertures. At least one aperture of the first plurality of apertures is aligned with at least one aperture of the second plurality of apertures to receive a portion of a second fastening element therethrough to aid in securing the wedge element to a first portion of a scapula of a patient.

According to some implementations of the disclosure, a glenoid implant includes a reverse face plate, a keel element, a glenosphere, and a central fastening element. The reverse face plate includes a protrusion element with a first central aperture therethrough, a receiving element opposite the protrusion element, and a first plurality of apertures therethrough. Each of the plurality of apertures are positioned around the central aperture. The keel element includes a second central aperture, a threaded element to aid in securing the keel element to a first portion of a scapula of a patient, and a connecting element configured to couple with the receiving element of the reverse plate. The glenosphere includes a third central aperture and a receiving space configured to receive the protrusion element of the reverse face plate.

The central fastening element is configured to be at least partially positioned through the first central aperture of the reverse face plate, the second central aperture of the keel element, and the third central aperture of the glenosphere to aid in coupling the glenosphere to the reverse face plate and the keel element to the reverse face plate.

According to some implementations of the disclosure, a glenoid implant includes a reverse face plate, a keel element, a glenosphere, and a central fastening element. The reverse face plate includes a first receiving element with a first central aperture therethrough, a second receiving element opposite the first receiving element, and a first plurality of apertures therethrough. Each of the plurality of apertures are positioned around the first receiving element. The keel element includes a second central aperture, a threaded element to aid in securing the keel element to a first portion of a scapula of a patient, and a connecting element configured to couple with the second receiving element of the reverse plate. The glenosphere includes a third central aperture and a protrusion element configured to be received within the first receiving element of the reverse face plate. The central fastening element configured to be at least partially positioned through the first central aperture of the reverse face plate, the second central aperture of the keel element, and the third central aperture of the glenosphere to aid in coupling the glenosphere to the reverse face plate and the keel element to the reverse face plate.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 4 is a front view of the glenoid implant of FIG. 1 with a first, second and third cross-section;

FIG. 5 is a side view of the glenoid implant of FIG. 4 at the first cross-section;

FIG. 14 is a front view of the glenoid implant of FIG. 11 with a cross-section;

FIG. 15 is a side view of the glenoid implant of FIG. 14 at the cross-section;

FIG. 38 is a front isometric view of a glenoid implant in an eighth configuration according to some implementations of the present disclosure;

FIG. 39 is a rear isometric view of the glenoid implant of FIG. 38;

FIG. 40 is a cross-sectional isometric view of the glenoid implant of FIG. 38;

FIG. 41 is a front isometric view of a glenoid implant in a ninth configuration according to some implementations of the present disclosure;

FIG. 42 is a rear isometric view of the glenoid implant of FIG. 41;

FIG. 43 is a cross-sectional isometric view of the glenoid implant of FIG. 41;

Figure 1:
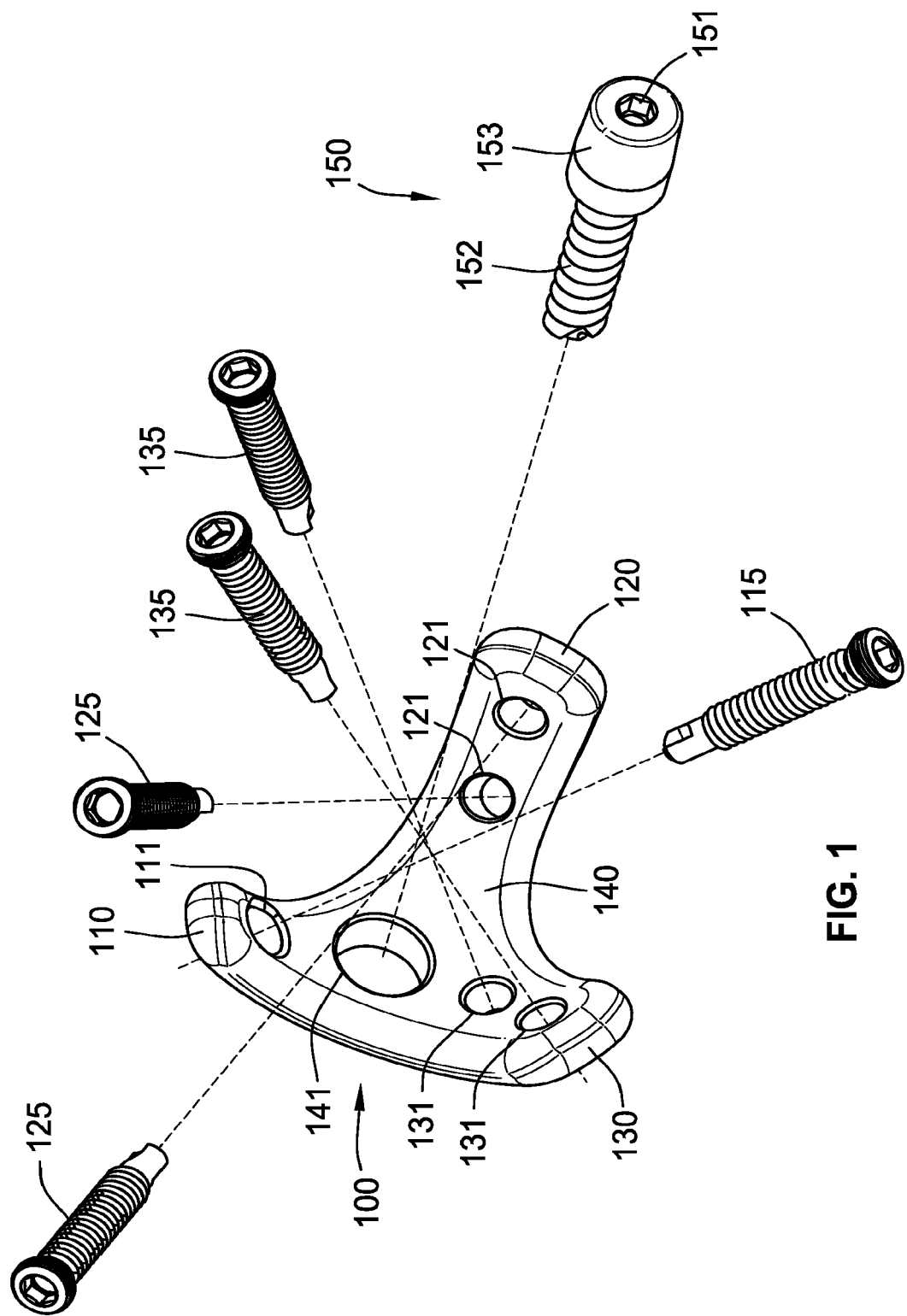
FIG. 1 is an exploded view of a glenoid implant in a first configuration according to some implementations of the present disclosure.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 2:
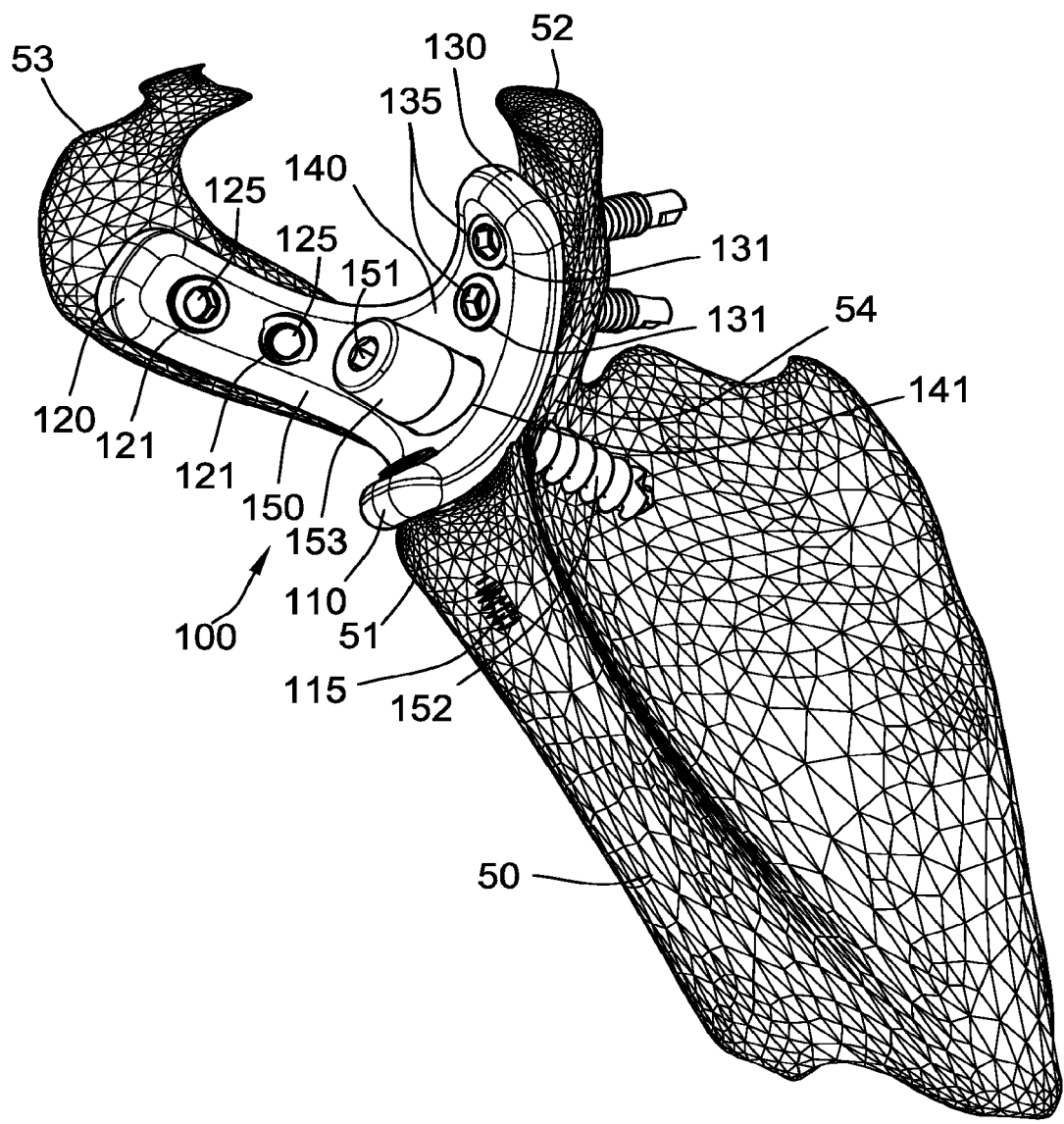
FIG. 2 is a front isometric perspective view of the glenoid implant of FIG. 1 surgically interfaced to a scapula.
Figure 3:
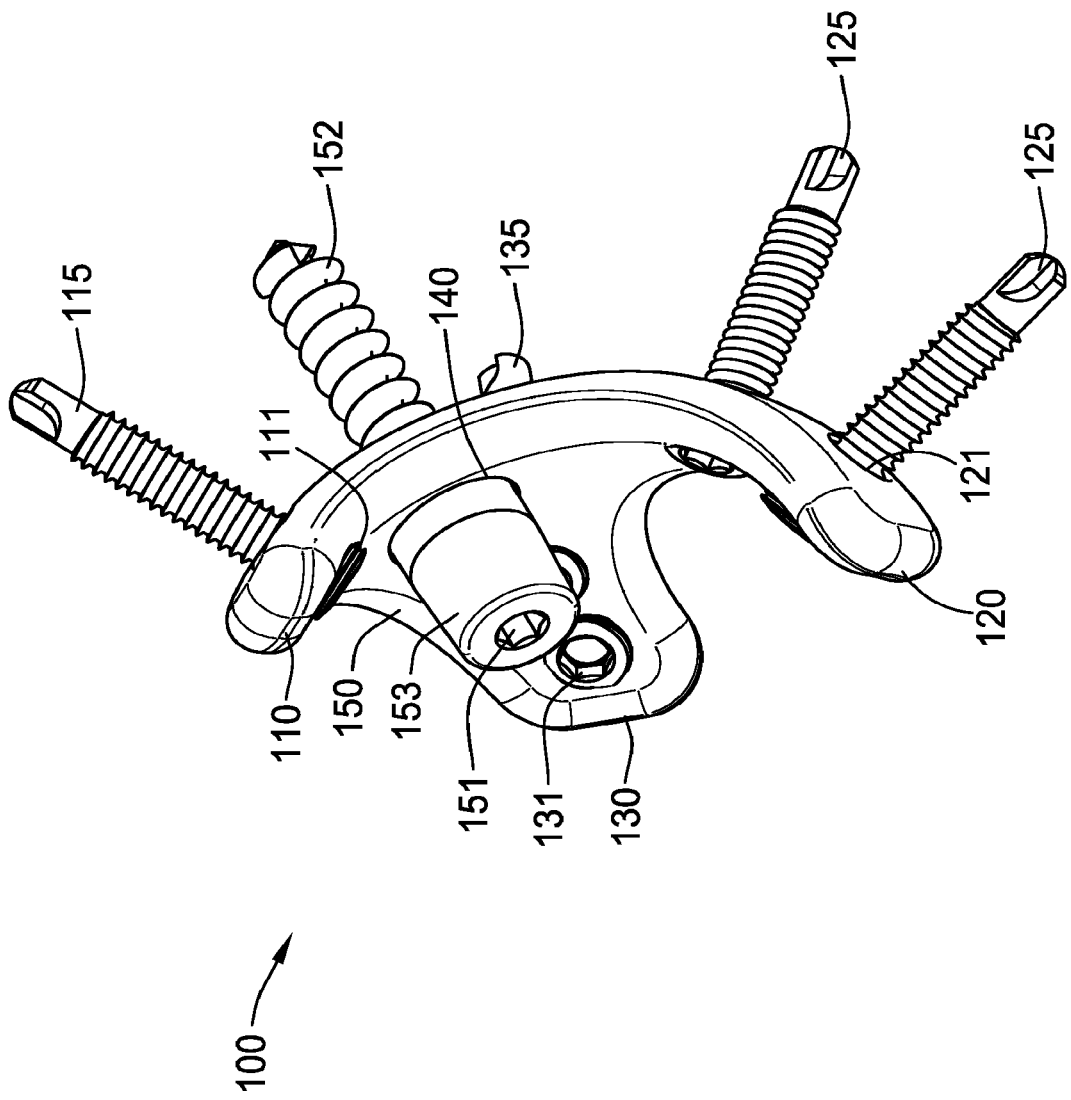
FIG. 3 is a side isometric perspective view of the glenoid implant of FIG. 1.

Referring generally to FIGS. 1-10, a glenoid implant 100 is illustrated. FIG. 1 is an exploded view of a glenoid implant 100. FIG. 3 is a side isometric perspective view of the glenoid implant 100. The glenoid implant 100 can be implemented in cases of severe bone loss and/or in cases of a fractured glenoid, where, for example, the glenoid implant 100 can be used to hold the fractured glenoid together so it can heal. The glenoid implant 100 includes a baseplate 140 and a first leg 110, a second leg 120, and a third leg 130 extending from the base plate 140. In some implementations, the first leg 110 can extend from the baseplate 140 in a first direction, the second leg 120 can extend from the baseplate 140 in a second direction, and the third leg 130 can extend from the baseplate 140 in a third direction. The legs can be curved with respect to the baseplate 140. In alternative implementations, the legs 110, 120, 130 can extend radially outward from the baseplate 140 without curvature.

The baseplate 140 includes a central aperture 141 therethrough. The first leg 110 also includes an aperture 111. The aperture 111 can be configured to receive a portion of a first fastening element 115 therethrough. The second leg 120 includes an aperture 121. The aperture 121 can be configured to receive a portion of a second fastening element 125 therethrough. Similarly, the third leg 130 includes an aperture 131. The aperture 131 can be configured to receive a portion of a third fastening element 135 therethrough. While the first 110, second 120, and third 130 legs are described with one aperture, it should be understood that each leg can contain more than one aperture. In some implementations, the second leg 120 is longer than the first leg 110 and also longer than the third leg 130.

The glenoid implant 100 can also include a central fastening element 150 configured to be at least partially positioned through the central aperture 141 of the baseplate 140. The central fastening element 150 can be configured as a compression screw, or as a lock screw. The fastening element 150 includes a screw component or a threaded shaft 152, a head element 153, and a receiving element 151. The receiving element 151 is shaped to receive a tool for turning and/or installing the central fastening element 150. In some implementations, the head 153 of the central fastening element 150 is configured to be coupled with one or more additional components using a Morse taper press fit. In alternative implementations, the head 153 of the central fastening element 150 is configured to be coupled with a humeral head.

As best shown in FIG. 2, the glenoid implant 100 can be surgically interfaced and/or installed in a scapula 50 of a patient. For the purposes of this disclosure, the scapula 50 is illustrated with four portions. The first portion 51 of the scapula includes the Infraglenoid tubercle (also referred to as the lateral boarder of the scapula) and/or the For Subscapularis, the second portion 53 includes the Acromion, the third portion 52 includes the Coracoid, and the fourth portion 54 includes the glenoid cavity. The first fastening element 115 can aid in securing the first leg 110 to the Infraglenoid tubercle and/or the For Subscapularis. The second fastening element 125 can aid in securing the second leg 120 to the Acromion. The third fastening element 135 can aid in securing the third leg 130 to the Coracoid. The central fastening element 150 can aid in securing the baseplate 140 to the glenoid cavity. For example, the central fastening element 150 can compress the baseplate 140 to the glenoid cavity. In alternative implementations, the central fastening element 150 can simply attach to the baseplate 140, not pulling the baseplate 140 into the glenoid cavity.

Figure 8:
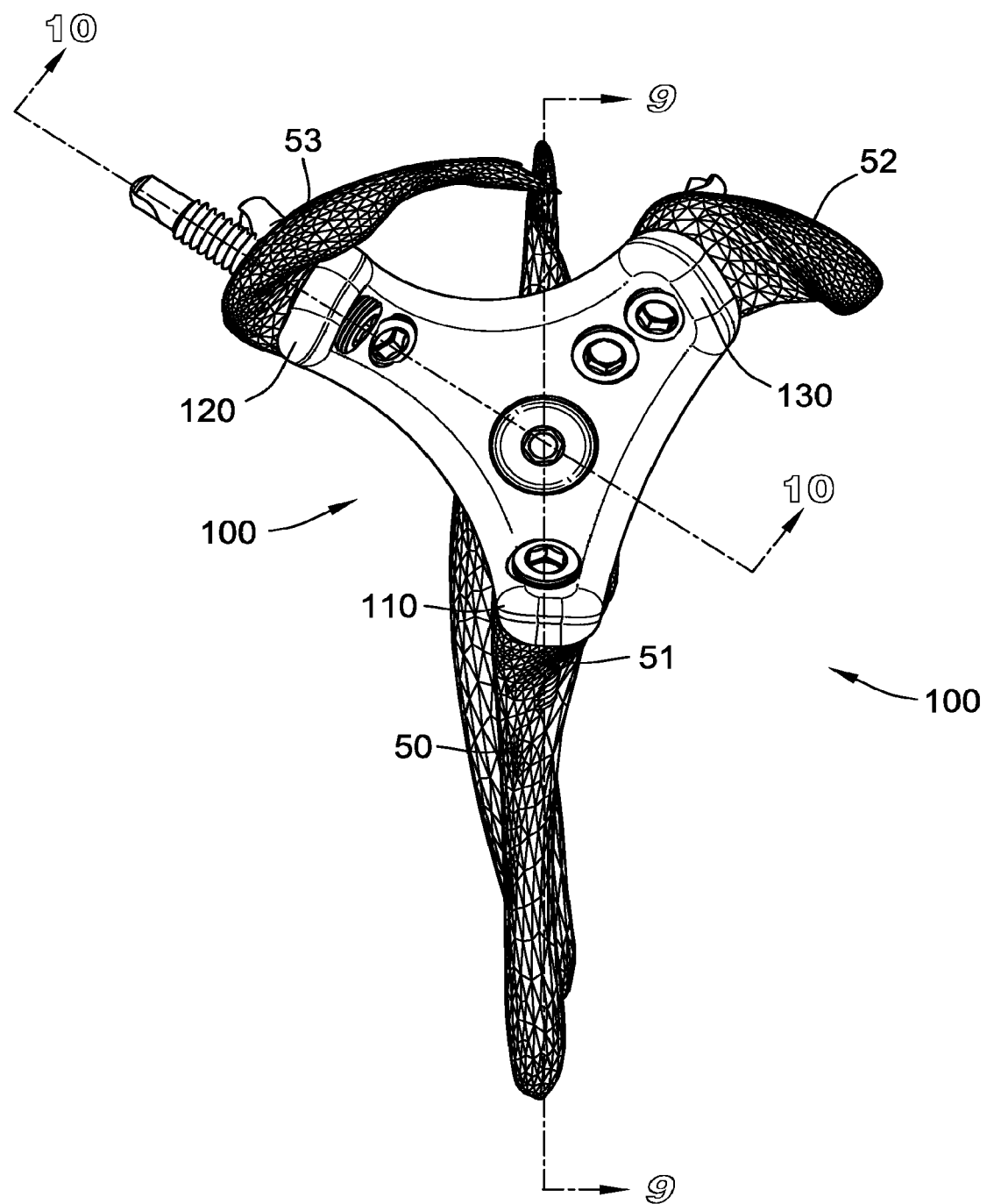
FIG. 8 is a front view of the glenoid implant of FIG. 1 surgically interfaced to a scapula, with a fourth, and fifth cross-section.
Figure 9:
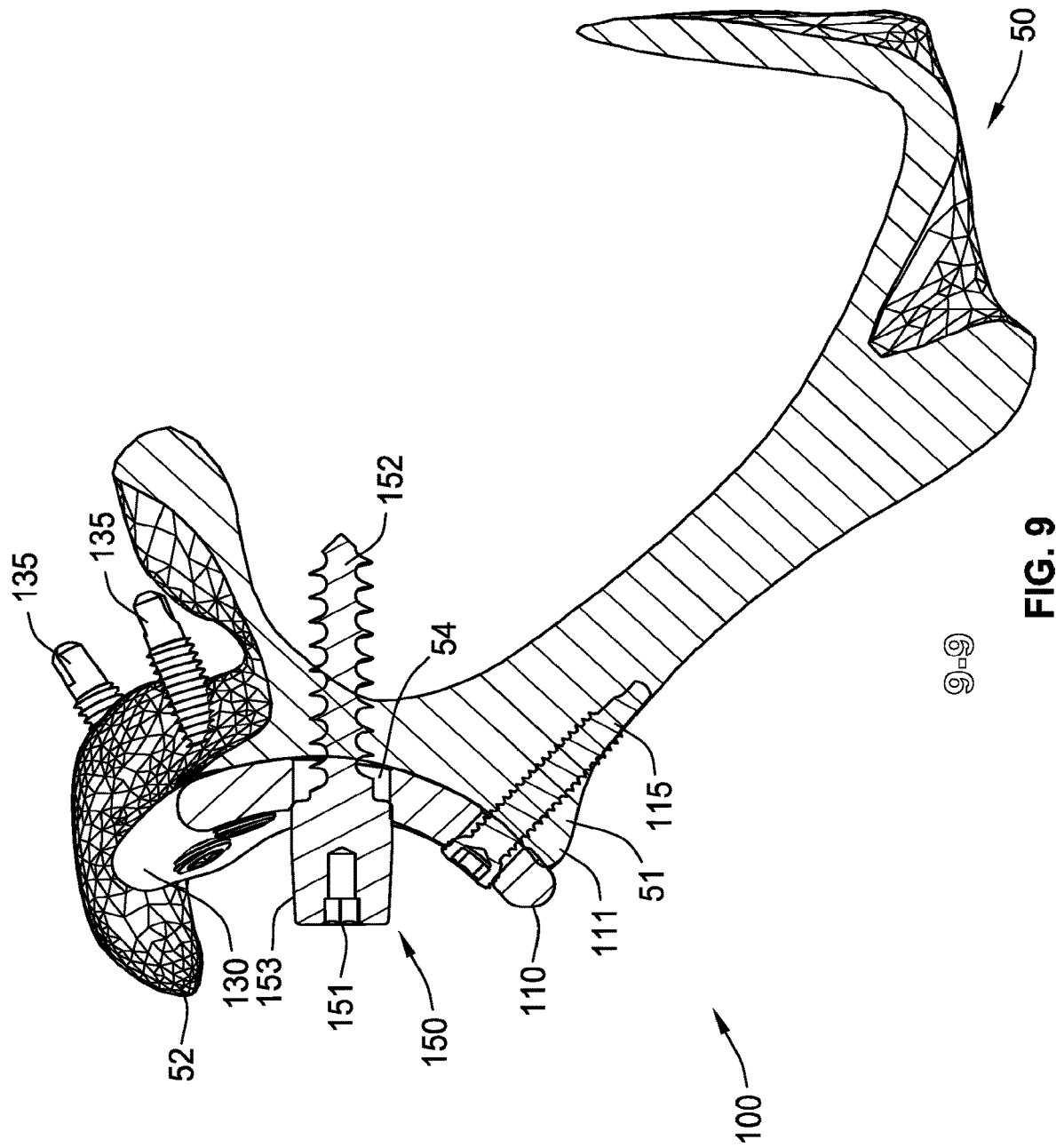
FIG. 9 is a side view of the glenoid implant of FIG. 8 at the first cross-section.
Figure 10:
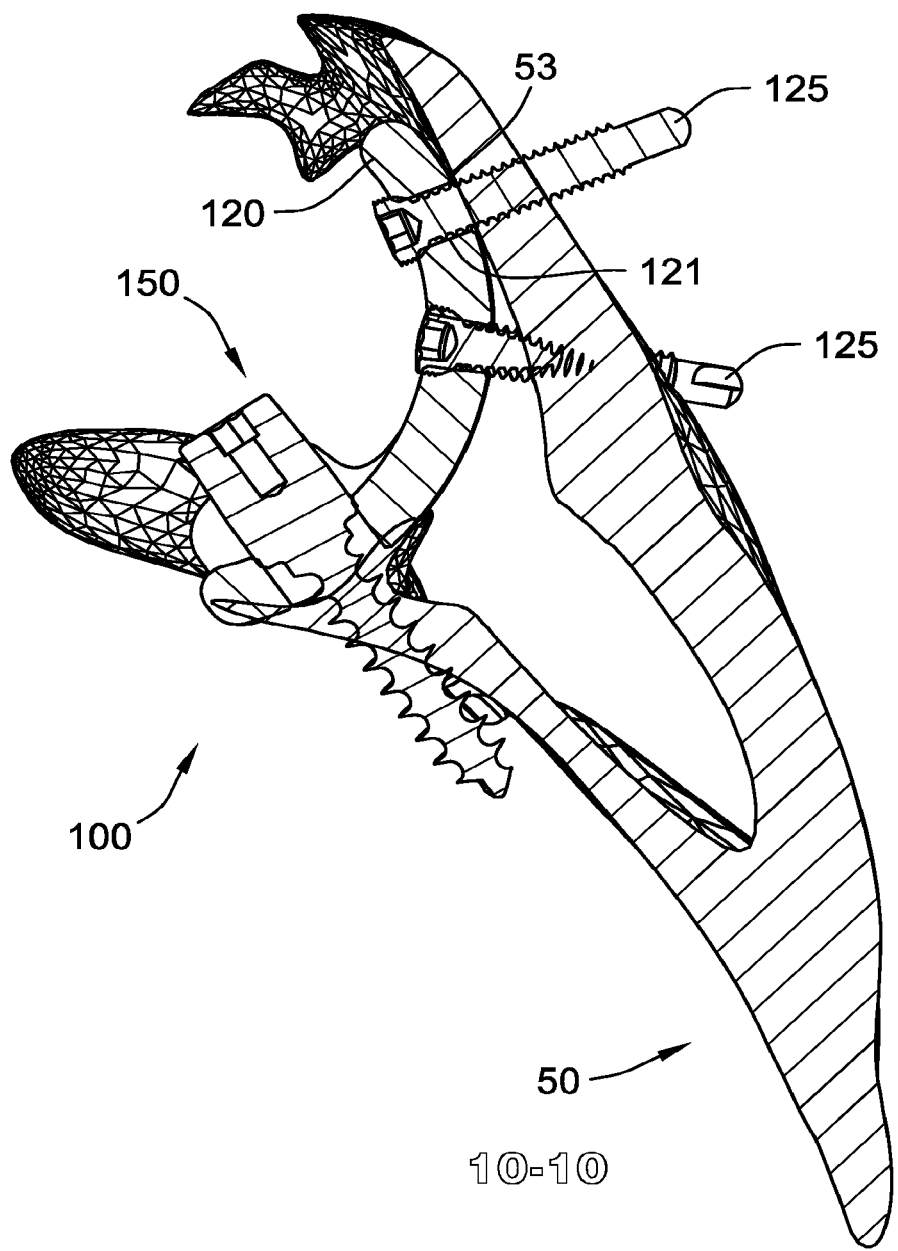
FIG. 10 is a side view of the glenoid implant of FIG. 8 at the second cross-section.

In some implementations, the first fastening element 115, the second fastening element 125, and the third fastening element 135 are configured to provide the glenoid implant 100 with bi-cortical support. In this way, the first fastening element 115, the second fastening element 125, and the third fastening element 135 are configured to protrude from the scapula 50 opposite the glenoid implant 100, to potentially connect two cortical plates. This is illustrated in FIGS. 8, 9 and 10. In some implementations, the first fastening element 115, the second fastening element 125, and the third fastening element 135 are configured to provide the glenoid implant 100 with uni-cortical support. In some implementations, the first fastening element 115, the second fastening element 125, and the third fastening element 135 can be self-tapping.

The first leg 110, the second leg 120, and the third leg 130 are curved to account for curvature of the Infraglenoid tubercle, the Acromion, and the Coracoid. In this way, a radius of curvature of the first leg 110, the second leg 120, and the third leg 130 aid in a substantial portion of the glenoid implant 100 directly abutting the Infraglenoid tubercle, the Acromion, and the Coracoid, respectively. In some implementations, at least seventy-five percent of a rear surface of the glenoid implant 100 directly abuts the scapula 50 prior to bone grafting material being applied. In some implementations, at least eighty percent, eighty-five percent, ninety percent, or ninety-five percent of a rear surface of the glenoid implant 100 directly abuts the scapula 50 prior to bone grafting material being applied.

Figure 7:
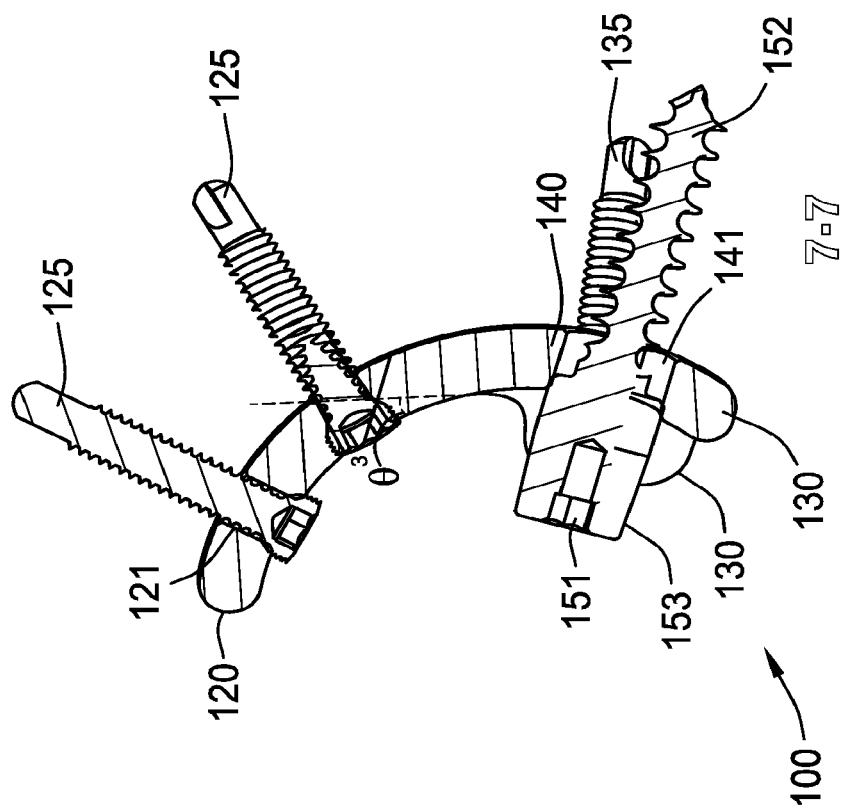
FIG. 7 is a side view of the glenoid implant of FIG. 4 at the third cross-section.
Figure 6:
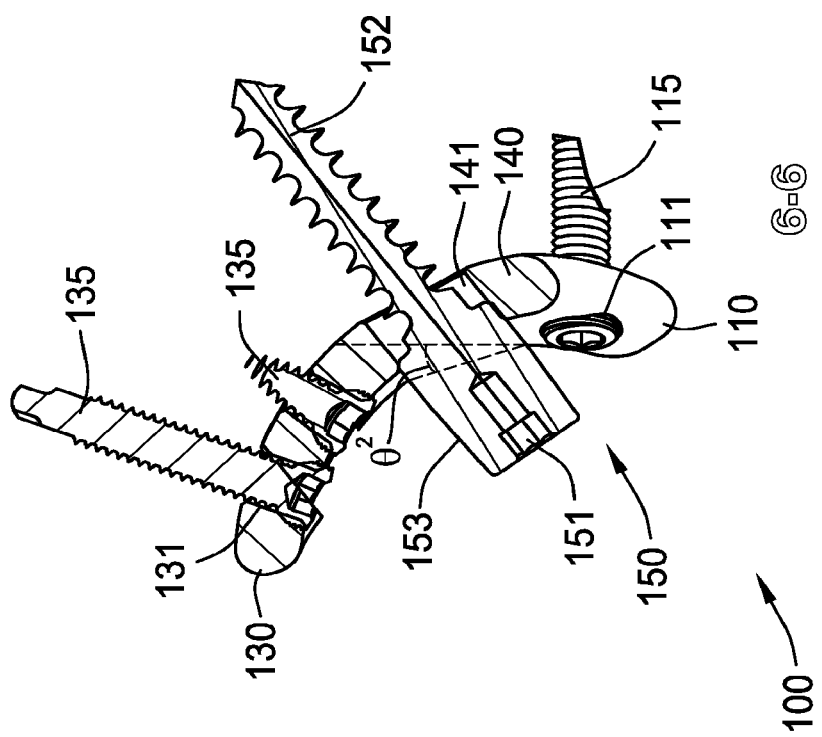
FIG. 6 is a side view of the glenoid implant of FIG. 4 at the second cross-section.

FIG. 4 is a front view of the glenoid implant 100 with a first cross-section 5-5, second cross-section 6-6, and third cross-section 7-7. FIG. 5 is a side cross-sectional view of the glenoid implant 100 at the first cross-section 5-5. FIG. 6 is a side cross-sectional view of the glenoid implant 100 at the second cross-section 6-6. FIG. 7 is a side cross-sectional view of the glenoid implant 100 at the third cross-section 7-7. As best shown in FIG. 5, the first leg 110 can extend from the baseplate 140 generally along a first arc $\theta^1$. As shown in FIG. 7, the second leg 120 can extend from the baseplate 140 generally along a third arc $\theta^3$. As shown in FIG. 6, the third leg 130 can extend from the baseplate 140 generally along a second arc $\theta^2$.

The radii of curvatures for each of the legs can vary with respect to one another. For example, the radius of curvature for the first arc $\theta^1$ can be larger than the radius of curvature for the second arc $\theta^2$. In some alternative implementations, the radius of curvature for the second arc $\theta^2$ is larger than the radius of curvature for the first arc $\theta^1$. Moreover, the radius of curvature for the first arc $\theta^1$ can be the same as a radius of curvature for the second arc $\theta^2$. This is the same with respect to the radius of curvature for the third arc $\theta^3$. In some implementations, the radius of curvature for the third arc $\theta^3$ is smaller than the radius of curvature for the second arc $\theta^2$ and the radius of curvature for the first arc $\theta^1$. In alternative embodiments, the radius of curvature for the third arc $\theta^3$ is the same as the radius of curvature for the second arc $\theta^2$ and the radius of curvature for the first arc $\theta^1$.

As illustrated herein, the baseplate 140, the first leg 110, the second leg 120, and the third leg 130 form a single monolithic part. However, in some implementations, the baseplate 140 can include a first portion coupled to a second portion such that the central aperture is defined by both the first portion and the second portion. In this case, the first portion of the baseplate, the first leg 110, and the second leg 120 form a first monolithic part and the second portion of the baseplate and the third leg 130 form a second monolithic part that is separate and distinct from the first monolithic part. This is discussed in greater detail with respect to FIG. 11.

Figure 11:
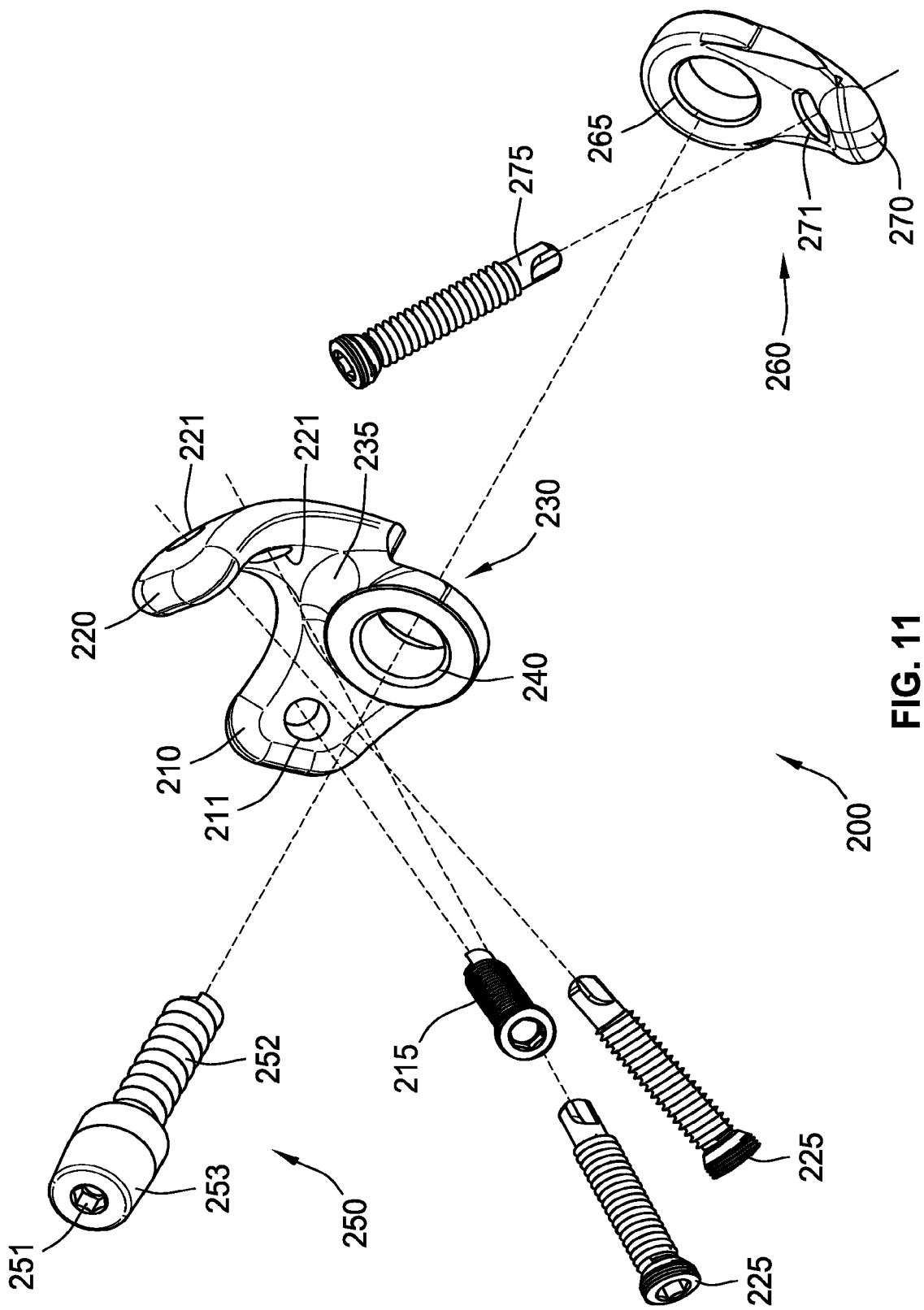
FIG. 11 is a front isometric exploded view of a glenoid implant in a second configuration according to some implementations of the present disclosure.
Figure 12:
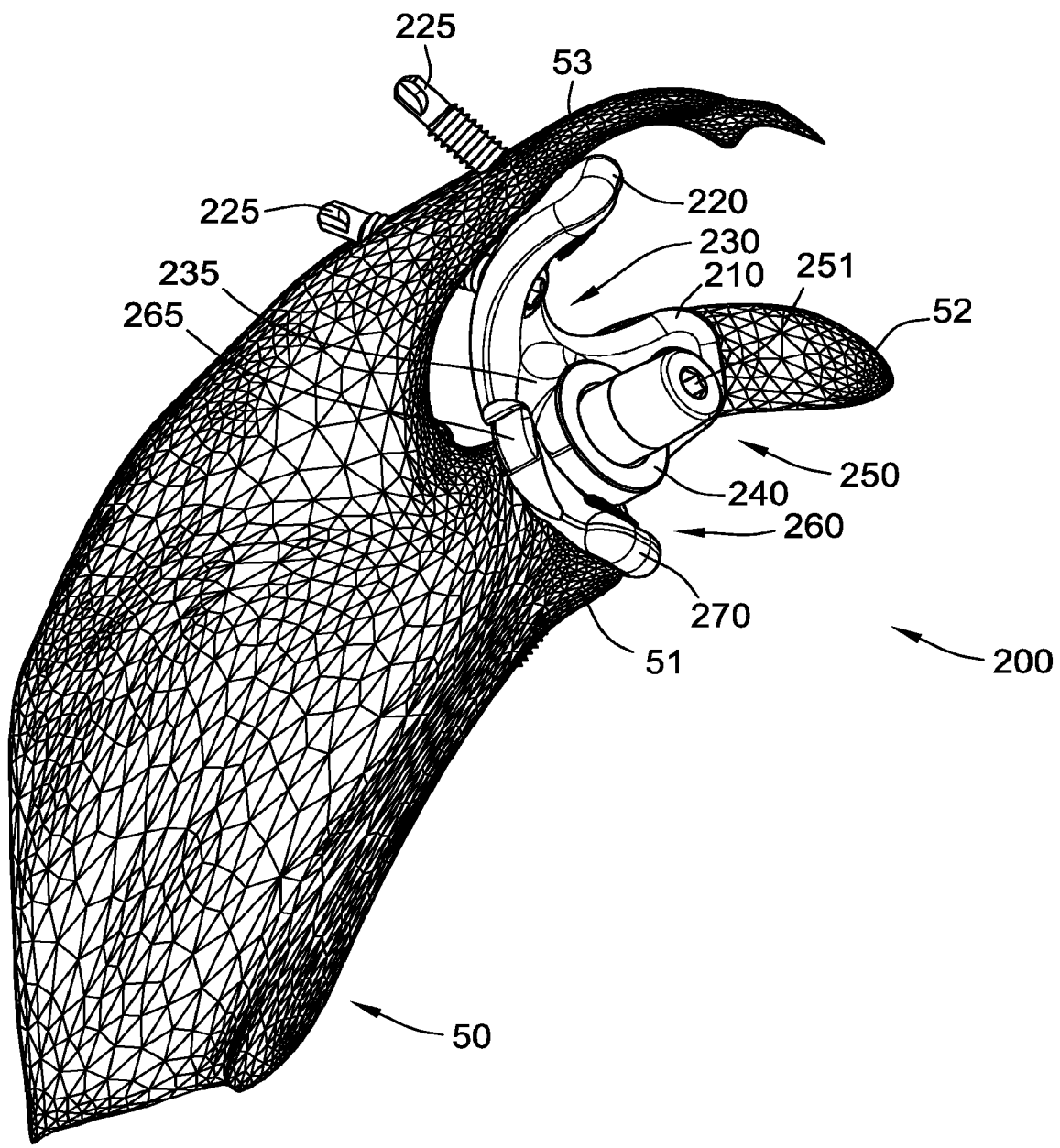
FIG. 12 is a side isometric perspective view of the glenoid implant of FIG. 11 surgically interfaced to a scapula.
Figure 13:
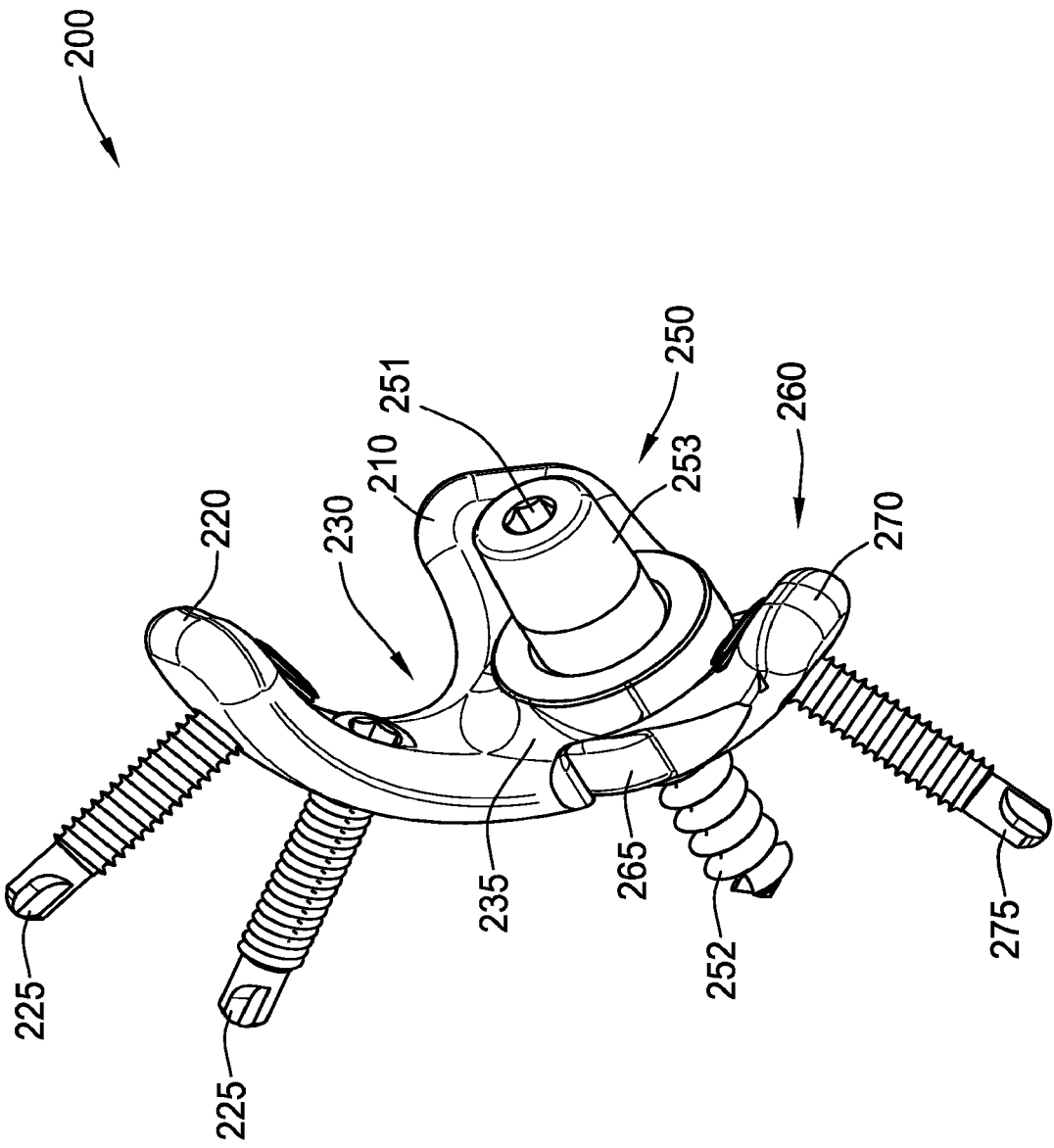
FIG. 13 is a side isometric perspective view of the glenoid implant of FIG. 11.
Figure 16:
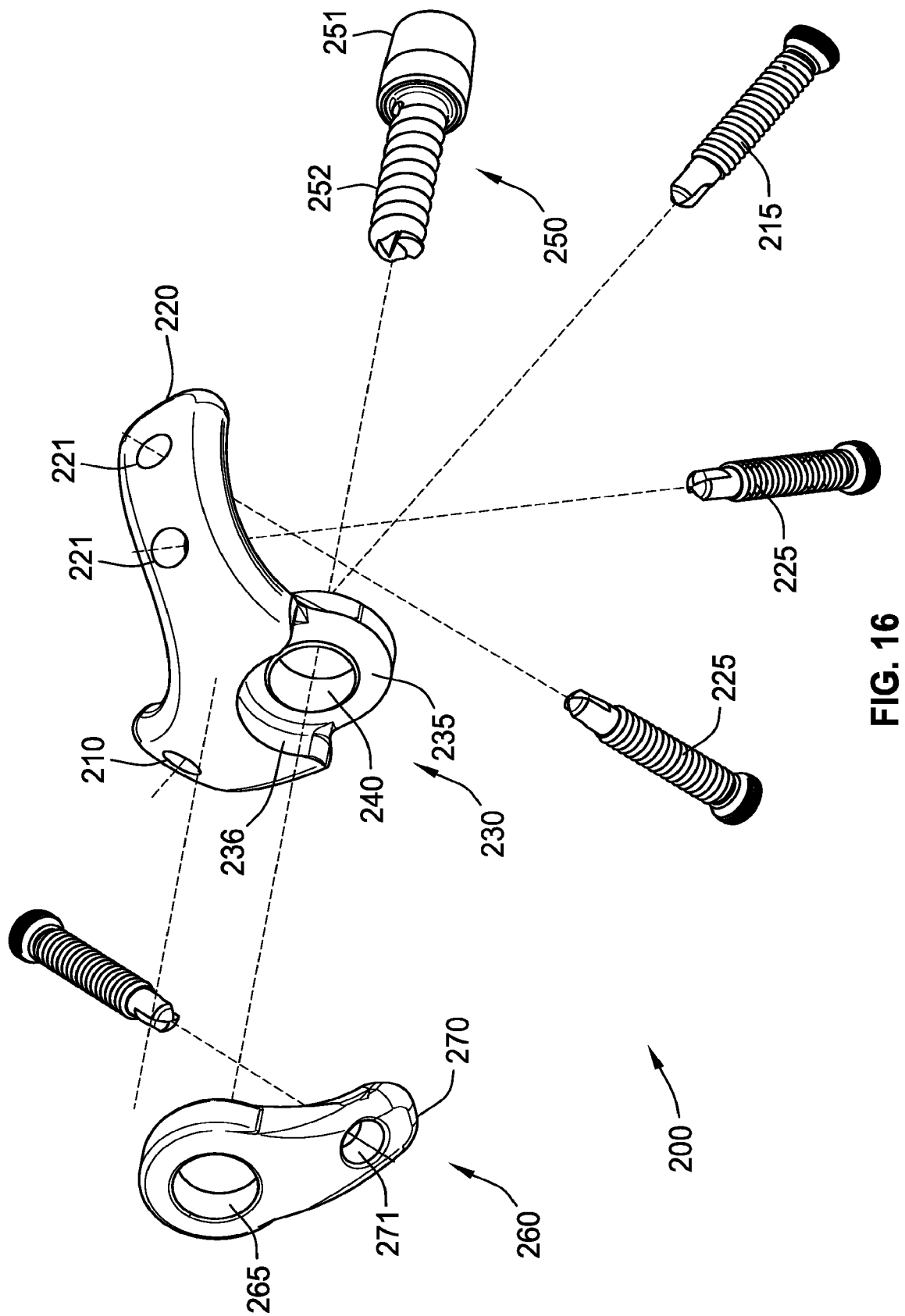
FIG. 16 is a rear isometric exploded view of the glenoid implant of FIG. 11.

Now referring to FIGS. 11-16, a glenoid implant 200 is illustrated. FIG. 11 is a front isometric exploded view of the glenoid implant 200. FIG. 13 is a side isometric perspective view of the glenoid implant 200 in an assembled form. FIG. 14 is a front view of the glenoid implant 200 with a cross-section 15-15. FIG. 15 is a side cross-sectional view of the glenoid implant 200 at the cross-section 15-15. FIG. 16 is a rear isometric exploded view of the glenoid implant 200. The glenoid implant 200 includes a base with a first portion 230 and a second portion 260. The first portion 230 includes a first aperture 240 therethrough. The second portion 260 includes a second aperture 265 therethrough. The first aperture 240 can be configured to align with the second aperture 265, thereby defining a central aperture of the base, responsive to the first portion 230 being coupled to the second portion 260.

The first leg 210 extends from the first portion 230 of the base generally along a first arc. The second leg 220 extends from the first portion 230 of the base generally along a second arc. The first leg 210 can include a first aperture 211. The second leg 220 can include a second aperture 221. The first aperture 211 can be configured to receive a portion of a first fastening element 215 therethrough. Similarly, the second aperture 221 can be configured to receive a portion of a second fastening element 225 therethrough. The glenoid implant 200 can also include a central fastening element 250 configured to be at least partially positioned through the first aperture 240 and the aligned second aperture 265.

The adjustable third leg 270 extends from the second portion 260 of the base generally along a third arc in response to the first portion 230 being coupled to the second portion 260. The adjustable third leg 270 can include a third aperture 271 therein configured to receive a portion of a third fastening element 275 therethrough.

As best shown in FIG. 12, the glenoid implant 200 can be surgically interfaced and/or installed in the scapula 50. The first fastening element 215 (FIG. 11) can aid in securing the first leg 210 to the Coracoid. The second fastening element 225 (FIG. 11) can aid in securing the second leg 220 to the Acromion. The third fastening element 275 (FIG. 11) can aid in securing the adjustable third leg 270 to the Infraglenoid tubercle. The central fastening element 250 can aid in securing the base to the glenoid cavity. Similar to the glenoid implant 100, the first fastening element 215 and the second fastening element 225 are configured to protrude from the scapula 50 opposite the glenoid implant 200, to potentially connect two cortical plates. In alternative implementations, the first fastening element 215 and the second fastening element 225 are configured to provide the glenoid implant 100 with uni-cortical support.

The separation of the base into two components allows for the rotation of the second portion 260 about the first portion 230. In this way, the glenoid implant 200 can be adjusted for varying anatomies of the scapula 50. Specifically, an angle between the adjustable third leg 270 and the first leg 210 can be adjusted to account for a distance between the first portion of the scapula 52 and the third portion of the scapula 51. This is also the case with the angle between the adjustable third leg 270 and the second leg 220.

Figure 17:
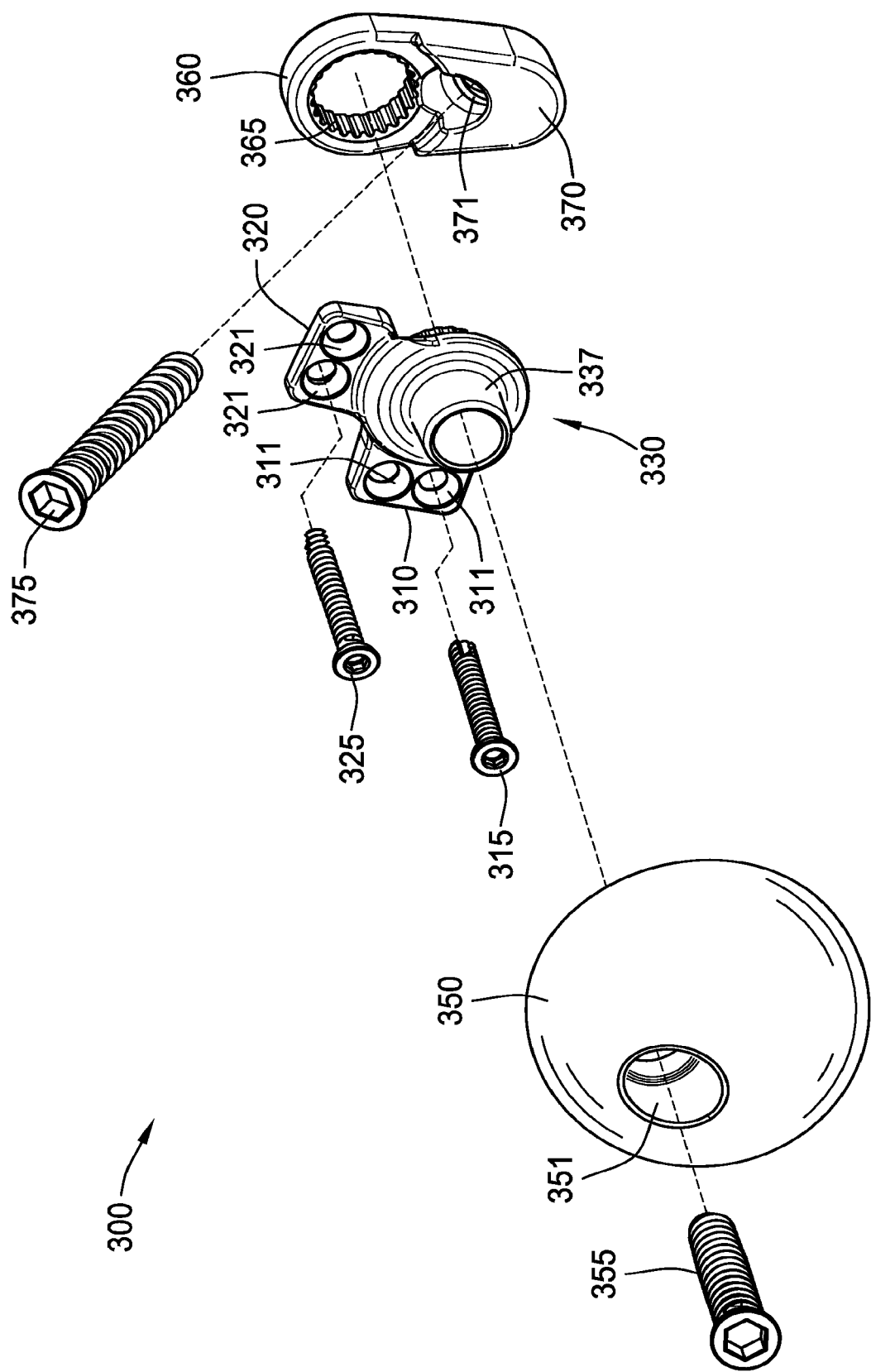
FIG. 17 is a front isometric exploded view of a glenoid implant in a third configuration according to some implementations of the present disclosure.
Figure 18:
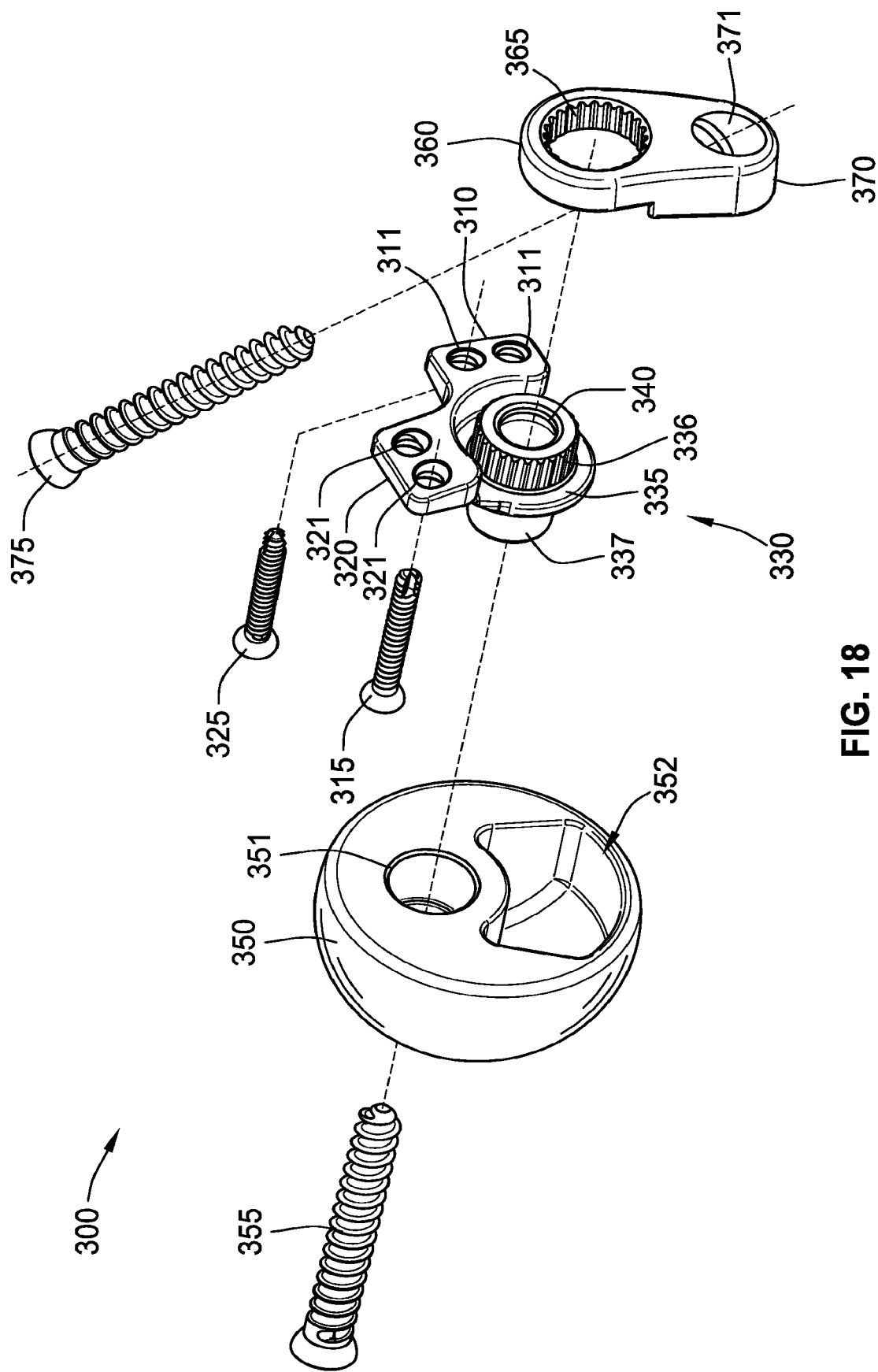
FIG. 18 is a rear isometric exploded view of the glenoid implant of FIG. 17.
Figure 19:
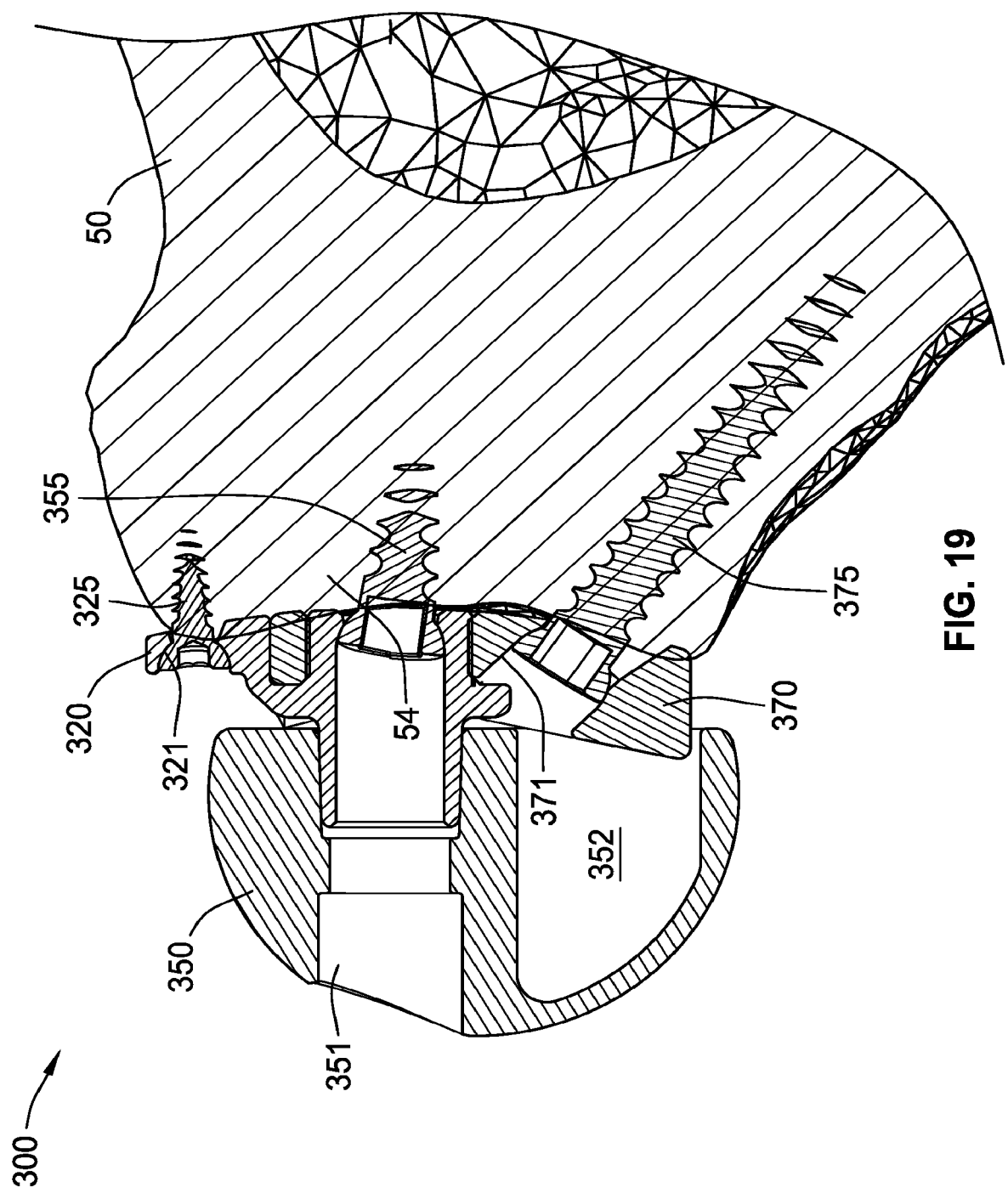
FIG. 19 is a cross-sectional side view of the glenoid implant of FIG. 17 surgically interfaced to a scapula.

Referring generally to FIGS. 17-19, a glenoid implant 300 is illustrated. As shown in FIG. 17, a glenoid implant 300 can include a base with a first portion 330 and a second portion 360, which are similar to the first portion 230 and the second portion 260 of the base described above in connection with the glenoid implant 200. The first portion 330 can include a first trunnion 337 extending outward. The glenoid implant 300 can further include a glenosphere 350 with a central aperture 351 and a first receiving space 352 (shown in FIG. 18). The central aperture 351 of the glenosphere 350 can be coupled to the first trunnion 337 of the first portion 330. The first trunnion 337 can include the central aperture 340 therethrough. The glenosphere 350 can be configured to be secured to the glenoid implant 300 via a central fastening element 355 through the central aperture 351, the central aperture 340, and the central aperture 365.

FIG. 18 is a rear isometric exploded view of the glenoid implant 300. The rear of the first portion 330 can include a second trunnion 336 extending outward. The first trunnion 337 and the second trunnion 336 can include the central aperture 340 therethrough. The second trunnion 336 can include splines configured to rotationally couple with corresponding grooves in the second aperture 365 of the second portion 360. In alternative implementations, the second trunnion 336 can include grooves configured to rotationally couple with corresponding splines in the second aperture 365 of the second portion 360. The first receiving space 352 of the glenosphere 350 can be configured to receive an augment. This is described in further detail below.

As shown in FIG. 19, the glenoid implant 300 can be surgically interfaced to a scapula 50 of a patient. The first fastening element 315 (not shown), the second fastening element 325, the third fastening element 375, and the central fastening element 355 can aid in securing the glenoid implant 300 into the glenoid cavity. The central fastening element 355 can compress the glenoid implant 300 to the glenoid cavity. In alternative implementations, the central fastening element 355 can attach to the glenoid implant 300 and not pull the glenoid implant 300 into the glenoid cavity.

Figure 20:
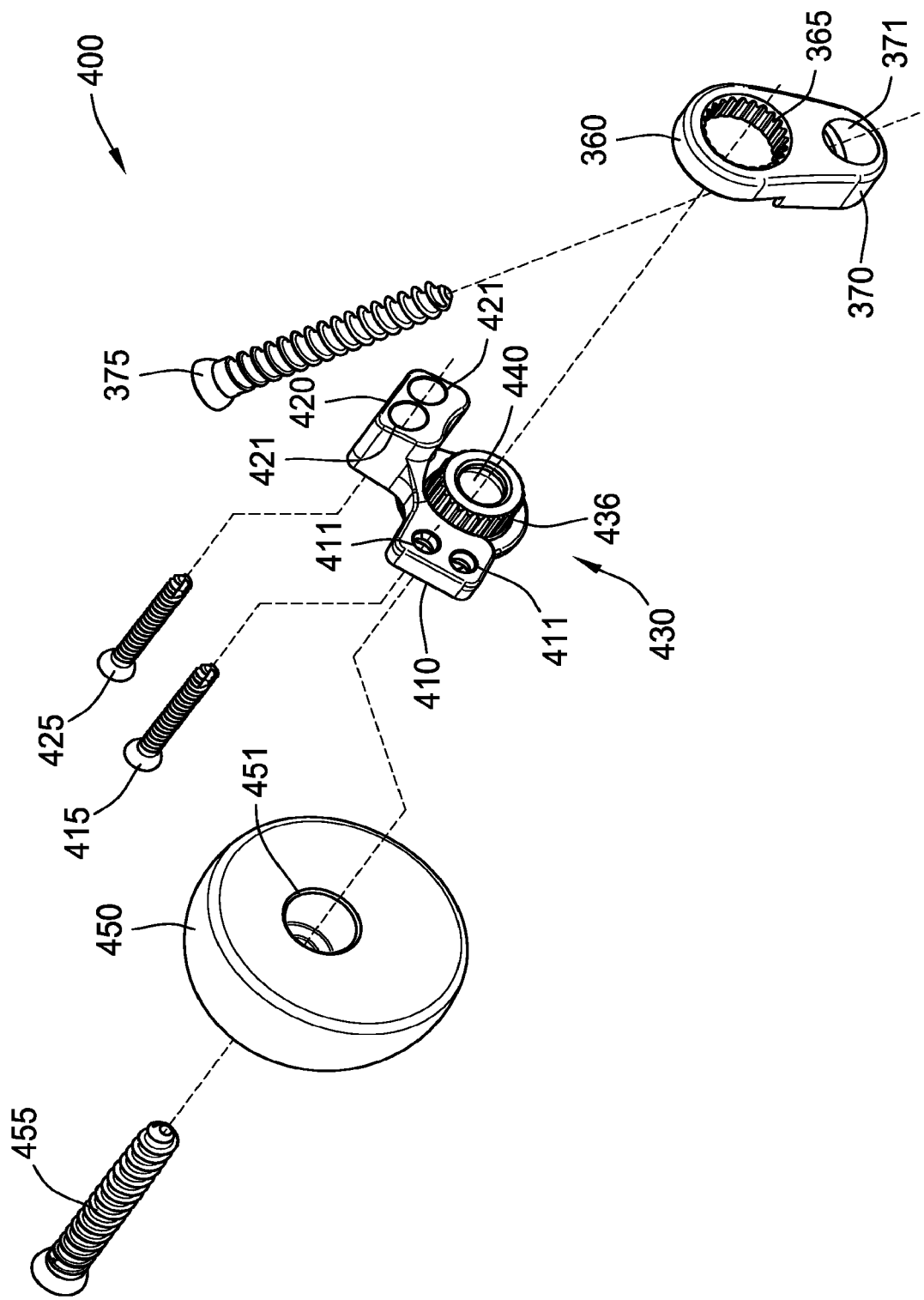
FIG. 20 is a rear isometric exploded view of a glenoid implant in a fourth configuration according to some implementations of the present disclosure.
Figure 21:
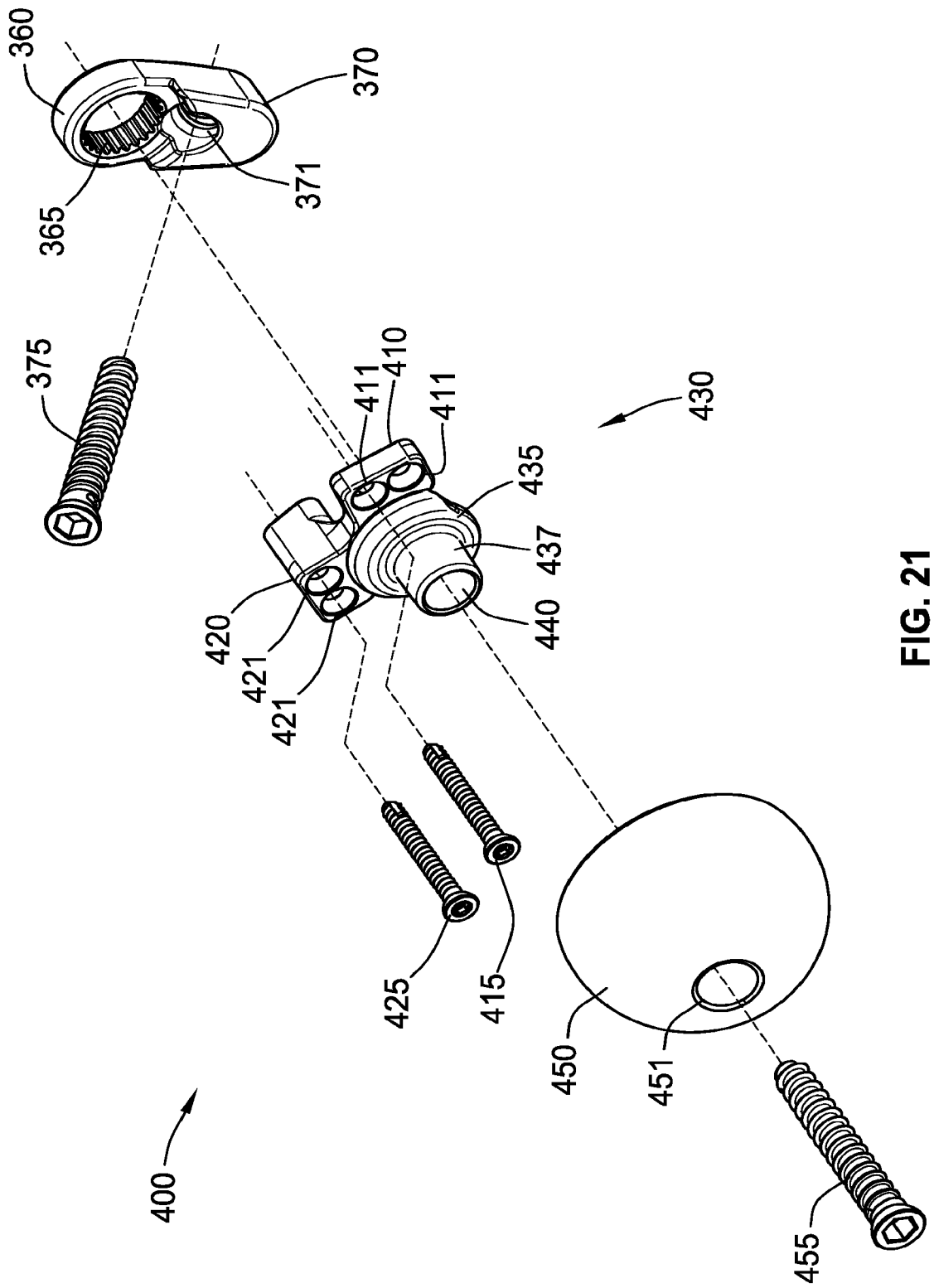
FIG. 21 is a front isometric exploded view of the glenoid implant of FIG. 20.
Figure 23:
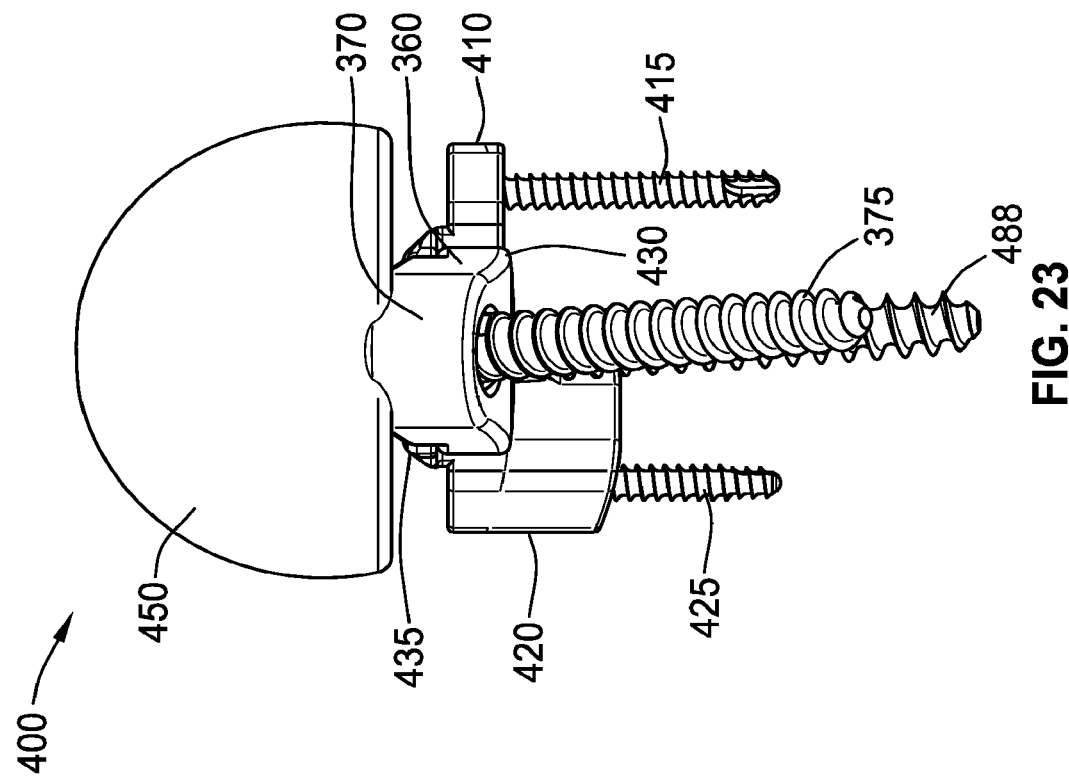
FIG. 23 is a second side view of the glenoid implant of FIG. 20.
Figure 22:
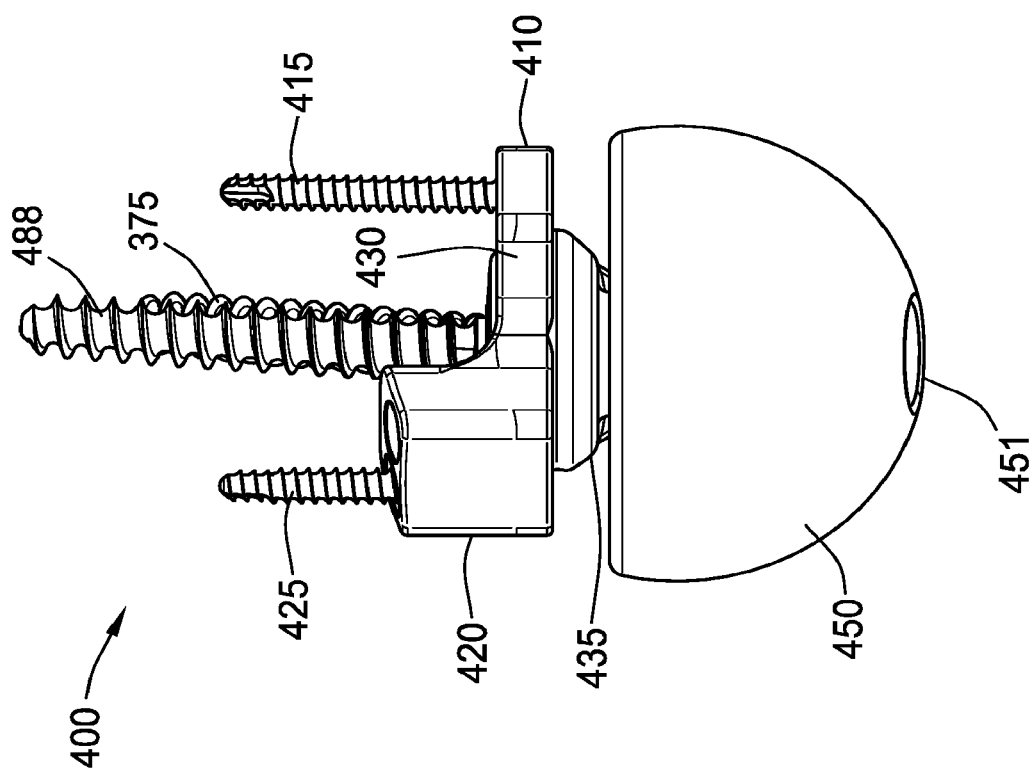
FIG. 22 is a first side view of the glenoid implant of FIG. 20.

Referring generally to FIGS. 20-23, a glenoid implant 400 is illustrated. FIGS. 20 and 21 are front and rear isometric exploded views of the glenoid implant 400. FIGS. 22 and 23 are first side and second side views of the assembled glenoid implant 400. The glenoid implant 400 can include a first portion 430 and the second portion 360, which are the same as, or similar to, the first portion 330 and the second portion 360 of the base described above in connection with the glenoid implant 300. Specific to the glenoid implant 400, the second leg 420 of the glenoid implant 400 can have a different geometry than the first leg 410. Specifically, the second leg 420 can be thicker than the first leg 410. In some implementations, the varying thickness of the legs can be fixed. In other implementations, the thickness of the legs can be adjusted during the surgical procedure. This is illustrated in the glenoid implant 500 of FIG. 24.

Figure 24:
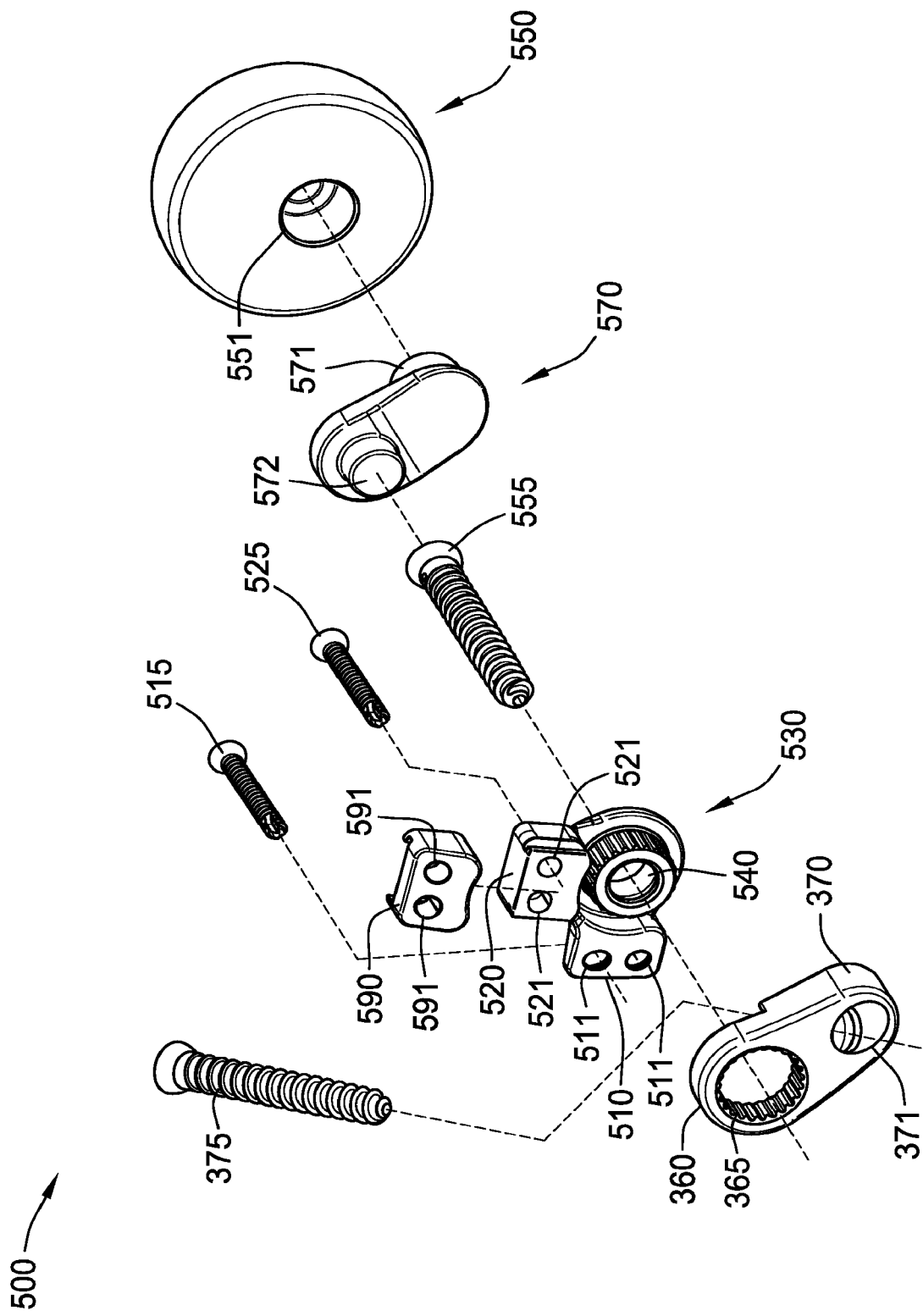
FIG. 24 is a rear isometric exploded view of a glenoid implant in a fifth configuration according to some implementations of the present disclosure.
Figure 25:
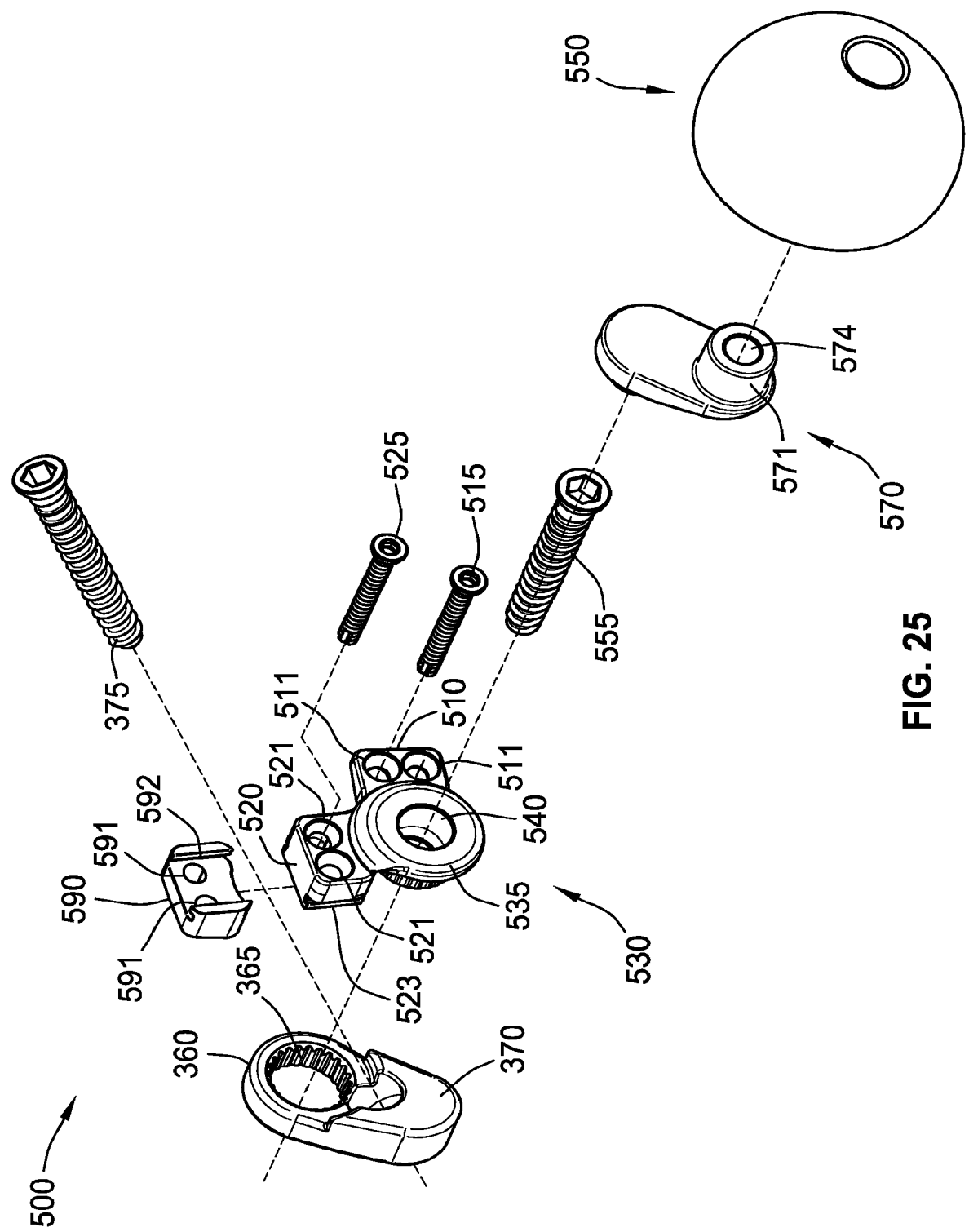
FIG. 25 is a front isometric exploded view of the glenoid implant of FIG. 24.
Figure 26:
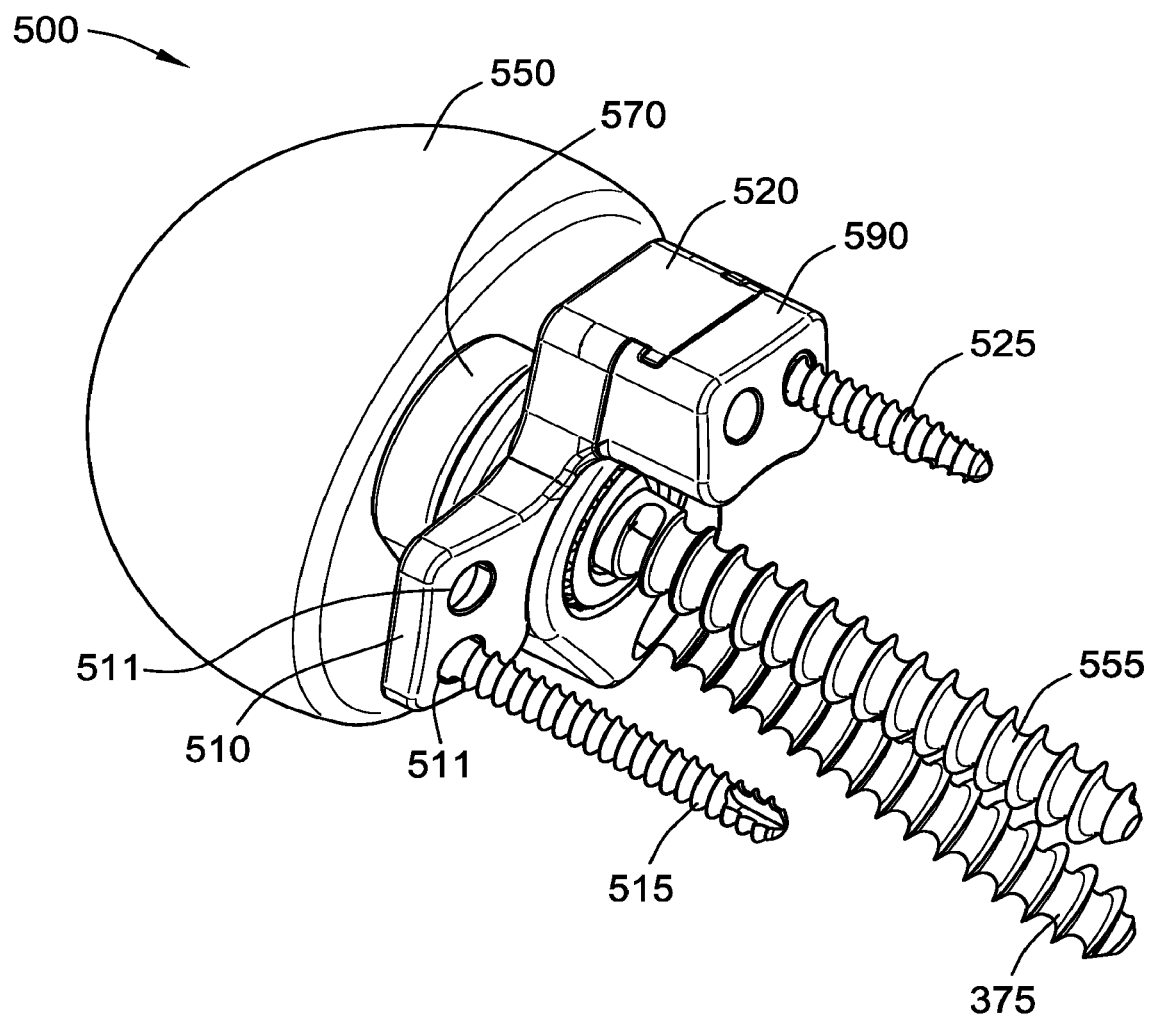
FIG. 26 is a side isometric view of the glenoid implant of FIG. 24.
Figure 27:
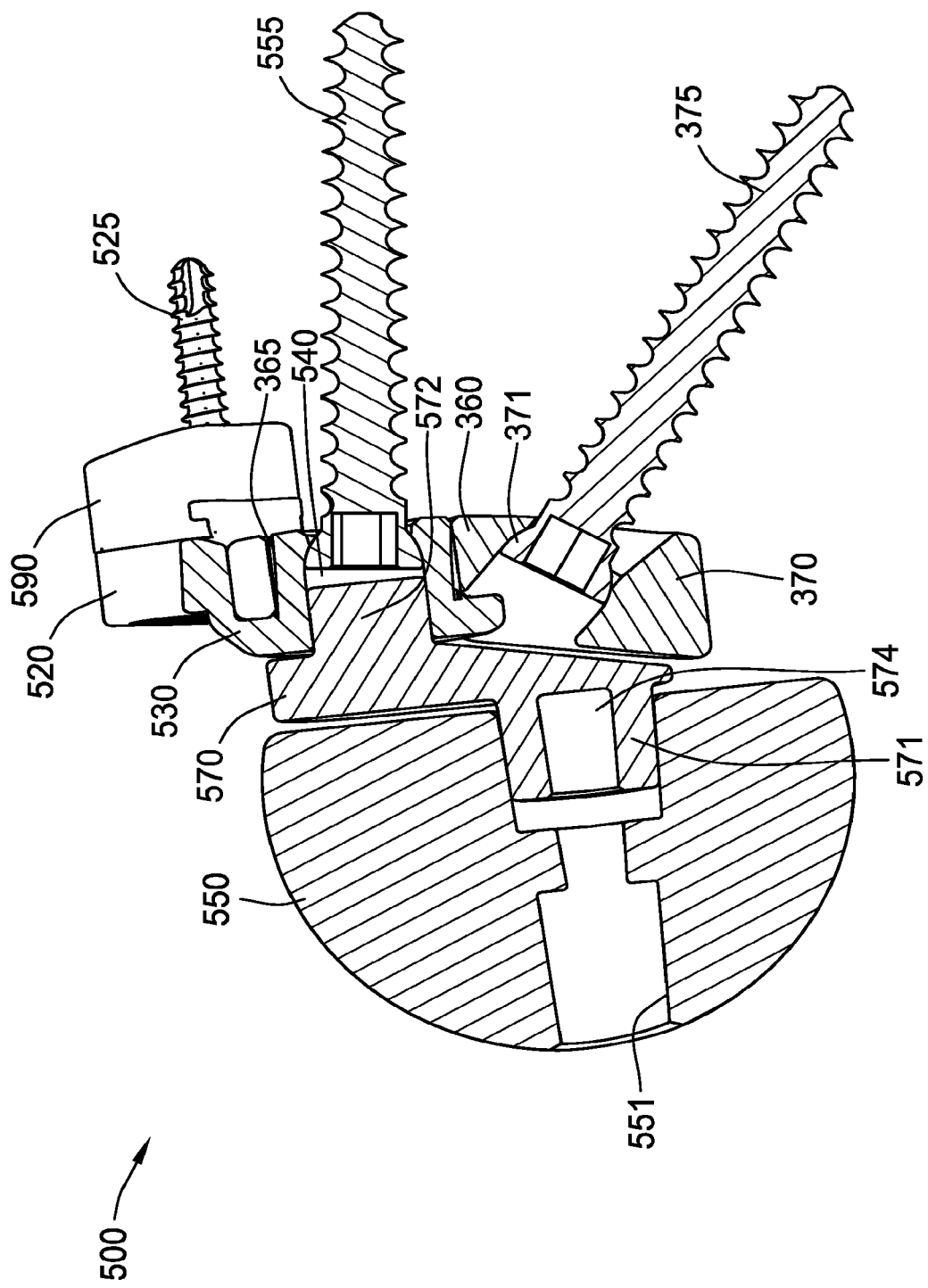
FIG. 27 is a cross-sectional side view of the glenoid implant of FIG. 24.

Referring generally to FIGS. 24-27, a glenoid implant 500 is illustrated. FIGS. 24 and 25 are front and rear isometric exploded views of the glenoid implant 500. FIG. 26 is a rear side isometric view of the glenoid implant 500. FIG. 27 is a cross-sectional side view of the glenoid implant 500. The glenoid implant 500 can include a first portion 530 and the second portion 360, which are the same as, or similar to, the first portion 430 and the second portion 360 of the base described above in connection with the glenoid implant 400.

Specific to the glenoid implant 500, the second leg 520 can be configured to be coupled to an augment 590, to increase the thickness of the second leg 520. Specifically, the augment 590 can include a slot 592 configured to receive a projection 523 extending from the second leg 520, such that the augment 590 slides onto and is coupled to the second leg 520. The augment 590 can include at least one aperture 591. The aperture 591 can be aligned with the aperture 521 of the second leg 521. In this way, the second fastening element 525 can be received through the second aperture 521 of the second leg 520 and the augment aperture 591 to aid in coupling the second leg 520 and the augment 590 to the glenoid cavity (similar to the glenoid cavity 300 of FIG. 19). While the glenoid implant 500 illustrates the augment 590 coupled to the second leg 520, it should be understood that the augment 590 can be coupled to either the first 510, second 520 or adjustable third leg 370.

The glenoid implant 500 can also include an offset element 570. The offset element 570 can include a base with a first trunnion 572 protruding from a first surface, and a second trunnion 571 protruding from a second surface opposite the first surface. The first trunnion 572 and the second trunnion 571 can have two distinct central axes. The first trunnion 572 can be aligned with the central aperture 540 of the first portion 530 and the central aperture 365 of the second portion 360. The second trunnion 571 can be aligned with the glenosphere central aperture 551. In this way, the glenosphere is coupled to the base such that a central axis of the central aperture 540 of the base is not aligned with a central axis of the aperture 551 within the glenosphere 550.

Figure 28:
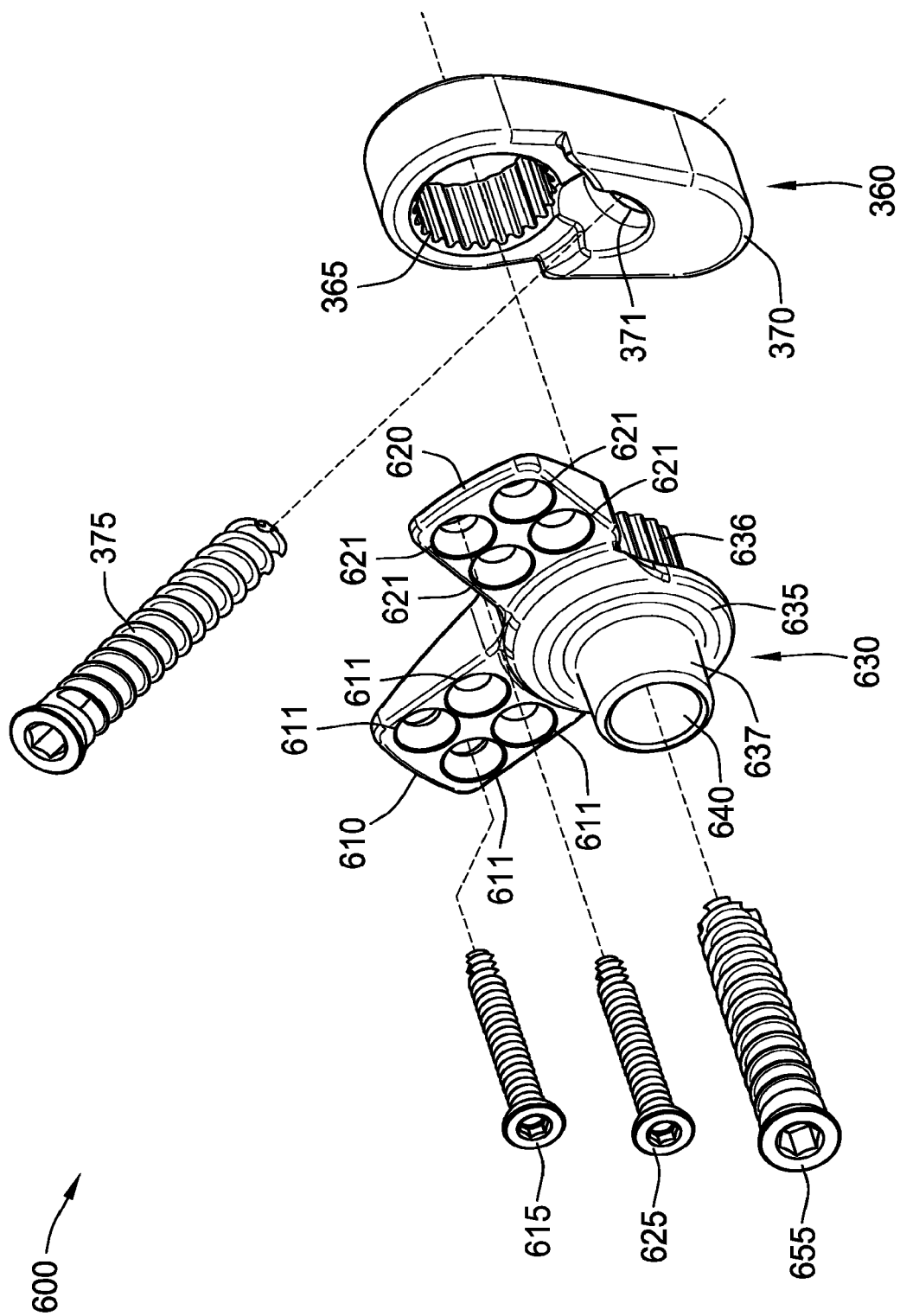
FIG. 28 is a front isometric exploded view of a glenoid implant in a sixth configuration according to some implementations of the present disclosure.
Figure 29:
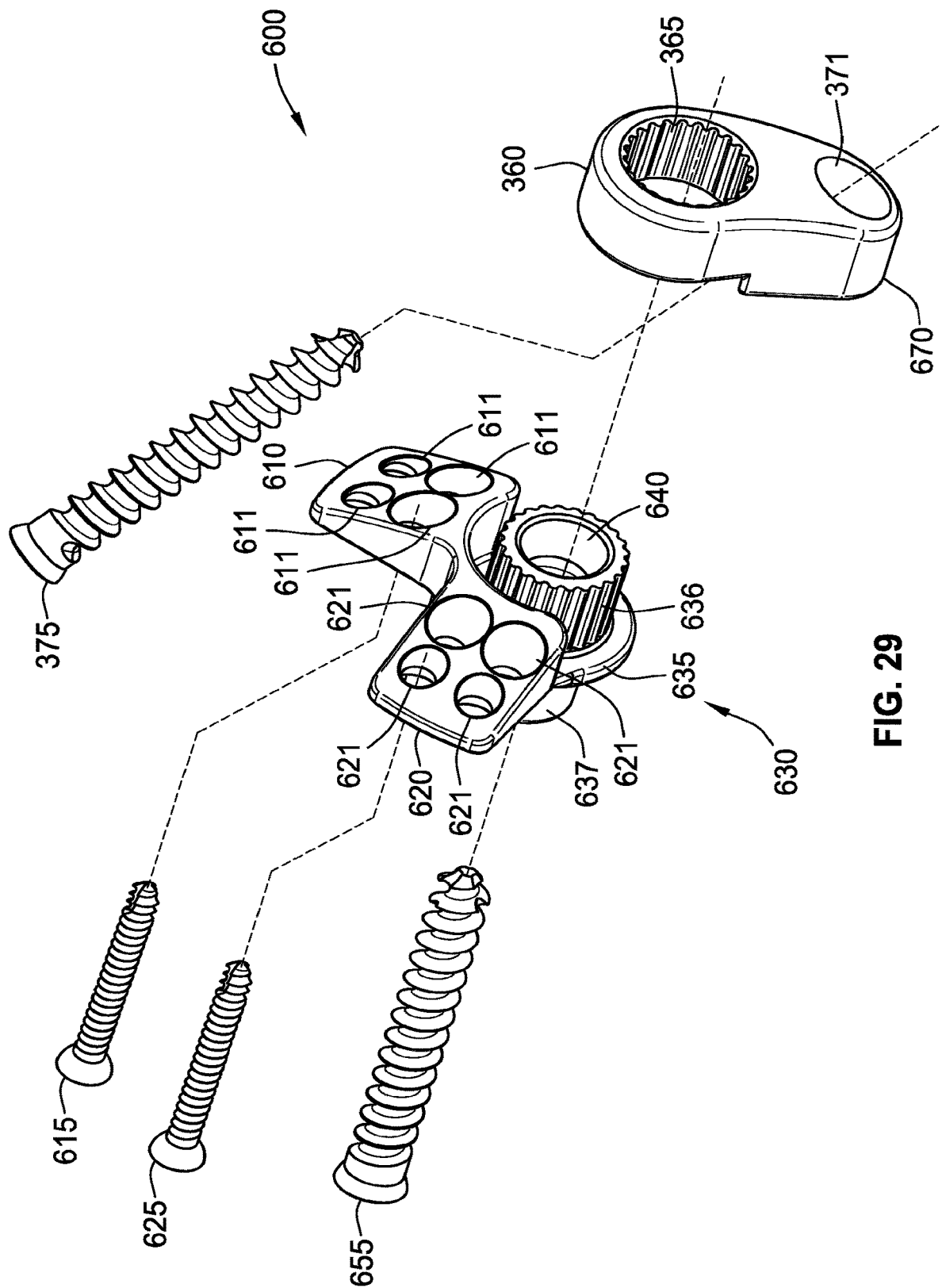
FIG. 29 is a rear isometric exploded view of the glenoid implant of FIG. 28.
Figure 30:
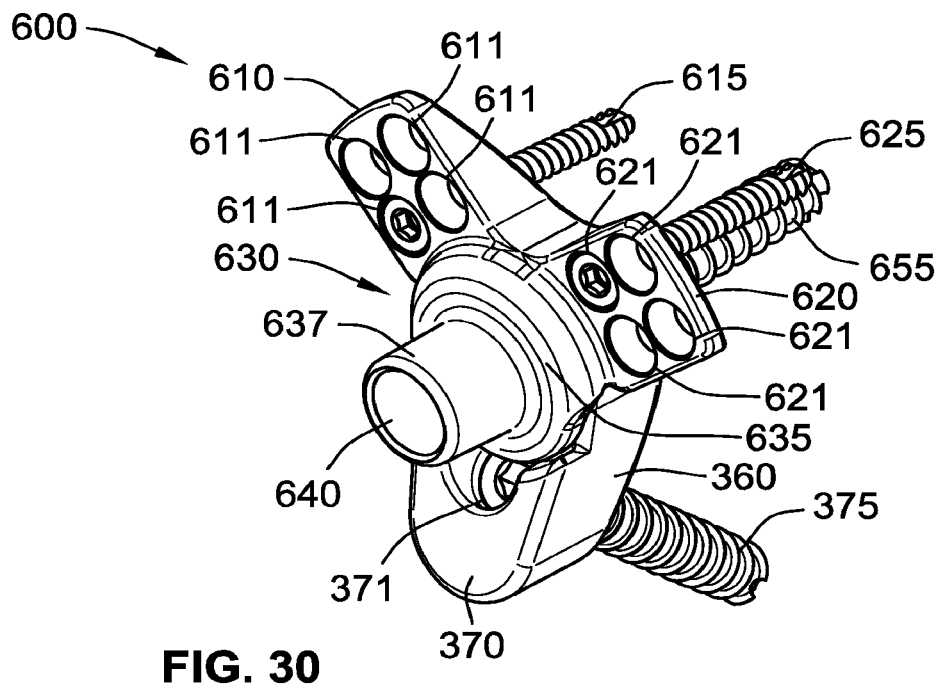
FIG. 30 is a front isometric view of the glenoid implant of FIG. 28.
Figure 31:
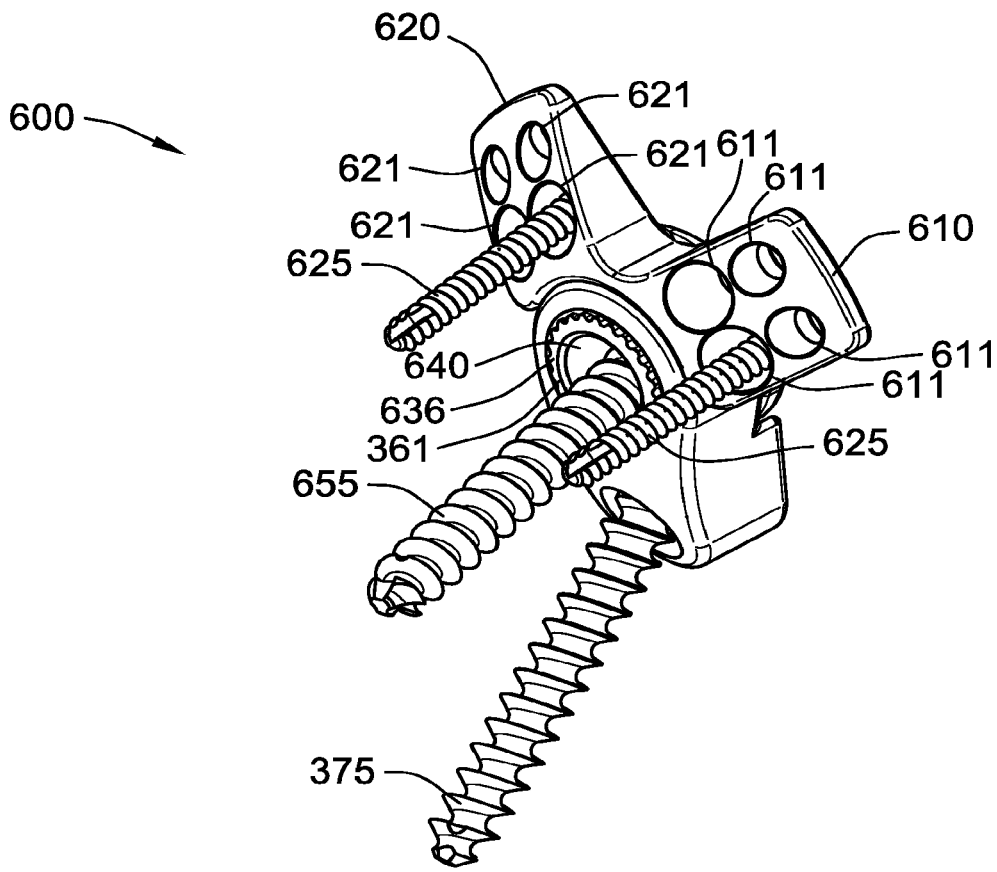
FIG. 31 is a rear isometric view of the glenoid implant of FIG. 28.
Figure 32:
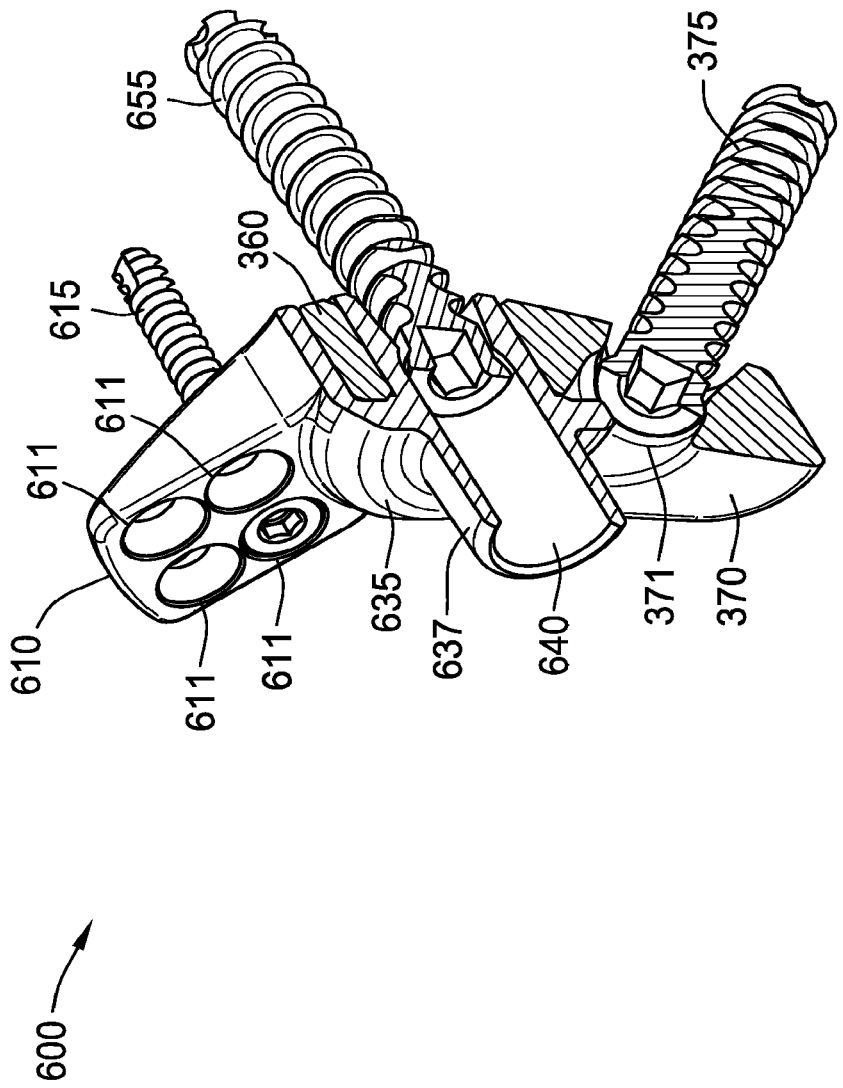
FIG. 32 is a cross-sectional isometric view of the glenoid implant of FIG. 28.

Referring generally to FIGS. 28-35, a glenoid implant 600 is illustrated. FIGS. 28 and 29 are front and rear isometric exploded views of the glenoid implant 600. FIGS. 30 and 31 are front and rear isometric views of the glenoid implant 600. FIG. 32 is a cross-sectional isometric view of the glenoid implant 600. The glenoid implant 600 can include a first portion 630 and the second portion 360, which are the same as, or similar to, the first portion 530 and the second portion 360 of the base described above in connection with the glenoid implant 500.

Specific to the glenoid implant 600, the first and second legs 610, 620 can be configured with additional apertures. As illustrated herein, the first leg 610 can include four apertures 611. Each aperture 611 can be configured to receive a portion of a first fastening element 615 therethrough. The second leg 620 can also include four apertures 621. Each aperture 621 can be configured to receive a portion of a second fastening element 625 therethrough. The additional apertures in the first and second legs 610, 620 assist with the lateralization of the glenoid implant 600.

Figure 34:
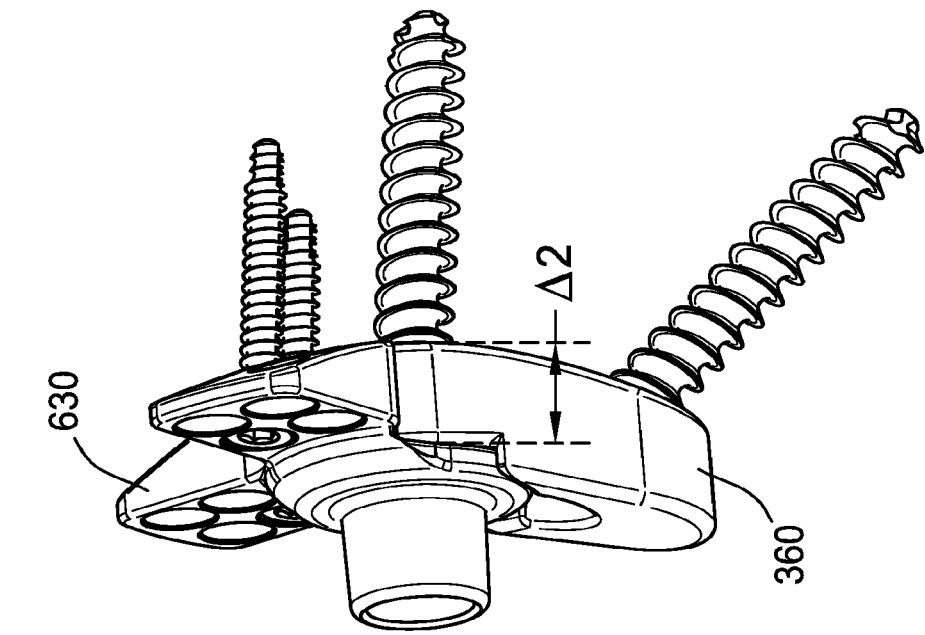
FIG. 34 is a side view of the glenoid implant of FIG. 28 in a second implementation.
Figure 33:
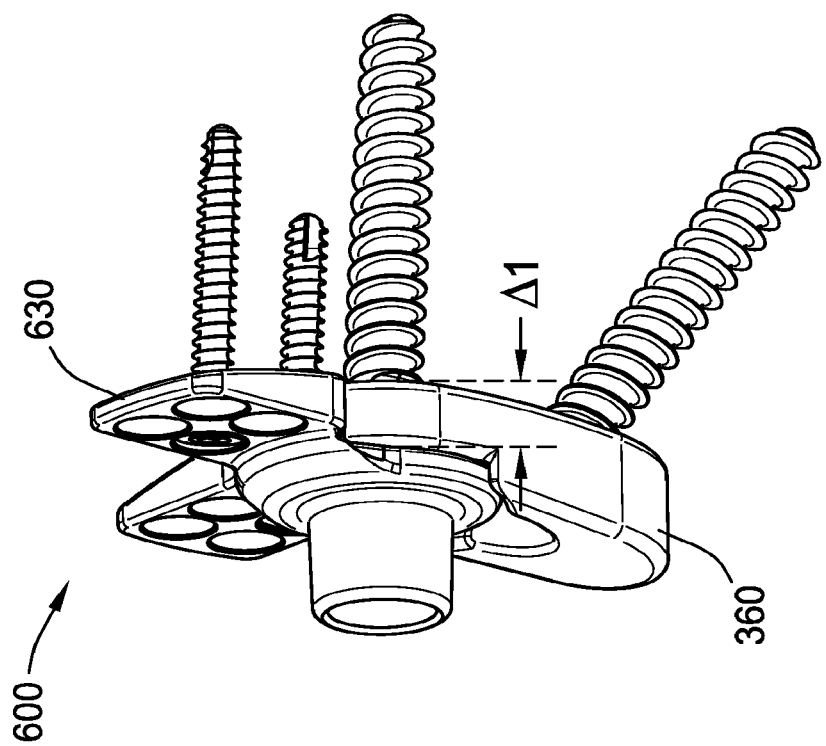
FIG. 33 is a side view of the glenoid implant of FIG. 28 in a first implementation.
Figure 35:
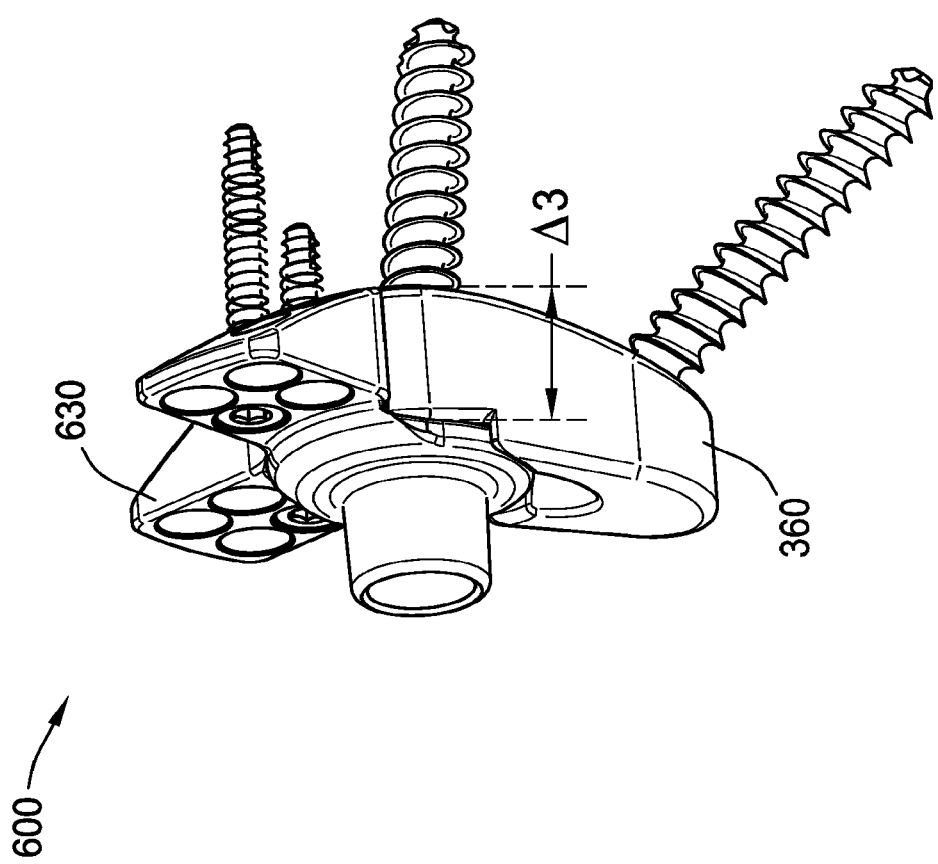
FIG. 35 is a side view of the glenoid implant of FIG. 28 in a third implementation.

While the second component 360 has been illustrated with multiple implementations discussed above, it should be understood that the geometry of the second component 360 can also vary. FIGS. 33, 34 and 35 are side views of the glenoid implant 600 in a first, second, and third implementation, respectively. As best shown in FIG. 33, the second component 360 can include a first thickness Δ1. The first and second legs 610, 620 can also have a first thickness to account for the first thickness Δ1 of the second component 360. FIG. 34 illustrates the second component 360 with a second thickness Δ2. The second thickness Δ2 can include a 5 mm offset from the first thickness Δ1. The first and second legs 610, 620 can have a second thickness to account for the second thickness Δ2 of the second component 360. FIG. 35 illustrates the second component 360 with a third thickness Δ3. The third thickness Δ3 can include a 10 mm offset from the first thickness Δ1. The first and second legs 610, 620 can also have a third thickness to account for the third thickness Δ3 of the second component 360. In this way, once the first component 630 and the second component 360 is assembled, the rear of the glenoid implant 600 can have a continuous surface.

Figure 36:
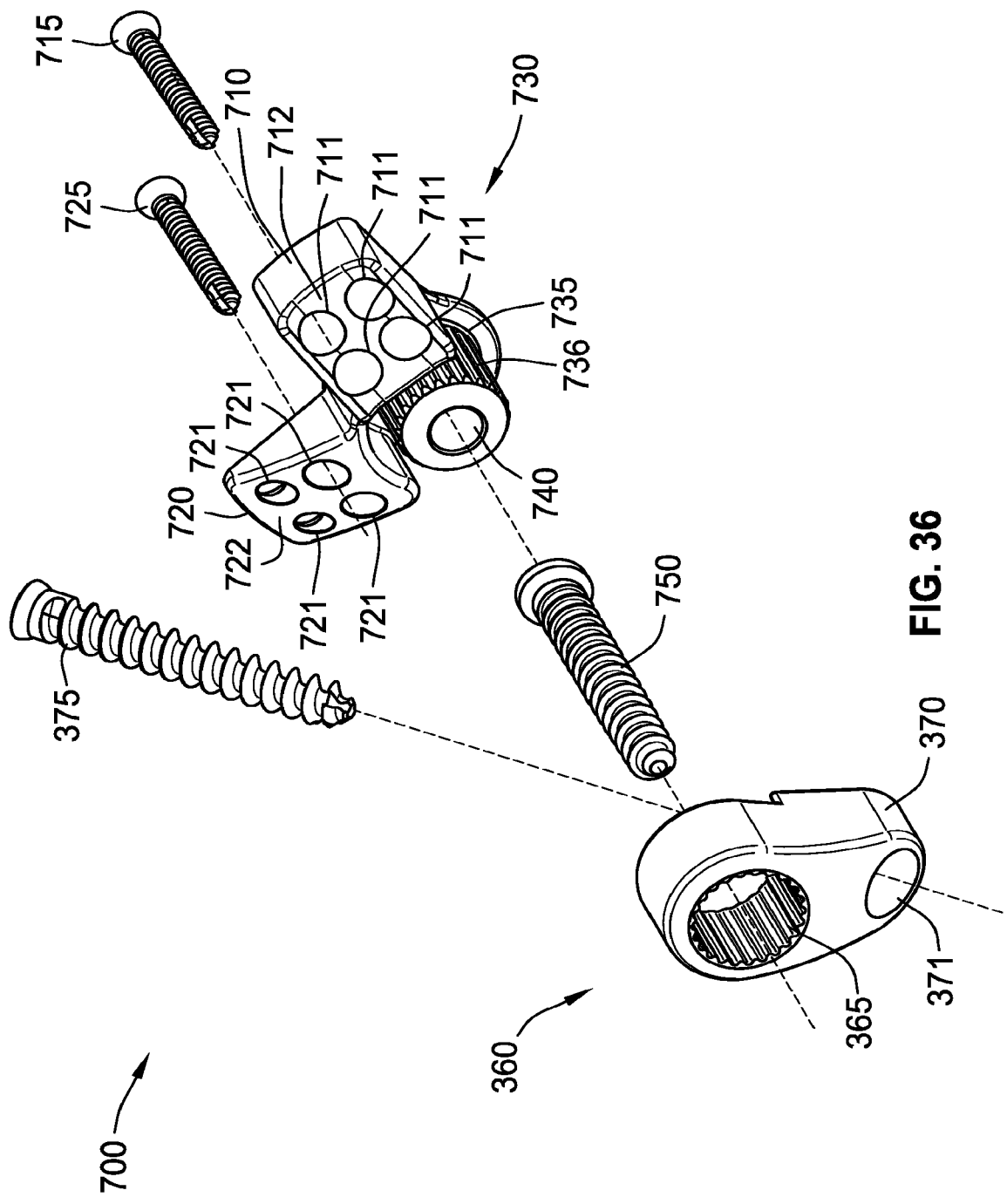
FIG. 36 is a rear isometric exploded view of a glenoid implant in a seventh configuration according to some implementations of the present disclosure.
Figure 37:
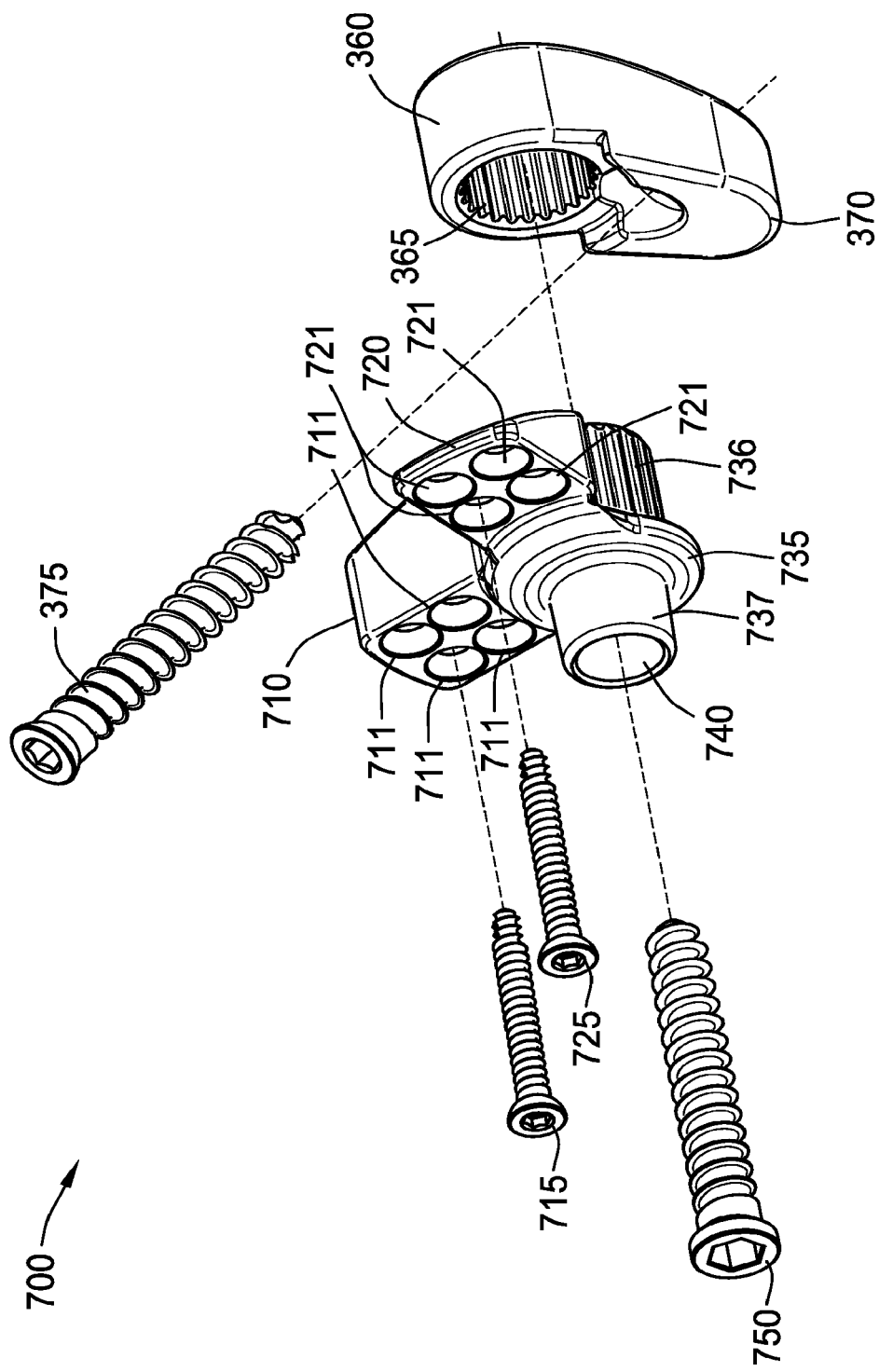
FIG. 37 is a front isometric exploded view of the glenoid implant of FIG. 36.

Referring generally to FIGS. 36-37, a glenoid implant 700 is illustrated. FIGS. 36 and 37 are front and rear isometric exploded views of the glenoid implant 700. The glenoid implant 700 can include a first portion 730 and the second portion 360, which are the same as, or similar to, the first portion 630 and the second portion 360 of the base described above in connection with the glenoid implant 600.

Specific to the glenoid implant 700, a scapula contacting surface 712 of the first leg 710 can have a different geometry than the scapula contacting surface 722 of the second leg 720. The scapula contacting surface 712 of the first leg 710 can include a convex surface while the scapula contacting surface 722 of the second leg 720, and the adjustable third leg 370 includes a concave surface. Moreover, the thickness of each leg can vary, as discussed above. While the scapula contacting surface 712 of the first leg 710 is illustrated with the convex surface, it should be understood that the contacting surface 722 of the second leg 720 or the adjustable third leg 360 can also have a convex surface.

Figure 98:
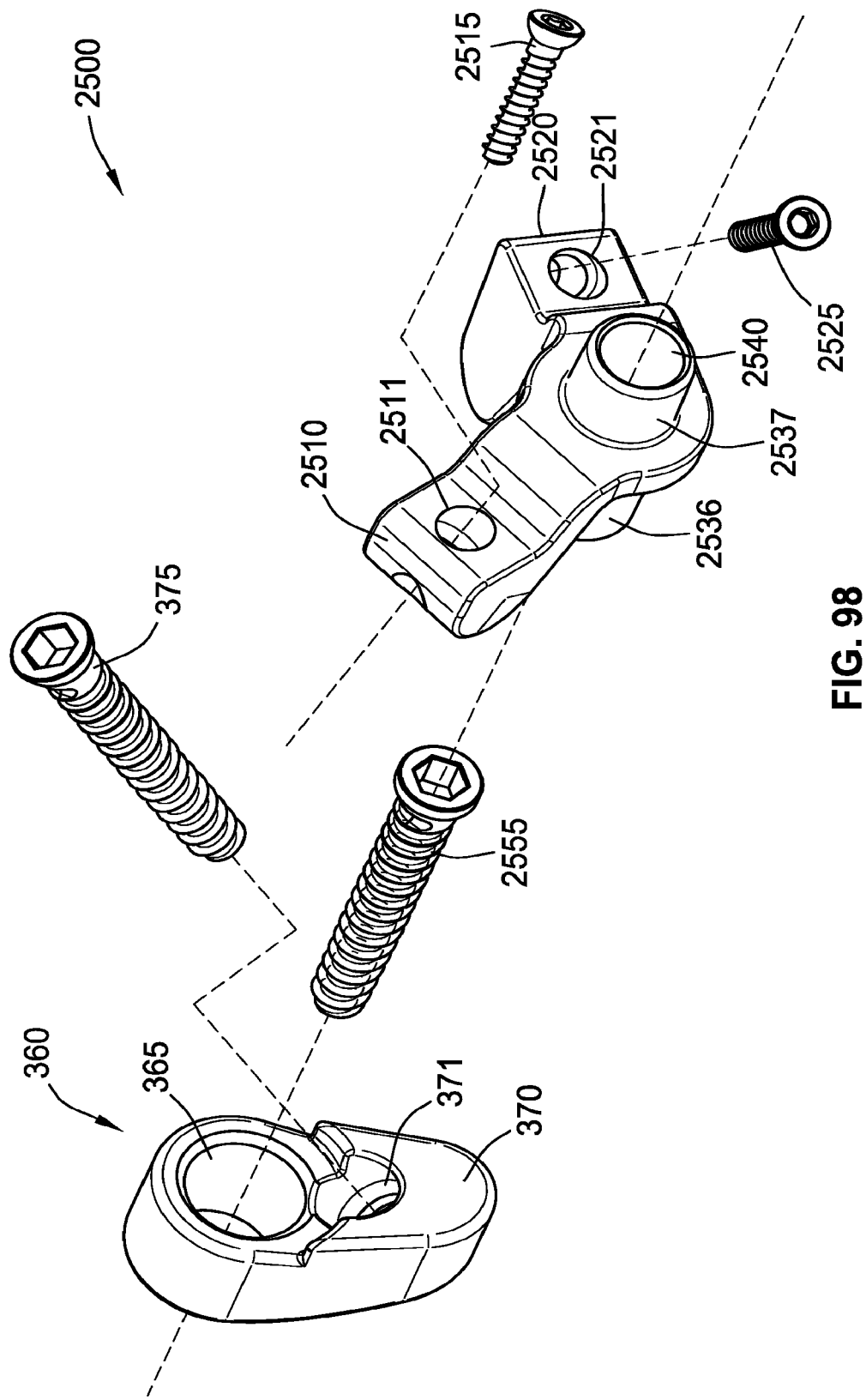
FIG. 98 is an exploded view of a glenoid implant in a twenty-seventh configuration according to some implementations of the present disclosure.
Figure 99:
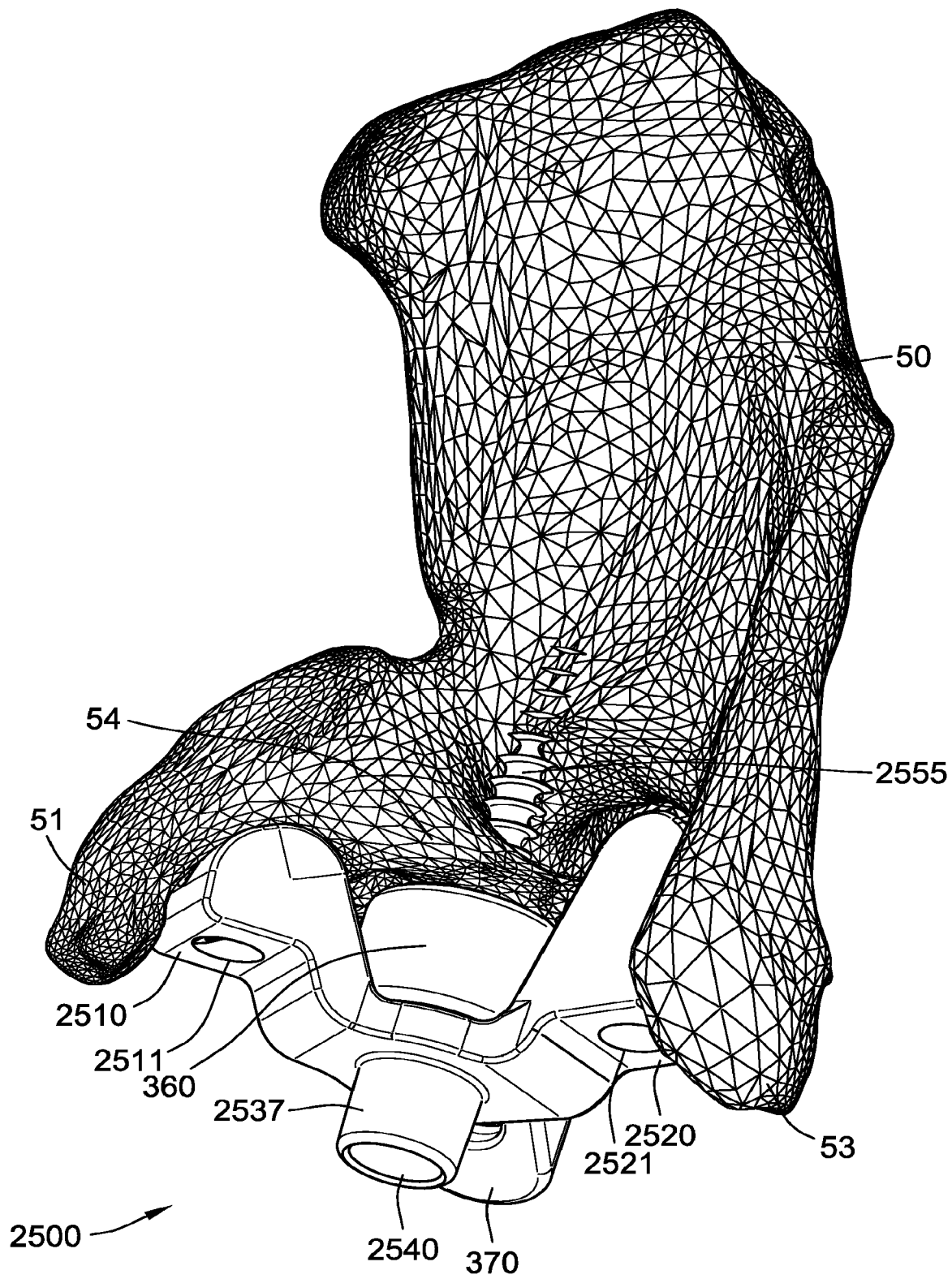
FIG. 99 is a front isometric perspective view of the glenoid implant of FIG. 98 surgically interfaced to a scapula.

Referring momentarily to FIGS. 98-99, a glenoid implant 2500 is illustrated. FIG. 98 is an exploded view of the glenoid implant 2500. FIG. 99 is a side isometric perspective view of the glenoid implant 2500. The glenoid implant 2500 can include a first portion 2530 and the second portion 360, which are the same as, or similar to, the first portion 730 and the second portion 360 of the base described above in connection with the glenoid implant 700.

Specific to the glenoid implant 2500, the first leg 2510 and the second leg 2520 can have a flat face surface and rounded rear surface configured to contact the scapula. In this configuration, each leg of the glenoid implant can be designed based on the profile of the scapula.

Figure 100:
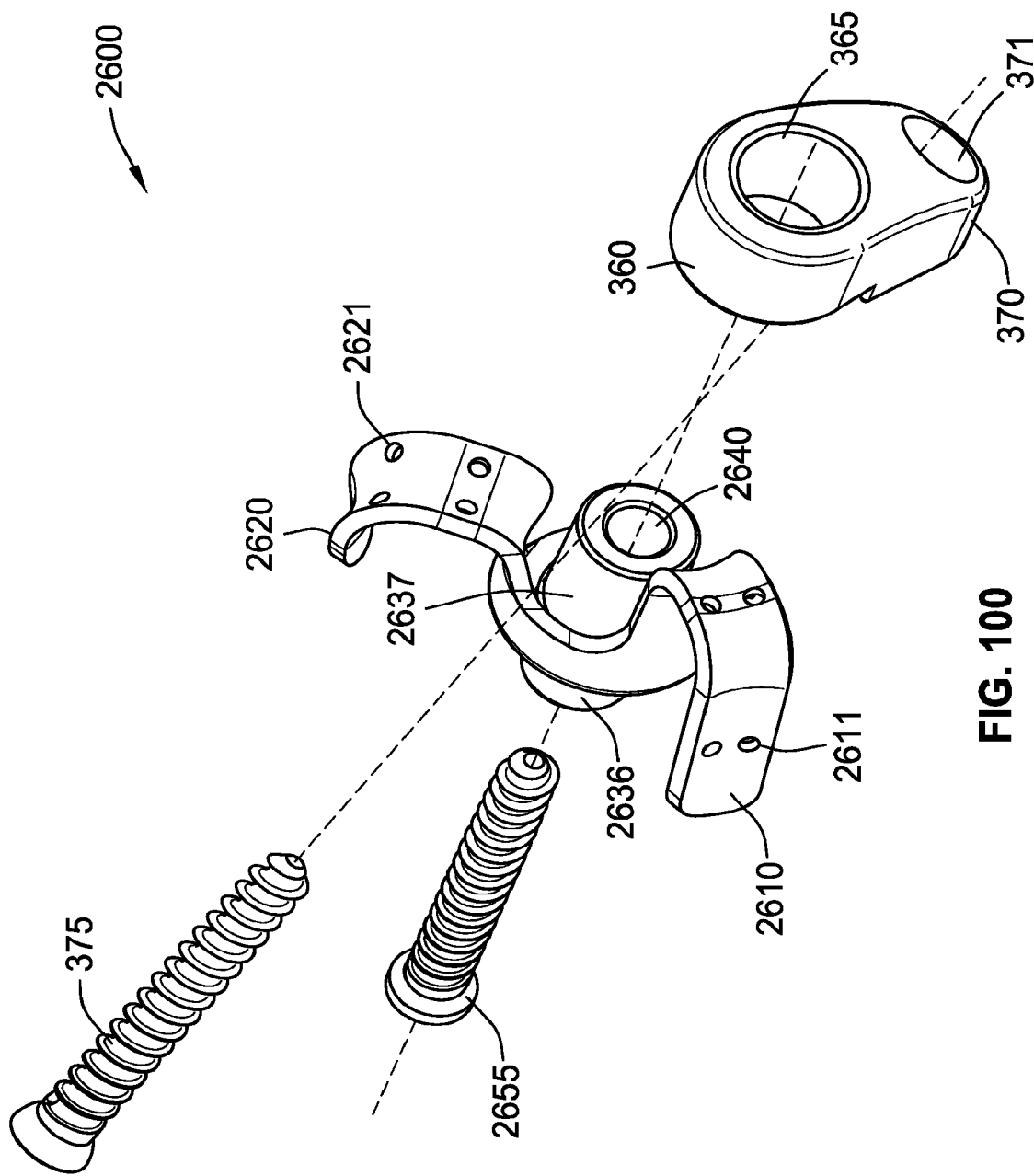
FIG. 100 is an exploded view of a glenoid implant in a twenty-eight configuration according to some implementations of the present disclosure.
Figure 101:
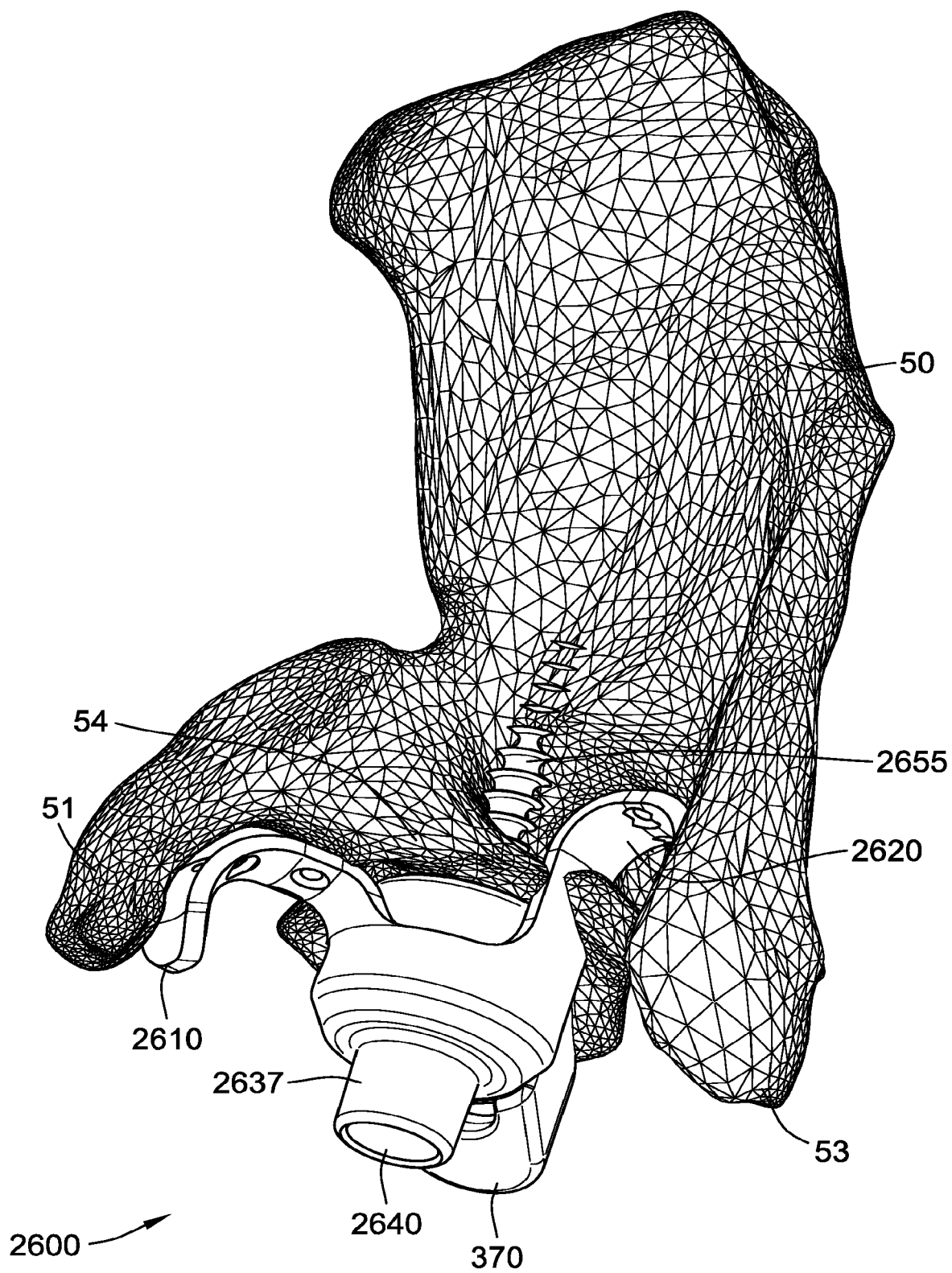
FIG. 101 is a front isometric perspective view of the glenoid implant of FIG. 100 surgically interfaced to a scapula.

Referring momentarily to FIGS. 100-101, a glenoid implant 2600 is illustrated. FIG. 100 is an exploded view of the glenoid implant 2600. FIG. 101 is a side isometric perspective view of the glenoid implant 2600. The glenoid implant 2600 can include a first portion 2630 and the second portion 360, which are the same as, or similar to, the first portion 2530 and the second portion 360 of the base described above in connection with the glenoid implant 2500.

Specific to the glenoid implant 2500, the first leg 2510 and the second leg 2520 can each have a unique arc. In this configuration, each leg of the glenoid implant can be designed based on the profile of the scapula. Specifically, the first leg 2510 and the second leg 2520 are bent in place depending on the anatomy of the scapula.

Referring generally to FIGS. 38-40, a second portion 460 is illustrated. FIGS. 38 and 39 are front and rear isometric views of the second portion 460. FIG. 40 is a cross-sectional isometric view of the second portion 460. The second portion 460 can include an adjustable leg 470 with an aperture 471 and a body 466. The adjustable leg 470 can be configured to extend from the body 466. The body 466 can include a central aperture 465. The second portion 460 can also include a keel component 476 extending from a rear surface of the second portion 460. The keel component 476 can be configured to be inserted into a cavity defect of the glenoid cavity of a scapula. This is discussed in greater detail below.

Referring generally to FIGS. 41-43, a second portion 560 is illustrated. FIGS. 41 and 42 are front and rear isometric views of the second portion 560. FIG. 43 is a cross-sectional isometric view of the second portion 560. The second portion 560 can include an adjustable leg 570 and a body 566, which are similar to, the adjustable leg 470 and the body 466 of the second portion 460 described above.

Specific to the second portion 560, the adjustable leg 570 can have a wider geometry than the adjustable leg 470 of the second portion 460. In addition, the body 566 can have a greater thickness than the body 466 of the second portion 460. It should be understood the second portion can vary in size and geometry based on the amount of bone loss of the patient. As best shown in FIGS. 40 and 43, the second portion 560 can be angled more for more severe bone loss. For example, the body 466 and the adjustable third leg 470 can be spaced between 130-135 degrees. Whereas, the body 566 and the adjustable third leg 570 can be spaced about 45 degrees. A glenosphere can be coupled to the body 466 or 566. This is discussed in greater detail below.

Figure 44:
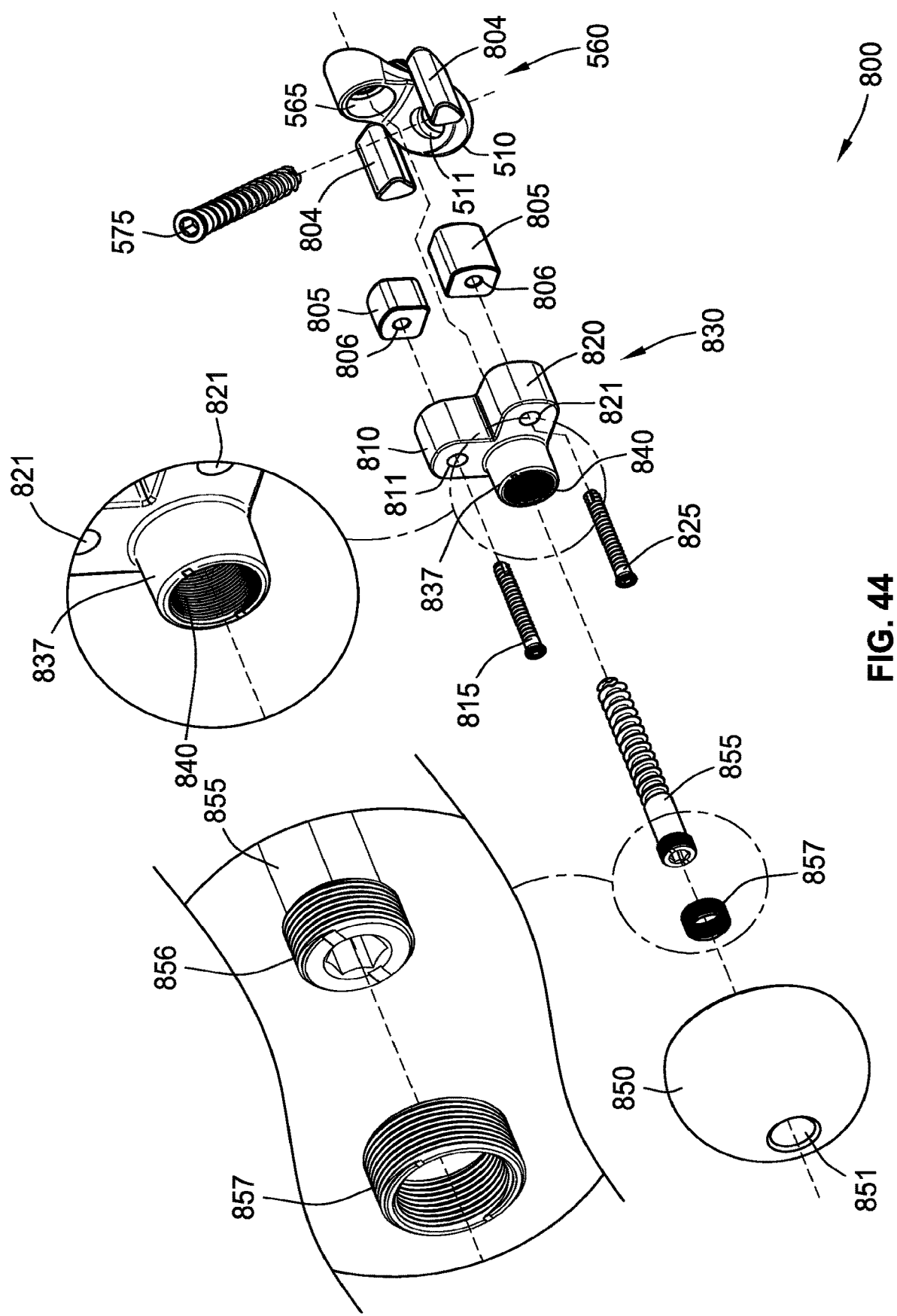
FIG. 44 is a front isometric exploded view of a glenoid implant in a tenth configuration according to some implementations of the present disclosure.
Figure 45:
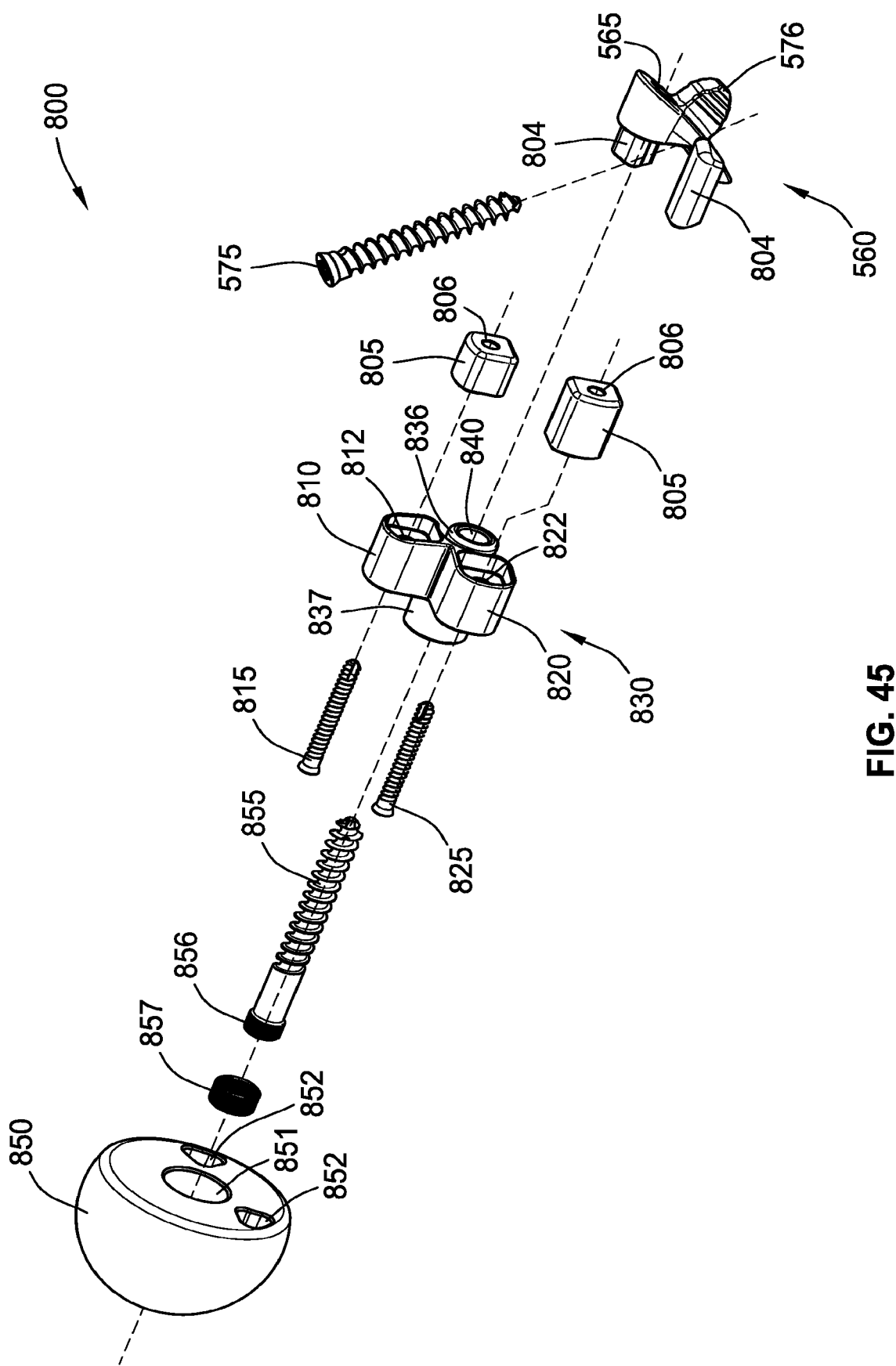
FIG. 45 is a rear isometric exploded view of the glenoid implant of FIG. 44.
Figure 46:
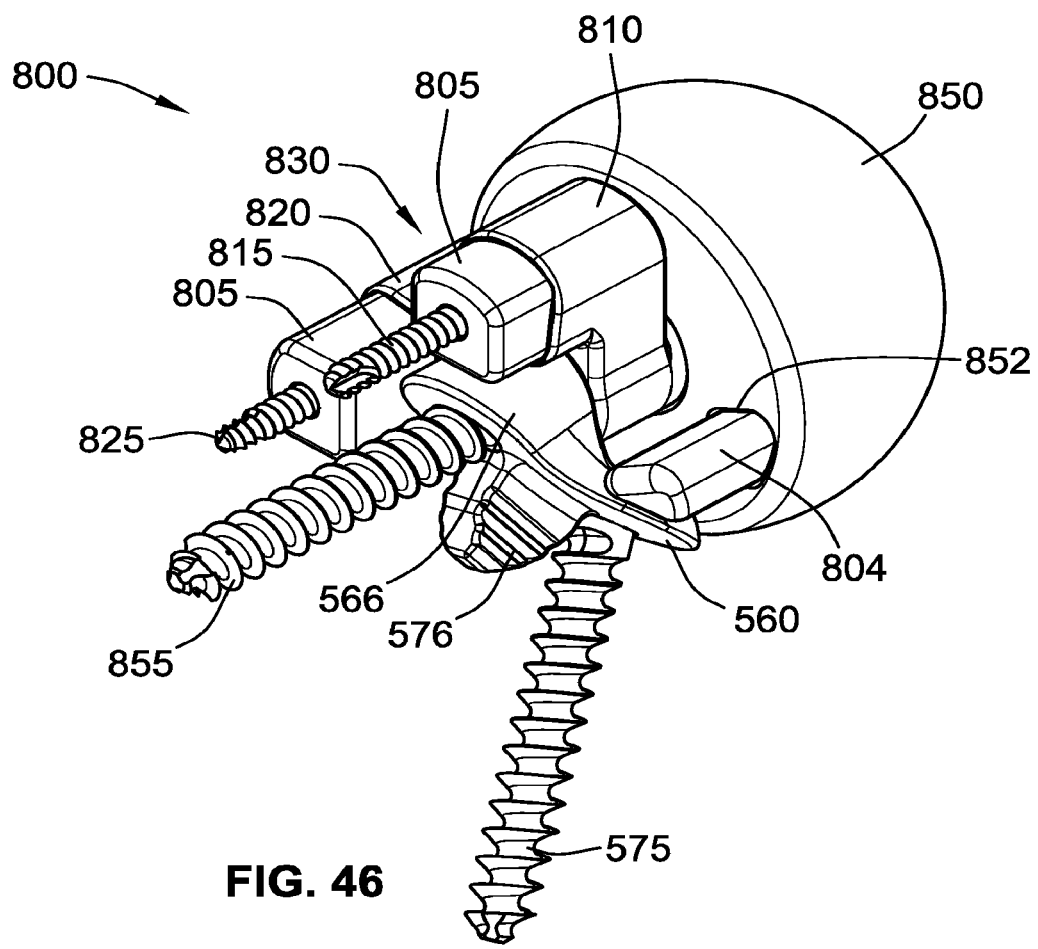
FIG. 46 is a right rear isometric view of the glenoid implant of FIG. 44.
Figure 47:
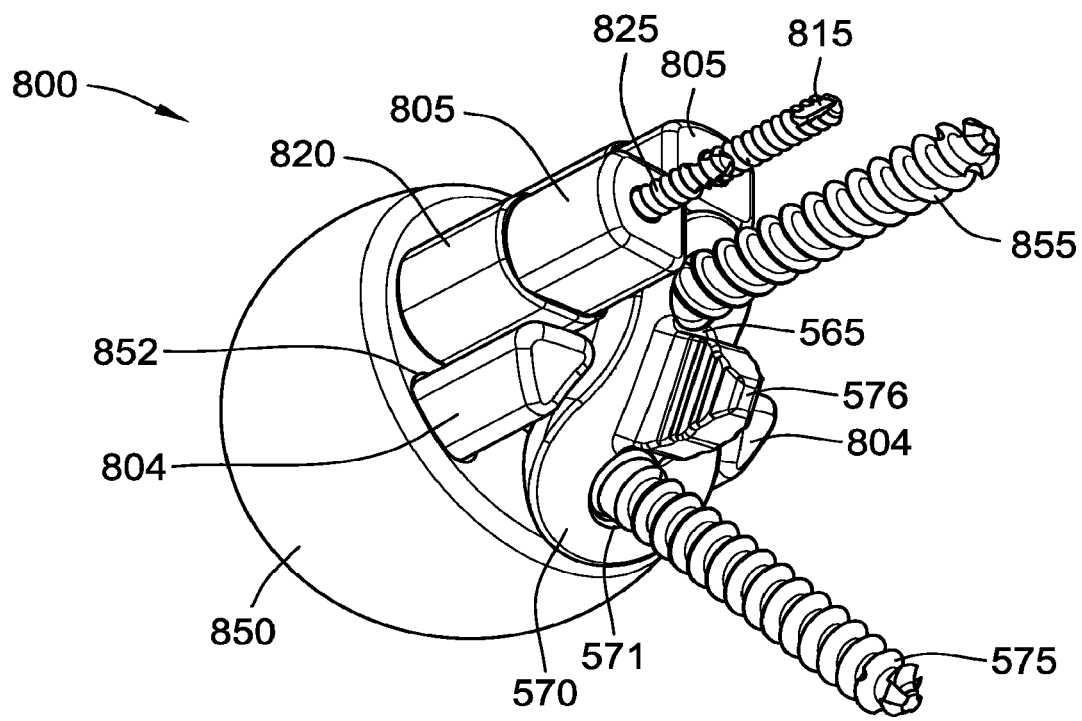
FIG. 47 is a left rear isometric view of the glenoid implant of FIG. 44.
Figure 48:
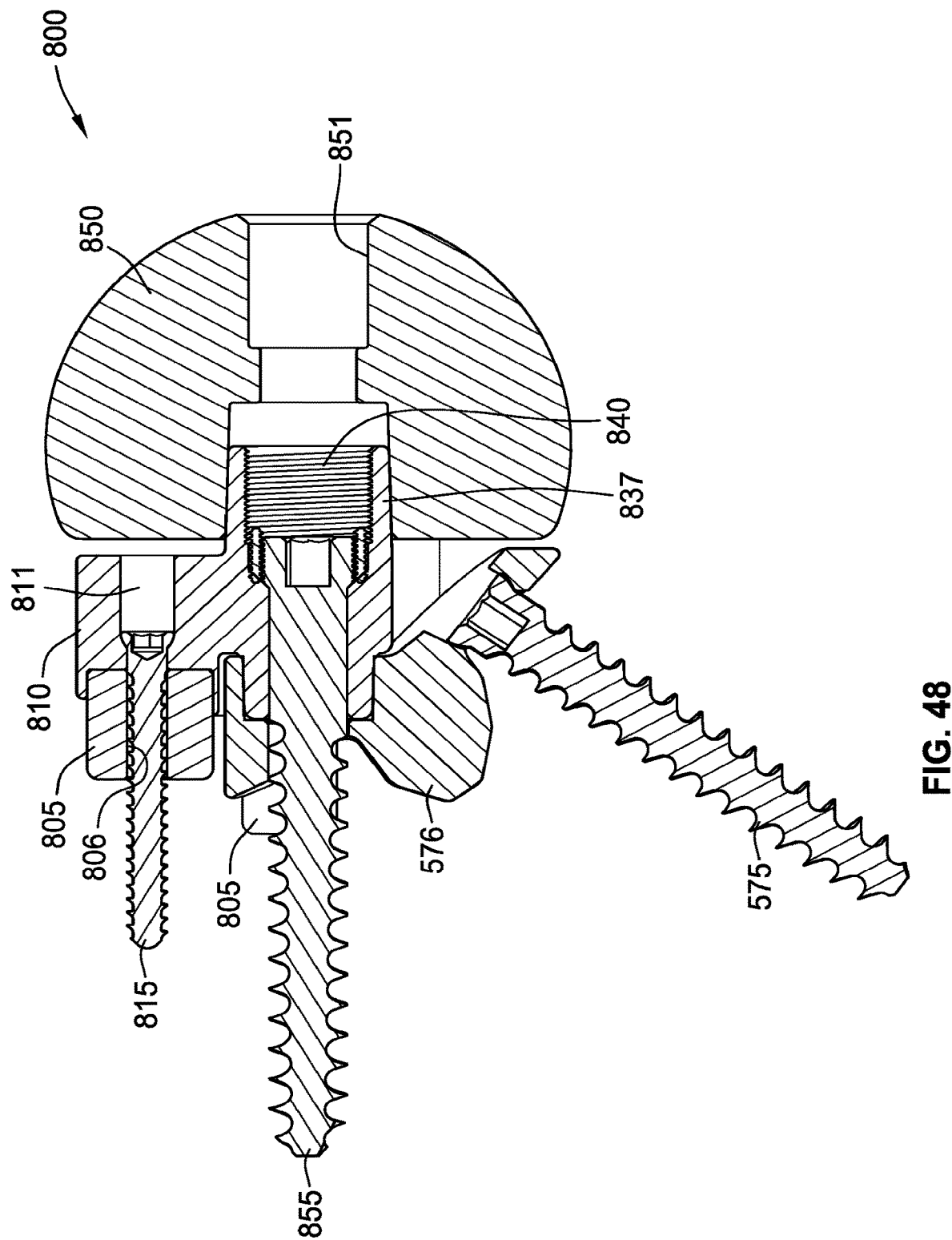
FIG. 48 is a cross-sectional side view of the glenoid implant of FIG. 44.
Figure 49:
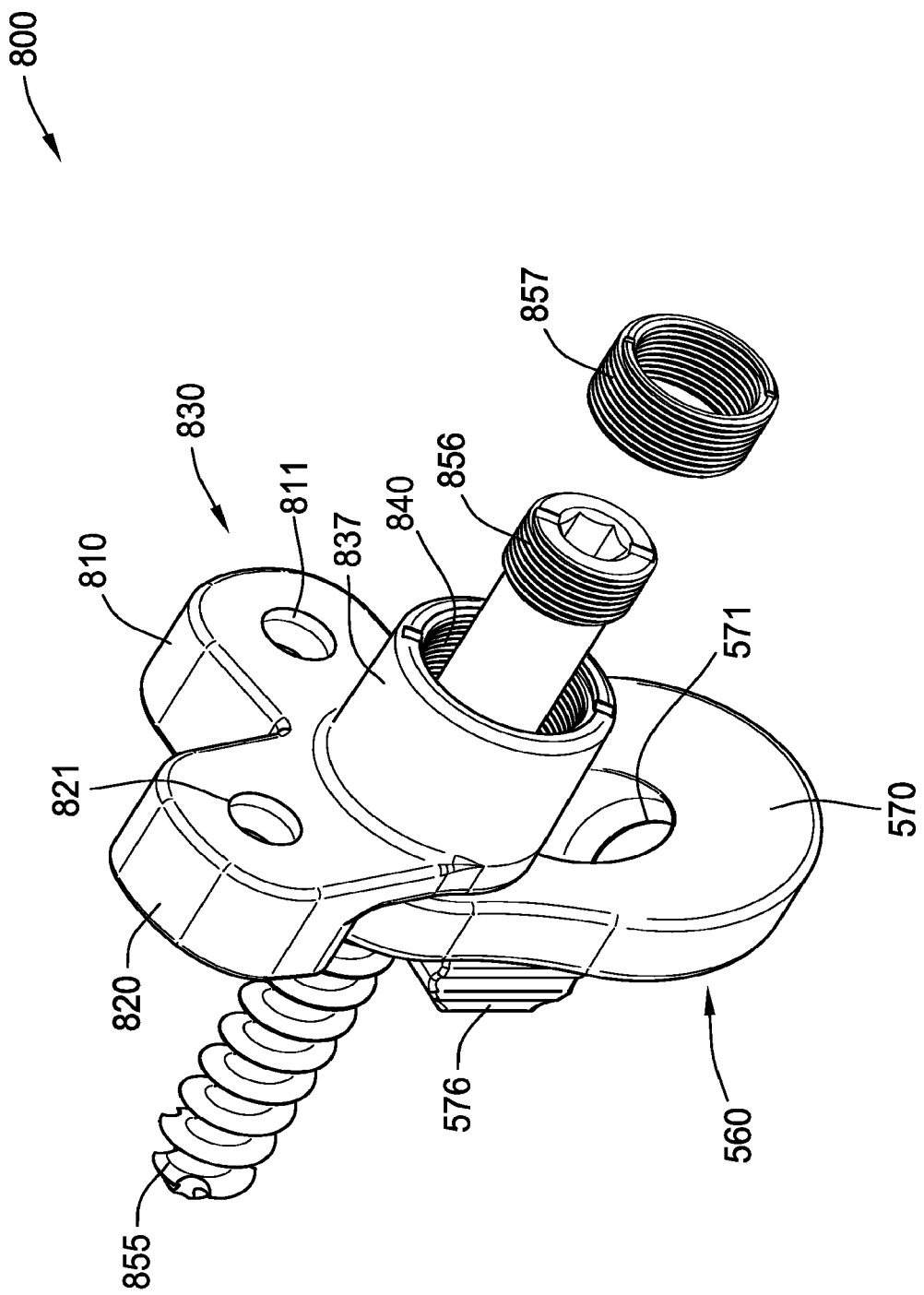
FIG. 49 is a front isometric view of a partial assembled glenoid implant of FIG. 44.
Figure 50:
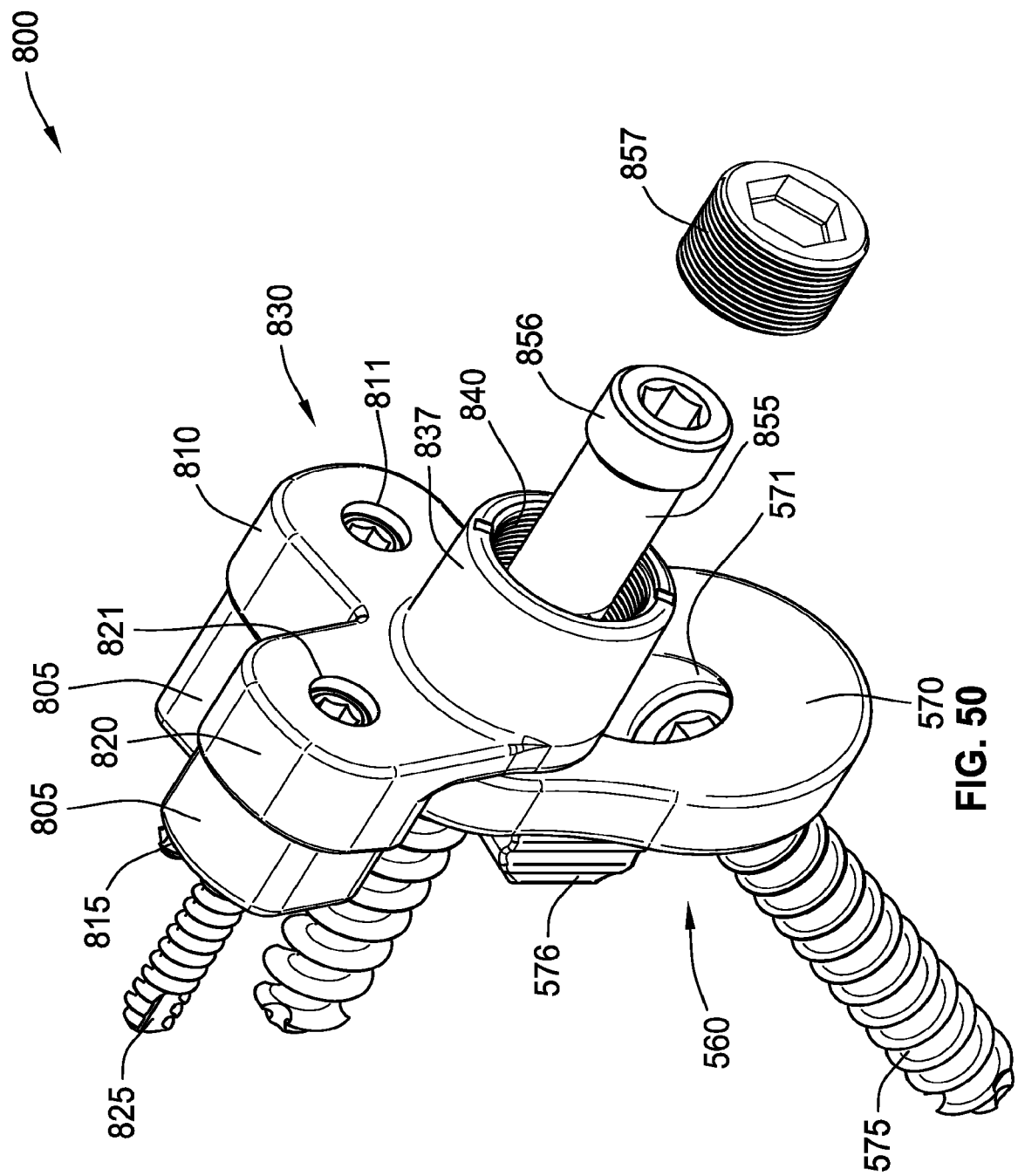
FIG. 50 is a front isometric view of a partial assembled glenoid implant of FIG. 44.

Referring generally to FIGS. 44-50, a glenoid implant 800 is illustrated. FIGS. 44 and 45 are front and rear isometric exploded views of the glenoid implant 800. FIGS. 46 and 47 are right and left rear isometric views of the glenoid implant 800. FIG. 48 is a cross-sectional side view of the glenoid implant 800. FIGS. 49 and 50 are front isometric views of a partial assembled glenoid implant 800.

The glenoid implant 800 can include a first portion 830 and the second portion 560, which are similar to the first portion 730 and the second portion 360 of the base described above in connection with the glenoid implant 700. Specific to the glenoid implant 800, the first and second legs 810, 820 can include a different geometry. The first leg 810 can have a single aperture 811, and the second leg 820 can have a single aperture 812. Furthermore, the first and second legs 810, 820 do not extend far from the flat trunnion 837. In fact, the first portion 830 is smaller in size with respect to previous implementations discussed herein. The first trunnion 837 can include a central aperture 840 configured to align with the central aperture 565 of the second portion 560.

As best shown in FIG. 45, the first leg 810 can have a receiving space 812 configured to receive an augment 805. Similarly, the second leg 820 can have a receiving space 822 configured to receive an augment. The rear of the first portion 830 can also include a second trunnion 836 configured to be received within the central aperture 565 of the second portion 560. The augments 805 can be provided to provide additional support to the glenoid implant 800 by increasing the relative thickness of the leg. Each augment 805 can include a corresponding aperture 806 that aligns with, for example, the first aperture 811 in the first leg 810. The alignment of the apertures allows the first fastening element 815 to be received through the first aperture 811 of the first leg 810 and the aperture 806 of the augment 805.

The glenoid implant 800 can also include a central fastening element 855 configured to be at least partially positioned through the central aperture 840 of the first portion 830 and the central aperture 565 of the second portion 560. The glenoid implant 800 can also include a glenosphere 850 configured to be secured to the first and second portions 830, 560 via the central fastening element 855. As best shown in FIGS. 46 and 47, the glenosphere 850 can include receiving spaces 852 configured to receive an augment 804. The augments 804 in the bottom of the glenosphere 850 can be attached with a screw. Alternatively, the augments 804 can be tapered and hammered into the glenosphere 850.

As best shown in FIG. 49, the head 856 of the central fastening element 855, in some implementations, is threaded. The threaded head 856 can be configured to couple with a threaded element 857. The threaded element 857 is configured to be received within the central aperture 840 of the first portion 830, which is also threaded to receive the threaded element 857 in a threaded engagement. The central fastening element 855 and the threaded element 857 are configured to screw into place in alternative directions. That is, in some implementations, the central fastening element 855 is screwed into place in a first rotational direction (e.g., clockwise) and the threaded element 857 is screwed into place in a second opposing rotational direction (e.g., counterclockwise). In an alternative implementation shown in FIG. 50, the head 856 of the central fastening element 855 is not threaded. The non-threaded head 856 is configured to be couple with a different version of the threaded element 857. In this implementation shown in FIG. 50, the central fastening element 855 is installed normally as described above (e.g., threaded into place in a first rotational direction) and then the threaded element 857 of FIG. 50 is fitted over the head 856 of the central fastening element 855 and installed. In such implementation of FIG. 50, the inside of the threaded element 857 is not threaded. Rather, the inside of the threaded element 857 of FIG. 50 can be a non-threaded cylindrical bore to slip over the head 856. This implementation of FIG. 50 can aid in minimizing micro motion between the central fastening element 855 and the threaded element 857, which can aid in preventing the central fastening element 855 from backing out of its installed position. The threaded element 857 of FIG. 49 or of FIG. 50 can be included in any of the glenoid implants of the present disclosure for the same or similar purposes as described herein.

The threaded element 857 is configured to be received within the central aperture 840 of the first portion 830, which is also threaded. The threaded element 857 is configured to lock the central fastening element 855 in place. As best shown in FIG. 48, the central aperture 851 of the glenosphere 850 can be configured to receive the first trunnion 837. In this way, the glenosphere 850 is secured to the base of the glenoid implant 800.

Figure 53:
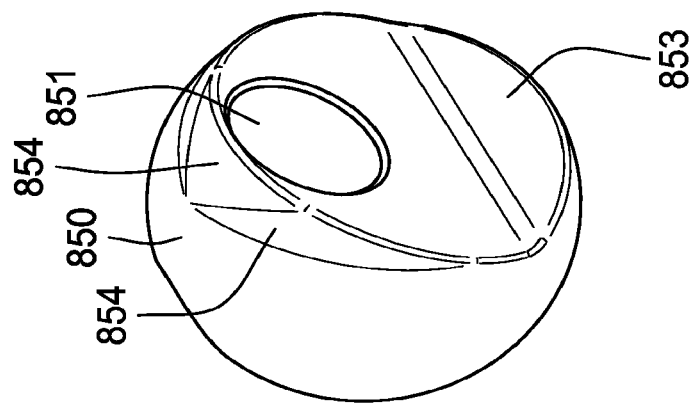
FIG. 53 is a rear isometric view of a glenosphere in a third configuration according to some implementations of the present disclosure.
Figure 52:
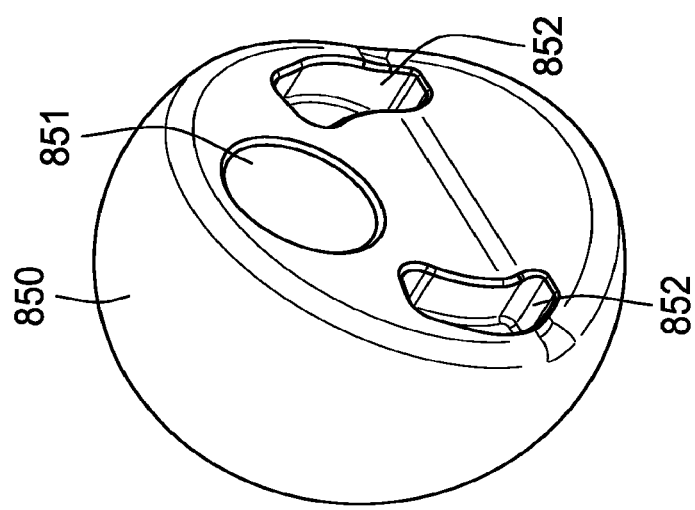
FIG. 52 is a rear isometric view of a glenosphere in a second configuration according to some implementations of the present disclosure.
Figure 51:
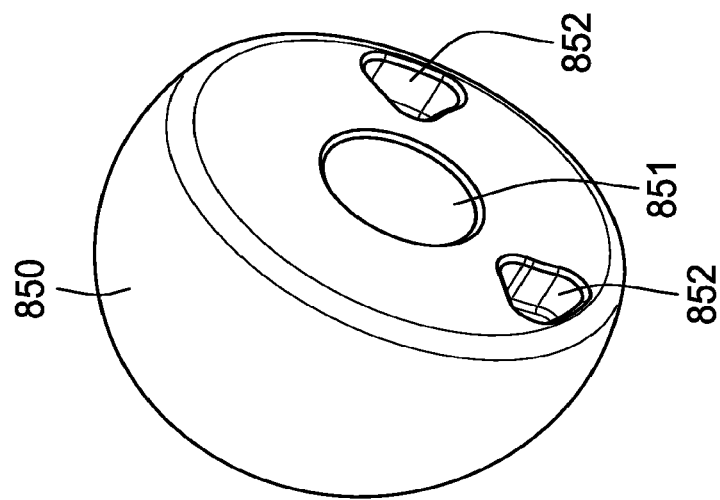
FIG. 51 is a rear isometric view of a glenosphere in a first configuration according to some implementations of the present disclosure.

While the glenosphere 850 has been illustrated as discussed above, it should be understood that the geometry of the glenosphere 850 can also vary. FIGS. 51, 52 and 53 are rear isometric views of a glenosphere 850 in a first, second, and third configuration, respectively. FIG. 51 illustrates the glenosphere 850 with a central aperture 851 and receiving slots 852 for one or two augments (not shown). FIG. 52 illustrates the glenosphere 850 with a central aperture 851, receiving slots 852, and a tab or wedge feature 853. Due to the tab or wedge feature 853 location on the glenosphere 850 (FIG. 52), the position and size of the receiving slots 852 of the second configuration varies with respect to that of the receiving slots 852 of the first configuration (FIG. 51). FIG. 53 illustrates the glenosphere 850 with a central aperture 851, a first tab or wedge feature 853, and a second tab or wedge feature 854 that is opposite the first tab or wedge feature 853. These tab/wedge features can assist in securing the glenosphere 850 to the other elements of the glenoid implants of the present disclosure. They can also provide additional support to the scapula.

Figure 54:
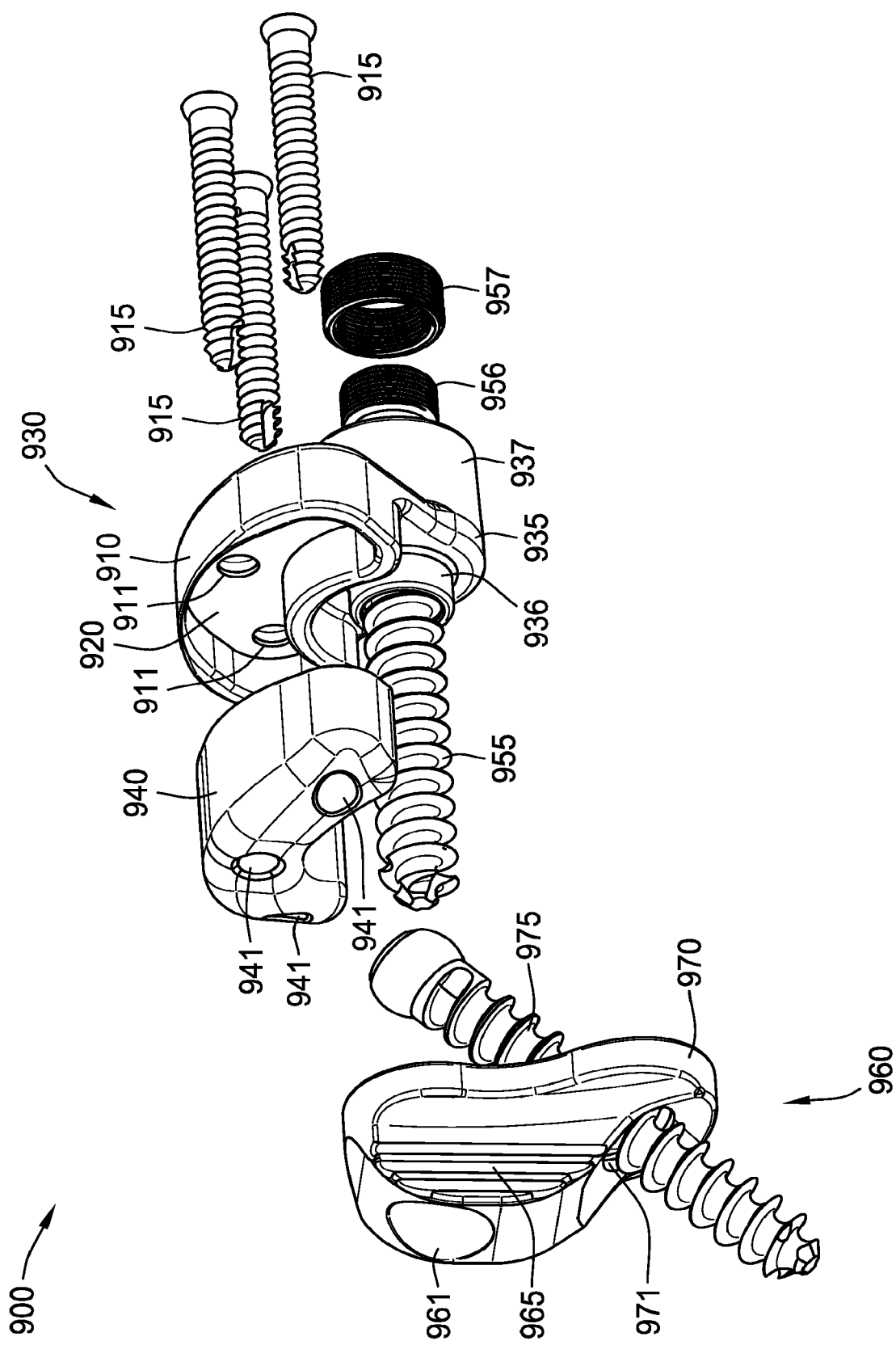
FIG. 54 is a rear isometric exploded view of a glenoid implant in an eleventh configuration according to some implementations of the present disclosure.
Figure 55:
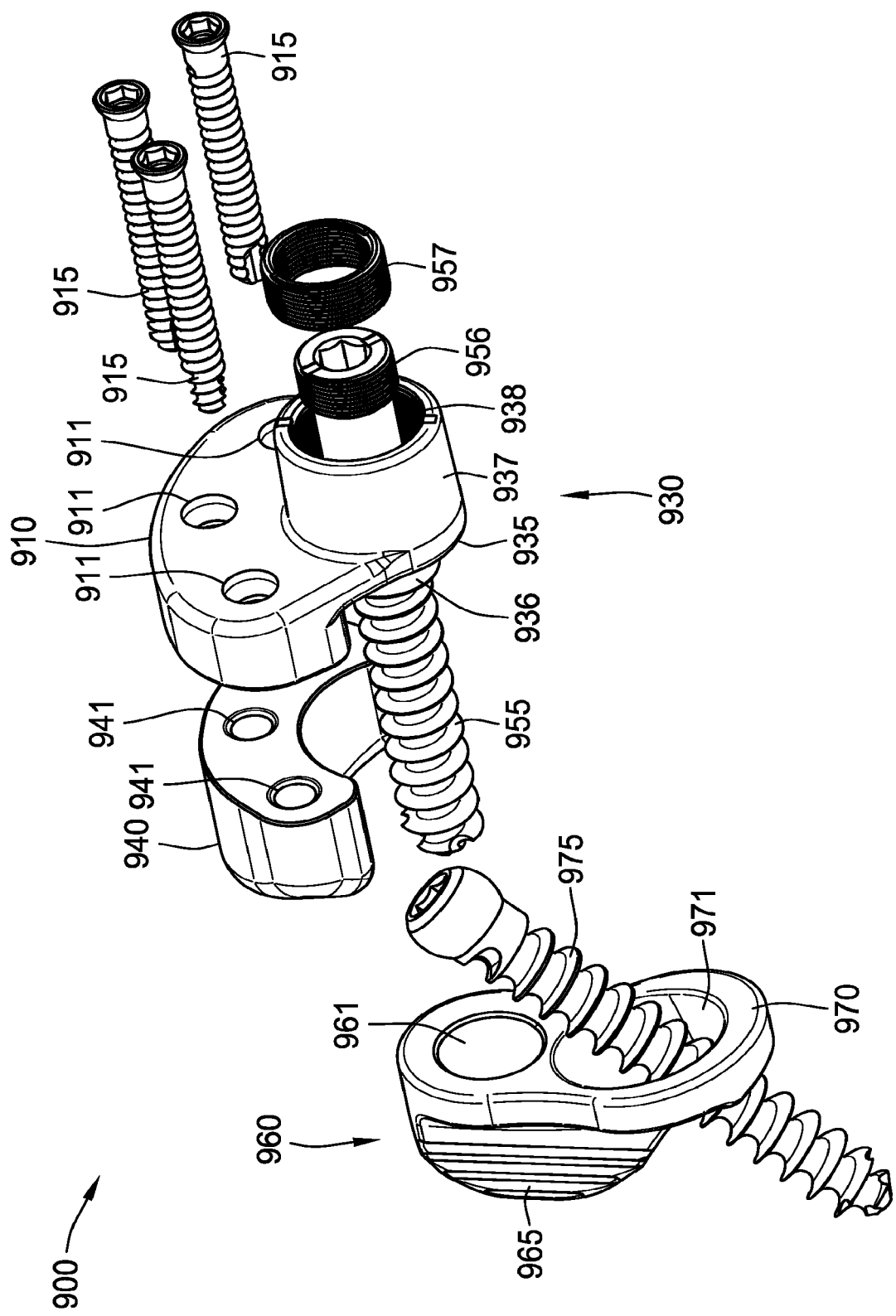
FIG. 55 is a front isometric exploded view of the glenoid implant of FIG. 54.

Referring generally to FIGS. 54-55, a glenoid implant 900 is illustrated. FIG. 54 is a rear isometric or perspective exploded view of the glenoid implant 900, whereas FIG. 55 is a front isometric or perspective exploded view of the glenoid implant 900. The glenoid implant 900 includes a base element 960, a coupling element 930, and an augment 940. The base element 960 has a central aperture 961 and an adjustable third leg 970, which includes a second aperture 971. The adjustable third leg 970 is adjustable relative to the coupling element 930 in that the adjustable third leg 970 can be rotated relative to the coupling element 930. The base element 960 includes a keel element 965 extending or protruding from a rear of the base element 960. The keel element 965 is configured to aid in securing the base element 960 to a first portion of a scapula of a patient/user. The second aperture 971 of the base element 960 is configured to receive a portion of a first fastening element 975 therethrough to aid in securing the base element 960 to the first portion of the scapula. In some implementations, the first portion of the scapula is a glenoid cavity. The coupling element 930 includes a first elongated portion 910 and a second portion 935. The first elongated portion 910 includes a receiving space 920 (FIG. 54), and apertures 911 therethrough. Furthermore, the second portion 935 includes a central aperture 938 that is aligned with the central aperture 961 of the base element 960 when the base element 960 is coupled to the coupling element 930.

The augment 940 is sized and configured to be at least partially received within the receiving space 920 of the first elongated portion 910 of the coupling element 930. The augment 940 includes apertures 941 therethrough. Each aperture 911 of the coupling element 930 is aligned with each aperture 941 of the augment 940 to receive a portion of a respective second fastening element 915 therethrough. The second fastening elements 915 can aid in securing the coupling element 930 and/or the augment 940 to a second portion of the scapula 50 of the patient/user.

The second portion 935 of the coupling element 930 can include a first trunnion 937 and a second trunnion 936. The first trunnion 937 is opposite the first trunnion 937. The first trunnion 937 is configured to receive or be received in a glenosphere (not shown). The second trunnion 936 can be configured to be received within the central aperture 961 (FIG. 55) of the base element 960. As a result, the coupling element 960 and the augment 940, once coupled, are configured to rotate relative to the base element 960 and/or relative to an axis of the base element 960 (e.g., a central axis of the central aperture 961). While three second fastening elements 915 are illustrated herein, it should be understood that not all the second fastening elements 915 need be included if, for example, the coupling element 960 and the augment 940 are rotated to one side. The glenoid implant 900 can be implemented in cases of severe bone loss. The base element 960 can be configured as an inlay component, meaning, the keel element 965 can be shaped to account for a cavity defect or missing bone.

The glenoid implant 900 can also include a central fastening element 955 configured to be at least partially positioned through the central aperture 961 of the base element 960 and the central aperture 938 of the coupling element 930. The central fastening element 955 is similar in variations with the central fastening element 855 of the glenoid implant 800.

A head 956 of the central fastening element 955 can be the same as or similar to the head 856 described above. Similarly, the glenoid implant 900 can include a threaded element 957 that is the same as, or similar to, the threaded element 857 described above.

Figure 56:
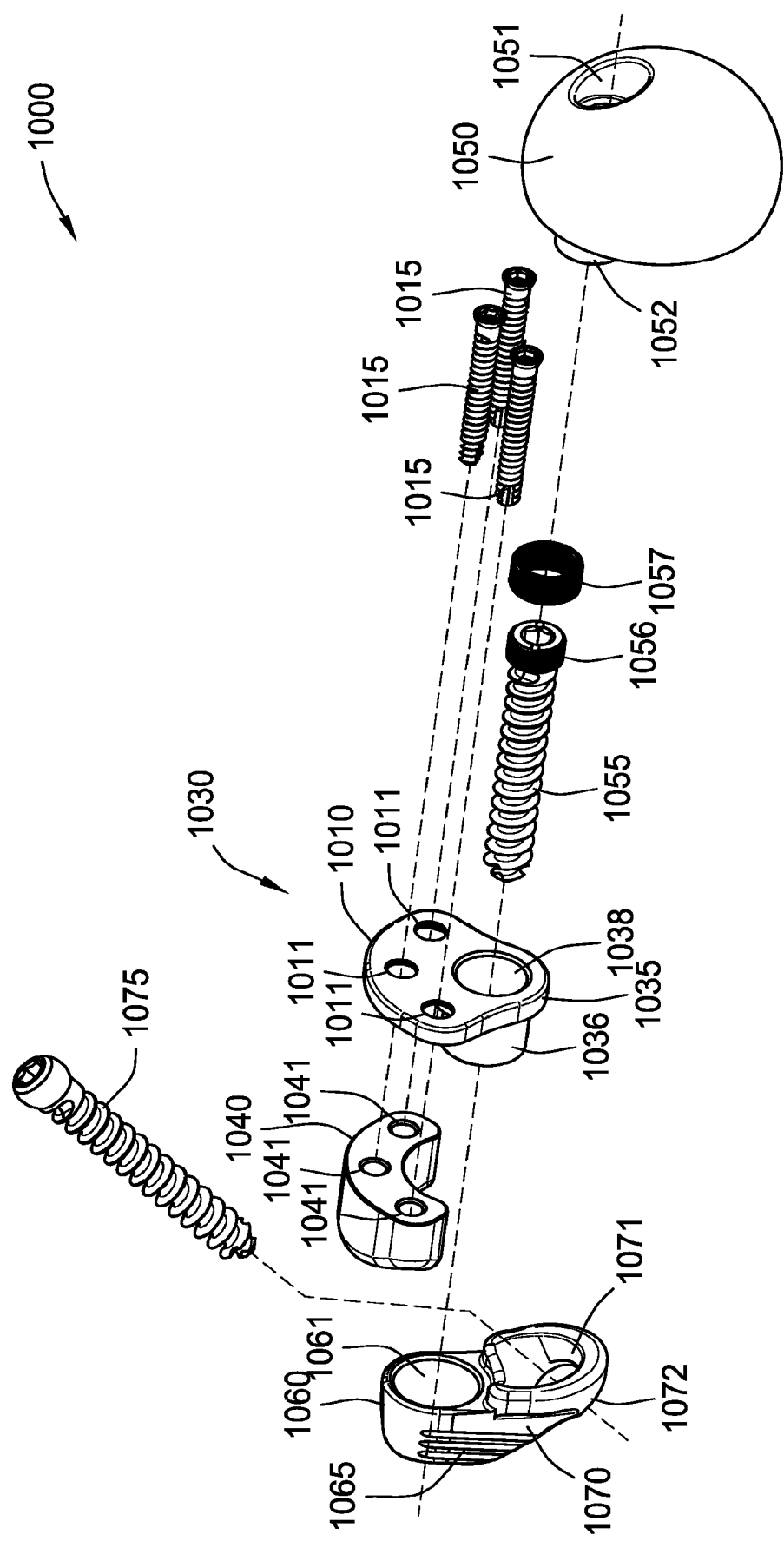
FIG. 56 is a front isometric exploded view of a glenoid implant in a twelfth configuration according to some implementations of the present disclosure.
Figure 57:
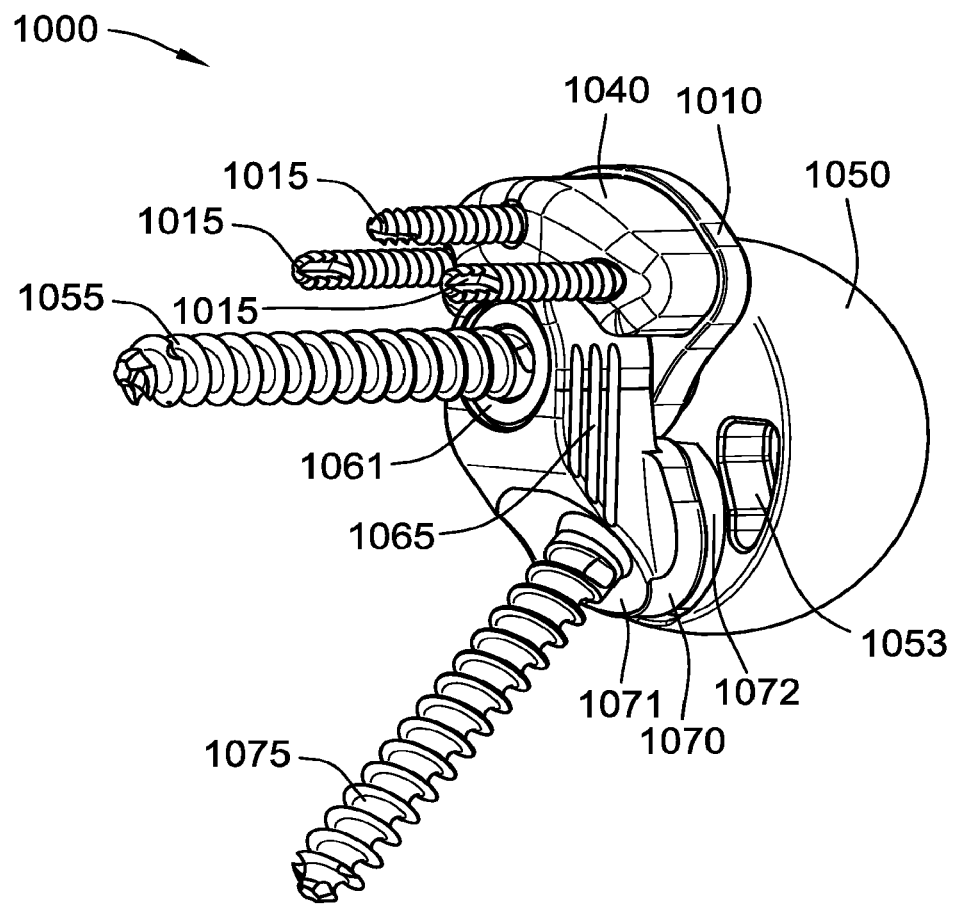
FIG. 57 is a right rear isometric view of the glenoid implant of FIG. 56.
Figure 58:
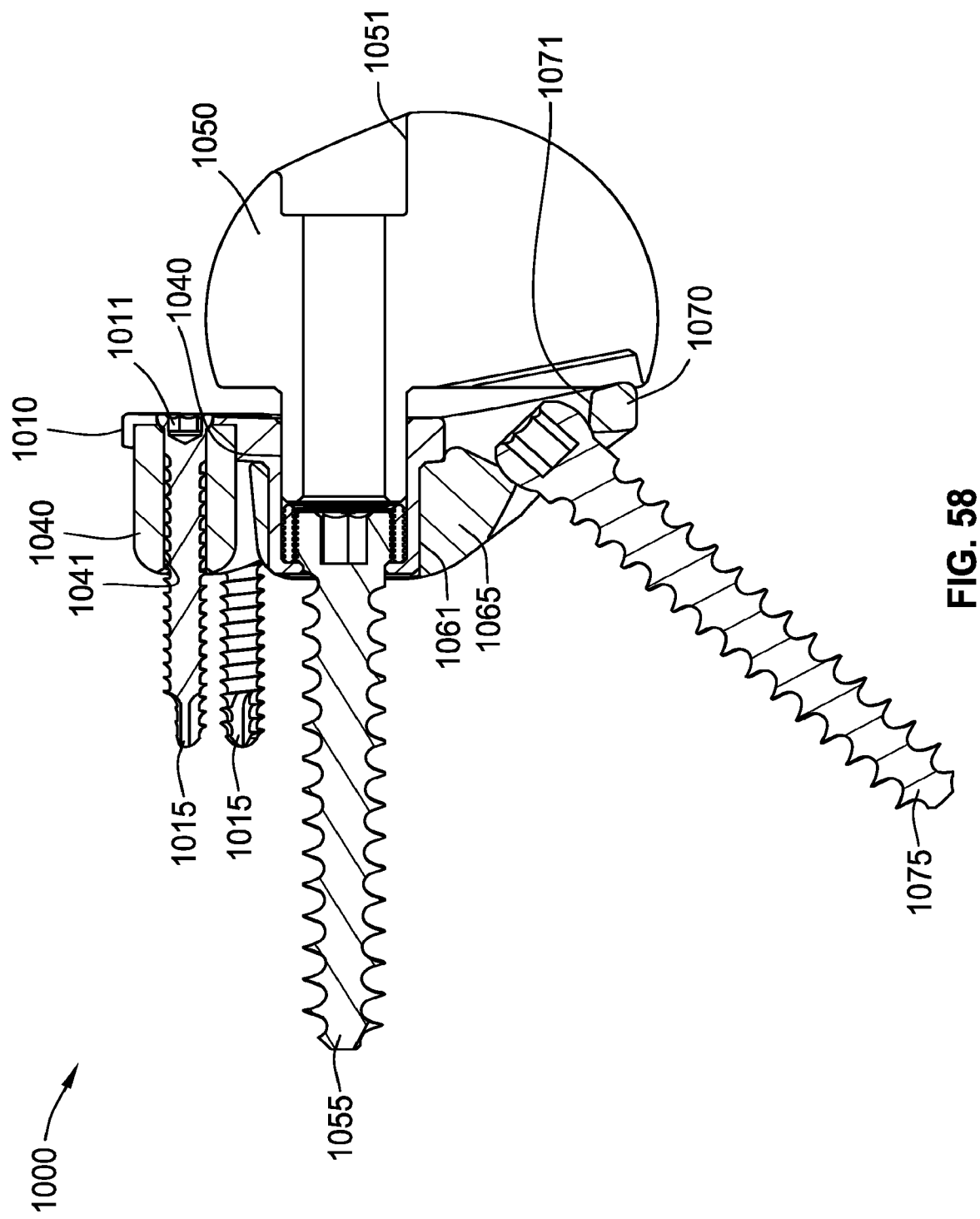
FIG. 58 is a cross-sectional side view of the glenoid implant of FIG. 56.

Referring generally to FIGS. 56-58, a glenoid implant 1000 is illustrated. FIG. 56 is a front isometric exploded view of the glenoid implant 1000. FIG. 57 is a right rear isometric view of the glenoid implant 1000. FIG. 58 is a cross-sectional side view of the glenoid implant 1000.

The glenoid implant 1000 can include a base element 1060, a coupling element 1030, an augment 1040, a central fastening element 1055 with a threaded head 1056 and a threaded element 1057, a first fastening element 1075, and second fastening elements 1015, which are similar to, the base element 960, the coupling element 930, the augment 940, the central fastening element 955 with the threaded head 956 and threaded element 957 of the glenoid implant 900, the first fastening element 975, and the second fastening elements 915. Specific to the glenoid implant 1000, the coupling element 1030 can have a shallower receiving area (not shown) than that of the coupling element 930. The coupling element 1030 includes a first elongated portion 1010 and a second portion 1035. The first elongated portion 1010 includes a receiving space that receives the augment 1040 therein as shown in FIG. 57. The first elongated portion 1010 also includes apertures 911 therethrough for permitting the second fastening elements 1015 to at least partially pass therethrough for securing the glenoid implant 1000 during installation. Furthermore, the second portion 1035 includes a central aperture 1038 that is aligned with the central aperture 1061 of the base element 1060 when the base element 1060 is coupled to the coupling element 1030.

The augment 1040 includes apertures 1041 therethrough. Each aperture 1011 of the coupling element 1030 is aligned with each aperture 1041 of the augment 1040 to receive a portion of a respective one of the second fastening elements 1015 therethrough. The second fastening elements 1015 can aid in securing the coupling element 1030 and/or the augment 1040 to a second portion of the scapula 50 of the patient/user.

Furthermore, the base element 1060 can include a tab or wedge feature 1072 extending from the aperture 1071 of the adjustable third leg 1070. Moreover, the coupling element 1030 can have a sole trunnion 1036 extending from the rear, and configured to be received within the central aperture 1061 of the base element 1060. Like the base element 960, the base element 1060 includes a keel element 1065 that extends or protrudes from a rear of the base element 1060.

The glenoid implant also includes a glenosphere 1050 that is connected to the coupling element 1030 via a trunnion 1052 of the glenosphere 1050 that extends from the glenosphere 1050. The trunnion 1052 can be configured to be received within the central aperture 1038 of the coupling element 1030. The glenosphere 1050 can include one or more receiving spaces 1053 (FIG. 57) configured to receive one or more corresponding augments (not shown, but could be the same as, or similar to, augments 804). The augments in the bottom of the glenosphere 1050 can be attached with a screw or the augments can be tapered and hammered into the glenosphere 1050. The glenosphere 1050 also includes a central aperture 1051 (FIG. 56) that permits the central fastening element 1055 and/or the threaded element 1057 to be passed therethrough (at least partially) during installation of the glenoid implant 1000 into bone of a patient.

Figure 59:
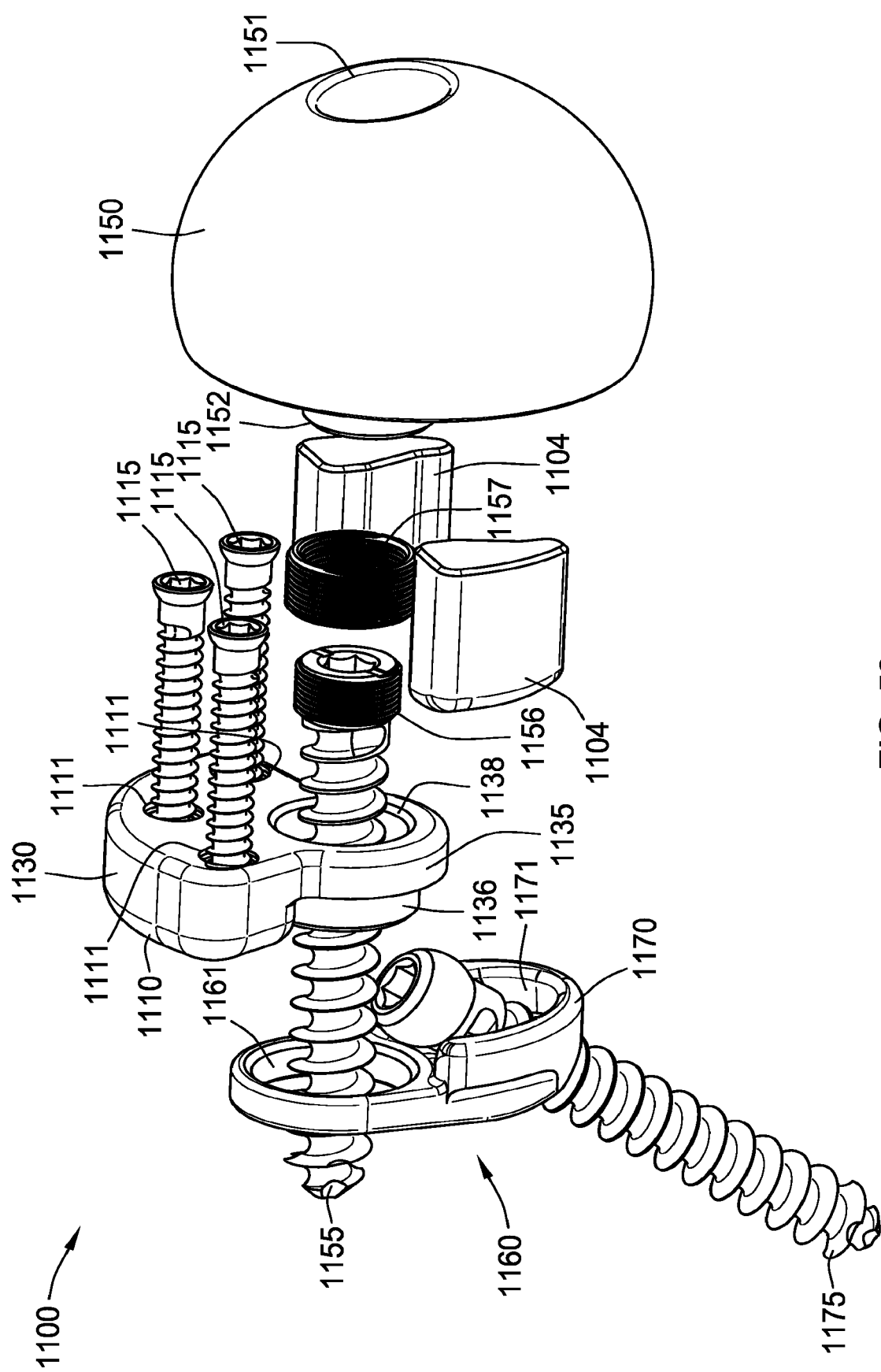
FIG. 59 is a front isometric exploded view of a glenoid implant in a thirteenth configuration according to some implementations of the present disclosure.
Figure 60:
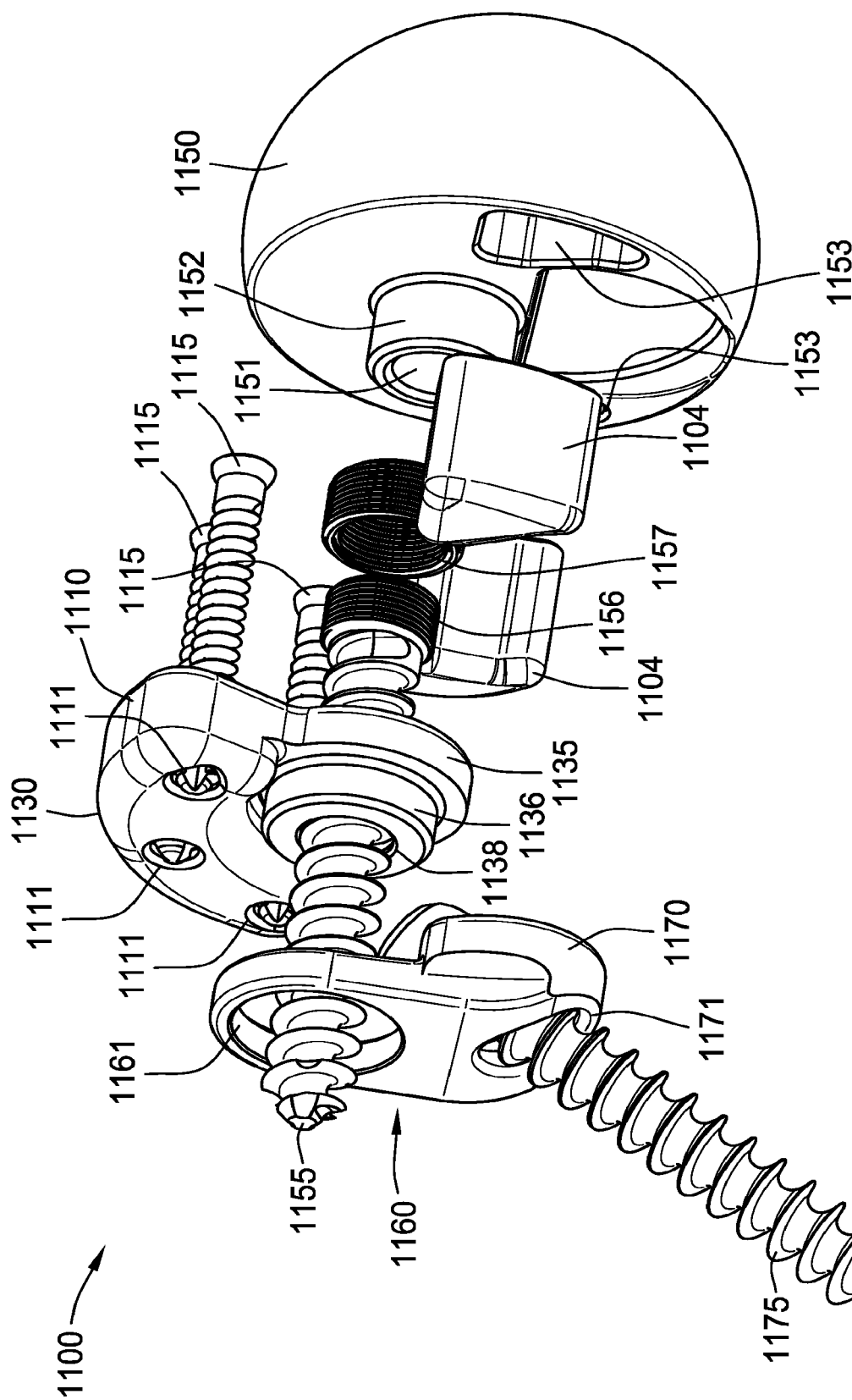
FIG. 60 is a rear isometric view of the glenoid implant of FIG. 59.

Referring generally to FIGS. 59-60, a glenoid implant 1100 is illustrated. FIGS. 59 and 60 are front and rear isometric exploded views of the glenoid implant 1100. The glenoid implant 1100 includes a base element 1160, a coupling element 1130, a central fastening element 1155, a first fastening element 1175, and second fastening elements 1115, which are the same as, or similar to, the base element 1060, the coupling element 1030, the central fastening element 1055 of the glenoid implant 1000, the first fastening element 1075, and the second fastening elements 1015. The base element 1160 has a central aperture 1161 and an adjustable third leg 1170, which includes a second aperture 1171. The adjustable third leg 1170 is adjustable relative to the coupling element 1130 in that the adjustable third leg 1170 can be rotated relative to the coupling element 1130. The second aperture 1171 of the base element 1160 is configured to receive a portion of a first fastening element 1175 therethrough to aid in securing the base element 1160 to the first portion of the scapula 50.

The coupling element 1130 includes a first elongated portion 1110 and a second portion 1135 (FIG. 60). The first elongated portion 1110 includes apertures 1111 therethrough. Furthermore, the second portion 1135 includes a central aperture 1138 that is aligned with the central aperture 1161 of the base element 1160 when the base element 1160 is coupled to the coupling element 1130. Specific to the glenoid implant 1100, the coupling element 1130 does not have a receiving area because there is no augment component to attach. The first elongated portion 1110 of the coupling element 1130 has an extended geometrical shape, and is not flat like its predecessors discussed above. Furthermore, a second trunnion 1136 is relatively shorter than the trunnion 1036 discussed above. This is because the base component 1160 has a slimmer profile than the base component 1060 discussed above.

The base element 1160 has a flat rear surface, as it is configured as an on-lay component. The glenoid implant also includes a glenosphere 1150 that is connected to the coupling element 1130 via a trunnion 1152 of the glenosphere 1150 that extends from the glenosphere 1150. The trunnion 1152 can be configured to be received within the central aperture 1138 of the coupling element 1130. The glenosphere 1150 can include one or more receiving spaces 1153 (FIG. 60) configured to receive one or more corresponding augments (not shown, but could be the same as, or similar to, augments 804). The augments in the bottom of the glenosphere 1150 can be attached with a screw or the augments can be tapered and hammered into the glenosphere 1150. The glenosphere 1150 also includes a central aperture 1151 (FIGS. 59-60) that permits the central fastening element 1155 and/or the threaded element 1157 to be passed therethrough (at least partially) during installation of the glenoid implant 1100 into bone of a patient.

A head 1156 of the central fastening element 1155 can be the same as or similar to the head 856 described above. Similarly, the glenoid implant 1100 can include a threaded element 1157 that is the same as, or similar to, the threaded element 857 described above.

Figure 61:
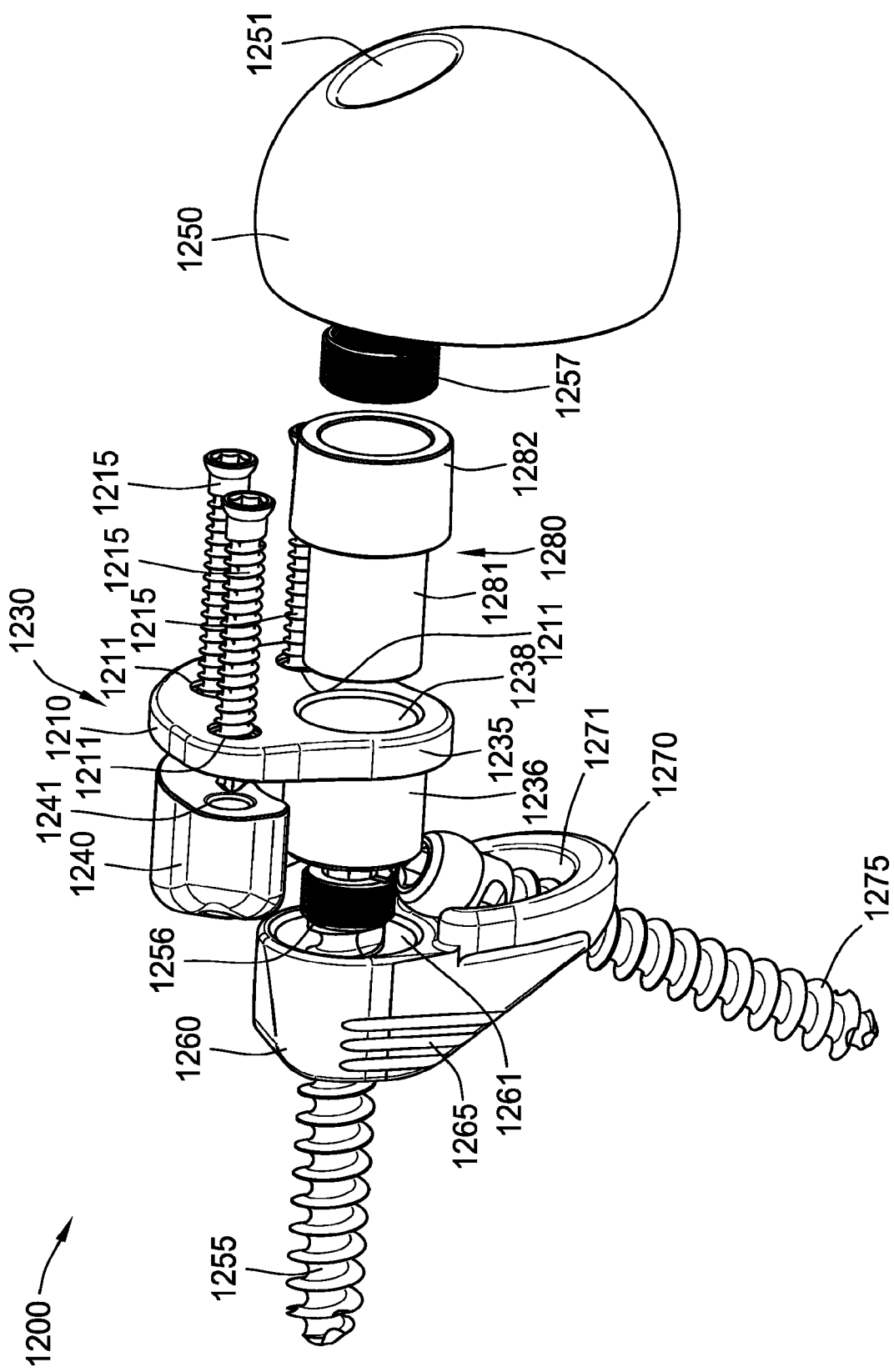
FIG. 61 is a front isometric exploded view of a glenoid implant in a fourteenth configuration according to some implementations of the present disclosure.
Figure 62:
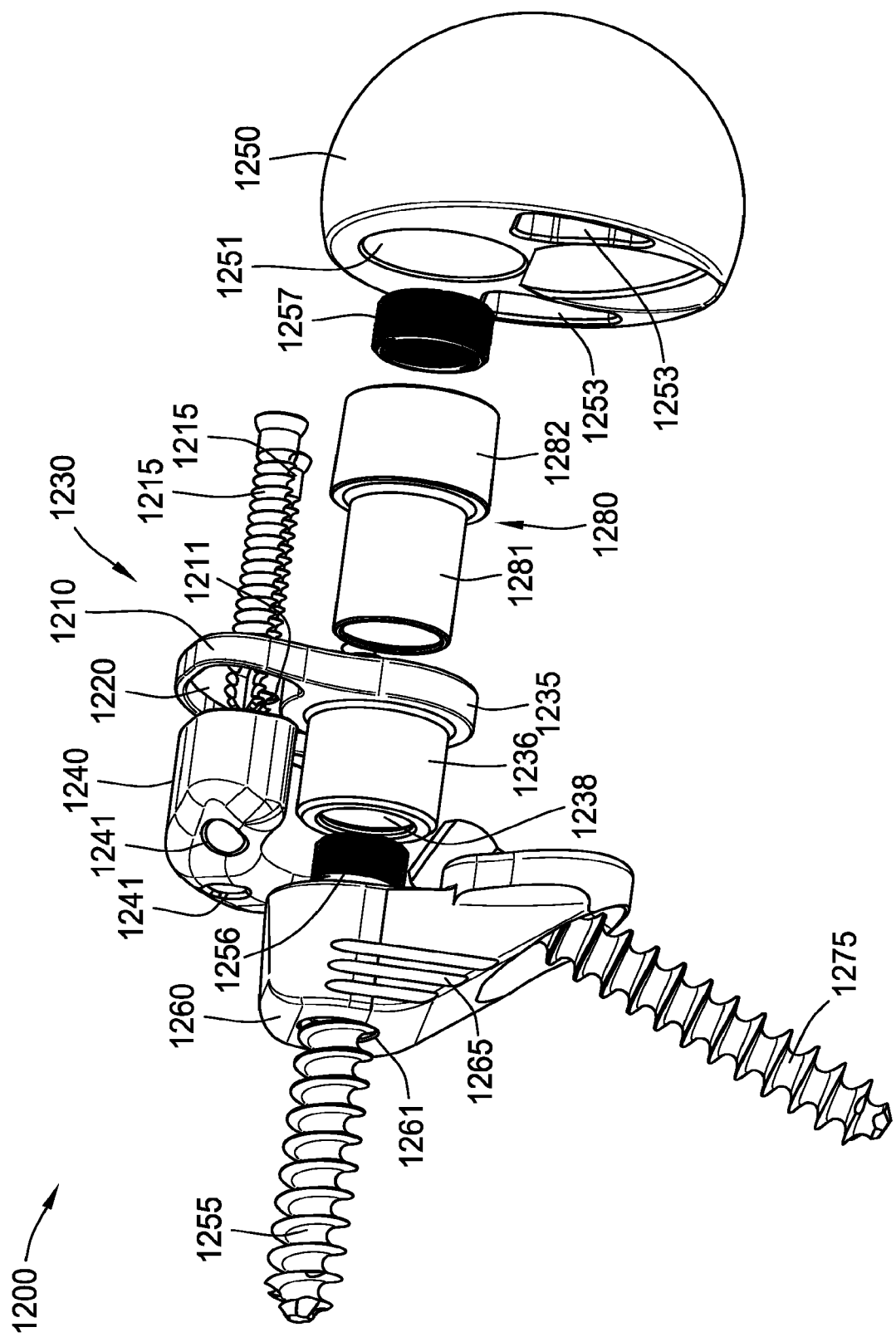
FIG. 62 is a rear isometric view of the glenoid implant of FIG. 61.

Referring generally to FIGS. 61-62, a glenoid implant 1200 is illustrated. FIG. 61 is a front isometric or perspective exploded view of the glenoid implant 1200, whereas FIG. 62 is a rear isometric of perspective exploded view of the glenoid implant 1200. The glenoid implant 1200 includes a base element 1260, a coupling element 1230, and an augment 1240, which are the same as, or similar to, the base element 960, the coupling element 930, and the augment 940 of the glenoid implant 900.

The base element 1260 has a central aperture 1261 and an adjustable third leg 1270, which includes a second aperture

1271. The adjustable third leg 1270 is adjustable relative to the coupling element 1230 in that the adjustable third leg 1270 can be rotated relative to the coupling element 1230. The base element 1260 includes a keel element 1265 extending or protruding from a rear of the base element 1260. The keel element 1265 is configured to aid in securing the base element 1260 to a first portion of a scapula of a patient/user. The second aperture 1271 of the base element 1260 is configured to receive a portion of a first fastening element 1275 therethrough to aid in securing the base element 1260 to the first portion of the scapula. In some implementations, the first portion of the scapula 50 is a glenoid cavity. The coupling element 1230 includes a first elongated portion 1210 and a second portion 1235. The first elongated portion 1210 includes a receiving space 1220 (FIG. 62), and apertures 1211 therethrough. Furthermore, the second portion 1235 includes a central aperture 1238 that is aligned with the central aperture 1261 of the base element 1260 when the base element 1260 is coupled to the coupling element 1230.

The augment 1240 is sized and configured to be at least partially received within the receiving space 1220 of the first elongated portion 1210 of the coupling element 1230. The augment 1240 includes apertures 1241 therethrough. Each aperture 1211 of the coupling element 1230 is aligned with each aperture 1241 of the augment 1240 to receive a portion of a respective second fastening element 1215 therethrough. The second fastening elements 1215 can aid in securing the coupling element 1230 and/or the augment 1240 to a second portion of the scapula 50 of the patient/user.

The second portion 1235 of the coupling element 1230 includes a trunnion 1236, but compared to the glenoid implant 900, the glenoid implant 1200, does not include a first trunnion opposite the trunnion 1236 extending from the coupling element 1230 towards the glenosphere 1250. The trunnion 1236 can be configured to be received within the central aperture 1261 (FIG. 61) of the base element 1260. As a result, the coupling element 1230 and the augment 1240, once coupled, are configured to rotate relative to the base element 1260 and/or relative to an axis of the base element 1260 (e.g., a central axis of the central aperture 1261). While three second fastening elements 1215 are illustrated herein, it should be understood that not all the second fastening elements 1215 need be included if, for example, the coupling element 1260 and the augment 1240 are rotated to one side. The glenoid implant 1200 can be implemented in cases of severe bone loss. The base element 1260 can be configured as an inlay component, meaning, the keel element 1265 can be shaped to account for a cavity defect or missing bone.

Instead of the coupling element 1230 including a trunnion like the first trunnion 937 of the glenoid implant 900, the glenoid implant 1200 includes a double trunnion element 1280, which include a first end 1281 and a second end 1282. A central fastening element 1255 can be received through an opening 1251 in the glenosphere 1250 and positioned generally through the double trunnion element 1280 such that at least a portion of a head 1256 of the central fastening element 1255 is within the double trunnion element 1280. A threaded element 1257 can also be received through the opening 1251 of the glenosphere 1250 and generally positioned in the second end 1282 of the double trunnion element 1280. The threaded element 1257 is configured to aid in locking the double trunnion element 1280 to the coupling element 1230 and aid in preventing the central fastening element 1255 from backing out (e.g., backing out of the double trunnion element 1280 and/or the glenosphere 1250). The threaded element 1257 screws onto the head 1256 of the central fastening element 1255 and or to threads inside the second end 1282 of the double trunnion element 1280.

The glenosphere 1250 can include receiving elements 1253. The receiving elements 1253 are configured to receive augments (not shown, but could be the same as, or similar to, augments 804). The augments in the bottom of the glenosphere 1250 can be attached with a screw. Alternatively, the augments can be tapered and hammered into the glenosphere 1250 (e.g., a press fit or a Morse tapered fit, or the like).

Figure 63:
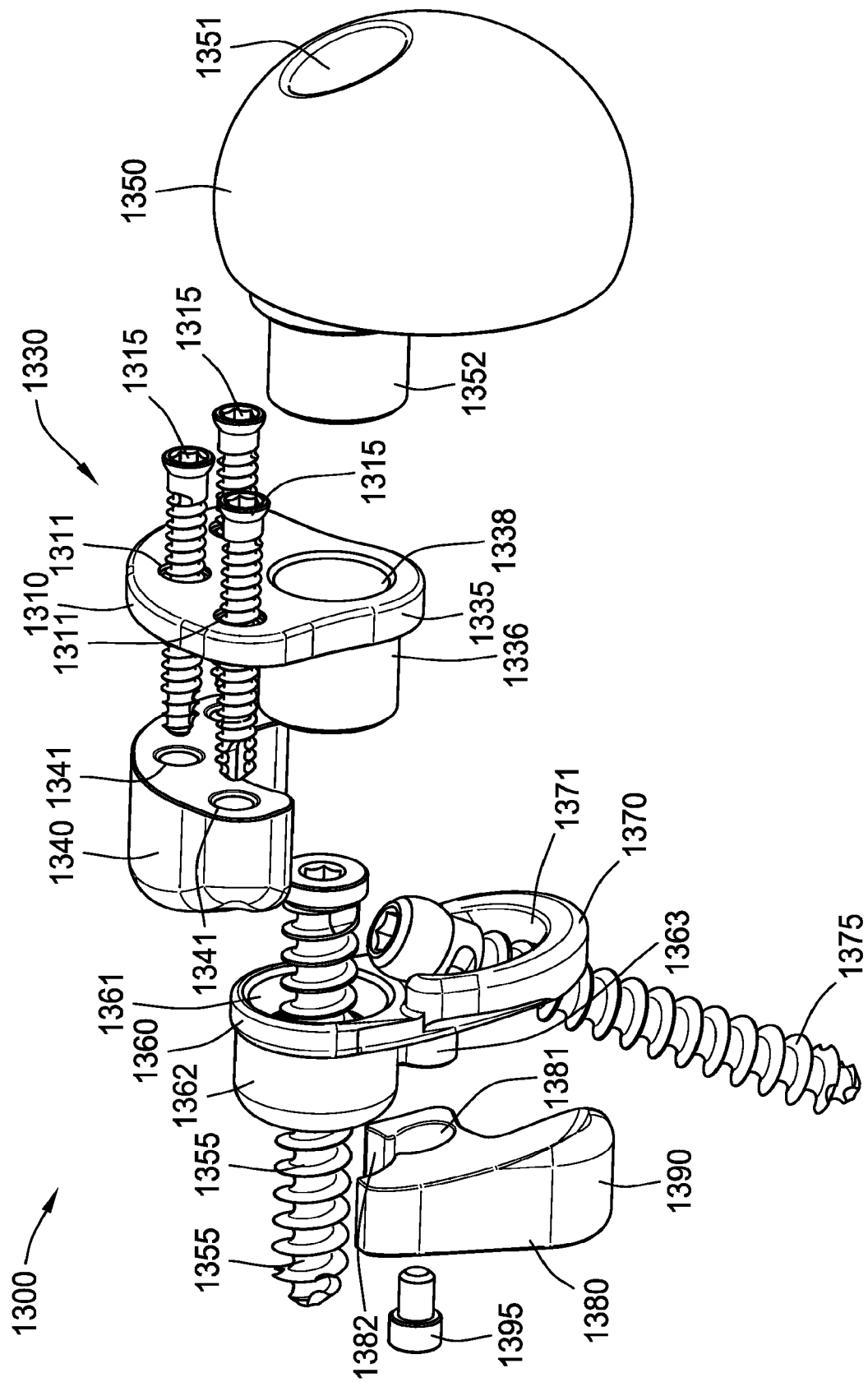
FIG. 63 is a front isometric exploded view of a glenoid implant in a fifteenth configuration according to some implementations of the present disclosure.
Figure 64:
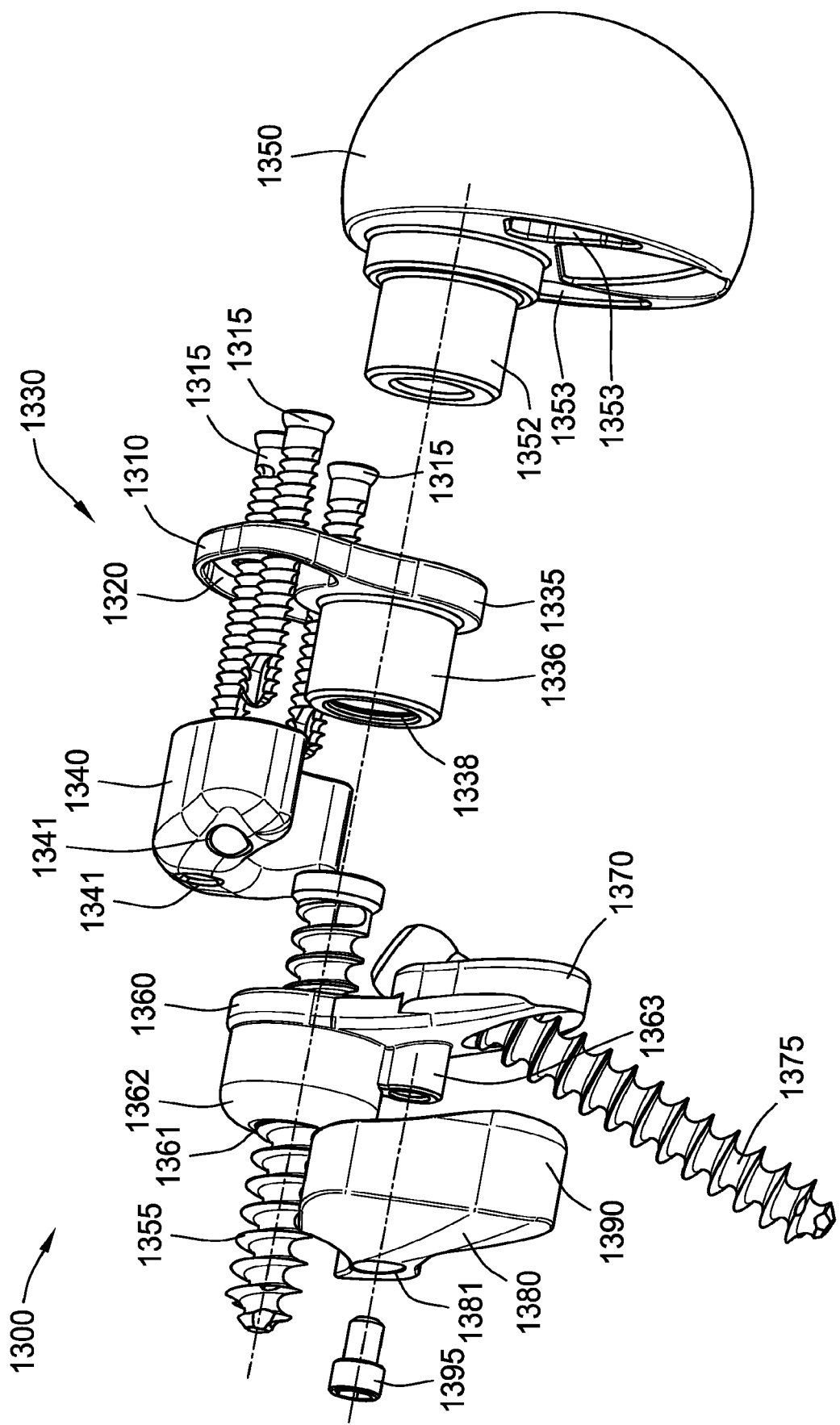
FIG. 64 is a rear isometric view of the glenoid implant of FIG. 63.

Referring generally to FIGS. 63-64, a glenoid implant 1300 is illustrated. FIG. 63 is a front isometric or perspective exploded view of the glenoid implant 1300, whereas FIG. 64 is a rear isometric of perspective exploded view of the glenoid implant 1300. The glenoid implant 1300 includes a base element 1360, a coupling element 1330, an augment 1340, and a glenosphere 1350, which are the same as, or similar to, the base element 1160, the coupling element 1230, the augment 1240, and the glenosphere 1250.

The base element 1360 has a central aperture 1361 and an adjustable third leg 1370, which includes a second aperture 1371. The adjustable third leg 1370 is adjustable relative to the coupling element 1330 in that the adjustable third leg 1370 can be rotated relative to the coupling element 1330. The base element 1360 includes a rear trunnion 1362 extending or protruding from a rear of the base element 1360. The rear trunnion 1362 is configured to abut a removable wedge augment 1380.

The base element 1360 includes a receiving element or an attachment portion 1363 that is positioned adjacent to the rear trunnion 1362. The removable wedge augment 1380 includes one or more abutting surfaces 1382 that are configured to abut one or more corresponding portions of the rear trunnion 1362 when the removable wedge augment 1380 is coupled to the base element 1360. As shown, the one or more abutting surfaces 1382 are generally curved in a manner to match and/or mate with the curved and/or cylindrical outer surface of the rear trunnion 1362. Alternatively, the one or more abutting surfaces 1382 can have any shape and/or curvature or be flat and/or angled relative to a central axis of a central aperture 1381.

The removable wedge augment 1380 includes the central aperture or slot or slit 1381 that is configured to receive a fastening element 1395 (e.g., a threaded fastening element, such as, for example, a screw or bolt, or the like) therethrough. That is, in some implementations, the central aperture 1381 is opened on one side or end so as to not be a through bore style aperture. The fastening element 1395, when positioned at least partially through the central aperture 1381, can engage (e.g., in a threaded manner) the attachment portion 1363 to hold the removable wedge augment 1380 onto and in engagement with the base element 1360.

The removable wedge augment 1380 also includes a wedge portion 1390 that can have any size and/or shape so as to modify the overall shape and size of the base element 1360 when the removable wedge augment 1380 is coupled thereto. As such, the removable wedge augment 1380 can be coupled to the base element 1360 to provide the base element 1360 with a unique geometric shape configured to be inserted into a cavity defect of a scapula. Various shapes and sizes of the removable wedge augment 1380 can be provided, for example, in a kit, to provide various combinations for the overall shape and size of the glenoid implant 1300.

The second aperture 1371 of the base element 1360 is configured to receive a portion of a first fastening element 1375 therethrough to aid in securing the base element 1360 to the first portion of the scapula. In some implementations, the first portion of the scapula 50 is a glenoid cavity. The coupling element 1330 includes a first elongated portion 1310 and a second portion 1335. The first elongated portion 1310 includes a receiving space 1320 (FIG. 64), and apertures 1311 therethrough. Furthermore, the second portion 1335 includes a central aperture 1338 that is aligned with the central aperture 1361 of the base element 1360 when the base element 1360 is coupled to the coupling element 1330.

The augment 1340 is sized and configured to be at least partially received within the receiving space 1320 of the first elongated portion 1310 of the coupling element 1330. The augment 1340 includes apertures 1341 therethrough. Each aperture 1311 of the coupling element 1330 is aligned with each aperture 1341 of the augment 1340 to receive a portion of a respective second fastening element 1315 therethrough. The second fastening elements 1315 can aid in securing the coupling element 1330 and/or the augment 1340 to a second portion of the scapula 50 of the patient/user.

The second portion 1335 of the coupling element 1330 includes a trunnion 1336, but compared to the glenoid implant 900, the glenoid implant 1300, does not include a first trunnion opposite the trunnion 1336 extending from the coupling element 1330 towards the glenosphere 1350. The trunnion 1336 can be configured to be received within the central aperture 1361 (FIG. 63) of the base element 1360. As a result, the coupling element 1330 and the augment 1340, once coupled, are configured to rotate relative to the base element 1360 and/or relative to an axis of the base element 1360 (e.g., a central axis of the central aperture 1261). While three second fastening elements 1315 are illustrated herein, it should be understood that not all the second fastening elements 1315 need be included if, for example, the coupling element 1360 and the augment 1340 are rotated to one side. The glenoid implant 1300 can be implemented in cases of severe bone loss. The base element 1360 can be configured as an inlay component, meaning, the removable wedge augment 1380 can be shaped to account for a cavity defect or missing bone.

Instead of the coupling element 1330 including a trunnion like the first trunnion 937 of the glenoid implant 900, the glenosphere 1350 includes a trunnion element 1352 that engages with the central aperture 1338 of the second portion 1335 of the coupling element 1330.

A central fastening element 1355 can be received through an opening 1351 in the glenosphere 1350 and positioned generally through the trunnion element 1352 such that at least a portion of a head of the central fastening element 1355 is within the trunnion 1336 and/or the central aperture 1361 of the base element 1360.

The glenosphere 1350 can include receiving elements 1353. The receiving elements 1353 are configured to receive augments (not shown, but could be the same as, or similar to, augments 804). The augments in the bottom of the glenosphere 1350 can be attached with a screw. Alternatively, the augments can be tapered and hammered into the glenosphere 1350 (e.g., a press fit or a Morse tapered fit, or the like).

Figure 65:
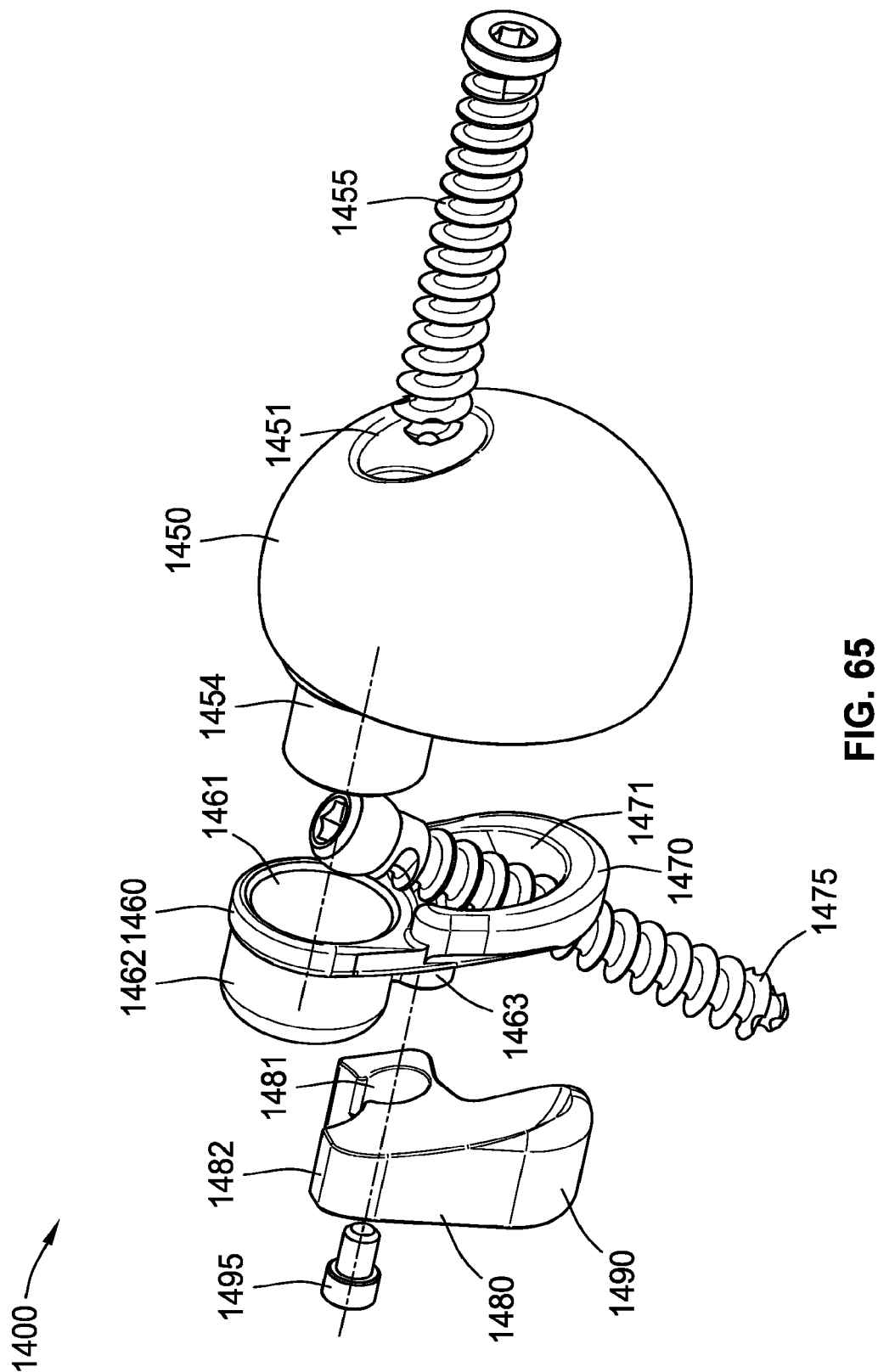
FIG. 65 is a front isometric exploded view of a glenoid implant in a sixteenth configuration according to some implementations of the present disclosure.
Figure 66:
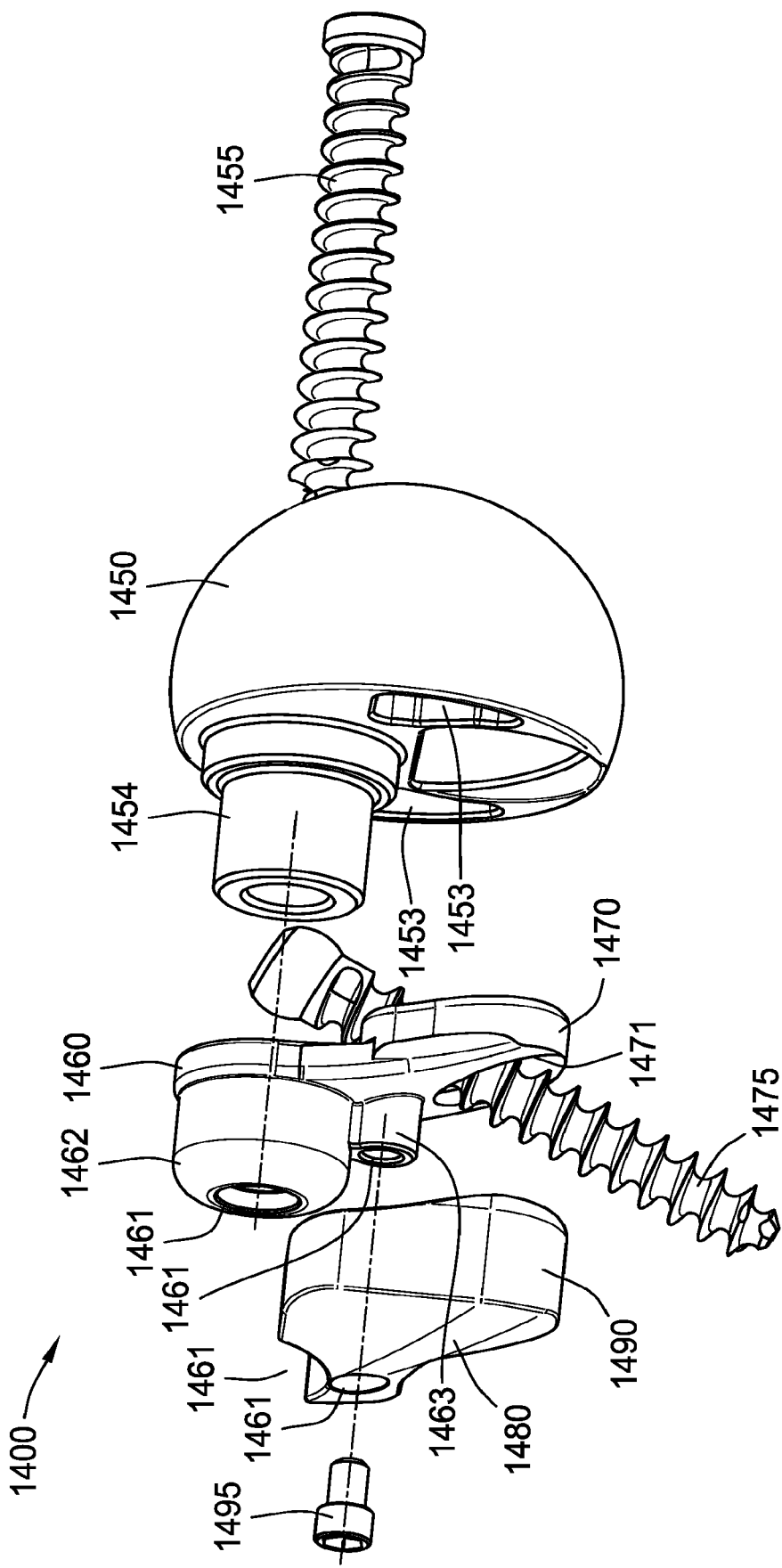
FIG. 66 is a rear isometric view of the glenoid implant of FIG. 65.

Referring generally to FIGS. 65-66, a glenoid implant 1400 is illustrated. FIG. 65 is a front isometric or perspective exploded view of the glenoid implant 1400, whereas FIG. 66 is a rear isometric of perspective exploded view of the glenoid implant 1400. The glenoid implant 1400 includes a base element 1460, a removable wedge augment 1480, and a glenosphere 1450, which are the same as, or similar to, the base element 1360, the removable wedge augment 1380, and the glenosphere 1350 of the glenoid implant 1300.

The base element 1460 has a central aperture 1461 and an adjustable leg 1470, which includes a second aperture 1471. The adjustable leg 1470 is adjustable relative to the glenosphere 1450 in that the adjustable leg 1470 can be rotated relative to the trunnion 1454. The base element 1460 includes a rear trunnion 1462 extending or protruding from a rear of the base element 1460. The rear trunnion 1462 is configured to abut the removable wedge augment 1480.

The glenoid implant 1400 differs from the glenoid implant 1300 in that the glenoid implant 1400 does not include a coupling element (e.g., coupling element 1330), nor does the glenoid implant 1400 include an augment (e.g., augment 1340). These elements are eliminated from the glenoid implant 1400 at least in part because the glenosphere 1450 is directly coupled with the base element 1460. Specifically, a trunnion 1454 of the glenosphere 1450 is coupled to the central aperture 1461 of the rear trunnion 1462 of the base element 1460.

Like the removable wedge augment 1380, the removable wedge augment 1480 includes a central aperture or slot or slit 1481, one or more abutting surfaces 1482, a wedge portion 1490, and a fastening element 1495 that are the same as, or similar to, the central aperture or slot or slit 1381, the one or more abutting surfaces 1382, the wedge portion 1390, and the fastening element 1395 of the removable wedge augment 1380. Further, the base element 1460 includes an attachment portion 1463 that can receive a portion of the fastening element 1495 to aid in holding the removable wedge augment 1480 in engagement with the base element 1460.

The glenoid implant 1400 also includes a first fastening element 1475 and a central fastening element 1455 that are the same as, or similar to, the first fastening element 1375 and the central fastening element 1355 of the glenoid implant 1300. The central fastening element 1455 can be received through an opening 1451 in the glenosphere 1450 and positioned generally through the rear trunnion 1462 such that at least a portion of a head of the central fastening element 1455 is within the trunnion 1454 and/or the central aperture 1461 of the base element 1460.

The glenosphere 1450 can include receiving elements 1453. The receiving elements 1453 are configured to receive augments (not shown, but could be the same as, or similar to, augments 804). The augments in the bottom of the glenosphere 1450 can be attached with a screw. Alternatively, the augments can be tapered and hammered into the glenosphere 1450 (e.g., a press fit or a Morse tapered fit, or the like).

Figure 67:
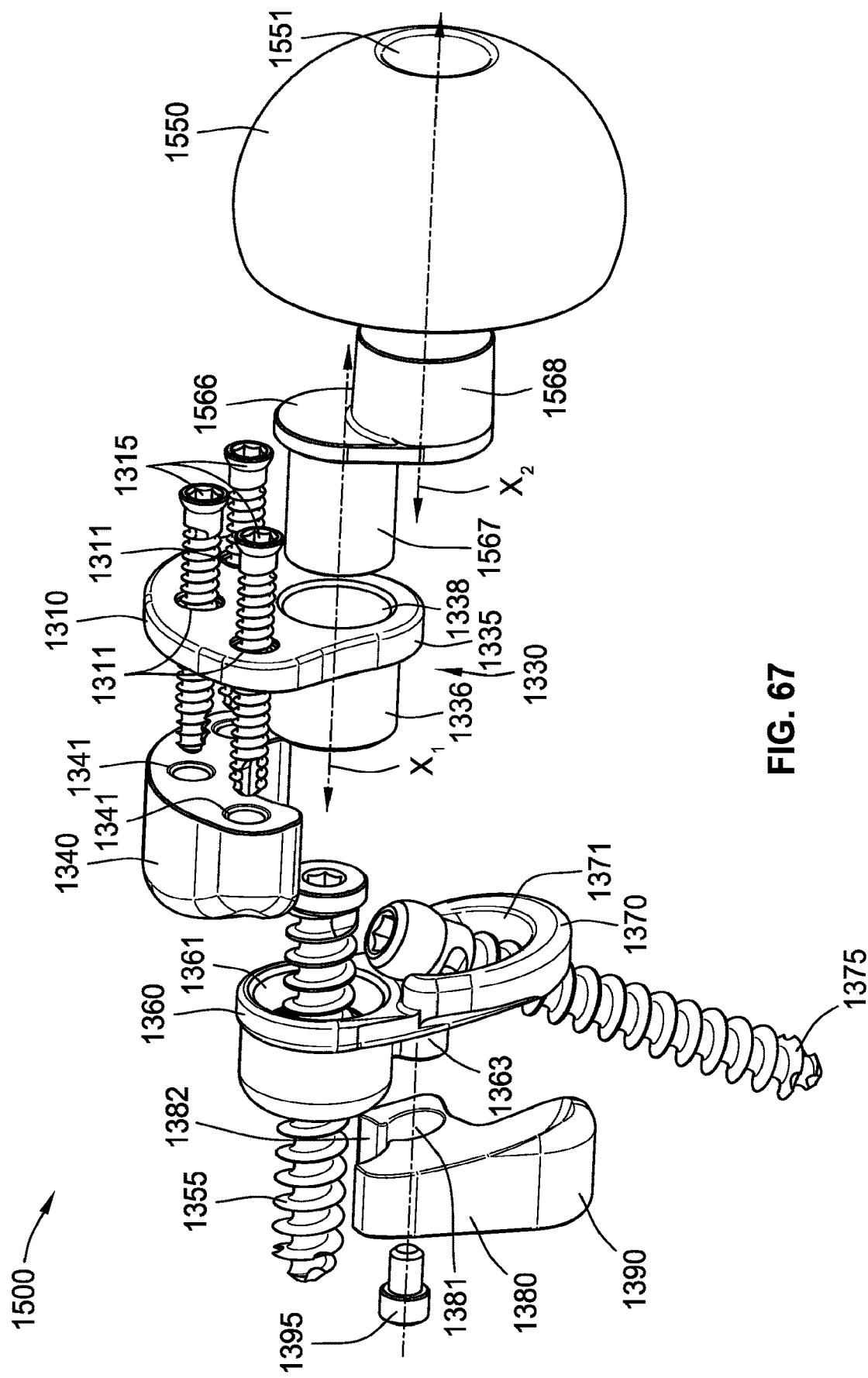
FIG. 67 is a front isometric exploded view of a glenoid implant in a seventeenth configuration according to some implementations of the present disclosure.
Figure 68:
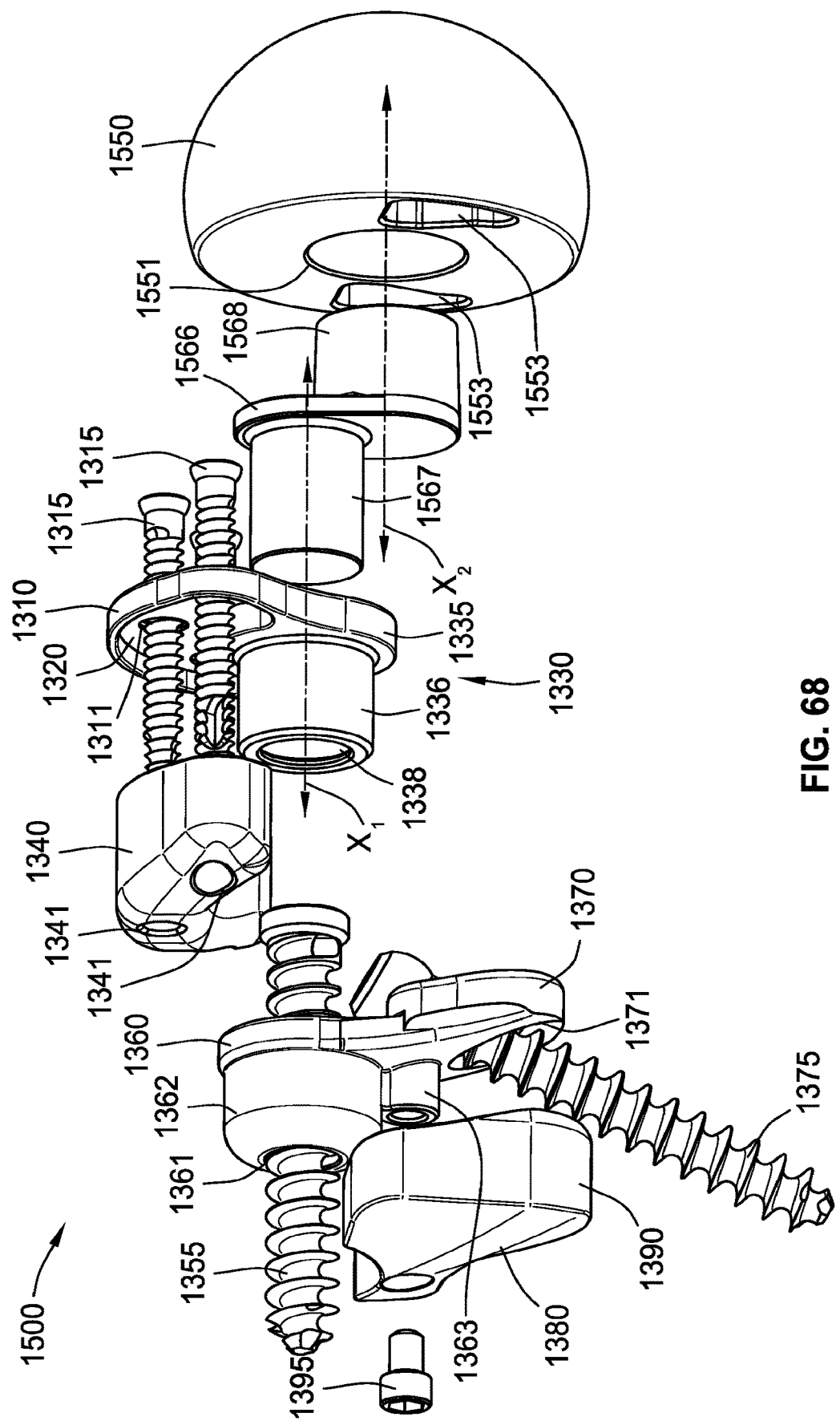
FIG. 68 is a rear isometric view of the glenoid implant of FIG. 67.

Referring generally to FIGS. 67-68, a glenoid implant 1500 is illustrated, which is the same as, or similar to, the glenoid implant 1300 except for the trunnion element 1352 of the glenosphere 1350 is replaced with central aperture 1551 of a glenosphere 1550, and an offset element 1566 is included. As such, like references are used for like elements and the disclosure for such like elements is not repeated for the glenoid implant 1500.

FIG. 67 is a front isometric or perspective exploded view of the glenoid implant 1500, whereas FIG. 68 is a rear isometric of perspective exploded view of the glenoid implant 1500. The glenoid implant 1500 includes the base element 1360, the coupling element 1330, the augment 1340, and the removable wedge augment 1380, the glenosphere 1550, and the offset element 1566, where like references numbers from the glenoid implant 1300 are used for like components.

The glenosphere 1550 does not include a trunnion because the glenosphere 1550 is connected to the coupling element 1330 using the offset element 1566. The offset element 1566 includes a base with a first trunnion 1567 protruding from a first surface, and a second trunnion 1568 protruding from a second surface opposite the first surface. The first trunnion 1567 and the second trunnion 1568 have two distinct central axes that are offset from one another. The first trunnion 1567 is aligned with the central aperture 1338 of the coupling element 1330 and the central aperture 1361 of the base element 1360. The second trunnion 1568 is aligned with a central aperture 1551 of the glenosphere 1550. In this way, the glenosphere 1550 is coupled to the coupling element 1330 such that a central axis $x_1$ of the central aperture 1338 of the coupling element 1330 is not aligned with a central axis $x_2$ of the aperture 1551 within the glenosphere 1550.

The glenosphere 1550 can include receiving elements 1553. The receiving elements 1553 are configured to receive augments (not shown, but could be the same as, or similar to, augments 804). The augments in the bottom of the glenosphere 1550 can be attached with a screw. Alternatively, the augments can be tapered and hammered into the glenosphere 1550 (e.g., a press fit or a Morse tapered fit, or the like).

Figure 69:
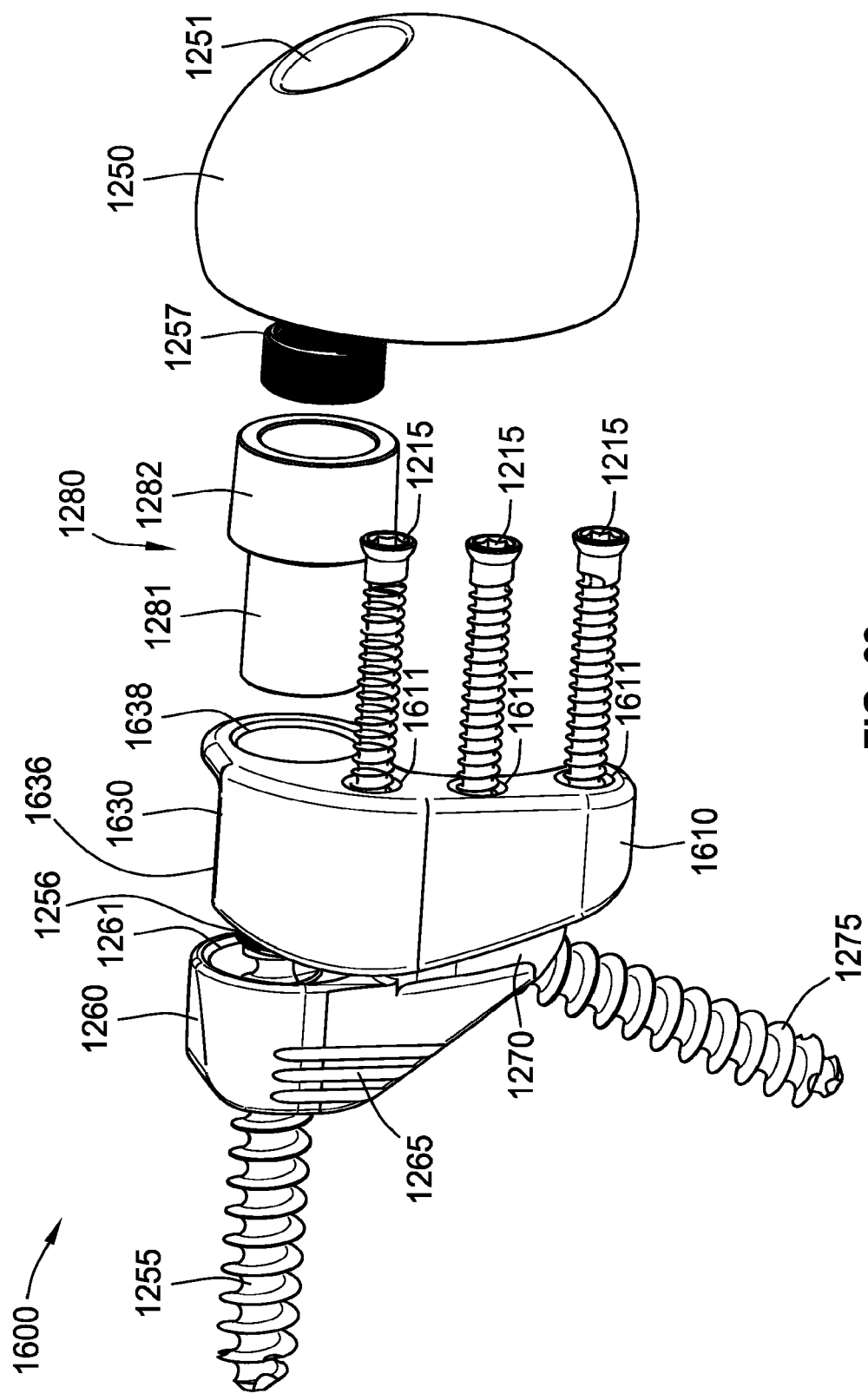
FIG. 69 is a front isometric exploded view of a glenoid implant in an eighteenth configuration according to some implementations of the present disclosure.
Figure 70:
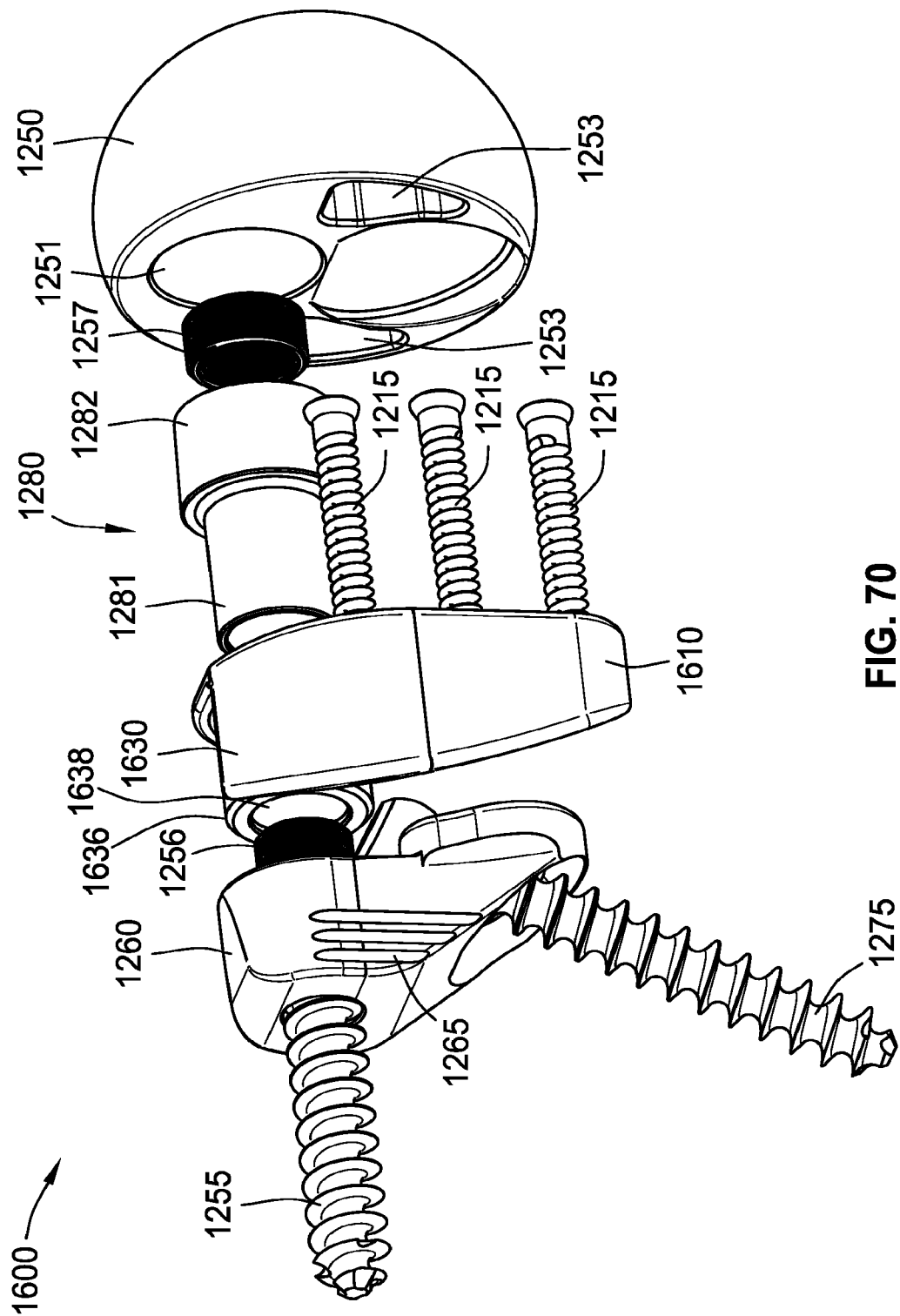
FIG. 70 is a rear isometric view of the glenoid implant of FIG. 69.

Referring generally to FIGS. 69-70, a glenoid implant 1600 is illustrated, which is the same as, or similar to, the glenoid implant 1200 except that the coupling element 1630 of the glenoid implant 1600 is different from the coupling element 1230 of the glenoid implant 1200. As such, like references are used for like elements and the disclosure for such like elements is not repeated for the glenoid implant 1600.

FIG. 69 is a front isometric or perspective exploded view of the glenoid implant 1600, whereas FIG. 70 is a rear isometric of perspective exploded view of the glenoid implant 1600. The glenoid implant 1600 includes the base element 1260, double trunnion element 1280, the glenosphere 1250, and the coupling element 1630, where like references numbers from the glenoid implant 1200 are used for like components.

The coupling element 1630 is generally position or biased to one side of the base element 1260. The coupling element 1630 includes a first elongated portion 1610 and a central aperture 1638. The elongated portion 1610 includes apertures 1611 therethrough, each configured to receive a portion of a second fastening element 1315. The coupling element 1630 also includes a trunnion 1636 configured to be inserted into the central aperture 1361 of the base element 1360.

Figure 71:
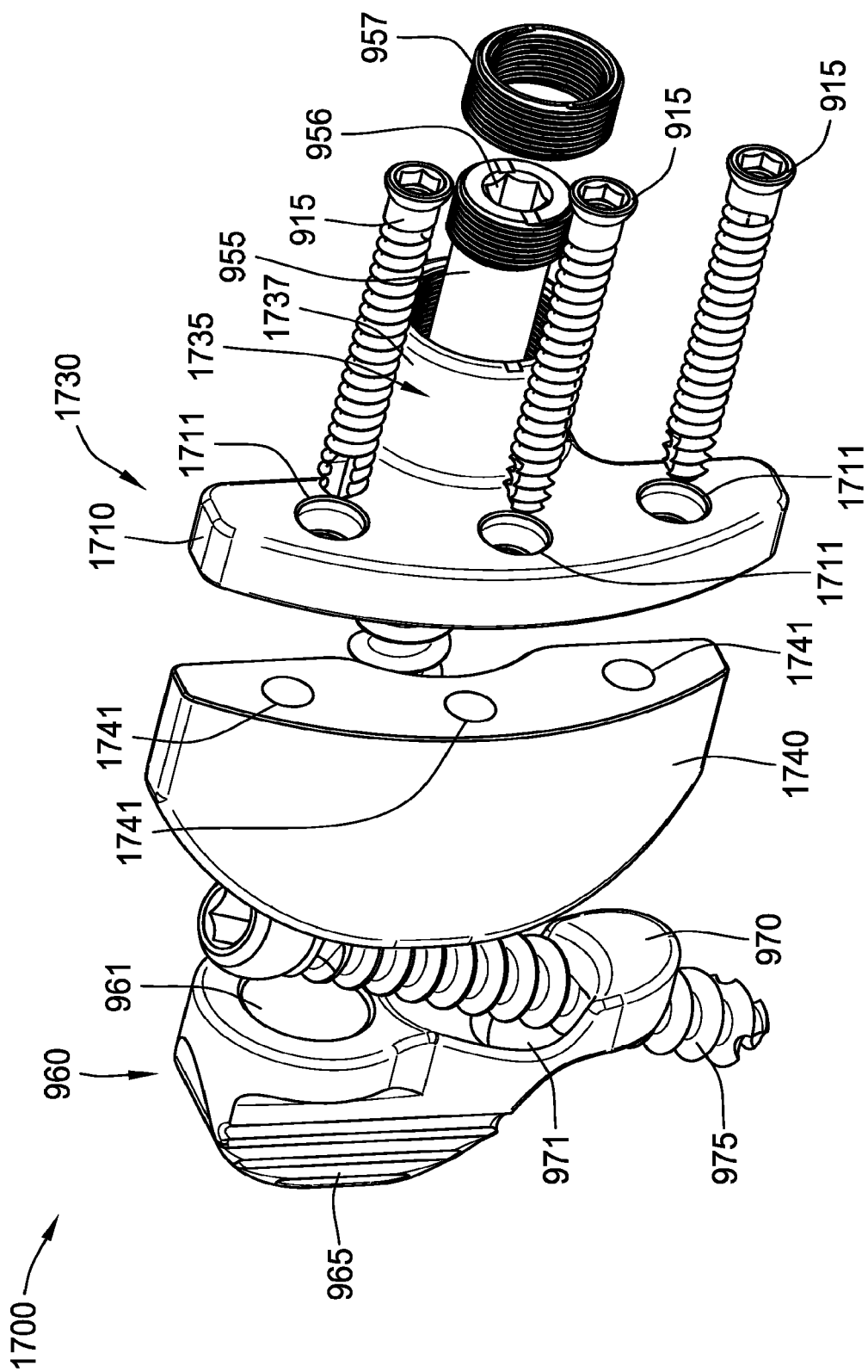
FIG. 71 is a front isometric exploded view of a glenoid implant in a nineteenth configuration according to some implementations of the present disclosure.
Figure 72:
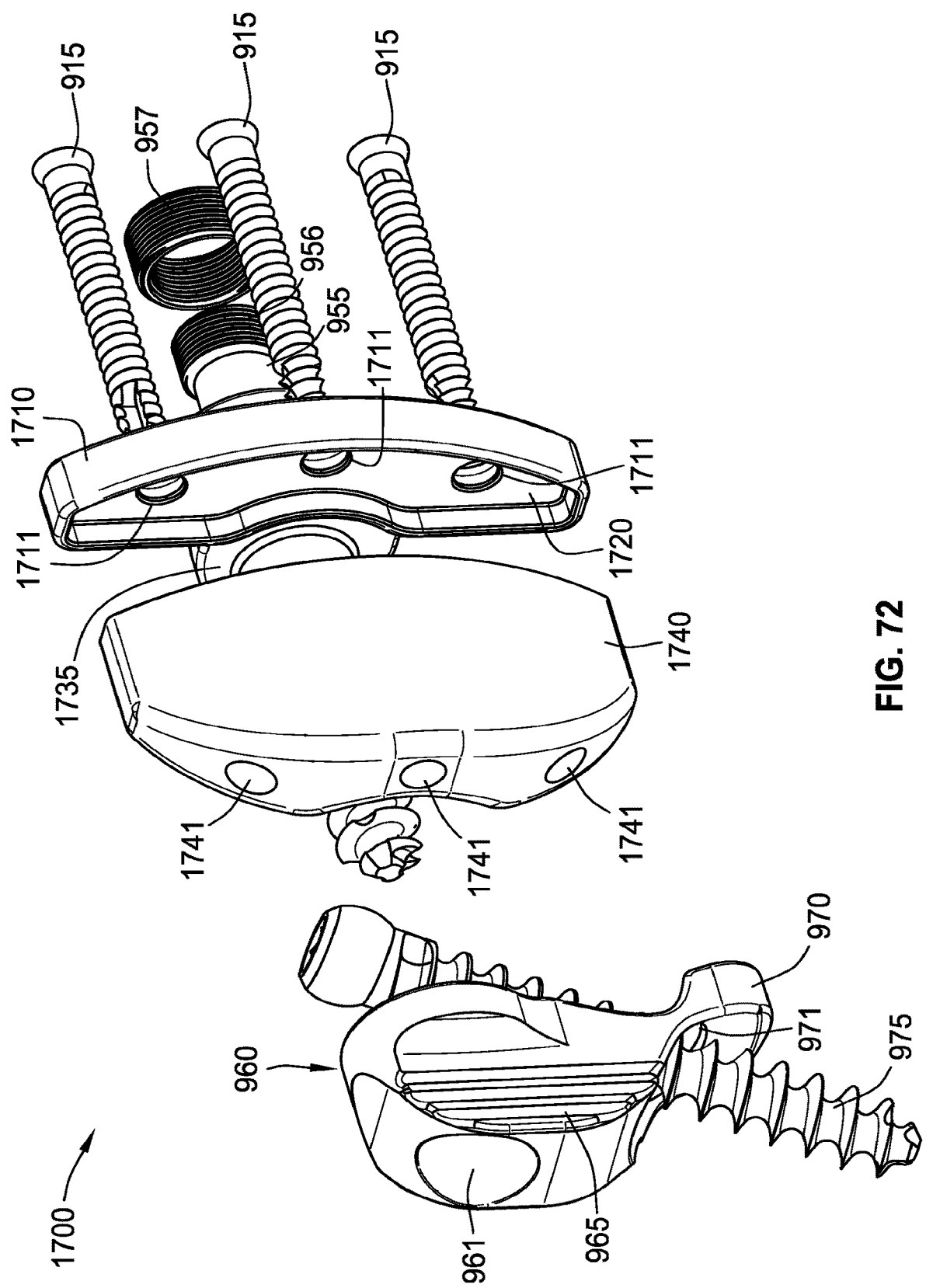
FIG. 72 is a rear isometric view of the glenoid implant of FIG. 71.

Referring generally to FIGS. 71-72, a glenoid implant 1700 is illustrated, which is the same as, or similar to, the glenoid implant 900 except that the coupling element 1730 of the glenoid implant 1700 is different from the coupling element 930 of the glenoid implant 900. As such, like references are used for like elements and the disclosure for such like elements is not repeated for the glenoid implant 1700.

FIG. 70 is a rear isometric or perspective exploded view of the glenoid implant 1700, whereas FIG. 71 is a front isometric of perspective exploded view of the glenoid implant 1700. The glenoid implant 1700 includes the base element 960, the first fastening element 975, the central fastening element 955, the threaded element 957, a coupling element 1630, and an augment 1740, where like reference numbers from the glenoid implant 900 are used for like components.

The coupling element 1730 and the augment 1740 are both generally positioned or biased to one side of the base element 960. The coupling element 1730 includes a first elongated portion 1710 and a second portion 1735. The elongated portion 1710 includes apertures 1711 therethrough, each configured to receive a portion of a second fastening element 915. The second portion 1735 of the coupling element 1730 includes and/or is a trunnion 1737 configured to be inserted into an aperture or cavity of a glenosphere (not shown). The elongated portion 1710 of the coupling element 1730 includes a receiving space 1720 configured to receive the augment 1740. The elongated portion 1710 has a relatively slimmer profile as compared to the elongated portion 1610 of the glenoid implant 1600. The augment 1740 includes apertures 1741 therethrough. Each aperture 1711 of the coupling element 1730 is aligned with each aperture 1741 of the augment 1740 to receive a portion of a respective second fastening element 915 therethrough.

Figure 73:
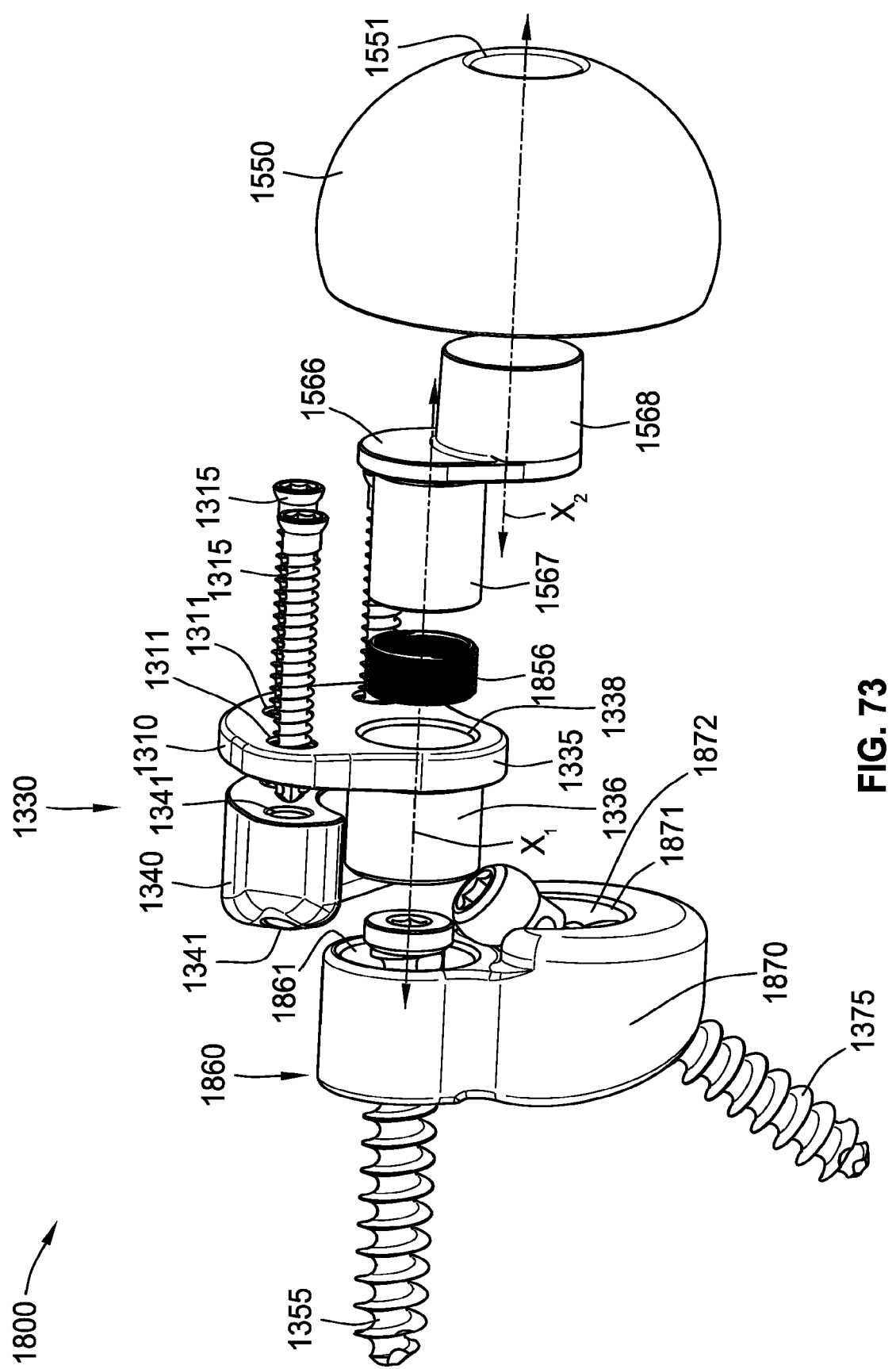
FIG. 73 is a front isometric exploded view of a glenoid implant in a twentieth configuration according to some implementations of the present disclosure.
Figure 74:
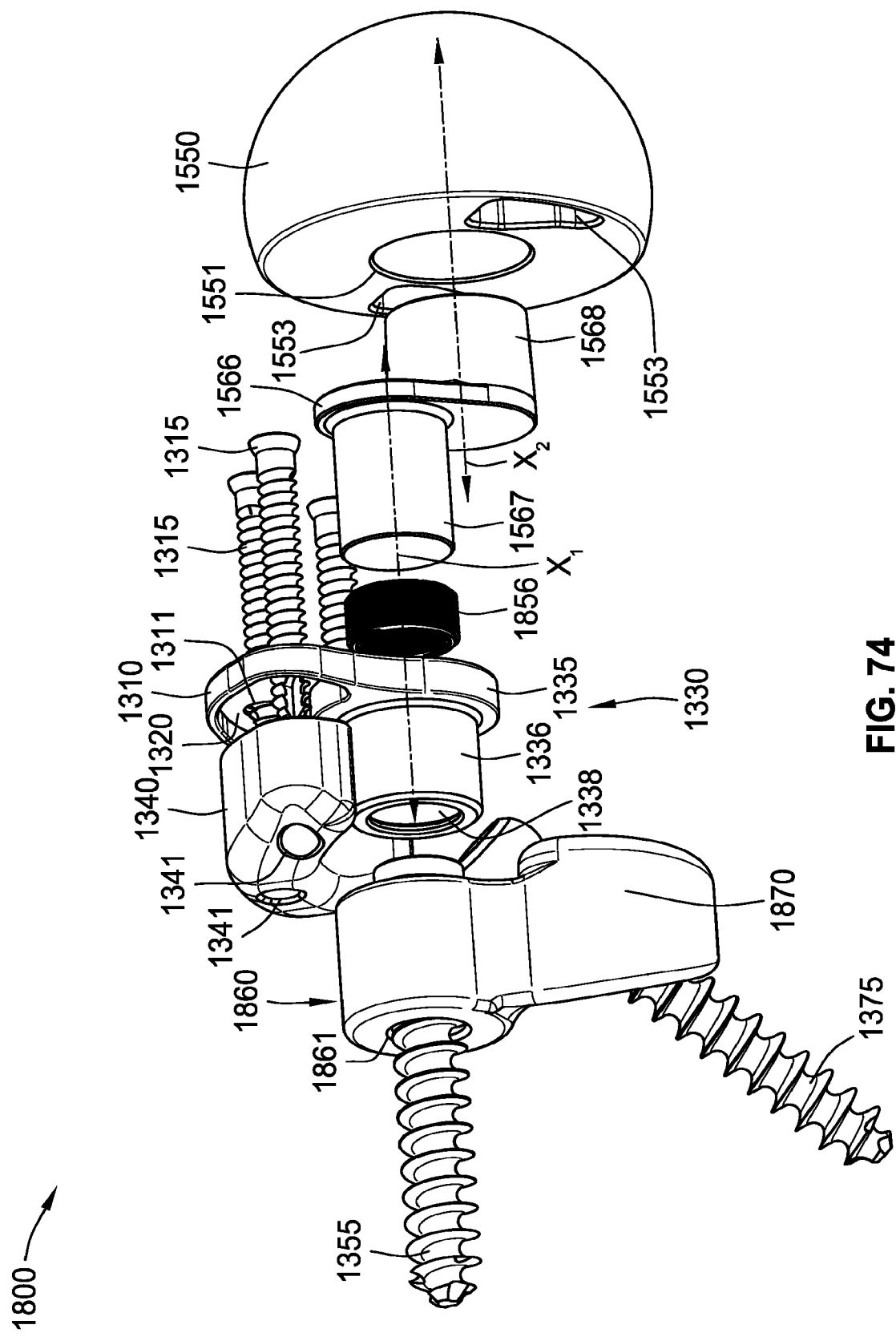
FIG. 74 is a rear isometric view of the glenoid implant of FIG. 73.

Referring generally to FIGS. 73-74, a glenoid implant 1800 is illustrated which is the same as, or similar to, the glenoid implant 1500 except for the base element 1360 is replaced with a base element 1860 and the removable wedge augment 1380 is not included in the glenoid implant 1800 and a threaded element 1856 is included. The threaded element 1856 is configured to engage threadingly with a corresponding threaded bore in the base element 1860. The threaded element 1856 aids in preventing the central fastening element 1355 from backing out (e.g., backing out into the first trunnion 1567 of the offset element 1566). As such, like references are used for like elements and the disclosure for such like elements is not repeated for the glenoid implant 1800. As shown, the threaded element 1856 is a cylindrical ring having an outer surface and an inner surface. The outer surface is threaded and the inner surface is threaded. In some implementations, the threaded outer surface is threaded in a first direction and the threaded inner surface is threaded in a second opposing direction. As such, the threaded element 1856 is able to be threaded onto a head of the central fastener element 1355 and into a threaded bore portion of the trunnion 1336. In some implementations, the threaded outer surface is threaded in a first direction and the threaded inner surface is threaded in first direction as well.

FIG. 73 is a front isometric or perspective exploded view of the glenoid implant 1800, whereas FIG. 74 is a rear isometric of perspective exploded view of the glenoid implant 1800. The glenoid implant 1800 includes the coupling element 1330, the augment 1340, the glenosphere 1550, the offset element 1566, and the base element 1860, where like references numbers from the glenoid implants 1300 and 1500 are used for like components.

The base element 1860 has a uni-body wedge shape. As best shown in FIG. 74, a left or first rear side 1870 of the base element 1860 is longer than an opposing right or second rear side 1872 of the base element 1860, to create a unique profile for a certain cavity defects. Put another way, a first portion of the base element 1860 surrounds a central aperture 1861 and a second portion of the base element 1860 surrounds a second aperture 1871. The second portion of the base element 1860 can be divided into two opposing sides, namely, the first or left side 1870 and the second or right side 1872 referenced above. As shown, the thickness or width of the first or left side 1870 is greater than the thickness or width of the second or right side 1872, which provides a shape of the base element with a generally wedge shape (e.g., from left to right, where the wedge thickness goes from relatively thick to relatively thinner).

Figure 75:
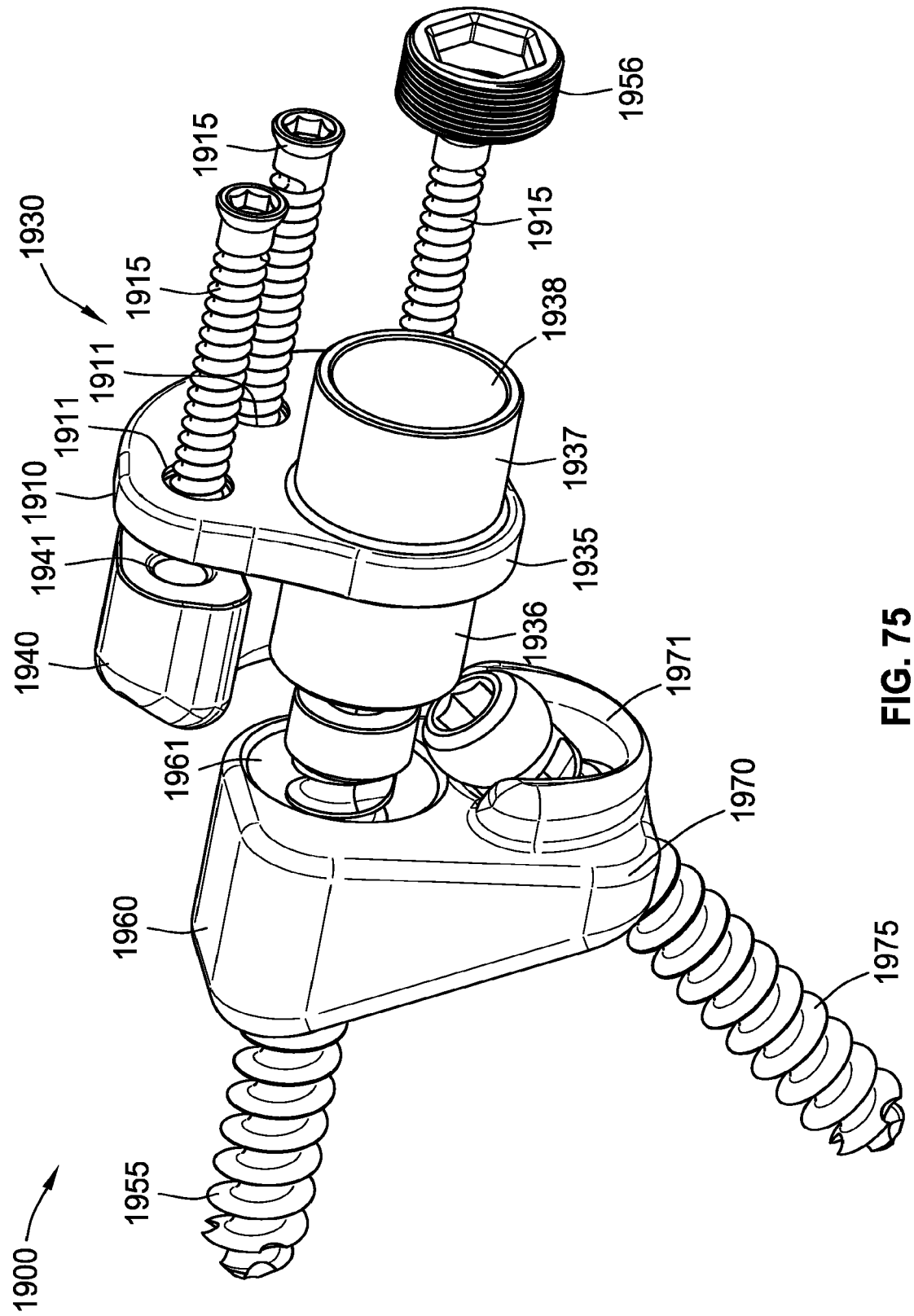
FIG. 75 is a front isometric exploded view of a glenoid implant in a twenty-first configuration according to some implementations of the present disclosure.
Figure 76:
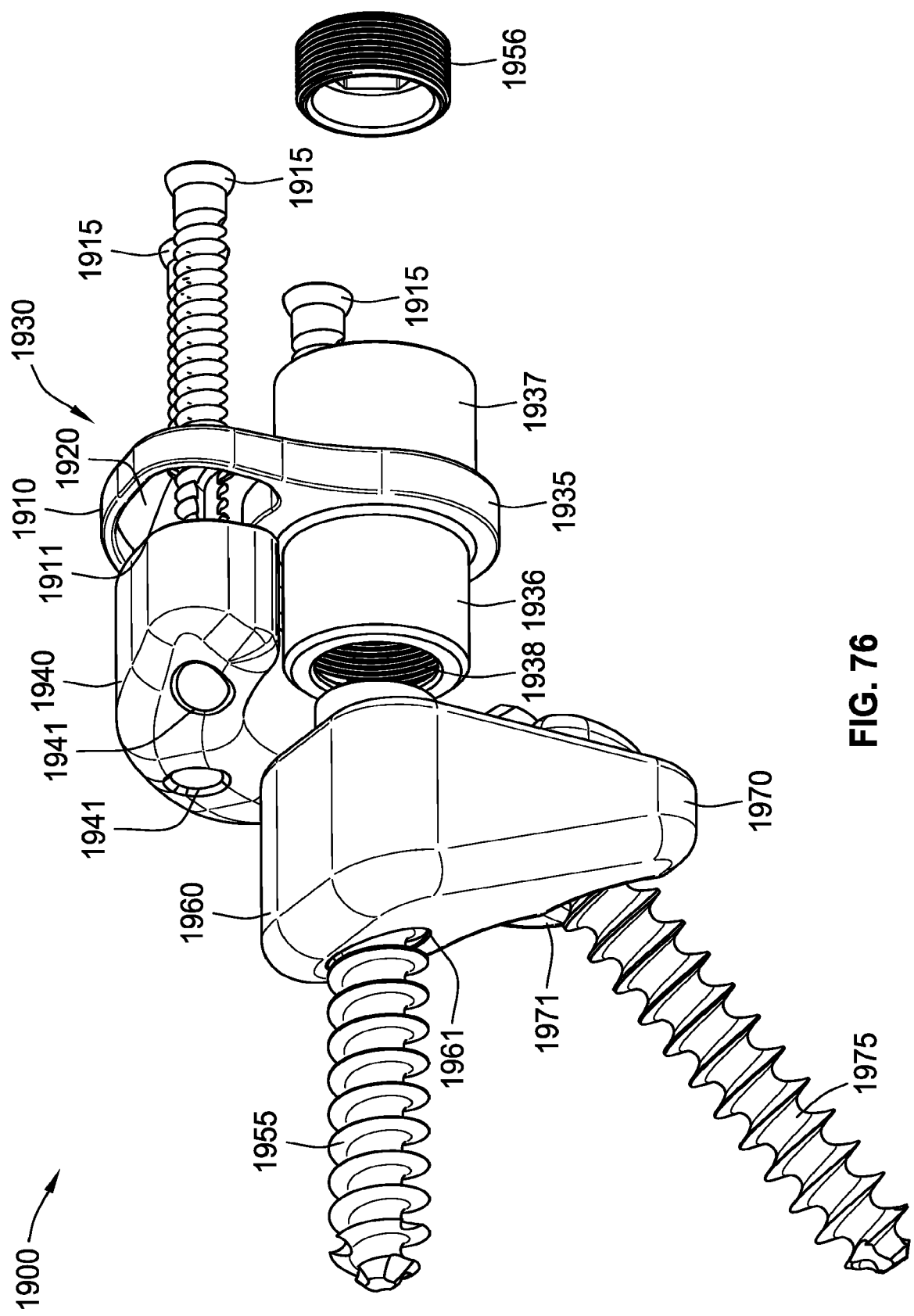
FIG. 76 is a rear isometric view of the glenoid implant of FIG. 75.

Referring generally to FIGS. 75-76, a glenoid implant 1900 is illustrated. FIG. 75 is a front isometric or perspective exploded view of the glenoid implant 1900, whereas FIG. 76 is a rear isometric or perspective exploded view of the glenoid implant 1900. The glenoid implant 1900 includes a base element 1960, a coupling element 1930, and an augment 1940. The base element 1960 has a central aperture 1961 and an adjustable third leg 1970, which includes a second aperture 1971. The adjustable third leg 1970 is adjustable relative to the coupling element 1930 in that the adjustable third leg 1970 can be rotated relative to the coupling element 1930. The base element 1960 is similar to the base element 960, except that the overall shape of the base element 1960 is a wedge shape as opposed to including a keel element, like the keel element 965 (FIG. 55). The second aperture 1971 of the base element 1960 is configured to receive a portion of a first fastening element 1975 therethrough to aid in securing the base element 1960 to the first portion of the scapula. In some implementations, the first portion of the scapula is a glenoid cavity. The coupling element 1930 includes a first elongated portion 1910 and a second portion 1935. The first elongated portion 1910 includes a receiving space 1920 (FIG. 76), and apertures 1911 therethrough. Furthermore, the second portion 1935 includes a central aperture 1938 that is aligned with the central aperture 1961 of the base element 1960 when the base element 1960 is coupled to the coupling element 1930.

The augment 1940 is sized and configured to be at least partially received within the receiving space 1920 of the first elongated portion 1910 of the coupling element 1930. The augment 1940 includes apertures 1941 therethrough. Each aperture 1911 of the coupling element 1930 is aligned with each aperture 1941 of the augment 1940 to receive a portion of a respective second fastening element 1915 therethrough. The second fastening elements 1915 can aid in securing the coupling element 1930 and/or the augment 1940 to a second portion of the scapula 50 of the patient/user.

The second portion 1935 of the coupling element 1930 can include a first trunnion 1937 and a second trunnion 1936 opposite the first trunnion 1937. The first trunnion 1937 is configured to receive or be received in a glenosphere (not shown). The second trunnion 1936 can be configured to be received within the central aperture 1961 (FIG. 75) of the base element 1960. As a result, the coupling element 1960 and the augment 1940, once coupled, are configured to rotate relative to the base element 1960 and/or relative to an axis of the base element 1960 (e.g., a central axis of the central aperture 1961). While three second fastening elements 1915 are illustrated herein, it should be understood that not all the second fastening elements 1915 need be included if, for example, the coupling element 1960 and the augment 1940 are rotated to one side. The glenoid implant 1900 can be implemented in cases of severe bone loss.

The glenoid implant 1900 can also include a central fastening element 1955 configured to be at least partially positioned through the central aperture 1961 of the base element 1960 and the central aperture 1938 of the coupling element 1930. The central fastening element 1955 is similar in variations with the central fastening element 1855 of the glenoid implant 800.

A head of the central fastening element 1955 can be the same as or similar to the head 856 described above. Similarly, the glenoid implant 1900 can include a threaded element 1956 that is the same as, or similar to, the threaded element 857 (or other threaded elements) described above.

Figure 77:
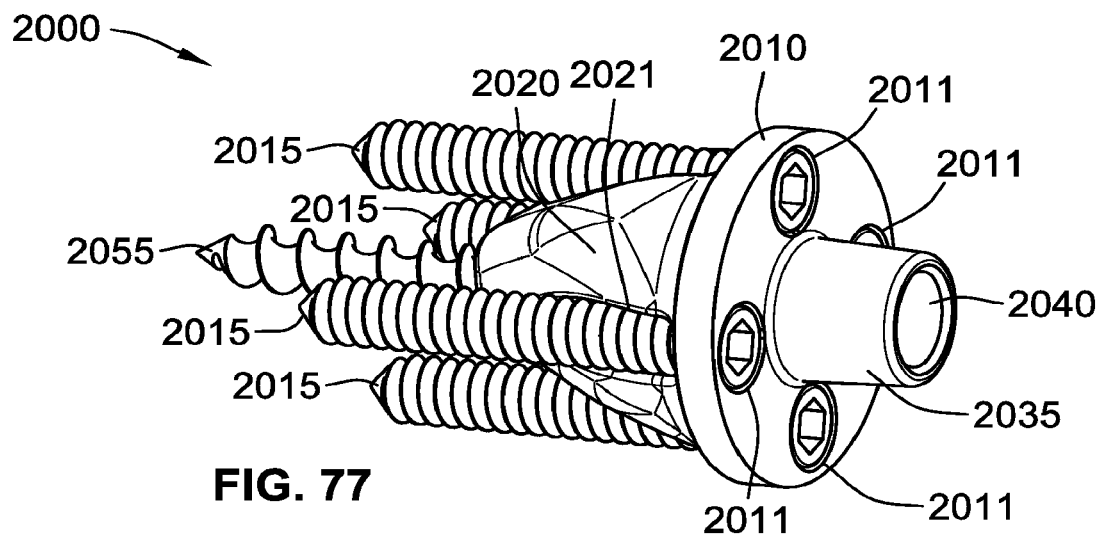
FIG. 77 is a front isometric view of a glenoid implant in a twenty-second configuration according to some implementations of the present disclosure.
Figure 78:
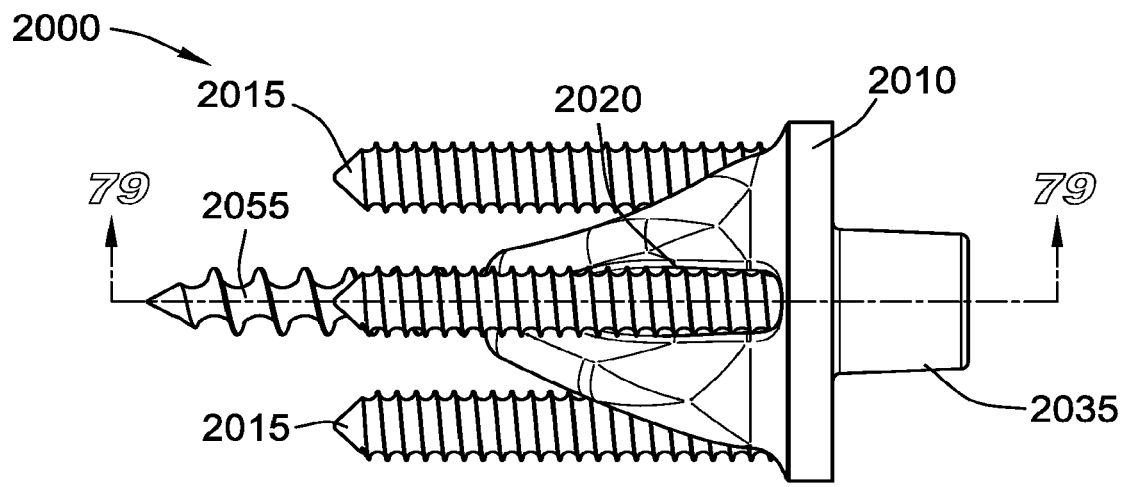
FIG. 78 is a top view of the glenoid implant of FIG. 77 with a cross-section.
Figure 79:
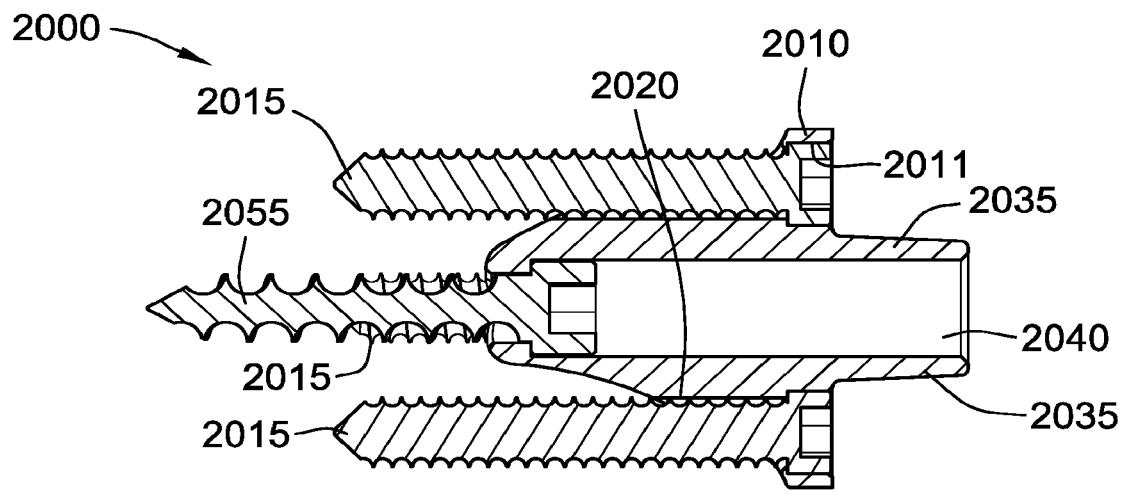
FIG. 79 is a side view of the glenoid implant of FIG. 78 at the cross-section.
Figure 80:
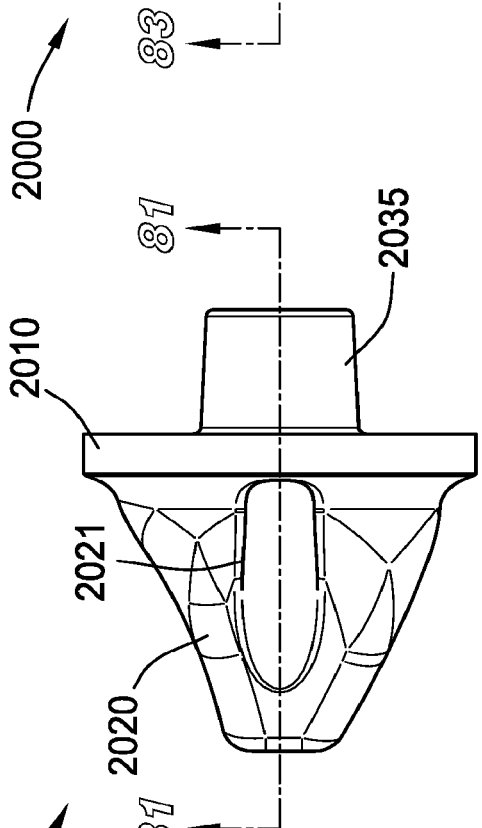
FIG. 80 is a first side view of the glenoid implant of FIG. 77 with a cross-section.
Figure 81:
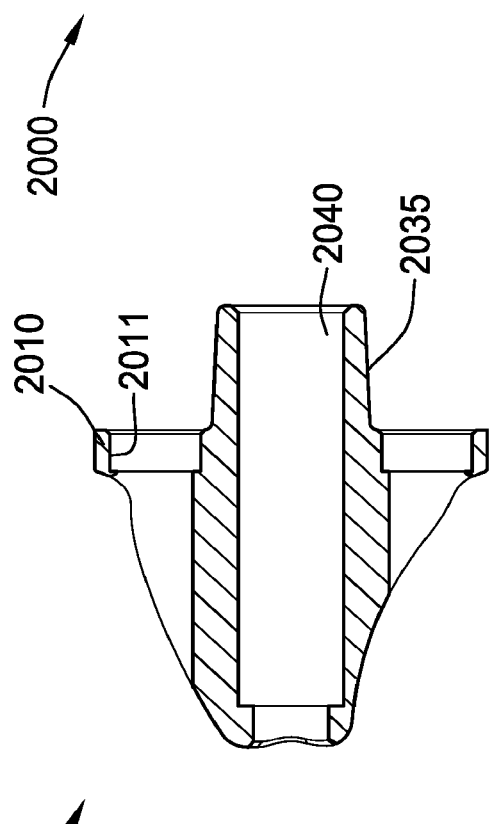
FIG. 81 is the first side view of the glenoid implant of FIG. 80 at the cross-section.
Figure 82:
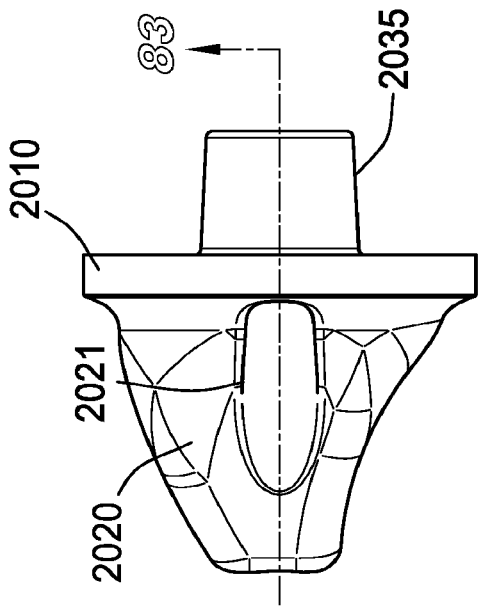
FIG. 82 is a second side view of the glenoid implant of FIG. 77 with a cross-section.
Figure 83:
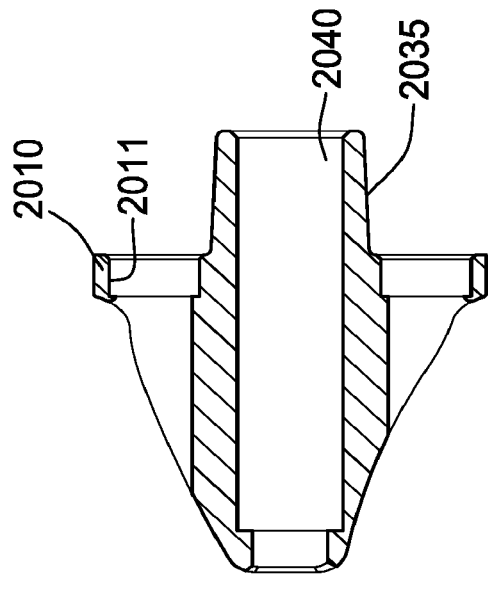
FIG. 83 is the second side view of the glenoid implant of FIG. 82 at the cross-section.

Referring generally to FIGS. 77-83, a glenoid implant 2000 is illustrated. FIG. 77 is a front isometric view of the glenoid implant 2000. FIG. 78 is a top view of the glenoid implant 2000 with cross-section 79-79. FIG. 79 is a side view of the glenoid implant 2000 at the cross-section 79-79. FIG. 80 is a first top view of the glenoid implant 2000 with a cross-section 81-81. FIG. 81 is a first side view of the glenoid implant 2000 at the cross-section 81-81. FIG. 82 is a second top view of the glenoid implant 2000 with a cross-section 83-83. FIG. 83 is the second side view of the glenoid implant 2000 at the cross-section 83-83.

The glenoid implant 2000 can include a baseplate 2010, a trunnion 2035 extending therefrom (e.g., for engaging a glenosphere), and a keel element 2020. The glenoid implant 2000 can include a central aperture 2040 therethrough configured to receive a central fastening element 2055 therethrough. The glenoid implant 2000 can also include apertures 2011 therethrough. Each of the apertures 2011 can be positioned around the central aperture 2040. The keel element 2020 can extend from a rear of the baseplate 2010. The central aperture 2040 can extend through the keel element 2020 such that the keel element 2020 and the baseplate 2010 are aligned. The keel element 2020 can also include grooves 2021. Each aperture 2011 of the baseplate 2010 can be aligned with each groove 2021 of the keel element 2020 to receive a portion of a second fastening element 2015 therethrough. The keel element 2020 is shaped to account for a cavity defect within the scapula of a patient.

Figure 84:
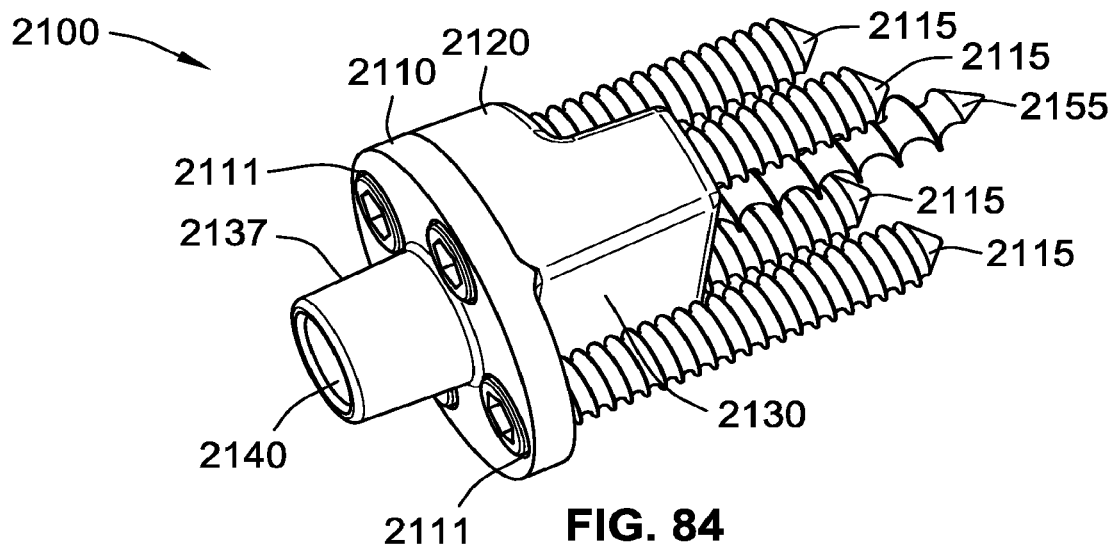
FIG. 84 is a top isometric view of a glenoid implant in a twenty-third configuration according to some implementations of the present disclosure.
Figure 85:
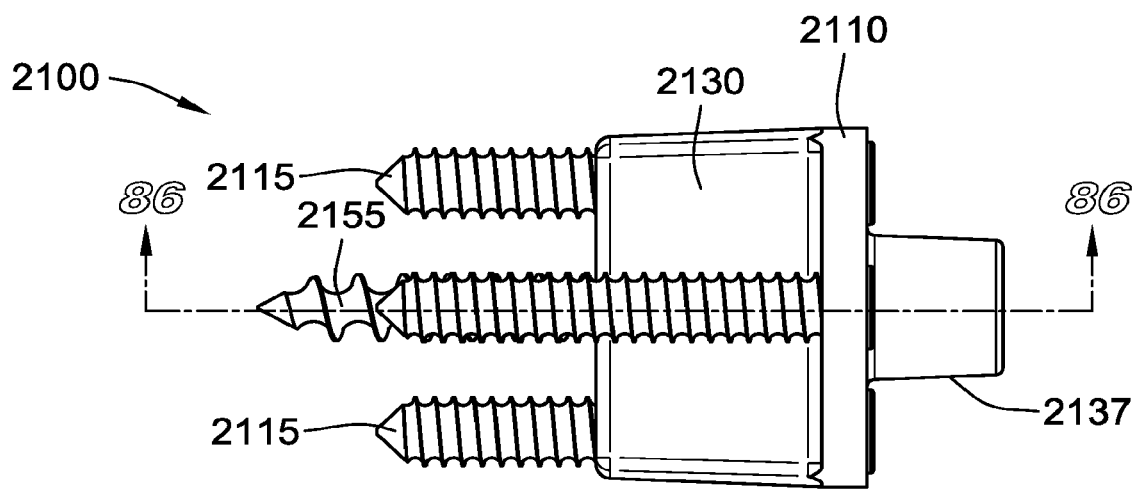
FIG. 85 is a side view of the glenoid implant of FIG. 84 with a cross-section.
Figure 86:
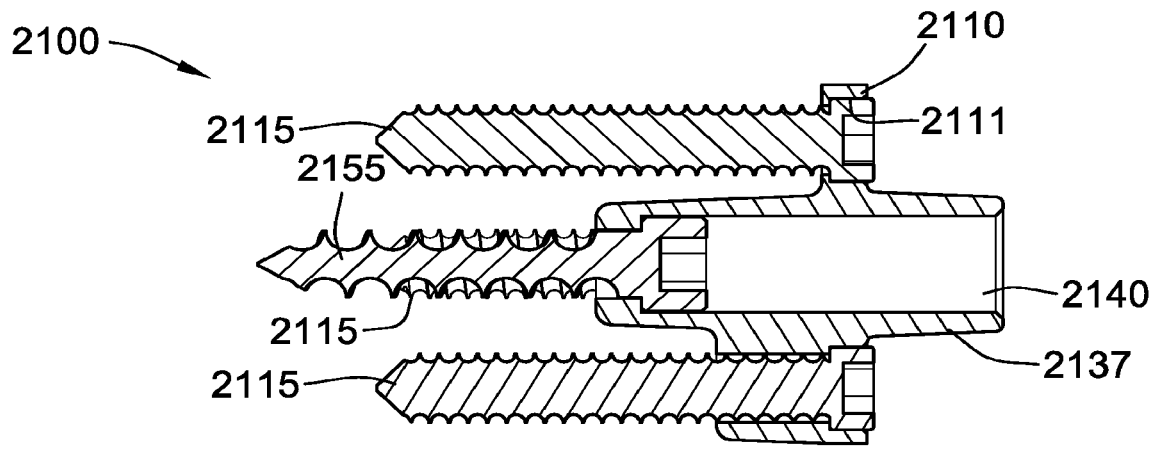
FIG. 86 is the side view of the glenoid implant of FIG. 85 at the cross-section.
Figure 87:
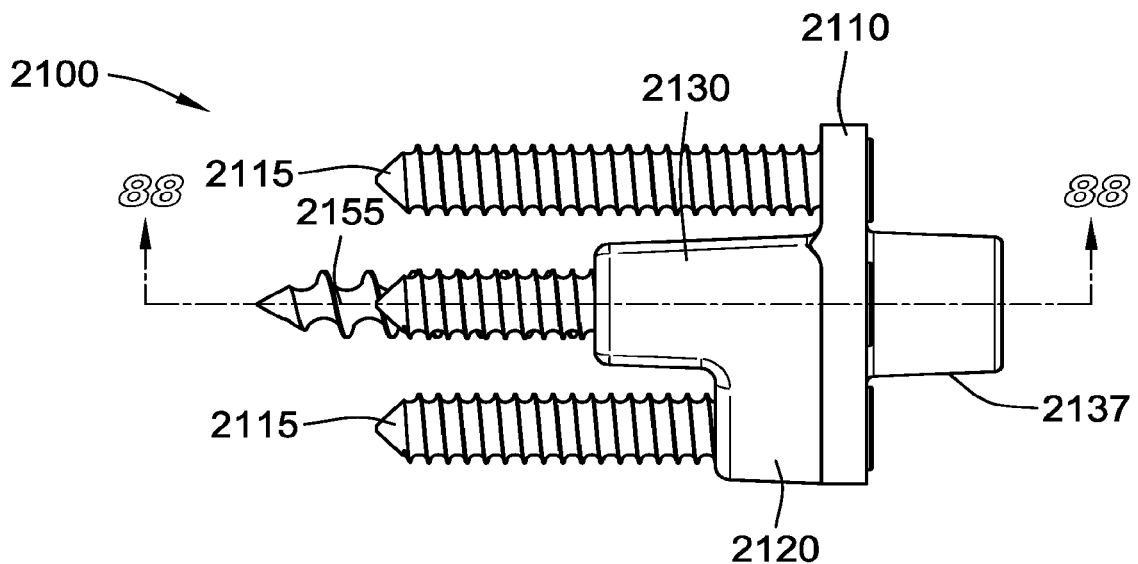
FIG. 87 is a top view of the glenoid implant of FIG. 84 with a cross-section.
Figure 88:
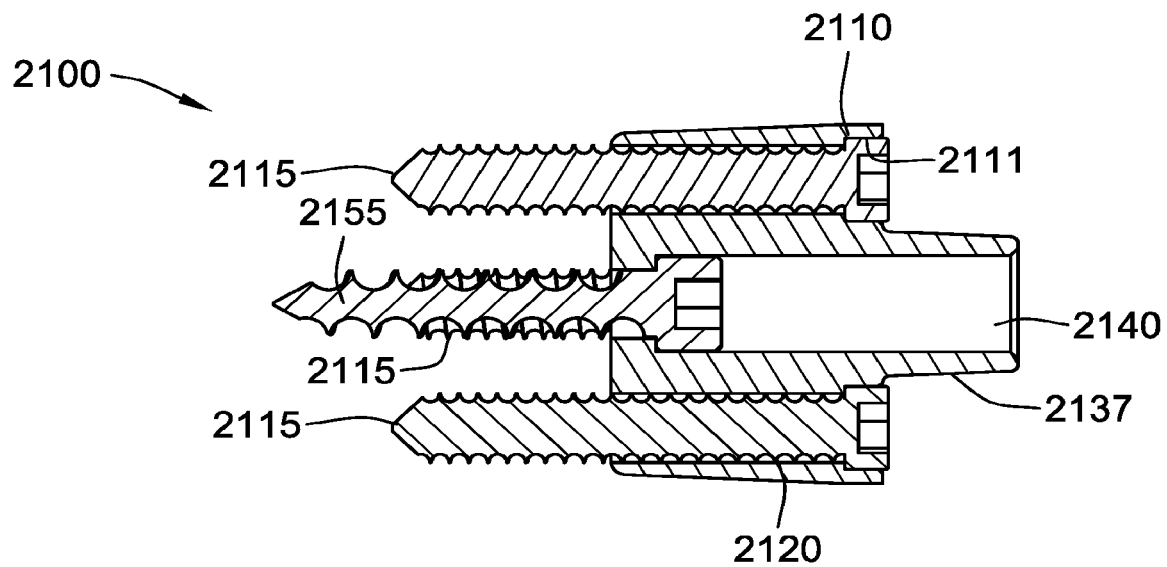
FIG. 88 is the side view of the glenoid implant of FIG. 87 at the cross-section.

Referring generally to FIGS. 84-88, a glenoid implant 2100 is illustrated. FIG. 84 is a top isometric view of the glenoid implant 2100. FIG. 85 is a side view of the glenoid implant 2100 with a cross-section 86-86. FIG. 86 is the side view of the glenoid implant 2100 at the cross-section 86-86. FIG. 87 is a top view of the glenoid implant 2100 with a cross-section 88-88. FIG. 88 is the side view of the glenoid implant 2100 at the cross-section 88-88.

The glenoid implant 2100 includes a baseplate 2110, a trunnion 2137 extending therefrom (e.g., for engaging a glenosphere), a first keel portion 2120, and a second keel portion 2130. The glenoid implant 2100 can include a central aperture 2140 therethrough configured to receive a central fastening element 2155 therethrough.

The first keel portion 2120 and the second keel portion 2130 together form a stepped keel element. The first keel portion 2120 is generally adjacent to one side of the base plate 2110, whereas the second keel portion is generally adjacent to the center of the base plate 2110. In this way, at least one second fastening element 2115 will not pass through the keel element as best shown in FIGS. 84 and 85.

Figure 89:
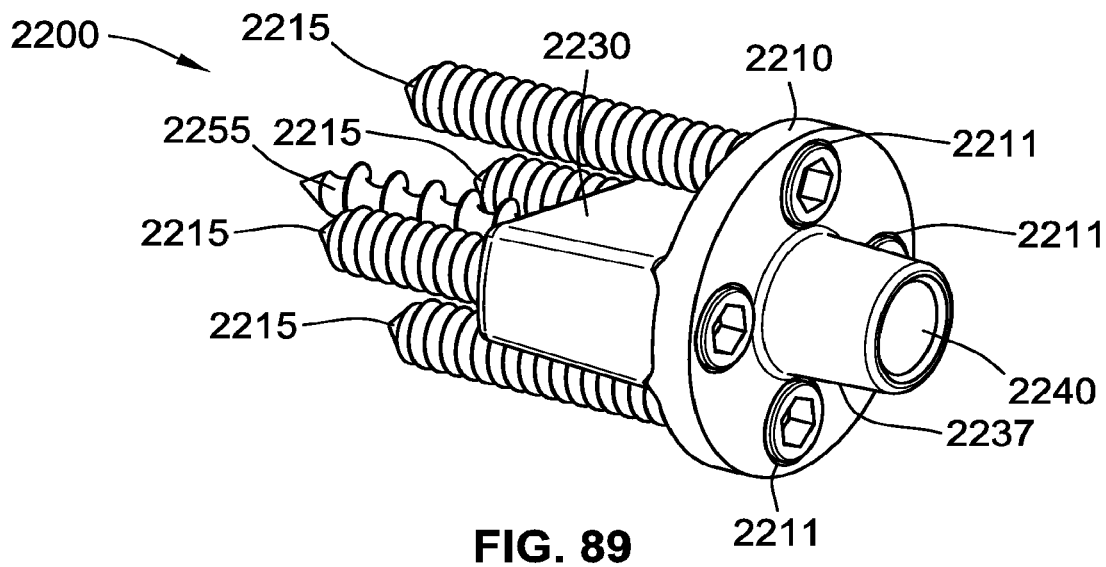
FIG. 89 is a top isometric view of a glenoid implant in a twenty-fourth configuration according to some implementations of the present disclosure.
Figure 90:
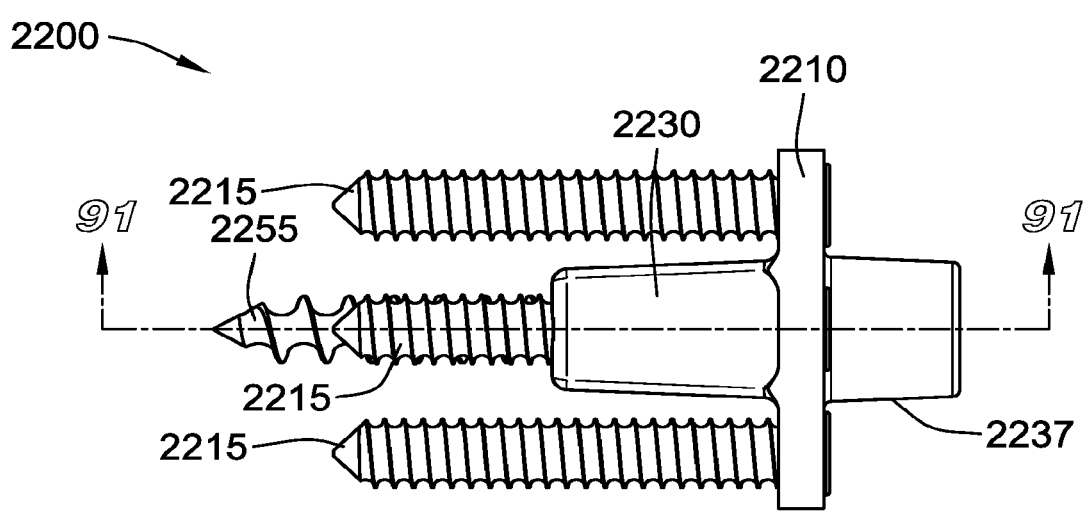
FIG. 90 is a side view of the glenoid implant of FIG. 89 with a cross-section.
Figure 91:
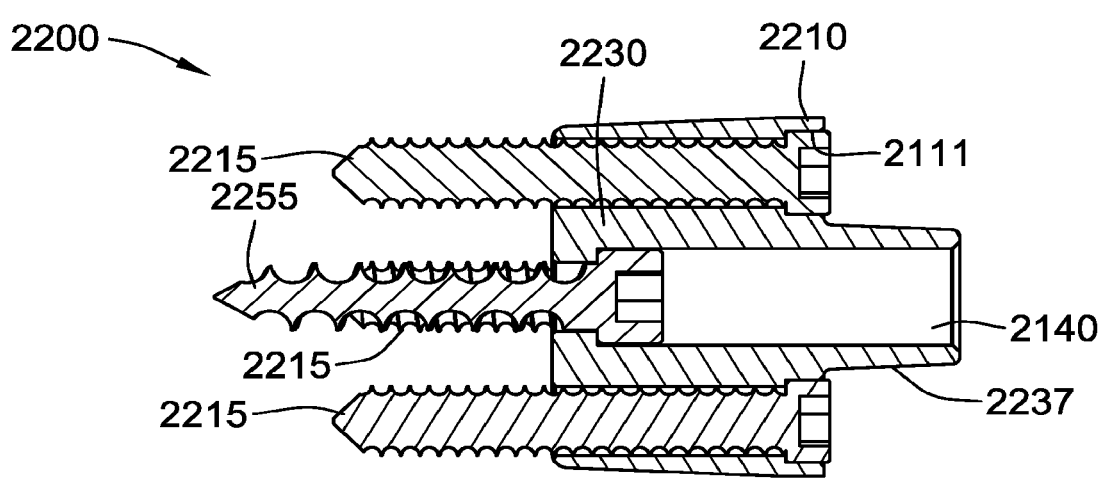
FIG. 91 is the side view of the glenoid implant of FIG. 90 at the cross-section.
Figure 92:
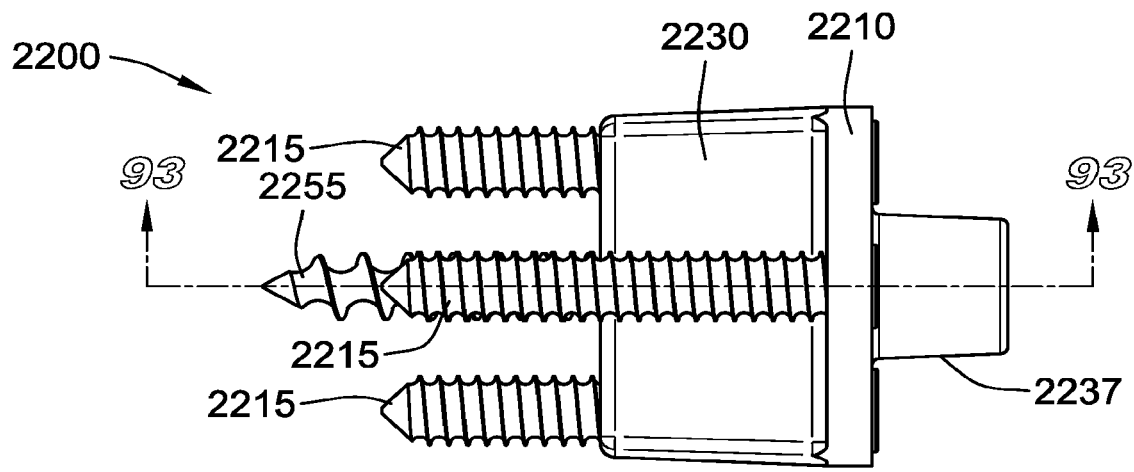
FIG. 92 is a top view of the glenoid implant of FIG. 89 with a cross-section.
Figure 93:
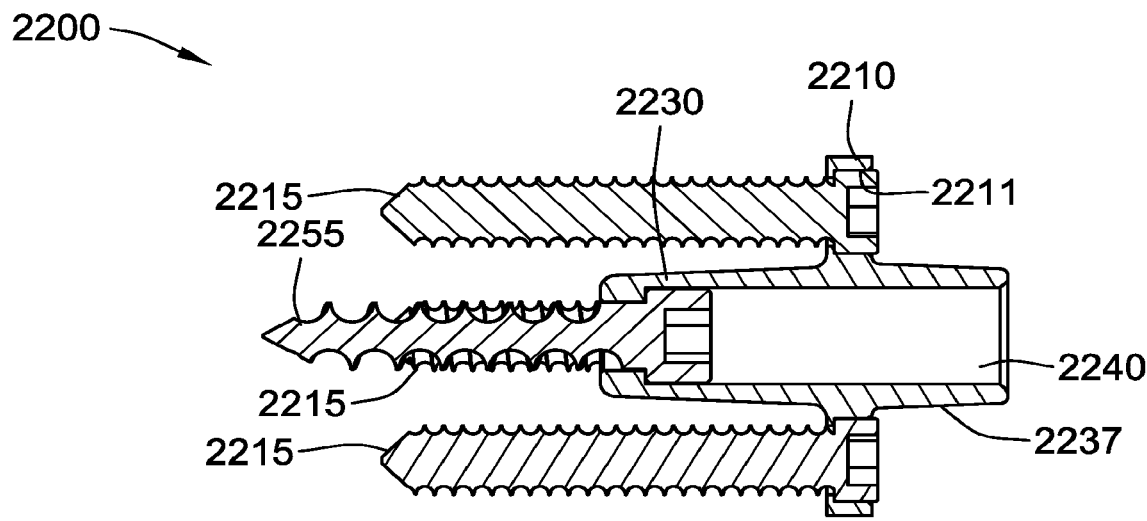
FIG. 93 is the side view of the glenoid implant of FIG. 92 at the cross-section.

Referring generally to FIGS. 89-93, a glenoid implant 2200 is illustrated. FIG. 89 is a perspective view of the glenoid implant 2200. FIG. 90 is a first side view of the glenoid implant 2200. FIG. 91 is a side cross-sectional view of the glenoid implant 2200 at the cross-section 91-91 in FIG. 90. FIG. 92 is a second side view of the glenoid implant 2200. FIG. 93 is a side cross-sectional view of the glenoid implant 2200 at the cross-section 93-93 in FIG. 92.

The glenoid implant 2200 includes a baseplate 2210, a trunnion 2237 extending therefrom (e.g., for engaging a glenosphere), and a keel element 2230. The glenoid implant 2100 can include a central aperture 2240 therethrough configured to receive a central fastening element 2255 therethrough. The keel element 2230 is a single center wedge component. In such a configuration, more than one second fastening element 2215 does not pass through the keel element 2230 (see FIG. 90), but goes directly into the scapula.

Figure 94:
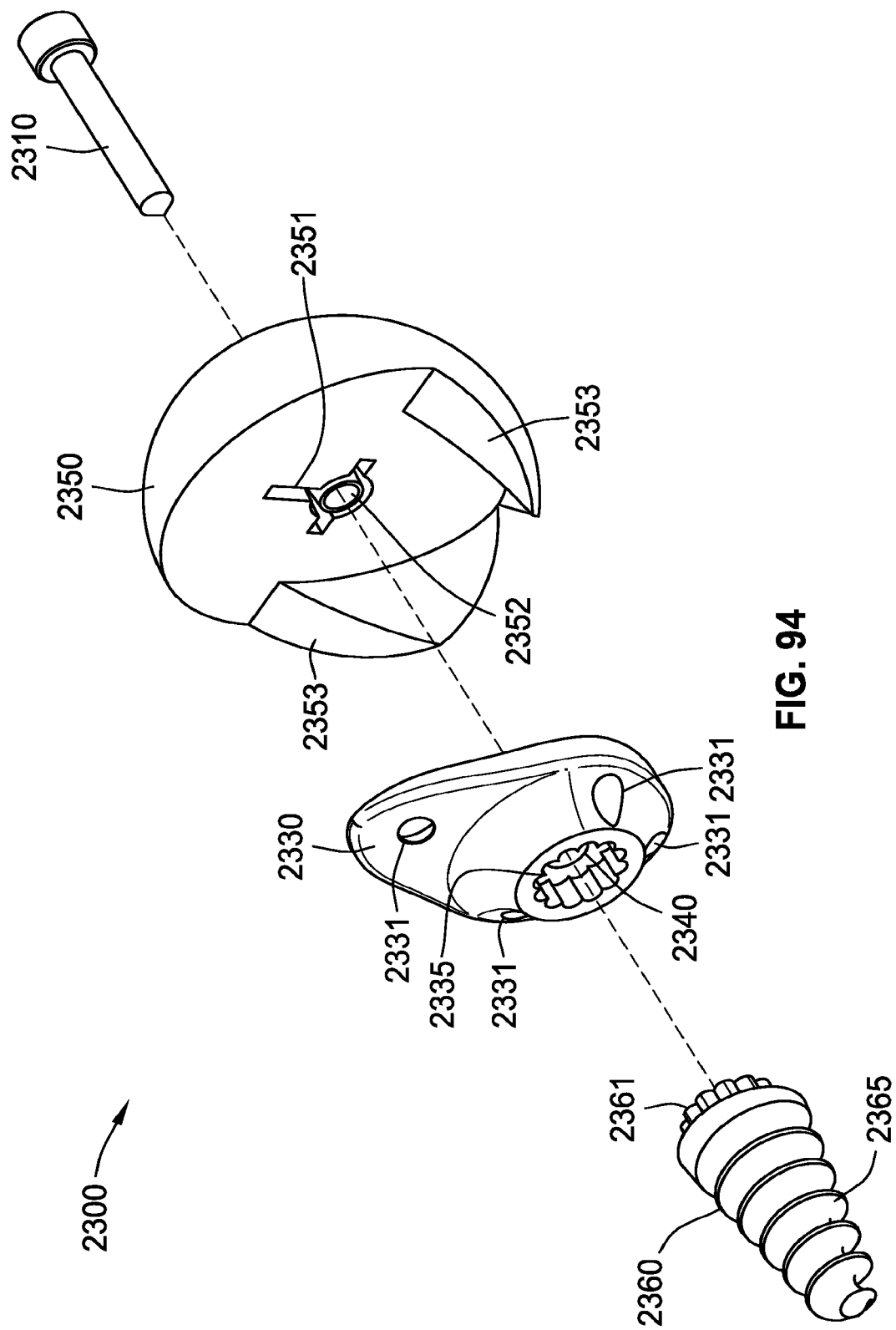
FIG. 94 is a rear isometric exploded view of a glenoid implant in a twenty-fifth configuration according to some implementations of the present disclosure.
Figure 95:
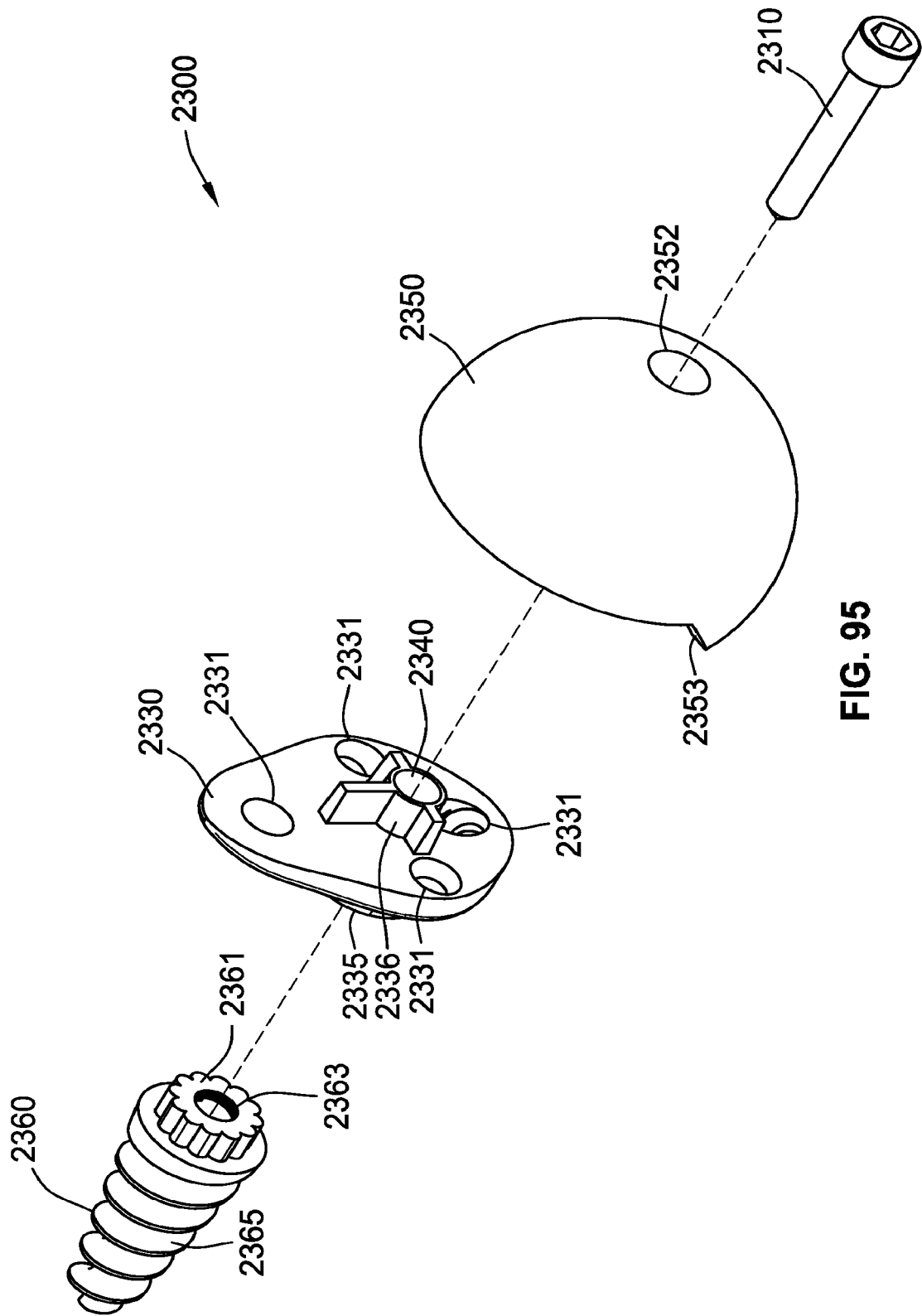
FIG. 95 is a front isometric view of the glenoid implant of FIG. 94.

Referring generally to FIGS. 94-95, a glenoid implant 2300 is illustrated. FIGS. 94 and 95 are rear and front isometric exploded views of the glenoid implant 2300, respectively. The glenoid implant 2300 includes a reverse face plate 2330, a keel element 2360, a glenosphere 2350, and a central fastening element 2310. The reverse face plate 2330 includes a protrusion element 2336 (FIG. 95) with a first central aperture 2340 therethrough. The reverse face plate 2330 can also include a receiving element 2335 opposite the protrusion element 2336. The receiving element 2335 can have a raised profile. The reverse face plate 2330 can also include apertures 2331 therethrough. Each of the apertures 2331 are positioned around the central aperture 2340. The keel element 2360 can include a second central aperture 2363. The keel element 2360 can include a threaded element 2365 to aid in securing the keel element to a portion of a scapula. Furthermore, the keel element 2360 can include a locking element 2361 configured to couple with the receiving element 2335 of the reverse plate 2330. The glenosphere 2350 can include a third central aperture 2352. The glenosphere 2350 can also include a receiving space 2351 with a unique profile that corresponds with the protrusion element 2336 of the reverse face plate 2330.

The central fastening element 2310 can be configured to be at least partially positioned through the first central aperture 2340 of the reverse face plate 2330, the second central aperture 2363 of the keel element 2360, and the third central aperture 2352 of the glenosphere 2350. The central fastening element 2310 can aid in coupling the glenosphere 2350 to the reverse face plate 2330 and the keel element 2360 to the reverse face plate 2330.

In some implementations, the receiving element 2335 of the reverse face plate 2330 includes splines configured to non-rotationally couple with corresponding grooves in the connecting element 2361 of the keel element 2360. In alternative implementations, the receiving element 2335 of the reverse face plate 2330 includes grooves configured to non-rotationally couple with corresponding splines in the connecting element 2361 of the keel element 2360.

Figure 96:
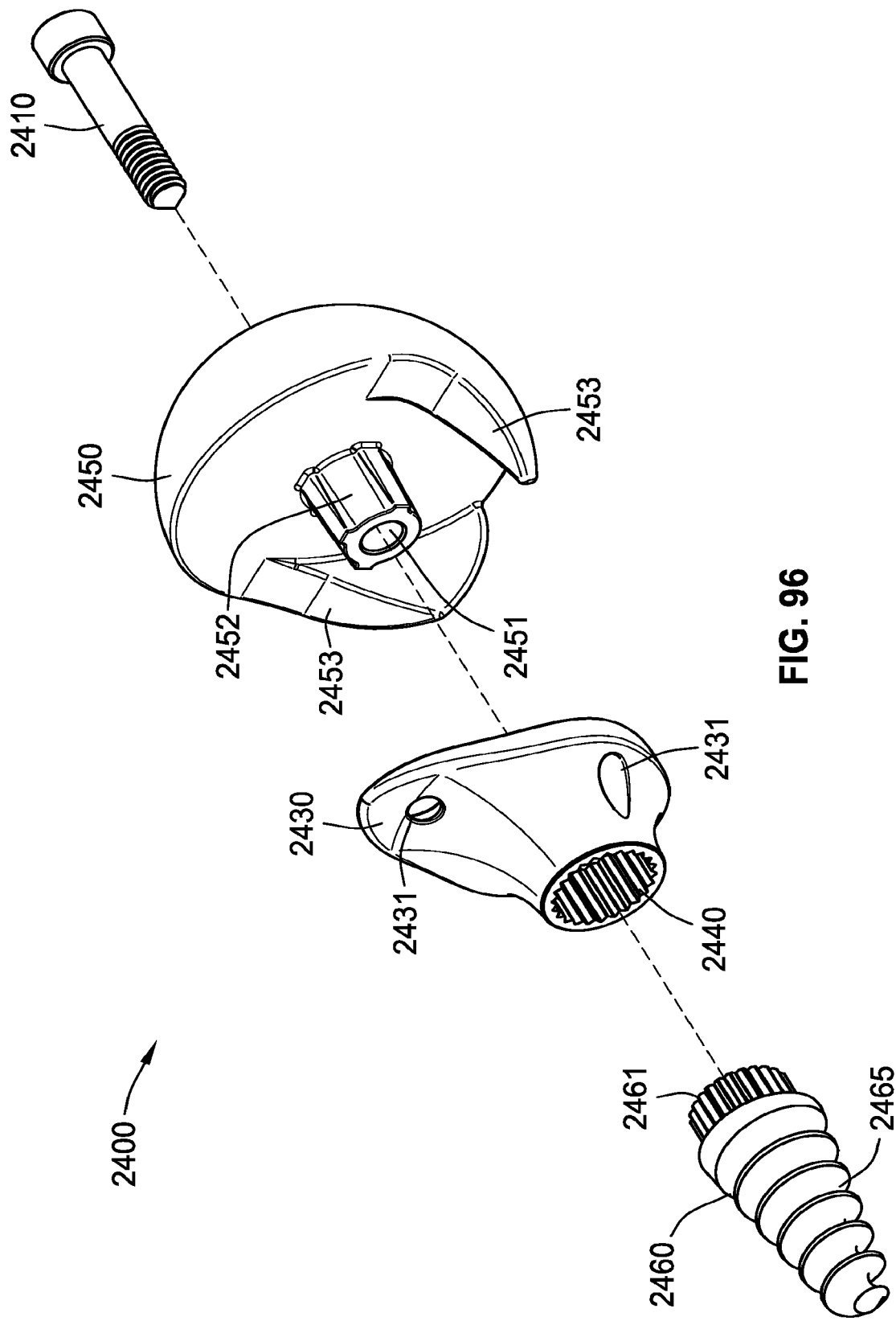
FIG. 96 is a rear isometric exploded view of a glenoid implant in a twenty-sixth configuration according to some implementations of the present disclosure.
Figure 97:
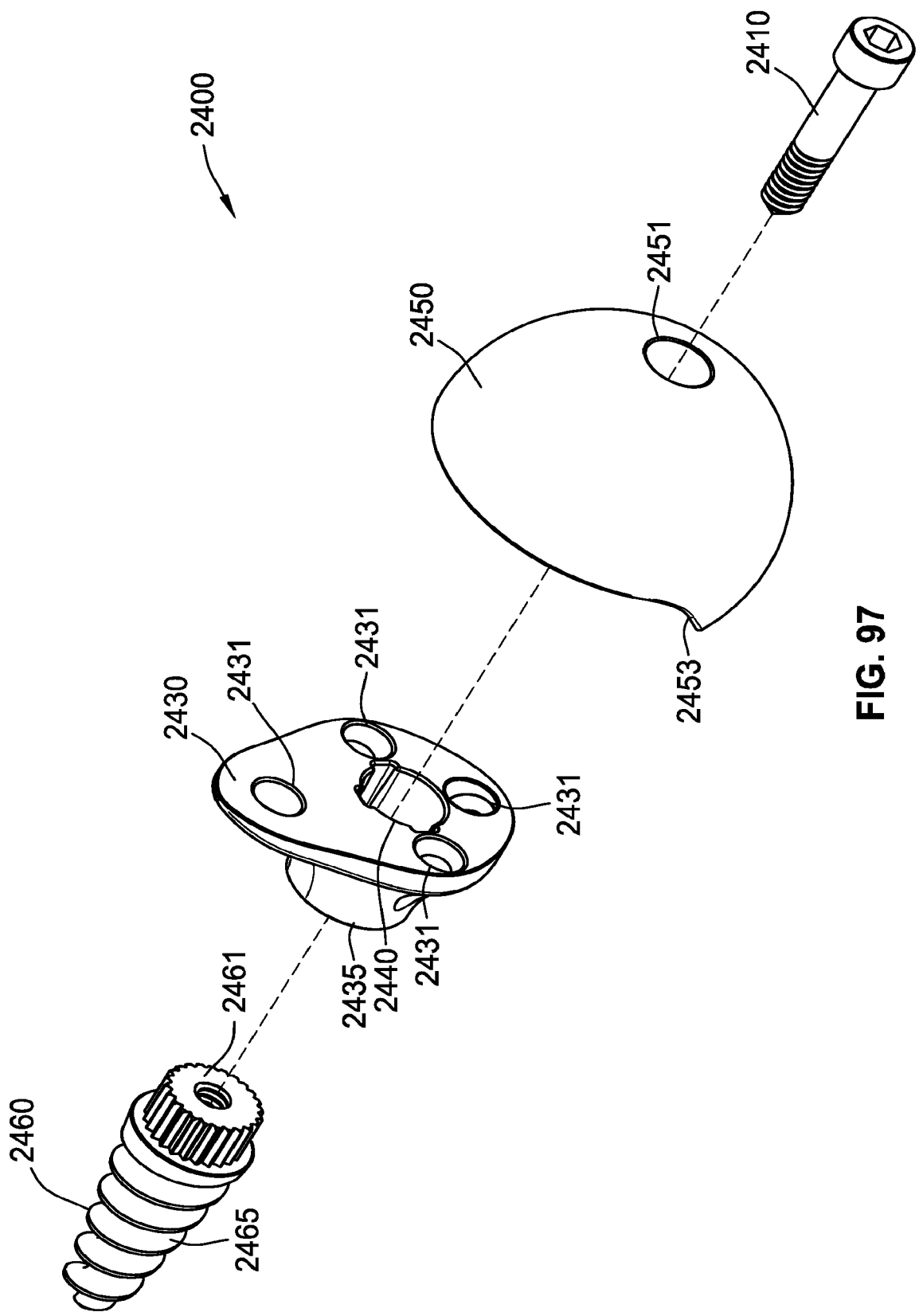
FIG. 97 is a front isometric view of the glenoid implant of FIG. 96.

Referring generally to FIGS. 96-97, a glenoid implant 2400 is illustrated. FIGS. 96 and 97 are front and rear isometric exploded views of the glenoid implant 2400. The glenoid implant 2400 includes a reverse face plate 2430, a keel element 2460, a glenosphere 2450, and a central fastening element 2410, which are similar to the reverse face plate 2330, the keel element 2360, the glenosphere 2350, and the central fastening element 2310 of the glenoid implant 2300. The reverse face plate 2430 can include a receiving element 2440 in the place of the protrusion element 2336. The glenosphere 2450 can include a protrusion element 2452 configured to be received within the receiving element 2440 of the reverse face plate 2430. The glenosphere 2450 can also include wedge elements 2453 configured to abut the reverse face plate 2430 once coupled to the glenosphere 2450.

Alternative Implementations

Alternative Implementation 1. A glenoid implant comprising: a baseplate having a central aperture therethrough; a first leg extending from the baseplate generally along a first arc, the first leg having a first aperture therein configured to receive a portion of a first fastening element therethrough to aid in securing the first leg to a first portion of a scapula of a patient; and a second leg extending from the baseplate generally along a second arc, the second leg having a second aperture therein configured to receive a portion of a second fastening element therethrough to aid in securing the second leg to a second portion of the scapula of the patient.

Alternative Implementation 2. The glenoid implant of Alternative Implementation 1, wherein a radius of curvature for the first arc is larger than a radius of curvature for the second arc.

Alternative Implementation 3. The glenoid implant of Alternative Implementation 1, wherein a radius of curvature for the first arc is the same as a radius of curvature for the second arc.

Alternative Implementation 4. The glenoid implant of Alternative Implementation 1, wherein a radius of curvature for the second arc is larger than a radius of curvature for the first arc.

Alternative Implementation 5. The glenoid implant of Alternative Implementation 1, wherein the first portion of the scapula of the patient is an Acromion.

Alternative Implementation 6. The glenoid implant of Alternative Implementation 1, wherein the second portion of the scapula of the patient is a Coracoid.

Alternative Implementation 7. The glenoid implant of Alternative Implementation 1, further comprising a third leg extending from the baseplate generally along a third arc, the third leg having a third aperture therein configured to receive a portion of a third fastening element therethrough to aid in securing the third leg to a third portion of the scapula of the patient.

Alternative Implementation 8. The glenoid implant of Alternative Implementation 7, wherein a radius of curvature for the third arc is smaller than a radius of curvature for the second arc and a radius of curvature for the first arc.

Alternative Implementation 9. The glenoid implant of Alternative Implementation 7, wherein a radius of curvature for the third arc is the same as a radius of curvature for the second arc and a radius of curvature for the first arc.

Alternative Implementation 10. The glenoid implant of Alternative Implementation 7, wherein the third portion of the scapula of the patient is an Infraglenoid tubercle.

Alternative Implementation 11. The glenoid implant of Alternative Implementation 7, wherein the baseplate, the first leg, the second leg, and the third leg form a single monolithic part.

Alternative Implementation 12. The glenoid implant of Alternative Implementation 7, wherein the baseplate includes a first portion coupled to a second portion such that the central aperture is defined by both the first portion and the second portion.

Alternative Implementation 13. The glenoid implant of Alternative Implementation 12, wherein the first portion of the baseplate, the first leg, and the second leg form a first monolithic part and wherein the second portion of the baseplate and the third leg form a second monolithic part that is separate and distinct from the first monolithic part.

Alternative Implementation 14. The glenoid implant of Alternative Implementation 7, wherein the first leg, the second leg, and the third leg are curved to account for curvature of the first portion, second portion, and third portion of the scapula of the patient.

Alternative Implementation 15. The glenoid implant of Alternative Implementation 7, wherein the first leg, the second leg, and the third leg extend generally along the first arc, the second arc, and the third arc, respectively, such that each of the first leg, the second leg, and the third leg has a radius of curvature.

Alternative Implementation 16. The glenoid implant of Alternative Implementation 15, wherein the radius of curvature of the first leg, the second leg, and the third leg aid in a substantial portion of the glenoid implant directly abutting the first portion, second portion, and third portion, respectively, of the scapula of the patient.

Alternative Implementation 17. The glenoid implant of Alternative Implementation 16, wherein at least seventy-five percent of a rear surface of the glenoid implant directly abuts the scapula of the patient prior to bone grafting material being applied.

Alternative Implementation 18. The glenoid implant of Alternative Implementation 7, wherein the second leg is longer than the second leg and the third leg.

Alternative Implementation 19. The glenoid implant of Alternative Implementation 1, further comprising a central fastening element configured to be at least partially positioned through the central aperture of the baseplate to aid in securing the baseplate to a fourth portion of the scapula of the patient.

Alternative Implementation 20. The glenoid implant of Alternative Implementation 19, wherein the fourth portion of the scapula of the patient is a glenoid cavity.

Alternative Implementation 21. The glenoid implant of Alternative Implementation 19, wherein a head of the central fastening element is configured to be coupled with one or more additional components using a Morse taper press fit.

Alternative Implementation 22. The glenoid implant of Alternative Implementation 19, wherein the head of the central fastening element is configured to be coupled with a humeral head.

Alternative Implementation 23. The glenoid implant of Alternative Implementation 19, wherein the central fastening element includes a compression screw.

Alternative Implementation 24. The glenoid implant of Alternative Implementation 19, wherein the central fastening element includes a lock screw.

Alternative Implementation 25. The glenoid implant of Alternative Implementation 1, wherein the first fastening element and the second fastening element are configured to provide the glenoid implant with bi-cortical support.

Alternative Implementation 26. The glenoid implant of Alternative Implementation 1, wherein the first fastening element and the second fastening element are configured to provide the glenoid implant with uni-cortical support.

Alternative Implementation 27. A glenoid implant comprising: a baseplate having a central aperture therethrough; a first leg extending from the baseplate in a first direction, the first leg having a first aperture therein configured to receive a portion of a first fastening element therethrough to aid in securing the first leg to a first portion of a scapula of a patient; and a second leg extending from the baseplate in a second direction, the second leg having a second aperture therein configured to receive a portion of a second fastening element therethrough to aid in securing the second leg to a second portion of the scapula of the patient.

Alternative Implementation 28. The glenoid implant of Alternative Implementation 27, wherein the first portion of the scapula of the patient is an Acromion.

Alternative Implementation 29. The glenoid implant of Alternative Implementation 27, wherein the second portion of the scapula of the patient is a Coracoid.

Alternative Implementation 30. The glenoid implant of Alternative Implementation 27, further comprising a third leg extending from the baseplate generally in a third direction, the third leg having a third aperture therein configured to receive a portion of a third fastening element therethrough to aid in securing the third leg to a third portion of the scapula of the patient.

Alternative Implementation 31. The glenoid implant of Alternative Implementation 30, wherein the third portion of the scapula of the patient is an Infraglenoid tubercle.

Alternative Implementation 32. The glenoid implant of Alternative Implementation 30, wherein the baseplate, the first leg, the second leg, and the third leg form a single monolithic part.

Alternative Implementation 33. The glenoid implant of Alternative Implementation 30, wherein the baseplate includes a first portion coupled to a second portion such that the central aperture is defined by both the first portion and the second portion.

Alternative Implementation 34. The glenoid implant of Alternative Implementation 33, wherein the first portion of the baseplate, the first leg, and the second leg form a first monolithic part and wherein the second portion of the baseplate and the third leg form a second monolithic part that is separate and distinct from the first monolithic part.

Alternative Implementation 35. The glenoid implant of Alternative Implementation 30, wherein the first leg, the second leg, and the third leg are curved to account for curvature of the first portion, second portion, and third portion of the scapula of the patient.

Alternative Implementation 36. The glenoid implant of Alternative Implementation 30, wherein the first leg, the second leg, and the third leg extend generally along a first arc, a second arc, and a third arc, respectively, such that each of the first leg, the second leg, and the third leg has a radius of curvature.

Alternative Implementation 37. The glenoid implant of Alternative Implementation 36, wherein the radius of curvature of the first leg, the second leg, and the third leg aid in a substantial portion of the glenoid implant directly abutting the first portion, second portion, and third portion, respectively, of the scapula of the patient.

Alternative Implementation 38. The glenoid implant of Alternative Implementation 37, wherein at least seventy-five percent of a rear surface of the glenoid implant directly abuts the scapula of the patient prior to bone grafting material being applied.

Alternative Implementation 39. The glenoid implant of Alternative Implementation 27, further comprising a central fastening element configured to be at least partially positioned through the central aperture of the baseplate to aid in securing the baseplate to a fourth portion of the scapula of the patient.

Alternative Implementation 40. A glenoid implant comprising: a base including a first portion and a second portion, the first portion having a first aperture therethrough and the second portion having a second aperture therethrough, the first aperture being configured to align with the second aperture, thereby defining a central aperture of the base, responsive to the first portion being coupled to the second portion; a first leg extending from the first portion of the base generally along a first arc, the first leg having a first aperture therein configured to receive a portion of a first fastening element therethrough to aid in securing the first leg to a first portion of a scapula of a patient; a second leg extending from the first portion of the base generally along a second arc, the second leg having a second aperture therein configured to receive a portion of a second fastening element therethrough to aid in securing the second leg to a second portion of the scapula of the patient; and an adjustable third leg extending from the second portion of the base generally along a third arc responsive to the first portion being coupled to the second portion, the third leg having a third aperture therein configured to receive a portion of a third fastening element therethrough to aid in securing the third leg to a third portion of the scapula of the patient.

Alternative Implementation 41. The glenoid implant of Alternative Implementation 40, wherein the first portion of the scapula of the patient is an Acromion.

Alternative Implementation 42. The glenoid implant of Alternative Implementation 40, wherein the second portion of the scapula of the patient is a Coracoid.

Alternative Implementation 43. The glenoid implant of Alternative Implementation 40, wherein the third portion of the scapula of the patient is an Infraglenoid tubercle.

Alternative Implementation 44. The glenoid implant of Alternative Implementation 40, further comprising a central fastening element configured to be at least partially positioned through the central aperture of the base to aid in securing the base to a fourth portion of the scapula of the patient.

Alternative Implementation 45. The glenoid implant of Alternative Implementation 44, wherein the fourth portion of the scapula of the patient is a glenoid cavity.

Alternative Implementation 46. The glenoid implant of Alternative Implementation 44, further comprising a glenosphere configured to be secured to the base via the central fastening element.

Alternative Implementation 47. The glenoid implant of Alternative Implementation 46, further comprising an offset element, the offset element aids in coupling the glenosphere to the base such that a central axis of the central aperture of the base is not aligned with a central axis of an aperture within the glenosphere.

Alternative Implementation 48. The glenoid implant of Alternative Implementation 47, wherein the offset element comprises a base with a first coupling element protruding from a first surface of the base adjacent to a first end of the base and a second coupling element protruding from a second opposing surface of the base adjacent to a second opposing end of the base.

Alternative Implementation 49. The glenoid implant of Alternative Implementation 40, wherein the first aperture of the first portion of the base includes splines configured to rotationally couple with corresponding grooves in the second aperture of the second portion of the base.

Alternative Implementation 50. The glenoid implant of Alternative Implementation 49, wherein an angle between the adjustable third leg and the first leg adjustable can be adjusted to account for a distance between the first portion of the scapula of the patient and the third portion of the scapula of the patient.

Alternative Implementation 51. The glenoid implant of Alternative Implementation 40, wherein the first aperture of the first portion of the base includes grooves configured to non-rotationally couple with corresponding splines in the second aperture of the second portion of the base.

Alternative Implementation 52. The glenoid implant of Alternative Implementation 40, further comprising an augment configured to be coupled to at least one of the first leg, the second leg, and the adjustable third leg to increase a relative thickness thereof.

Alternative Implementation 53. The glenoid implant of Alternative Implementation 40, further comprising an augment configured to be coupled to the first leg to increase a relative thickness of the first leg.

Alternative Implementation 54. The glenoid implant of Alternative Implementation 53, wherein the augment comprises at least one slot configured to receive an at least one projection extending from the first leg such that the augment slides onto and is coupled to the first leg.

Alternative Implementation 55. The glenoid implant of Alternative Implementation 53, wherein the augment comprises a corresponding aperture that aligns with the first aperture in the first leg such that the first fastening element is configured to be received through the first aperture of the first leg and the augment aperture to aid in coupling the first leg and the augment to the first portion of the scapula of the patient.

Alternative Implementation 56. The glenoid implant of Alternative Implementation 40, further comprising an augment configured to be coupled to the third leg to increase a relative thickness of the third leg.

Alternative Implementation 57. The glenoid implant of Alternative Implementation 56, wherein the augment comprises at least one slot configured to receive an at least one projection extending from the third leg such that the augment slides onto and is coupled to the third leg.

Alternative Implementation 58. The glenoid implant of Alternative Implementation 56, wherein the augment comprises a corresponding aperture that aligns with the third aperture in the third leg such that the third fastening element is configured to be received through the third aperture of the third leg and the augment aperture to aid in coupling the third leg and the augment to the third portion of the scapula of the patient.

Alternative Implementation 59. The glenoid implant of Alternative Implementation 40, wherein the first leg, the second leg, and the removable leg comprises a first thickness that enables a 5 mm offset for the glenoid implant from the scapula of the patient.

Alternative Implementation 60. The glenoid implant of Alternative Implementation 40, wherein the first leg, the second leg, and the removable leg comprises a first thickness that enables a 10 mm offset for the glenoid implant from the scapula of the patient.

Alternative Implementation 61. The glenoid implant of Alternative Implementation 40, wherein the scapula contacting surface of one or more of the first leg, the second leg, and the adjustable third leg includes a convex surface and the scapula contacting surface of one or more of the first leg, the second leg, and the adjustable third leg includes a concave surface.

Alternative Implementation 62. The glenoid implant of Alternative Implementation 40, wherein the adjustable third leg comprises a convex surface along the third arc, the convex surface contacts the third portion of the scapula of the patient.

Alternative Implementation 63. The glenoid implant of Alternative Implementation 40, wherein the first leg comprises a convex surface along the first arc, the convex surface contacts the first portion of the scapula of the patient.

Alternative Implementation 64. The glenoid implant of Alternative Implementation 40, wherein the second leg comprises a convex surface along the third arc, the convex surface contacts the second portion of the scapula of the patient.

Alternative Implementation 65. The glenoid implant of Alternative Implementation 40, wherein the first leg, the second leg, and the third leg extend generally along a first arc, a second arc, and a third arc, respectively, such that each of the first leg, the second leg, and the third leg has a radius of curvature.

Alternative Implementation 66. The glenoid implant of Alternative Implementation 65, wherein the radius of curvature of the first leg, the second leg, and the third leg aid in a substantial portion of the glenoid implant directly abutting the first portion, second portion, and third portion, respectively, of the scapula of the patient.

Alternative Implementation 67. The glenoid implant of Alternative Implementation 40, wherein the first leg is configured as a wedge shape where a flat first surface is adjacent to the first aperture, and a curved second surface is configured to coincide with a surface of the first portion of a scapula of a patient.

Alternative Implementation 68. The glenoid implant of Alternative Implementation 40, wherein the second leg is configured as a wedge shape where a flat first surface is adjacent to the second aperture, and a curved second surface is configured to coincide with a surface of the second portion of a scapula of a patient.

Alternative Implementation 69. A glenoid implant comprising: a base including a first portion and a second portion, the first portion having a first aperture therethrough and the second portion having a second aperture therethrough, the first aperture being configured to align with the second aperture, thereby defining a central aperture of the base, responsive to the first portion being coupled to the second portion; a first leg extending from the first portion of the base generally along a first arc, the first leg having a first aperture therein configured to receive a portion of a first fastening element therethrough to aid in securing the first leg to a first portion of a scapula of a patient; a second leg extending from the first portion of the base generally along a second arc, the second leg having a second aperture therein configured to receive a portion of a second fastening element therethrough to aid in securing the second leg to a second portion of the scapula of the patient; an adjustable third leg extending from the second portion of the base generally along a third arc responsive to the first portion being coupled to the second portion, the third leg having a third aperture therein configured to receive a portion of a third fastening element therethrough to aid in securing the third leg to a third portion of the scapula of the patient; and a keel element extending from a rear surface of the adjustable third leg configured to fit into a cavity defect of the third portion of the scapula of the patient.

Alternative Implementation 70. The glenoid implant of Alternative Implementation 69, wherein the first portion of the scapula of the patient is an Acromion.

Alternative Implementation 71. The glenoid implant of Alternative Implementation 69, wherein the second portion of the scapula of the patient is a glenoid cavity.

Alternative Implementation 72. The glenoid implant of Alternative Implementation 69, wherein the third portion of the scapula of the patient is a Coracoid.

Alternative Implementation 73. The glenoid implant of Alternative Implementation 69, wherein the fourth portion of the scapula of the patient is an Infraglenoid tubercle.

Alternative Implementation 74. The glenoid implant of Alternative Implementation 69, wherein the baseplate includes a first portion coupled to a second portion such that the central aperture is defined by both the first portion and the second portion.

Alternative Implementation 75. The glenoid implant of Alternative Implementation 74, wherein the first portion of the baseplate and the third adjustable leg form a first monolithic part and wherein the second portion of the baseplate, the first leg, and the second leg form a second monolithic part that is separate and distinct from the first monolithic part.

Alternative Implementation 76. The glenoid implant of Alternative Implementation 69, further comprising a central fastening element configured to be at least partially positioned through the central aperture of the base to aid in securing the base to a fourth portion of the scapula of the patient.

Alternative Implementation 77. The glenoid implant of Alternative Implementation 76, wherein the fourth portion of the scapula of the patient is a glenoid cavity.

Alternative Implementation 78. The glenoid implant of Alternative Implementation 76, further comprising a glenosphere configured to be secured to the base via the central fastening element.

Alternative Implementation 79. The glenoid implant of Alternative Implementation 78, further comprising an augment configured to be coupled to an aperture within the glenosphere.

Alternative Implementation 80. The glenoid implant of Alternative Implementation 69, wherein the first aperture of the first portion of the base includes splines configured to non-rotationally couple with corresponding grooves in the second aperture of the second portion of the base.

Alternative Implementation 81. The glenoid implant of Alternative Implementation 80, wherein an angle between the adjustable third leg and the first leg adjustable can be adjusted to account for a distance between the first portion of the scapula of the patient and the third portion of the scapula of the patient.

Alternative Implementation 82. The glenoid implant of Alternative Implementation 69, wherein the first aperture of the first portion of the base includes grooves configured to non-rotationally couple with corresponding splines in the second aperture of the second portion of the base.

Alternative Implementation 83. The glenoid implant of Alternative Implementation 69, further comprising an insert configured to be coupled to the first leg to increase a relative thickness of the first leg.

Alternative Implementation 84. The glenoid implant of Alternative Implementation 83, wherein the insert comprises a corresponding aperture that aligns with the first aperture in the first leg such that the first fastening element is configured to be received through the first aperture of the first leg and the insert aperture to aid in coupling the first leg and the insert to the first portion of the scapula of the patient.

Alternative Implementation 85. The glenoid implant of Alternative Implementation 69, wherein the scapula contacting surface of one or more of the first leg, the second leg, and the adjustable third leg includes a convex surface and the scapula contacting surface of one or more of the first leg, the second leg, and the adjustable third leg includes a concave surface.

Alternative Implementation 86. The glenoid implant of Alternative Implementation 69, wherein the adjustable third leg comprises a convex surface along the third arc, the convex surface contacts the third portion of the scapula of the patient.

Alternative Implementation 87. The glenoid implant of Alternative Implementation 69, wherein the first leg comprises a convex surface along the first arc, the convex surface contacts the first portion of the scapula of the patient.

Alternative Implementation 88. The glenoid implant of Alternative Implementation 69, wherein the second leg comprises a convex surface along the third arc, the convex surface contacts the second portion of the scapula of the patient.

Alternative Implementation 89. The glenoid implant of Alternative Implementation 69, wherein the first leg, the second leg, and the third leg extend generally along a first arc, a second arc, and a third arc, respectively, such that each of the first leg, the second leg, and the third leg has a radius of curvature.

Alternative Implementation 90. The glenoid implant of Alternative Implementation 89, wherein the radius of curvature of the first leg, the second leg, and the third leg aid in a substantial portion of the glenoid implant directly abutting the first portion, second portion, and third portion, respectively, of the scapula of the patient.

Alternative Implementation 91. A glenoid implant comprising: a base element having a central aperture therethrough, a second aperture therethrough, and a keel element extending from a rear of the base element, the keel element is configured to secure the base element to a first portion of a scapula of a patient, wherein the second aperture is configured to receive a portion of a first fastening element therethrough to aid in securing the base element to the first portion of the scapula of the patient, a coupling element having a first elongated portion and a second portion, the first elongated portion comprising a plurality of apertures therethrough and the second portion comprising a central aperture aligned with the central aperture of the base element; and an augment configured to be received within a receiving space of the first elongated portion of the coupling element, the augment comprising a second plurality of apertures therethrough, wherein each aperture of the first plurality of apertures is aligned with each aperture of the second plurality of apertures to receive a portion of a second fastening element therethrough to aid in securing the coupling element and the augment to a second portion of the scapula of the patient, wherein the coupling element and the augment is configured to rotate about an axis of the base element.

Alternative Implementation 92. The glenoid implant of Alternative Implementation 91, wherein the first portion of the scapula of the patient is a glenoid cavity.

Alternative Implementation 93. The glenoid implant of Alternative Implementation 91, wherein the base element is configured as an inlay component.

Alternative Implementation 94. The glenoid implant of Alternative Implementation 91, further comprising a central fastening element configured to be at least partially positioned through the central aperture of the base element and the central aperture of the coupling element to aid in coupling the base element and the coupling element to the first portion of the scapula of the patient.

Alternative Implementation 95. The glenoid implant of Alternative Implementation 94, wherein a head of the central fastening element is configured to secure additional components using a Morse taper press fit.

Alternative Implementation 96. The glenoid implant of Alternative Implementation 95, wherein the head of the central fastening element is configured to secure a humeral head.

Alternative Implementation 97. The glenoid implant of Alternative Implementation 94, wherein the central fastening element includes a compression screw.

Alternative Implementation 98. The glenoid implant of Alternative Implementation 94, wherein the central fastening element includes a lock screw.

Alternative Implementation 99. The glenoid implant of Alternative Implementation 91, further comprising a glenosphere configured to be secured to the coupling element via the central fastening element.

Alternative Implementation 100. The glenoid implant of Alternative Implementation 99, wherein the glenosphere base comprises a male receiving element configured to receive the central fastening element.

Alternative Implementation 101. The glenoid implant of Alternative Implementation 91, wherein the second fastening element is configured to provide the glenoid implant with bi-cortical support.

Alternative Implementation 102. The glenoid implant of Alternative Implementation 91, wherein the second fastening element is configured to provide the glenoid implant with uni-cortical support.

Alternative Implementation 103. A glenoid implant comprising: a base element having a central aperture therethrough and a second aperture therethrough, the second aperture being configured to receive a portion of a first fastening element therethrough to aid in coupling the base element to a first portion of a scapula of a patient, a coupling element having a plurality of apertures therethrough and a central aperture aligned with the central aperture of the base element, wherein each aperture of the plurality of apertures is configured to receive a portion of a second fastening element therethrough to aid in securing the coupling element to a second portion of the scapula of the patient, and wherein the coupling element is configured to rotate about an axis of the base element.

Alternative Implementation 104. The glenoid implant of Alternative Implementation 103, wherein the first portion of the scapula of the patient is a glenoid cavity.

Alternative Implementation 105. The glenoid implant of Alternative Implementation 103, wherein the base element is configured as an on-lay component.

Alternative Implementation 106. The glenoid implant of Alternative Implementation 103, further comprising a central fastening element configured to be at least partially positioned through the central aperture of the base element and the central aperture of the coupling element to aid in securing the base element and the coupling element to the first portion of the scapula of the patient.

Alternative Implementation 107. The glenoid implant of Alternative Implementation 106, wherein a head of the central fastening element is configured to secure additional components using a Morse taper press fit.

Alternative Implementation 108. The glenoid implant of Alternative Implementation 107, wherein the head of the central fastening element is configured to secure a humeral head.

Alternative Implementation 109. The glenoid implant of Alternative Implementation 106, wherein the central fastening element includes a compression screw.

Alternative Implementation 110. The glenoid implant of Alternative Implementation 106, wherein the central fastening element includes a lock screw.

Alternative Implementation 111. The glenoid implant of Alternative Implementation 103, further comprising a glenosphere configured to be secured to the coupling element via the central fastening element.

Alternative Implementation 112. The glenoid implant of Alternative Implementation 111, further comprising an augment configured to be coupled to an aperture within the glenosphere.

Alternative Implementation 113. The glenoid implant of Alternative Implementation 111, wherein the glenosphere comprises a male receiving element configured to receive the central fastening element.

Alternative Implementation 114. The glenoid implant of Alternative Implementation 103, wherein the second fastening element is configured to provide the glenoid implant with bi-cortical support.

Alternative Implementation 115. The glenoid implant of Alternative Implementation 103, wherein the second fastening element is configured to provide the glenoid implant with uni-cortical support.

Alternative Implementation 116. A glenoid implant comprising: a base element having a central aperture therethrough, a second aperture therethrough, and a keel element extending from a rear of the base element, the keel element configured to secure the base element to a first portion of a scapula of a patient, wherein the second aperture is configured to receive a portion of a first fastening element therethrough to aid in securing the base element to the first portion of the scapula of the patient, a coupling element having a first elongated portion and a second portion, the first elongated portion comprising a plurality of apertures therethrough and the second portion comprising a central aperture aligned with the central aperture of the base element; and an augment configured to be received within a receiving space of the first elongated portion of the coupling element, the augment comprising a second plurality of apertures therethrough, wherein each aperture of the first plurality of apertures is aligned with each aperture of the second plurality of apertures to receive a portion of a second fastening element therethrough to aid in securing the coupling element and the augment to a second portion of the scapula of the patient, wherein the coupling element and the augment are configured to rotate about an axis of the base element.

Alternative Implementation 117. The glenoid implant of Alternative Implementation 116, wherein the first portion of the scapula of the patient is a glenoid cavity.

Alternative Implementation 118. The glenoid implant of Alternative Implementation 116, further comprising a central fastening element configured to be at least partially positioned through the central aperture of the base element and the central aperture of the coupling element to aid in securing the base element and the coupling element to the first portion of the scapula of the patient.

Alternative Implementation 119. The glenoid implant of Alternative Implementation 118, wherein the central fastening element includes a compression screw.

Alternative Implementation 120. The glenoid implant of Alternative Implementation 118, wherein the central fastening element includes a lock screw.

Alternative Implementation 121. The glenoid implant of Alternative Implementation 118, further comprising a double trunnion element configured to receive the central fastening element at a first end of the double trunnion element and a threaded element at a second end of the double trunnion element.

Alternative Implementation 122. The glenoid implant of Alternative Implementation 121, further comprising a glenosphere configured to be secured to the coupling element via the threaded element.

Alternative Implementation 123. The glenoid implant of Alternative Implementation 122, wherein the glenosphere comprises a female receiving element configured to receive the threaded element and the second end of the double trunnion element.

Alternative Implementation 124. The glenoid implant of Alternative Implementation 116, wherein the second fastening element is configured to provide the glenoid implant with bi-cortical support.

Alternative Implementation 125. The glenoid implant of Alternative Implementation 116, wherein the second fastening element is configured to provide the glenoid implant with uni-cortical support.

Alternative Implementation 126. A glenoid implant comprising: a base element having a central aperture therethrough, a second aperture therethrough, and a male receiving element on a rear end of the base element, the second aperture being configured to receive a portion of a first fastening element therethrough to aid in coupling the base element to a first portion of a scapula of a patient, a coupling element having a first elongated portion and a second portion, the first elongated portion comprising a plurality of apertures therethrough and the second portion comprising a central aperture aligned with the central aperture of the base element; and an augment configured to be received within a receiving space of the first elongated portion of the coupling element, the augment comprising a second plurality of apertures therethrough, wherein each aperture of the first plurality of apertures is aligned with each aperture of the second plurality of apertures to receive a portion of a second fastening element therethrough to aid in securing the coupling element and the augment to a second portion of the scapula of the patient, wherein the coupling element and the augment are configured to rotate about an axis of the base element.

Alternative Implementation 127. The glenoid implant of Alternative Implementation 126, further comprising a removable wedge element comprising an aperture, the aperture configured to receive the male receiving element of the base element and a third fastening element therethrough to aid in securing the removable wedge element to the base element.

Alternative Implementation 128. The glenoid implant of Alternative Implementation 127, wherein the removable wedge element is configured to fit into a cavity defect of the first portion of the scapula of the patient.

Alternative Implementation 129. The glenoid implant of Alternative Implementation 126, wherein the first portion of the scapula of the patient is a glenoid cavity.

Alternative Implementation 130. The glenoid implant of Alternative Implementation 126, further comprising a central fastening element configured to be at least partially positioned through the central aperture of the base element and the central aperture of the coupling element to aid in securing the base element and the coupling element to the first portion of the scapula of the patient.

Alternative Implementation 131. The glenoid implant of Alternative Implementation 130, wherein a head of the central fastening element is configured to secure additional components using a Morse taper press fit.

Alternative Implementation 132. The glenoid implant of Alternative Implementation 131, wherein the head of the central fastening element is configured to secure a humeral head.

Alternative Implementation 133. The glenoid implant of Alternative Implementation 130, wherein the central fastening element includes a compression screw.

Alternative Implementation 134. The glenoid implant of Alternative Implementation 130, wherein the central fastening element includes a lock screw.

Alternative Implementation 135. The glenoid implant of Alternative Implementation 130, further comprising a glenosphere configured to be secured to the coupling element via the central fastening element.

Alternative Implementation 136. The glenoid implant of Alternative Implementation 135, further comprising an augment configured to be coupled to an aperture within the glenosphere.

Alternative Implementation 137. The glenoid implant of Alternative Implementation 135, wherein the glenosphere comprises a male receiving element configured to receive the central fastening element.

Alternative Implementation 138. The glenoid implant of Alternative Implementation 126, wherein the second fastening element is configured to provide the glenoid implant with bi-cortical support.

Alternative Implementation 139. The glenoid implant of Alternative Implementation 126, wherein the second fastening element is configured to provide the glenoid implant with uni-cortical support.

Alternative Implementation 140. The glenoid implant of Alternative Implementation 135, further comprising an offset element, the offset element aids in coupling the glenosphere to the base such that a central axis of the central aperture of the base is not aligned with a central axis of an aperture within the glenosphere.

Alternative Implementation 141. The glenoid implant of Alternative Implementation 140, wherein the offset element comprises a base with a first coupling element protruding from a first surface of the base adjacent to a first end of the base and a second coupling element protruding from a second opposing surface of the base adjacent to a second opposing end of the base.

Alternative Implementation 142. A glenoid implant comprising: a base element having a central aperture therethrough, a second aperture therethrough, and a male receiving element on a rear end of the base element, wherein the second aperture is configured to receive a portion of a first fastening element therethrough to aid in securing the base element to a first portion of a scapula of a patient; a removable wedge element comprising an aperture, the aperture configured to receive the male receiving element of the base element and a third fastening element therethrough to aid in securing the removable wedge element to the base element; a central fastening element configured to be at least partially positioned through the central aperture of the base element to aid in securing the base element to the first portion of the scapula of the patient; and a glenosphere configured to be coupled to the base element via the central fastening element.

Alternative Implementation 143. The glenoid implant of Alternative Implementation 142, wherein the first fastening element is configured to provide the glenoid implant with uni-cortical support.

Alternative Implementation 144. The glenoid implant of Alternative Implementation 142, wherein the first portion of the scapula of the patient is a glenoid cavity.

Alternative Implementation 145. The glenoid implant of Alternative Implementation 142, wherein the central fastening element includes a compression screw.

Alternative Implementation 146. The glenoid implant of Alternative Implementation 142, wherein the central fastening element includes a lock screw.

Alternative Implementation 147. The glenoid implant of Alternative Implementation 142, wherein the glenosphere comprises a male receiving element configured to receive the central fastening element.

Alternative Implementation 148. The glenoid implant of Alternative Implementation 142, further comprising an augment configured to be coupled to an aperture within the glenosphere.

Alternative Implementation 149. A glenoid implant comprising: a base element having a central aperture therethrough, a second aperture therethrough, and a keel element extending from a rear of the base element, the keel element configured to secure the base element to a first portion of a scapula of a patient, wherein the second aperture is configured to receive a portion of a first fastening element therethrough to aid in securing the base element to the first portion of the scapula of the patient, a coupling element having a first elongated portion and a second portion, the first elongated body comprising a plurality of apertures therethrough and the second portion comprising a central aperture aligned with the central aperture of the base element, wherein each aperture of the plurality of apertures is configured to receive a portion of a second fastening element therethrough to aid in securing the coupling element to a second portion of the scapula of the patient, and wherein the first elongated portion of the coupling element is positioned to a first side of the base element.

Alternative Implementation 150. The glenoid implant of Alternative Implementation 149, wherein the first portion of the scapula of the patient is a glenoid cavity.

Alternative Implementation 151. The glenoid implant of Alternative Implementation 149, further comprising a central fastening element configured to be at least partially positioned through the central aperture of the base element and the central aperture of the coupling element to aid in securing the base element and the coupling element to the first portion of the scapula of the patient.

Alternative Implementation 152. The glenoid implant of Alternative Implementation 151, wherein the central fastening element includes a compression screw.

Alternative Implementation 153. The glenoid implant of Alternative Implementation 151, wherein the central fastening element includes a lock screw.

Alternative Implementation 154. The glenoid implant of Alternative Implementation 151, further comprising a double trunnion element configured to receive the central fastening element at a first end of the double trunnion element and a threaded element at a second end of the double trunnion element.

Alternative Implementation 155. The glenoid implant of Alternative Implementation 154, further comprising a glenosphere configured to be secured to the coupling element via the threaded element.

Alternative Implementation 156. The glenoid implant of Alternative Implementation 155, wherein the glenosphere comprises a female receiving element configured to receive the threaded element and the second end of the double trunnion element.

Alternative Implementation 157. The glenoid implant of Alternative Implementation 149, wherein the second fastening element is configured to provide the glenoid implant with bi-cortical support.

Alternative Implementation 158. The glenoid implant of Alternative Implementation 149, wherein the second fastening element is configured to provide the glenoid implant with uni-cortical support.

Alternative Implementation 159. A glenoid implant comprising: a base element having a central aperture therethrough, a second aperture therethrough, and a keel element extending from a rear of the base element, the keel element is configured to secure the base element to a first portion of a scapula of a patient, wherein the second aperture is configured to receive a portion of a first fastening element therethrough to aid in securing the base element to the first portion of the scapula of the patient; a coupling element having a first elongated portion and a second portion, the first elongated portion comprising a plurality of apertures therethrough and the second portion comprising a central aperture aligned with the central aperture of the base element; and an augment configured to be received within a receiving space of the first elongated portion of the coupling element, the augment comprising a second plurality of apertures therethrough, wherein each aperture of the first plurality of apertures is aligned with each aperture of the second plurality of apertures to receive a portion of a second fastening element therethrough to aid in securing the coupling element and the augment to a second portion of the scapula of the patient, wherein the coupling element and the augments are positioned to a first side of the base element.

Alternative Implementation 160. The glenoid implant of Alternative Implementation 159, wherein the first portion of the scapula of the patient is a glenoid cavity.

Alternative Implementation 161. The glenoid implant of Alternative Implementation 159, wherein the base element is configured as an inlay component.

Alternative Implementation 162. The glenoid implant of Alternative Implementation 159, further comprising a central fastening element configured to be at least partially positioned through the central aperture of the base element and the central aperture of the coupling element to aid in coupling the base element and the coupling element to the first portion of the scapula of the patient.

Alternative Implementation 163. The glenoid implant of Alternative Implementation 162, wherein a head of the central fastening element is configured to secure additional components using a Morse taper press fit.

Alternative Implementation 164. The glenoid implant of Alternative Implementation 163, wherein the head of the central fastening element is configured to secure a humeral head.

Alternative Implementation 165. The glenoid implant of Alternative Implementation 162, wherein the central fastening element includes a compression screw.

Alternative Implementation 166. The glenoid implant of Alternative Implementation 162, wherein the central fastening element includes a lock screw.

Alternative Implementation 167. A glenoid implant comprising: a base element having a central aperture therethrough, a second aperture therethrough, and a wedge element extending from a rear of the base element, the wedge element is configured to secure the base element to a first portion of a scapula of a patient, wherein the second aperture is configured to receive a portion of a first fastening element therethrough to aid in securing the base element to the first portion of the scapula of the patient, a coupling element having a first elongated portion and a second portion, the first elongated portion comprising a plurality of apertures therethrough and the second portion comprising a central aperture aligned with the central aperture of the base element; and an augment configured to be received within a receiving space of the first elongated portion of the coupling element, the augment comprising a second plurality of apertures therethrough, wherein each aperture of the first plurality of apertures is aligned with each aperture of the second plurality of apertures to receive a portion of a second fastening element therethrough to aid in securing the coupling element and the augment to a second portion of the scapula of the patient; wherein the coupling element and the augment are configured to rotate about an axis of the base element.

Alternative Implementation 168. The glenoid implant of Alternative Implementation 167, wherein the first portion of the scapula of the patient is a glenoid cavity.

Alternative Implementation 169. The glenoid implant of Alternative Implementation 167, further comprising a central fastening element configured to be at least partially positioned through the central aperture of the base element and the central aperture of the coupling element to aid in securing the base element and the coupling element to the first portion of the scapula of the patient.

Alternative Implementation 170. The glenoid implant of Alternative Implementation 169, wherein a head of the central fastening element is configured to secure additional components using a Morse taper press fit.

Alternative Implementation 171. The glenoid implant of Alternative Implementation 170, wherein the head of the central fastening element is configured to secure a humeral head.

Alternative Implementation 172. The glenoid implant of Alternative Implementation 169, wherein the central fastening element includes a compression screw.

Alternative Implementation 173. The glenoid implant of Alternative Implementation 169, wherein the central fastening element includes a lock screw.

Alternative Implementation 174. The glenoid implant of Alternative Implementation 169, further comprising a glenosphere configured to be secured to the coupling element via the central fastening element.

Alternative Implementation 175. The glenoid implant of Alternative Implementation 174, further comprising an augment configured to be coupled to an aperture within the glenosphere.

Alternative Implementation 176. The glenoid implant of Alternative Implementation 174, further comprising an offset element, the offset element aids in coupling the glenosphere to the base such that a central axis of the central aperture of the base is not aligned with a central axis of an aperture within the glenosphere.

Alternative Implementation 177. The glenoid implant of Alternative Implementation 176, wherein the offset element comprises a base with a first coupling element protruding from a first surface of the base adjacent to a first end of the base and a second coupling element protruding from a second opposing surface of the base adjacent to a second opposing end of the base.

Alternative Implementation 178. The glenoid implant of Alternative Implementation 167, wherein the wedge element comprises a first thickness at the central aperture, and a second thickness at the second aperture, wherein the first thickness is thicker than the second thickness.

Alternative Implementation 179. The glenoid implant of Alternative Implementation 167, wherein the wedge element comprises a first thickness at the central aperture, and a second thickness at the second aperture, wherein the second thickness is thicker than the first thickness.

Alternative Implementation 180. A glenoid implant comprising: a baseplate having a central aperture therethrough and a plurality of apertures therethrough, each of the plurality of apertures are positioned around the central aperture; and a keel element extending from a rear of the baseplate, the keel element comprising a central aperture aligned with the central aperture of the base element and a plurality of grooves, wherein each aperture of the plurality of apertures is aligned with each groove of the plurality of grooves to receive a portion of a second fastening element therethrough to aid in securing the wedge element to a first portion of a scapula of a patient, wherein the keel element is shaped to account for a cavity defect of a first portion of a scapula of a patient.

Alternative Implementation 181. The glenoid implant of Alternative Implementation 180, wherein the keel element comprises a non-uniform shape.

Alternative Implementation 182. A glenoid implant comprising: a baseplate having a central aperture therethrough and a first plurality of apertures therethrough, each of the plurality of apertures are positioned around the central aperture; and a keel element extending from a rear of the baseplate, the keel element comprising a central aperture aligned with the central aperture of the base element and a second plurality of apertures, wherein at least one aperture of the first plurality of apertures is aligned with at least one aperture of the second plurality of apertures to receive a portion of a second fastening element therethrough to aid in securing the wedge element to a first portion of a scapula of a patient.

Alternative Implementation 183. The glenoid implant of Alternative Implementation 182, wherein the keel element comprises an elongated quadrilateral portion and a second portion extending from the elongated quadrilateral portion.

Alternative Implementation 184. The glenoid implant of Alternative Implementation 183, wherein the elongated quadrilateral portion comprises the central aperture and at least two apertures of the second plurality of apertures, and the second portion comprises one aperture of the second plurality of apertures.

Alternative Implementation 185. The glenoid implant of Alternative Implementation 182, wherein the keel element comprises an elongated quadrilateral portion having the central aperture and at least two apertures of the second plurality of apertures.

Alternative Implementation 186. A glenoid implant comprising: a reverse face plate having a protrusion element with a first central aperture therethrough, a receiving element opposite the protrusion element, and a first plurality of apertures therethrough, each of the plurality of apertures are positioned around the central aperture; a keel element having a second central aperture, a threaded element to aid in securing the keel element to a first portion of a scapula of a patient, a connecting element configured to couple with the receiving element of the reverse plate; a glenosphere having a third central aperture and a receiving space configured to receive the protrusion element of the reverse face plate; and a central fastening element configured to be at least partially positioned through the first central aperture of the reverse face plate, the second central aperture of the keel element, and the third central aperture of the glenosphere to aid in coupling the glenosphere to the reverse face plate and the keel element to the reverse face plate.

Alternative Implementation 187. The glenoid implant of Alternative Implementation 186, wherein the receiving element of the reverse face plate includes splines configured to non-rotationally couple with corresponding grooves in the connecting element of the keel element.

Alternative Implementation 188. The glenoid implant of Alternative Implementation 186, wherein the receiving element of the reverse face plate includes grooves configured to non-rotationally couple with corresponding splines in the connecting element of the keel element.

Alternative Implementation 189. A glenoid implant comprising: a reverse face plate having a first receiving element with a first central aperture therethrough, a second receiving element opposite the first receiving element, and a first plurality of apertures therethrough, each of the plurality of apertures are positioned around the first receiving element; a keel element having a second central aperture, a threaded element to aid in securing the keel element to a first portion of a scapula of a patient, a connecting element configured to couple with the second receiving element of the reverse plate; a glenosphere having a third central aperture and a protrusion element configured to be received within the first receiving element of the reverse face plate; and a central fastening element configured to be at least partially positioned through the first central aperture of the reverse face plate, the second central aperture of the keel element, and the third central aperture of the glenosphere to aid in coupling the glenosphere to the reverse face plate and the keel element to the reverse face plate.

Alternative Implementation 190. The glenoid implant of Alternative Implementation 189, wherein the receiving element of the reverse face plate includes splines configured to non-rotationally couple with corresponding grooves in the connecting element of the keel element.

Alternative Implementation 191. The glenoid implant of Alternative Implementation 189, wherein the receiving element of the reverse face plate includes grooves configured to non-rotationally couple with corresponding splines in the connecting element of the keel element.

Alternative Implementation 192. A glenoid implant comprising: a base element having a central aperture therethrough, a second aperture therethrough, and a wedge element extending from a rear of the base element, the second aperture being configured to receive a portion of a first fastening element therethrough to aid in securing the base element to a first portion of a scapula of a patient; a coupling element having a first portion and a second portion, the first portion having a first plurality of apertures therethrough and the second portion having a central aperture aligned with the central aperture of the base element; and an augment configured to be received within a receiving space of the first portion of the coupling element, the augment having a second plurality of apertures therethrough, each of the first plurality of apertures being aligned with each of the second plurality of apertures to receive a respective second fastening element therethrough to aid in securing the coupling element and the augment to a second portion of the scapula of the patient, the coupling element and the augment being configured to rotate about an axis of the base element such that the coupling element and the augment are movable relative to the base element.

Alternative Implementation 193. The glenoid implant of Alternative Implementation 192, wherein the first portion of the scapula of the patient is a glenoid cavity.

Alternative Implementation 194. The glenoid implant of Alternative Implementation 192 or Alternative Implementation 193, further comprising a central fastening element configured to be at least partially positioned through the central aperture of the base element and the central aperture of the coupling element to aid in securing the base element and the coupling element to the first portion of the scapula of the patient.

Alternative Implementation 195. The glenoid implant of Alternative Implementation 194, wherein a head of the central fastening element is configured to secure additional components using a Morse taper press fit.

Alternative Implementation 196. The glenoid implant of Alternative Implementation 195, wherein the head of the central fastening element is configured to secure a glenosphere.

Alternative Implementation 197. The glenoid implant of any one of Alternative Implementations 194 to 196, wherein the central fastening element is a compression screw or a locking screw.

Alternative Implementation 198. The glenoid implant of any one of Alternative Implementations 192 to 197, further comprising a glenosphere configured to be secured to the coupling element.

Alternative Implementation 199. The glenoid implant of Alternative Implementation 198, further comprising a second augment coupled to the glenosphere such that a portion of the second augment protrudes from the glenosphere.

Alternative Implementation 200. The glenoid implant of Alternative Implementation 198 or Alternative Implementation 199, further comprising an offset element positioned generally between the coupling element and the glenosphere.

Alternative Implementation 201. The glenoid implant of Alternative Implementation 200, wherein the offset element aids in coupling the glenosphere to the coupling element such that a central axis of the central aperture of the base element is not aligned with a central axis of an aperture within the glenosphere.

Alternative Implementation 202. The glenoid implant of Alternative Implementation 200 or Alternative Implementation 201, wherein the offset element includes a base, a first coupling element protruding from a first side of the base, and a second coupling element protruding from a second opposing side of the base.

Alternative Implementation 203. The glenoid implant of Alternative Implementation 202, wherein the first coupling element is a first trunnion and the second coupling element is a second trunnion.

Alternative Implementation 204. The glenoid implant of Alternative Implementation 202 or Alternative Implementation 203, wherein the first coupling element is configured to be press fit into the central aperture of the second portion of the coupling element and the second coupling element is configured to be press fit into the aperture of the glenosphere.

Alternative Implementation 205. The glenoid implant of Alternative Implementation 194, further comprising a threaded element configured to be coupled to the central aperture of the second portion of the coupling element in a threaded fashion.

Alternative Implementation 206. The glenoid implant of Alternative Implementation 205, wherein a head of the central fastening element includes a threaded portion that is configured to be engaged by the threaded element in a threaded fashion.

Alternative Implementation 207. The glenoid implant of Alternative Implementation 205 or Alternative Implementation 206, wherein the threaded element is a cylindrical ring having an outer surface and an inner surface, at least a portion of the outer surface is threaded and at least a portion of the inner surface is threaded.

Alternative Implementation 208. The glenoid implant of Alternative Implementation 207, wherein the threaded outer surface is threaded in a first direction and wherein the threaded inner surface is threaded in a second opposing direction.

Alternative Implementation 209. The glenoid implant of any one of Alternative Implementations 192 to 208, wherein the wedge element includes a first side and a second opposing side, and wherein a thickness of the first side is different from a thickness of the second opposing side.

Alternative Implementation 210. The glenoid implant of any one of Alternative Implementations 192 to 209, wherein the base element has a first thickness adjacent to the central aperture and a second thickness adjacent to the second aperture, the thickness of the base element adjacent to the second aperture is greater than the thickness of the base element adjacent to the first aperture.

Alternative Implementation 211. A glenoid implant comprising: a base element having a trunnion forming a central aperture therethrough and an attachment portion adjacent to the trunnion, the base element further forming a second aperture that is configured to receive a portion of a first fastening element therethrough to aid in coupling the base element to a first portion of a scapula of a patient; a coupling element having a first portion and a second portion, the first portion having a plurality of apertures therethrough and the second portion having a central aperture aligned with the central aperture of the base element; and an augment configured to be received within a receiving space of the first portion of the coupling element, the augment having a second plurality of apertures therethrough, each of the first plurality of apertures being aligned with each of the second plurality of apertures to receive a respective second fastening element therethrough to aid in securing the coupling element and the augment to a second portion of the scapula of the patient, the coupling element and the augment being configured to rotate about an axis of the base element such that the coupling element and the augment are movable relative to the base element.

Alternative Implementation 212. The glenoid implant of Alternative Implementation 211, further comprising a removable wedge augment coupled to the base element.

Alternative Implementation 213. The glenoid implant of Alternative Implementation 212, wherein the removable wedge augment is coupled to the base element via a threaded fastening element.

Alternative Implementation 214. The glenoid implant of Alternative Implementation 213, wherein the removable wedge augment includes a central aperture configured to receive a least a portion of the threaded fastening element therethrough.

Alternative Implementation 215. The glenoid implant of Alternative Implementation 214, wherein the central aperture of the removable wedge augment is sized and positioned to receive at least a portion of the attachment portion of the base element when the removable wedge augment is coupled to the base element.

Alternative Implementation 216. The glenoid implant of Alternative Implementation 214 or Alternative Implementation 215, wherein the central aperture of the removable wedge augment is an opened slot.

Alternative Implementation 217. The glenoid implant of any one of Alternative Implementations 212 to 216, wherein the removable wedge augment includes one or more abutting surfaces configured to abut respective portions of the trunnion of the base element when the removable wedge augment is coupled to the base element.

Alternative Implementation 218. The glenoid implant of Alternative Implementation 217, wherein the one or more abutting surfaces are positioned adjacent to and on opposing sides of a central aperture of the removable wedge augment.

Alternative Implementation 219. The glenoid implant of any one of Alternative Implementations 212 to 218, wherein the removable wedge augment is sized and shaped to fit into a cavity defect of the first portion of the scapula of the patient.

Alternative Implementation 220. The glenoid implant of any one of Alternative Implementations 211 to 219, further comprising a central fastening element configured to be at least partially positioned through the central aperture of the base element and the central aperture of the second portion of the coupling element to aid in securing the base element and the coupling element to the first portion of the scapula of the patient.

Alternative Implementation 221. The glenoid implant of any one of Alternative Implementations 211 to 220, further comprising a glenosphere configured to be secured to the coupling element.

One or more elements or aspects or steps, or any portion(s) thereof, from one or more of any of Alternative Implementations 1-221 above can be combined with one or more elements or aspects or steps, or any portion(s) thereof, from one or more of any of the other Alternative Implementations 1-221 or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A glenoid implant comprising:
a base element having a central aperture therethrough, a second aperture therethrough, and a wedge element extending from a first side of the base element, the second aperture being configured to receive a portion of a first fastening element therethrough to aid in securing the base element to a first portion of a scapula of a patient;
a coupling element disposed on a second side of the base element opposite the first side and having a first portion and a second portion, the first portion having a first plurality of apertures therethrough and the second portion having a central aperture aligned with the central aperture of the base element; and
an augment configured to be received within a receiving space on the first side of the first portion of the coupling element, the augment having a second plurality of apertures therethrough, each of the first plurality of apertures being aligned with each of the second plurality of apertures to receive a respective second fastening element therethrough to aid in securing the coupling element and the augment to a second portion of the scapula of the patient, the coupling element and the augment being configured to rotate about an axis of the base element such that the coupling element and the augment are movable relative to the base element.

2. The glenoid implant of claim 1, wherein the first portion of the scapula of the patient is a glenoid cavity.

3. The glenoid implant of claim 1, further comprising a central fastening element configured to be at least partially positioned through the central aperture of the base element and the central aperture of the coupling element to aid in securing the base element and the coupling element to the first portion of the scapula of the patient.

4. The glenoid implant of claim 3, wherein a head of the central fastening element is configured to secure additional components using a Morse taper press fit.

5. The glenoid implant of claim 4, wherein the head of the central fastening element is configured to secure a glenosphere.

6. The glenoid implant of claim 3, wherein the central fastening element is a compression screw or a locking screw.

7. The glenoid implant of claim 1, further comprising a glenosphere configured to be secured to the coupling element.

8. The glenoid implant of claim 7, further comprising a second augment coupled to the glenosphere such that a portion of the second augment protrudes from the glenosphere.

9. The glenoid implant of claim 7, further comprising an offset element positioned generally between the coupling element and the glenosphere.

10. The glenoid implant of claim 9, wherein the offset element aids in coupling the glenosphere to the coupling element such that a central axis of the central aperture of the base element is not aligned with a central axis of an aperture within the glenosphere.

11. The glenoid implant of claim 9, wherein the offset element includes a base, a first coupling element protruding from a first side of the base, and a second coupling element protruding from a second opposing side of the base.

12. The glenoid implant of claim 11, wherein the first coupling element is a first trunnion and the second coupling element is a second trunnion.

13. The glenoid implant of claim 11, wherein the first coupling element is configured to be press fit into the central aperture of the second portion of the coupling element and the second coupling element is configured to be press fit into the aperture of the glenosphere.

14. The glenoid implant of claim 3, further comprising a threaded element configured to be coupled to the central aperture of the second portion of the coupling element in a threaded fashion.

15. The glenoid implant of claim 14, wherein a head of the central fastening element includes a threaded portion that is configured to be engaged by the threaded element in a threaded fashion.

16. The glenoid implant of claim 14, wherein the threaded element is a cylindrical ring having an outer surface and an inner surface, at least a portion of the outer surface is threaded and at least a portion of the inner surface is threaded.

17. The glenoid implant of claim 16, wherein the threaded outer surface is threaded in a first direction and wherein the threaded inner surface is threaded in a second opposing direction.

18. The glenoid implant of claim 1, wherein the wedge element includes a first side and a second opposing side, and wherein a thickness of the first side is different from a thickness of the second opposing side.

19. The glenoid implant of claim 1, wherein the base element has a first thickness adjacent to the central aperture and a second thickness adjacent to the second aperture, the first thickness of the base element adjacent to the central second aperture is greater than the second thickness of the base element adjacent to the first-second aperture.

20. A glenoid implant comprising:
a base element having a trunnion extending from a first side of the base element the trunnion forming a central aperture therethrough and an attachment portion adjacent to the trunnion, the base element further forming a second aperture that is configured to receive a portion of a first fastening element therethrough to aid in coupling the base element to a first portion of a scapula of a patient;
a coupling element disposed on a second side of the base element opposite the first side and having a first portion and a second portion, the first portion having a plurality of apertures therethrough and the second portion having a central aperture aligned with the central aperture of the base element; and an augment configured to be received within a receiving space on the first side of the first portion of the coupling element, the augment having a second plurality of apertures therethrough, each of the first plurality of apertures being aligned with each of the second plurality of apertures to receive a respective second fastening element therethrough to aid in securing the coupling element and the augment to a second portion of the scapula of the patient, the coupling element and the augment being configured to rotate about an axis of the base element such that the coupling element and the augment are movable relative to the base element.

21. The glenoid implant of claim 20, further comprising a removable wedge augment coupled to the base element.

22. The glenoid implant of claim 21, wherein the removable wedge augment is coupled to the base element via a threaded fastening element.

23. The glenoid implant of claim 22, wherein the removable wedge augment includes a central aperture configured to receive a least a portion of the threaded fastening element therethrough.

24. The glenoid implant of claim 23, wherein the central aperture of the removable wedge augment is sized and positioned to receive at least a portion of the attachment portion of the base element when the removable wedge augment is coupled to the base element.

25. The glenoid implant of claim 23, wherein the central aperture of the removable wedge augment is an opened slot.

26. The glenoid implant of claim 21, wherein the removable wedge augment includes one or more abutting surfaces configured to abut respective portions of the trunnion of the base element when the removable wedge augment is coupled to the base element.

27. The glenoid implant of claim 26, wherein the one or more abutting surfaces are positioned adjacent to and on opposing sides of a central aperture of the removable wedge augment.

28. The glenoid implant of claim 21, wherein the removable wedge augment is sized and shaped to fit into a cavity defect of the first portion of the scapula of the patient.

29. The glenoid implant of claim 20, further comprising a central fastening element configured to be at least partially positioned through the central aperture of the base element and the central aperture of the second portion of the coupling element to aid in securing the base element and the coupling element to the first portion of the scapula of the patient.

30. The glenoid implant of claim 20, further comprising a glenosphere configured to be secured to the coupling element.

* * * * *